June 23, 1959 R. B. TROUSDALE 2,892,035

ELECTRONIC TELEPHONE SYSTEM

Filed May 16, 1956 48 Sheets-Sheet 1

INVENTOR.
ROBERT B. TROUSDALE
BY F. H. Henson
AGENT

June 23, 1959 R. B. TROUSDALE 2,892,035

ELECTRONIC TELEPHONE SYSTEM

Filed May 16, 1956 48 Sheets-Sheet 2

June 23, 1959 R. B. TROUSDALE 2,892,035

ELECTRONIC TELEPHONE SYSTEM

Filed May 16, 1956 48 Sheets-Sheet 3

June 23, 1959 R. B. TROUSDALE 2,892,035

ELECTRONIC TELEPHONE SYSTEM

Filed May 16, 1956 48 Sheets-Sheet 5

June 23, 1959 R. B. TROUSDALE 2,892,035

ELECTRONIC TELEPHONE SYSTEM

Filed May 16, 1956 48 Sheets-Sheet 7

June 23, 1959 R. B. TROUSDALE 2,892,035

ELECTRONIC TELEPHONE SYSTEM

Filed May 16, 1956 48 Sheets-Sheet 8

LINK ALLOTTER 16

June 23, 1959 R. B. TROUSDALE 2,892,035

ELECTRONIC TELEPHONE SYSTEM

Filed May 16, 1956 48 Sheets-Sheet 9

June 23, 1959 R. B. TROUSDALE 2,892,035

ELECTRONIC TELEPHONE SYSTEM

Filed May 16, 1956 48 Sheets-Sheet 10

June 23, 1959 R. B. TROUSDALE 2,892,035

ELECTRONIC TELEPHONE SYSTEM

Filed May 16, 1956 48 Sheets-Sheet 12

June 23, 1959 R. B. TROUSDALE 2,892,035

ELECTRONIC TELEPHONE SYSTEM

Filed May 16, 1956 48 Sheets-Sheet 13

June 23, 1959 R. B. TROUSDALE 2,892,035

ELECTRONIC TELEPHONE SYSTEM

Filed May 16, 1956 48 Sheets-Sheet 14

TONE & PULSE GENERATOR 29

LINE SWITCH CIRCUIT LS-11

June 23, 1959 R. B. TROUSDALE 2,892,035

ELECTRONIC TELEPHONE SYSTEM

Filed May 16, 1956 48 Sheets-Sheet 18

June 23, 1959 R. B. TROUSDALE 2,892,035

ELECTRONIC TELEPHONE SYSTEM

Filed May 16, 1956 48 Sheets-Sheet 19

June 23, 1959 R. B. TROUSDALE 2,892,035

ELECTRONIC TELEPHONE SYSTEM

Filed May 16, 1956 48 Sheets-Sheet 20

June 23, 1959 R. B. TROUSDALE 2,892,035

ELECTRONIC TELEPHONE SYSTEM

Filed May 16, 1956 48 Sheets-Sheet 21

June 23, 1959 R. B. TROUSDALE 2,892,035

ELECTRONIC TELEPHONE SYSTEM

Filed May 16, 1956 48 Sheets-Sheet 23

June 23, 1959 R. B. TROUSDALE 2,892,035

ELECTRONIC TELEPHONE SYSTEM

Filed May 16, 1956 48 Sheets-Sheet 24

FINDER CONNECTOR 15-1

June 23, 1959 R. B. TROUSDALE 2,892,035

ELECTRONIC TELEPHONE SYSTEM

Filed May 16, 1956 48 Sheets-Sheet 26

June 23, 1959 R. B. TROUSDALE 2,892,035

ELECTRONIC TELEPHONE SYSTEM

Filed May 16, 1956 48 Sheets-Sheet 30

CHANNEL PULSE MATRIX 25

Fig. 32 CHANNEL PULSE MATRIX 25

June 23, 1959 R. B. TROUSDALE 2,892,035

ELECTRONIC TELEPHONE SYSTEM

Filed May 16, 1956 48 Sheets-Sheet 32

June 23, 1959 R. B. TROUSDALE 2,892,035

ELECTRONIC TELEPHONE SYSTEM

Filed May 16, 1956 48 Sheets-Sheet 38

BUSY LEAD CONVERTER & EMERGENCY SERVICE NUMBER CIRCUIT 17

BUSY LEAD CONVERTER & EMERGENCY
SERVICE NUMBER CIRCUIT 17

June 23, 1959 R. B. TROUSDALE 2,892,035

ELECTRONIC TELEPHONE SYSTEM

Filed May 16, 1956 48 Sheets-Sheet 40

June 23, 1959 R. B. TROUSDALE 2,892,035

ELECTRONIC TELEPHONE SYSTEM

Filed May 16, 1956 48 Sheets-Sheet 43

June 23, 1959 R. B. TROUSDALE 2,892,035

ELECTRONIC TELEPHONE SYSTEM

Filed May 16, 1956 48 Sheets-Sheet 46

June 23, 1959 R. B. TROUSDALE 2,892,035

ELECTRONIC TELEPHONE SYSTEM

Filed May 16, 1956 48 Sheets-Sheet 48

United States Patent Office 2,892,035

Patented June 23, 1959

2,892,035

ELECTRONIC TELEPHONE SYSTEM

Robert B. Trousdale, Webster, N.Y., assignor to General Dynamics Corporation, Rochester, N.Y., a corporation of Delaware Application May 16, 1956, Serial No. 585,186

17 Claims. (Cl. 179—15)

This invention relates in general to electronic telephone systems and more particularly to line finders and line finder allotters for use in electronic telephone systems. The invention herein disclosed is an improvement of the line finder and line finder allotter disclosed in my copending application, Serial No. 492,065, filed March 4, 1955, now patent No. 2,830,121, and assigned to the same assignee as the present invention.

In the time division multiplex telephone system disclosed in the above-identified copending application, each line of the system is assigned an individual time position which recurs in repetitive time position frames. Each line of the system is sampled for supervisory information during its individual time position in each time position frame and when a call is initiated on any one of the lines, a multiplexer input pulse is developed in the time position of the calling line. The line finders of the system are of the normally searching type and develop finder gate or search pulses in each individual time position in turn. When the search pulse generated by the allotted line finder coincides in time position with an input pulse, the line finder seizes the calling line and the searching operation of that line finder is terminated.

The line finders of the above-identified application are controlled to search at the frame rate, or slower. That is, the line finder develops a search or finder gate pulse only in one individual time position corresponding to a particular line of the system in each time position frame. Thus it is possible in a one hundred line system in which the finders search at the frame rate, to have a maximum finding time for each line finder equal to the duration of one hundred time position frames. If the frame rate is one thousand c.p.s., the maximum finding time is one hundred milliseconds. Although this finding time is not objectionable, the allotter which enables the line finders for use in turn must necessarily be a rather complex circuit. The allotter must enable only line finders which have not previously seized calling lines since in a system having ten or fifteen links the additive finding time would become prohibitive when several successively allotted line finders were already engaged.

Accordingly, it is the general object of this invention to provide a new and improved electronic telephone system.

It is a further object of this invention to provide new and improved line finders for use in an electronic telephone system.

It is a more particular object of this invention to provide new and improved time division multiplex telephone system line finders having a minimum finding time, and a new, improved, and simplified allotter for controlling the enablement of said line finders.

The invention accomplishes the above cited objects by providing a searching type line finder which develops finder gate or search pulses in the individual time position of each and every line of the system in each time position frame. To accomplish this, it is necessary that the line finders operate in exact synchronism with the signal source which establishes the individual time positions assigned to the lines of the system.

According to the invention, the signal source or pulse generator comprises a chain of frequency divider circuits in which each divider circuit except the first is controlled by the preceding circuit at the output frequency of the preceding circuit. The operation of the first divider circuit of the generator chain is controlled by a continuously running master oscillator. Each line finder includes a register which has a chain of frequency divider circuits equal in number to the divider circuits of the generator chain. By suitable gating of the output signals from the generator divider circuits and the output signals from the register divider circuits, a finder gate pulse is produced in any one of the line finders only when the setting of its register is identical to the setting of the generator. A portion of each finder gate pulse so produced is utilized to advance the setting of the line finder register. Thus, a finder gate pulse is not produced by a given finder until the generator advances to a setting which is identical to the setting of the register in that line finder, and once the register is synchronized with the pulse generator, it remains in synchronization until that line finder finds another calling line.

Since the line finding time is extremely short, a very much simplified allotter may be used. According to the present invention, the allotter is controlled to enable the line finders in turn, regardless of their idle or busy condition, at the frame rate. Thus, each line finder is enabled in turn for the duration of a time position frame and is capable of seizing any calling line of the system during that one frame.

The invention has been illustrated as embodied in a bi-path system in which the supervisory and communication paths are separate and distinct. It is to be understood that the invention is not limited to use in such a system. The invention could readily be used in a multiplex system in which the input pulses are modulated with both supervisory and speech signals. Such a system is disclosed and claimed in a copending application of Robert B. Trousdale and Frank A. Morris, Serial No. 134,974, filed December 24, 1949, issued United States Patent No. 2,773,934, December 11, 1956, and assigned to the same assignee as the present invention.

The electronic switching telephone system herein disclosed is of the bi-path type. That is, one path is used to control the selection of the lines and a second path is used to complete a connection for the transmission of voice signals between the calling and called lines. A number of line finder-connector links are provided in the system so that a number of calls may be handled simultaneously. An individual multiple point is provided for each of the links and the lines of the system are adapted to be selectively connected to any one of the multiple points for communication purposes.

The line circuits of the system serve to separate the supervisory signals from the voice signals received over their associated lines. The supervisory signals, such as on-hook supervision, off-hook supervision, and dial impulses are connected to the supervisory path and are used to control an assigned line finder-connector link to select and control the connection of the calling and called lines to the multiple point associated with that link.

Each line circuit employs a repeat coil for the purpose of transmitting the voice signals. The primary side of the repeat coil is attached to the line conductors and provides talking battery to the station or stations connected to that line. The secondary side of the repeat coil is connected to an individual line switch for that line. The line switch comprises a number of bilateral transistor switches of the type disclosed in the copending application of Robert B. Trousdale and George Elliott, Serial No. 529,530, filed August 18, 1955, and assigned to the same assignee as the present invention. Each bilateral transistor switch of the line switch is connected between the secondary winding of the line circuit repeat coil and a different one of the link multiple points. Thus, in a one hundred line system, there are one hundred bilateral transistor switches adapted to connect the secondary winding of the repeat coils in the one hundred line circuits to each link multiple point. The bilateral transistor switches are normally biased for non-conduction so that they block voice current transmission between the lines. When a bilateral transistor switch is biased for conduction, it extends the voice path from its associated line circuit to one of the link multiple points on a bidirectional basis; much like a closed pair of relay contacts. Voice signals may pass through the switch in either direction so that when a second switch is closed between a second line circuit and the same multiple point, voice signals may be transmitted between the two line circuits. Either the line finder or the connector of the link is operative to close the same voice switch. In other words, the system is "single-ended" and employs only one switch point between each line and each link. If a particular line is calling, the line finder of the assigned link acts to operate the switch, whereas, if a particular line is called, the connector of the assigned link acts to close this switch.

Selection of the bilateral transistor switches associated with calling and called lines is performed on a time sharing multiplex basis. Each line of the one hundred line system is assigned a particular pulse time position in each of the repetitive time position frames. Each time position frame comprises one hundred twenty-eight individual time positions since the system is designed on a binary basis and seven places are required to express the number "100" in the binary system of notation.

A multiplexer circuit, provided in the system, samples each of the one hundred line circuits in turn for supervisory information. If a line is off-hook, a multiplexer or input pulse is generated by the multiplexer in the assigned time position of that line. During dial interruptions and during periods when the line is on-hook, no multiplexer pulse is generated. The multiplexer output is multipled to all of the line finders and connectors of the system.

The line finders of the system respond to the appearance of pulses on the multiplexer output conductor, and, under control of the link allotter provided in the system, one of the line finders is activated to seize the calling line. The responding line finder seizes the line by generating a gating pulse in the same time position as the calling line multiplexer pulse. This pulse is then utilized to operate certain circuits in the associated connector, to render the bilateral transistor switch associated with that particular link in the line switch associated with the calling line conductive and to serve as a busy marking pulse, which indicates to the other links of the system that the calling line has been seized.

The connector associated with the responding line finder is then controlled in accordance with dial impulses appearing in the time position of the calling line to select the desired called line. If the called line is idle, the connector functions to generate a gating pulse in the time position of the called line. This gating pulse is utilized to render the bilateral transistor switch associated with that particular link in the line switch associated with the called line conductive and to produce a busy marking pulse which indicates to the other links of the system that the called line is busy. When the bilateral transistor switch in the line switch associated with the called line is rendered conductive, a talking or communication connection is completed from the calling line circuit to the called line circuit by way of the bilateral transistor switch in the line switch associated with the calling line, the link multiple point, and the bilateral transistor switch in the line switch associated with the called line.

The line switches are designed in such a way that the bilateral transistor switches will lock up in response to an applied short pulse. Thus, through time division multiplexing principles, it is possible to provide a single control conductor for each link to which is applied short pulses originating in that line finder-connector link. In setting up a call through the system, two switch control pulses are applied during each time division frame to this switch control conductor. As previously mentioned, a pulse in the time position of the calling line is generated by the line finder and a pulse in the time position of the called line is generated by the connector circuit.

In the illustrated fifteen link system, the fifteen switch control conductors from the fifteen links are combined in a two out of six configuration so that only six bi-stable circuits are needed in each line switch circuit to control the fifteen bilateral transistor switches of that line switch. Both line identification and link identification information is carried on these six conductors. Line information is carried by the time position occupied by pulses on the conductors, and link information is carried by the particular combination of conductors.

When the call is terminated, the line finder and connector of the assigned link cease to generate gating pulses in the time positions of the calling and called lines, respectively. When these pulses are no longer produced, the controlling bi-stable circuits in the line switches associated with the calling and called lines restore to normal so that the bilateral transistor switches between the calling and called lines and the multiple point of the assigned link are again rendered non-conductive.

Dial tone and busy tone signals are introduced into the talking path at the link multiple point. These tones are generated in the common equipment and their application is controlled by circuits in the connector. Ringback tone is generated in the called line circuit and its routed back over the previously completed talking connection to the calling line.

Ringing of the called line is accomplished with time division multiplex principles by the transmission of a ringing control pulse, generated in the connector, over a ringing control conductor multipled to all of the connectors and line circuits of the system. The ringing facilities in each line circuit are made responsive to pulses on this control conductor on a fully selective basis depending on the relative timing of the pulses, so that the proper line is rung. The first or second party on the line is rung in accordance with a secondary time multiplexing system, wherein the tip sides of the lines are all rung during a first one-second interval, and the ring sides of the lines are all rung during a second one-second interval. These two ringing intervals are spaced by one-second off periods so that a four-second cycle is provided. Ringing selection is controlled by the particular value of a digit prefixed to the line number.

An executive right of way feature is provided in the system. An executive marking conductor is multipled to all of the connectors of the system and carries executive marking pulses in the time positions of executive lines. The connectors compare the time position of their associated calling line with the time position of the executive marking pulses carried on the executive marking conductor. If these pulses occur in the same time position, the link handling a call which involves the line desired by the calling executive is forcibly released and the line switches of the lines involved in that call are thus restored to normal. The idle line finders of the system are prevented from seizing the line desired by the calling executive, even though the station on that line remains off-hook. The connector controlled by the calling executive then seizes the desired called line. If more than one executive line is provided in the system, the executive right of way feature is given to only the first executive line calling a particular line. In other words, the second executive call does not release the previously completed executive connection.

A trunk hunting feature is provided in the system by marking, on a trunk hunting marking conductor, the time positions of each line in each trunk group except the last line of the group. The trunk hunting marking conductor is then multipled to all of the connectors of the system, which respond by performing the trunk hunting operation when lines within the group are dialed by the calling line. Provision is made in the connector to allow trunk hunting to take place in preference to executive right of way so that only the last line in a trunk group is vulnerable to intrusion by an executive line.

An emergency service number feature is provided in the disclosed system since it is contemplated that the disclosed system may be utilized as the telephone system for an ocean-going ship. An emergency service line circuit is assigned for this purpose. A manual switch is provided on the line side of the emergency service line circuit so that the line connections can be wired in multiple either to the pilot house telephone line circuit or to the quarter-deck telephone line circuit. Calls may be made to the latter two telephones either through the regularly assigned line circuit or through the emergency service number line circuit. When these telephones originate calls, the switchboard is so arranged that the normally assigned line circuit will handle the call, thus leaving the emergency service line circuit free to handle emergency calls incoming to the selected one of these lines. This is accomplished by providing gating circuits within the busy lead converter circuit which operate on the busy pulses in a predetermined manner as follows:

(1) A permanent busy marking pulse is provided in the time position of the emergency service line circuit on the finder busy lead. The finders of the system are thus unable to respond to a call originating from this line circuit.

(2) A permanent absence of a busy marking pulse is provided in the time position of the emergency service line circuit on the connector busy conductor. Thus, all connectors are able to cut through to the emergency service line circuit regardless of its idle or busy condition.

(3) The busy lead converter functions to make the pilot house line circuit or the quarter-deck line circuit, as the case may be, artifically busy in the event that the emergency service number is dialed. This prevents the undesired calling in of a line finder incident to the answering of an emergency service call at the pilot house or quarter-deck telephone since the calling connector does not provide a busy marking pulse to cover these lines when the emergency service number is dialed. It also prevents a connector from seizing the regular line circuit and thus breaking in on an emergency call when the emergency service line circuit is in use.

Further objects and advantages of the invention will become apparent as the following description proceeds and the features of novelty which characterize the invention will be pointed out in particularity in the claims annexed to and forming a part of this specification.

For a better understanding of the invention, reference may be had to the accompanying drawings which comprise 49 figures on 48 sheets.

Figs. 1–6, inclusive, show a trunking diagram of the disclosed system in block form.

Figs. 9–41, inclusive, illustrate the details of the system shown in the block diagram of Figs. 1–6, inclusive.

Figure 43:
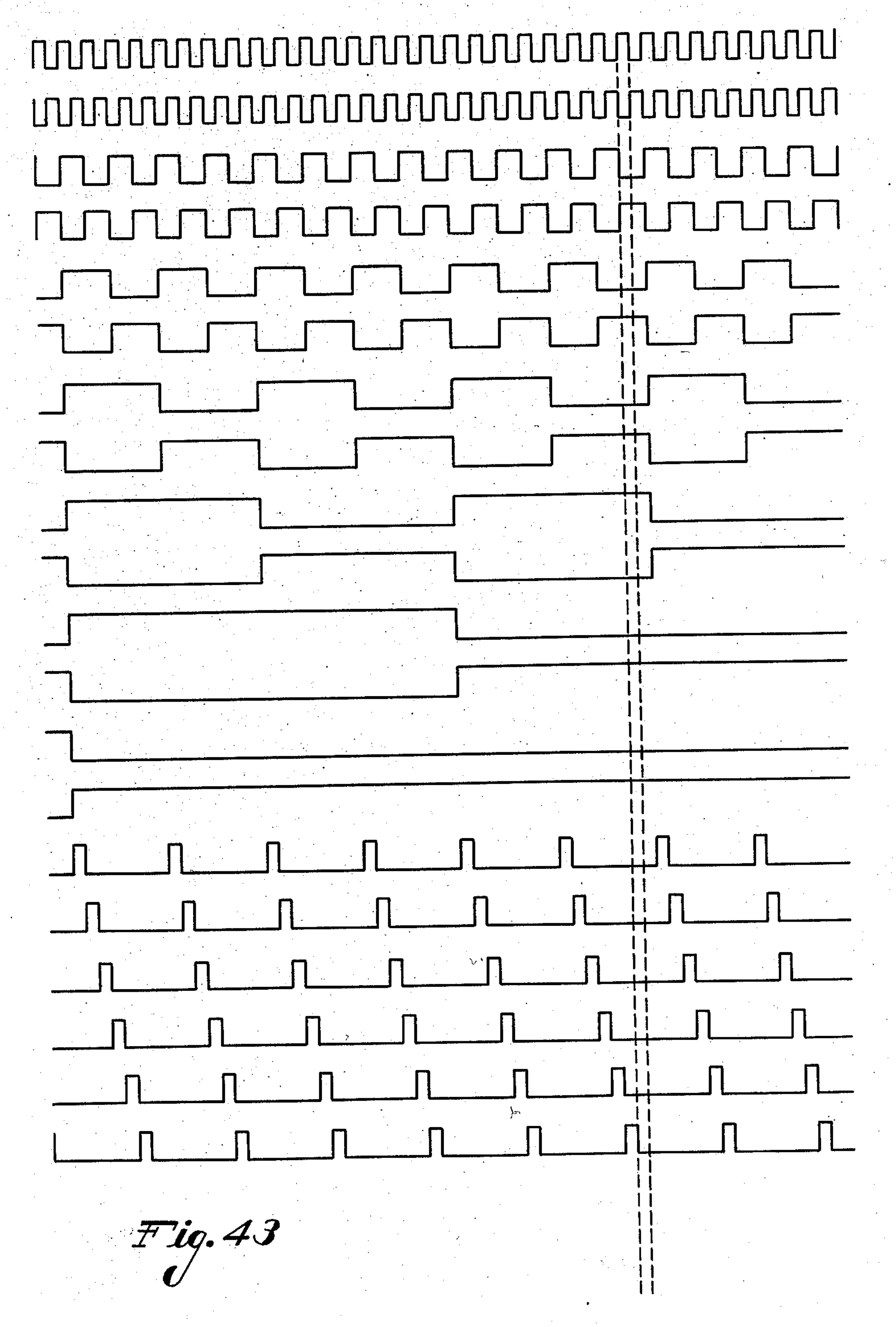
Figure 44:
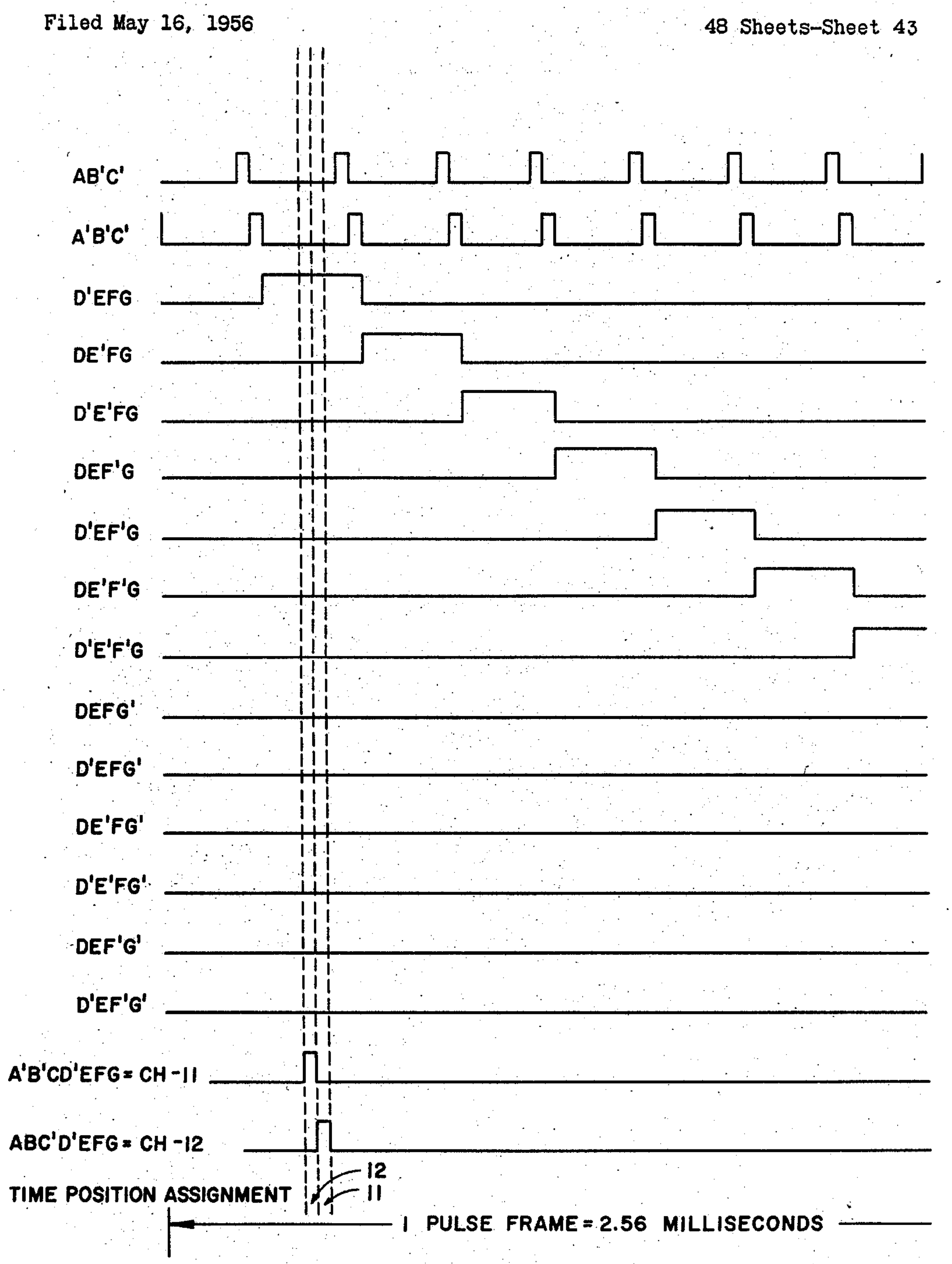
Figure 45:
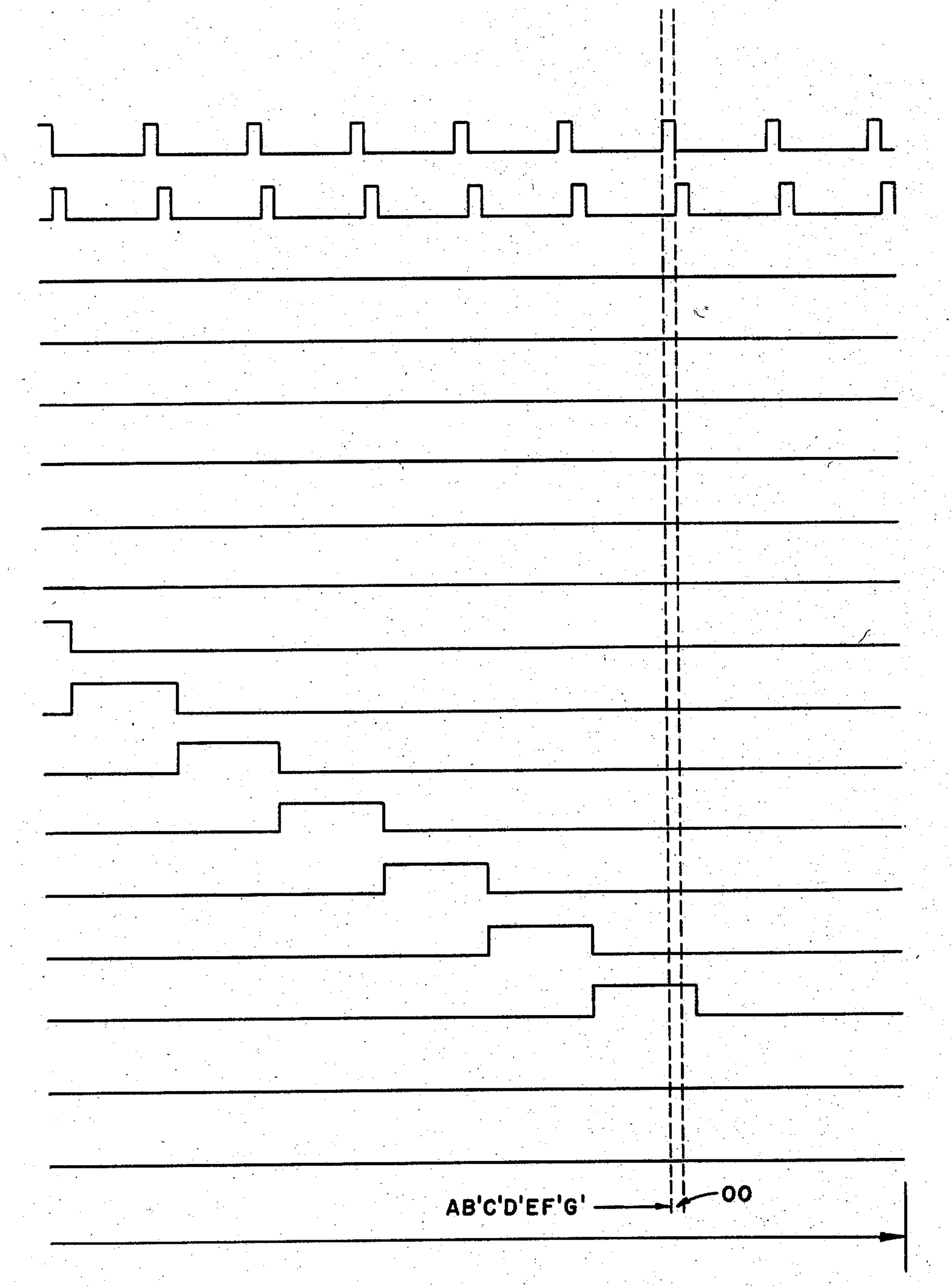

Figs. 42–45, inclusive, graphically illustrate the output signals from the binary pulse generation circuits of the system. Fig. 43 should be placed to the right of Fig. 42, and Figs. 44 and 45 should be placed beneath Figs. 42 and 43, respectively.

Figure 46:
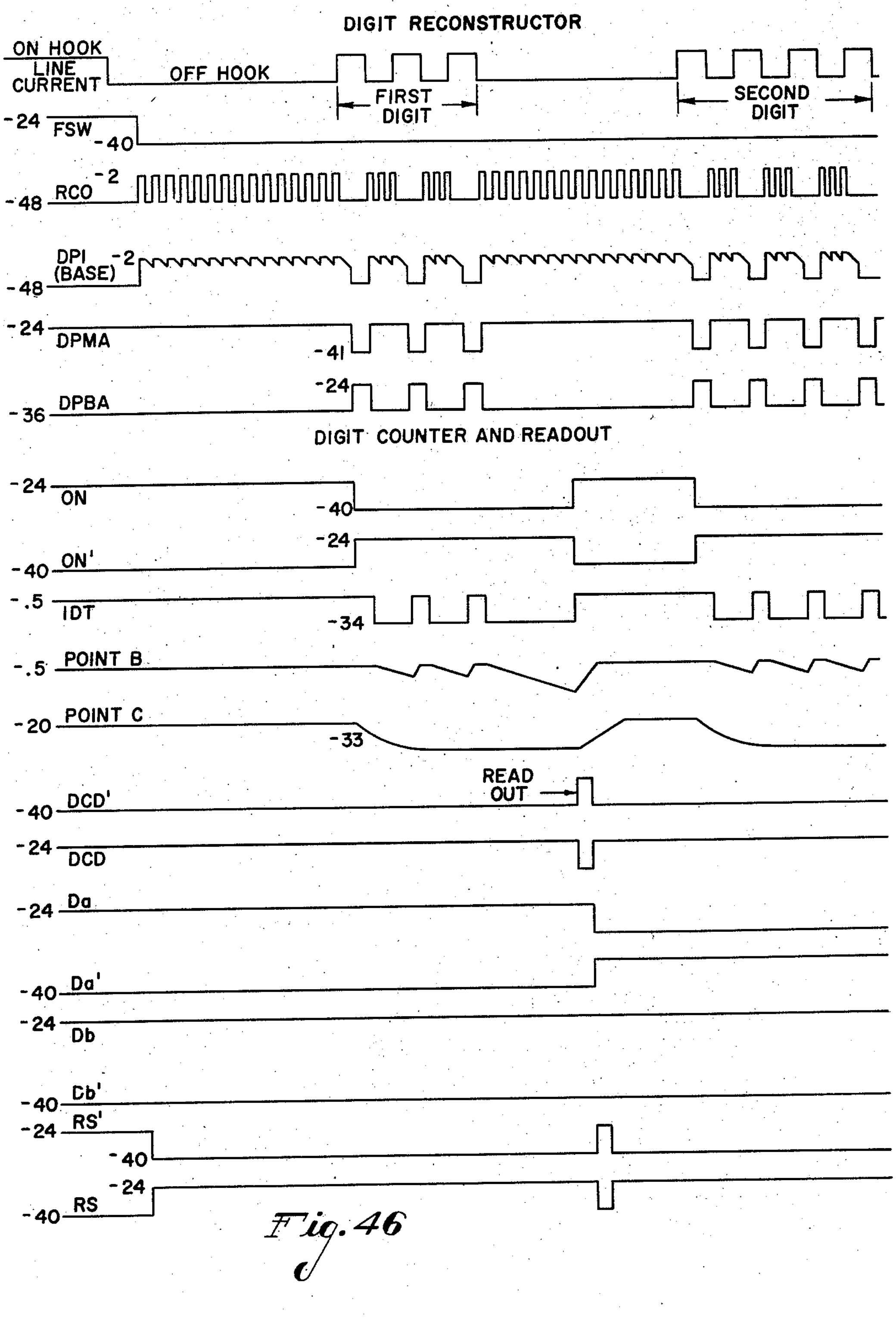
Figure 47:
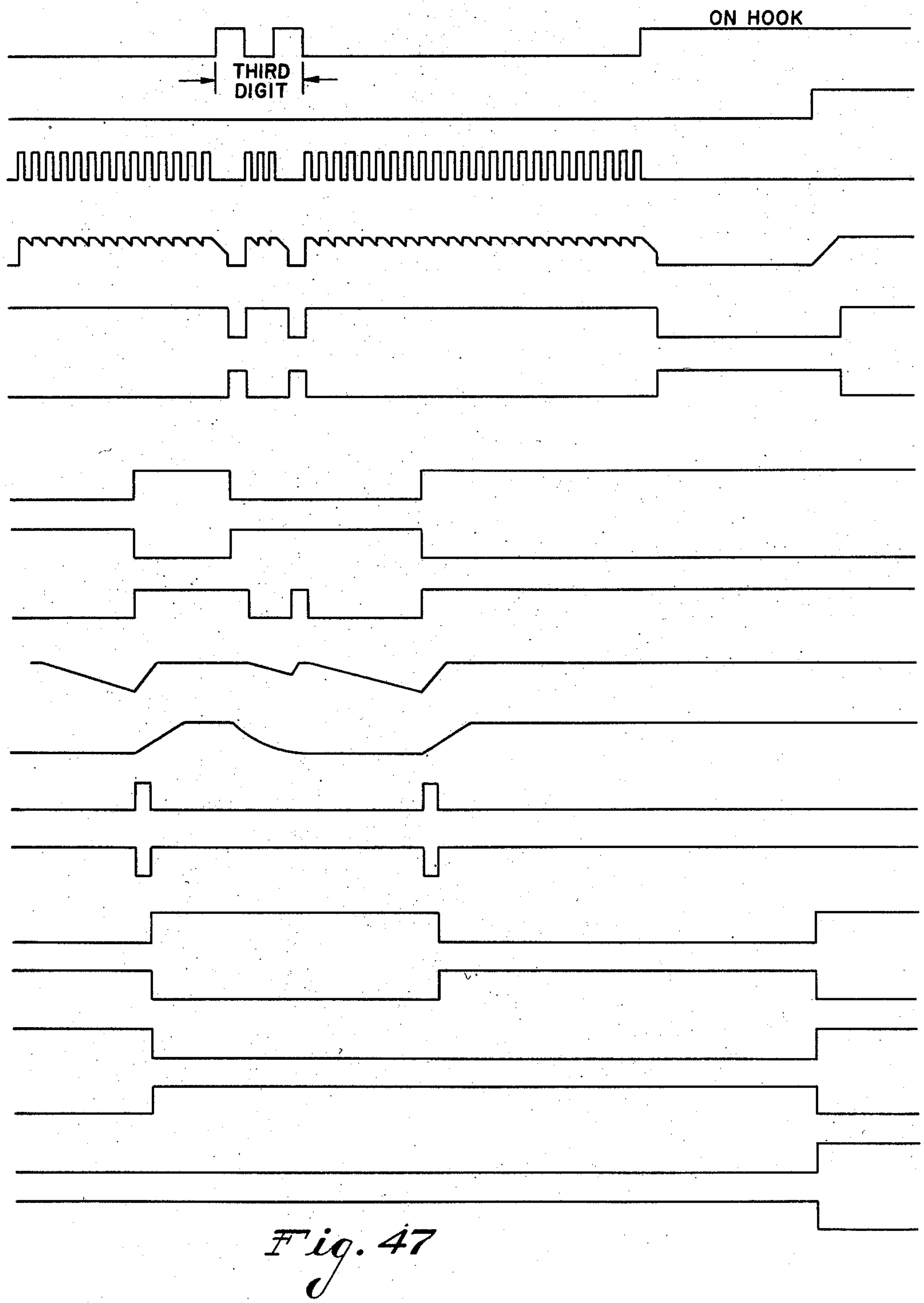
Figure 48:
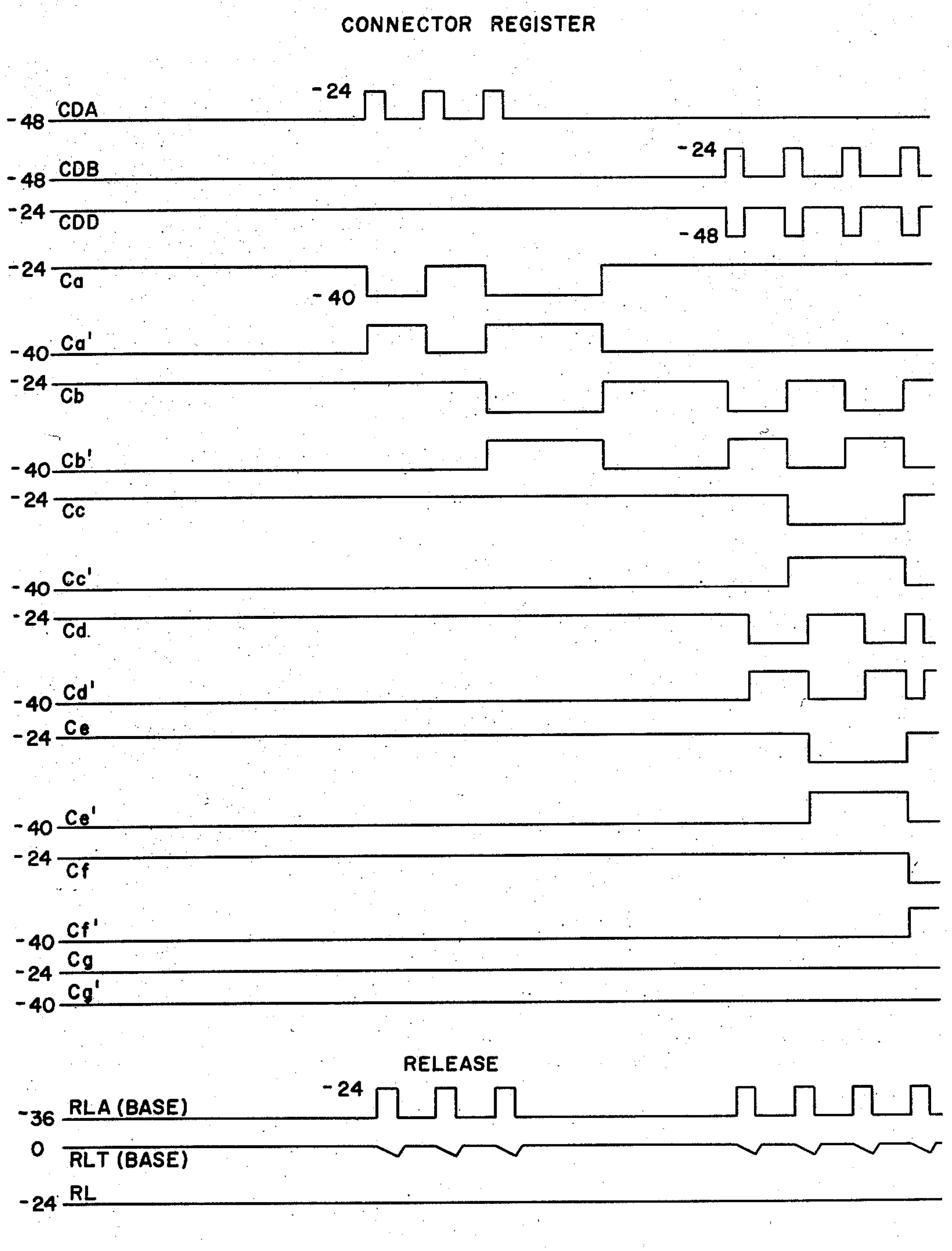
Figure 49:
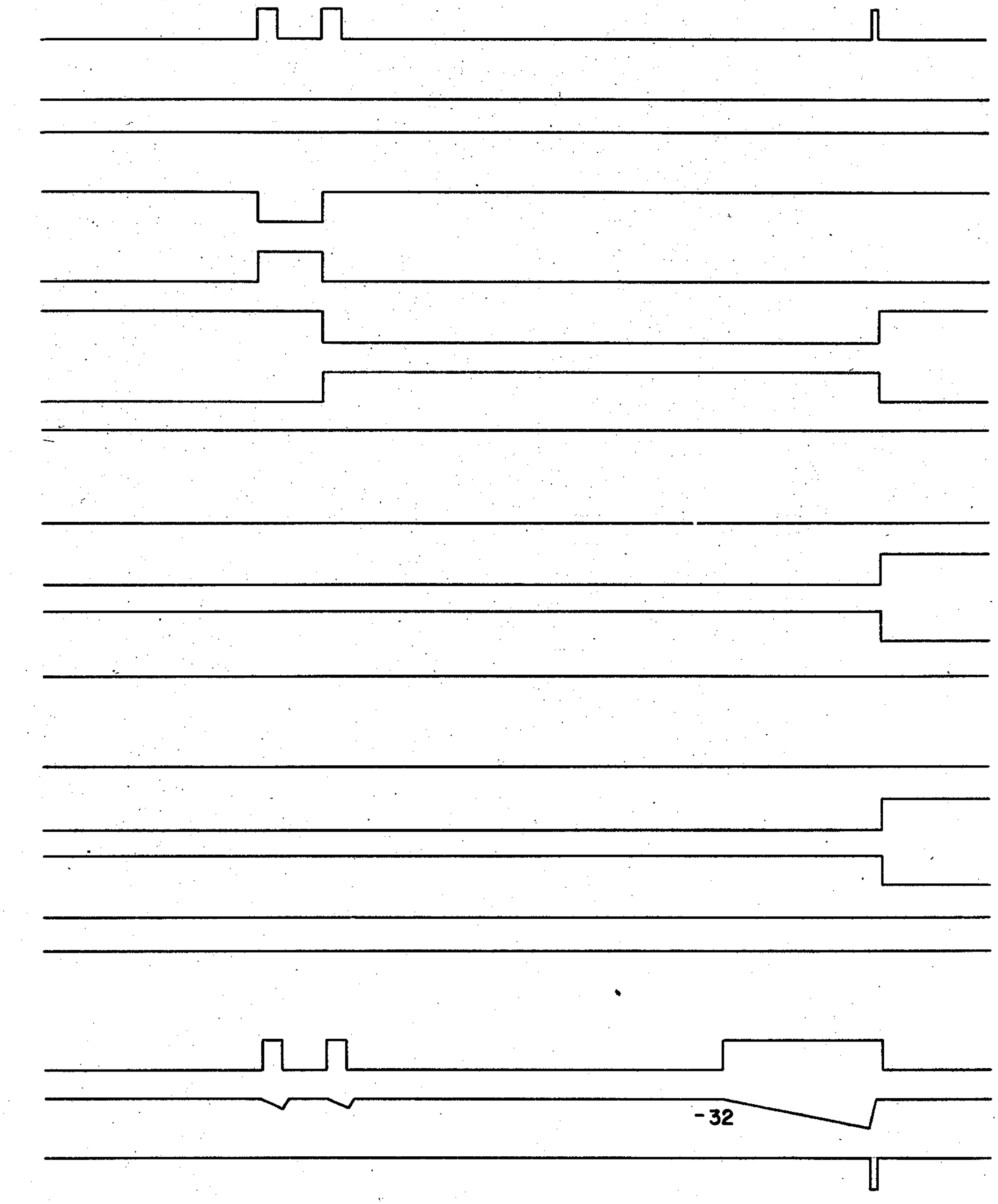

Figs. 46–49, inclusive, illustrate waveforms found in certain components of the connector circuit. Fig. 47 should be placed to the right of Fig. 46 and Figs. 48 and 49 should be placed beneath Figs. 46 and 47, respectively.

GENERAL DESCRIPTION

The general operation of the system can best be understood by reference to the trunking diagram shown in Figs. 1–6, inclusive. The system has been illustrated as comprising two lines, namely, the lines associated with line circuits 11 and 12, and three links, namely, links 1, 2 and 3. Link 1 is identical to links 2 and 3 and comprises finder-connector 15–1 and link 1 multiple point 14–1.

It is to be understood, of course, that in practice there would be up to one hundred line circuits identical to line circuits 11 and 12 associated with each group of links. The number of links required for one hundred line circuits is, of course, dictated by traffic conditions; although the trunking diagram shows just three links, from ten to fifteen links will normally be required to handle the traffic in each one hundred line group.

As previously mentioned, the system is of the bi-path type. The major components of the system are the voice path, a control path, equipment common to the entire switchboard, and equipment common to the one hundred line group. It is believed expedient to a more complete understanding of the system to describe the common equipment, group common equipment, and the voice path before proceeding to trace a call through the system. The control path, which comprises the finder-connector links, will be described in conjunction with the tracing of a call through the system.

*Common equipment*

Figure 3:
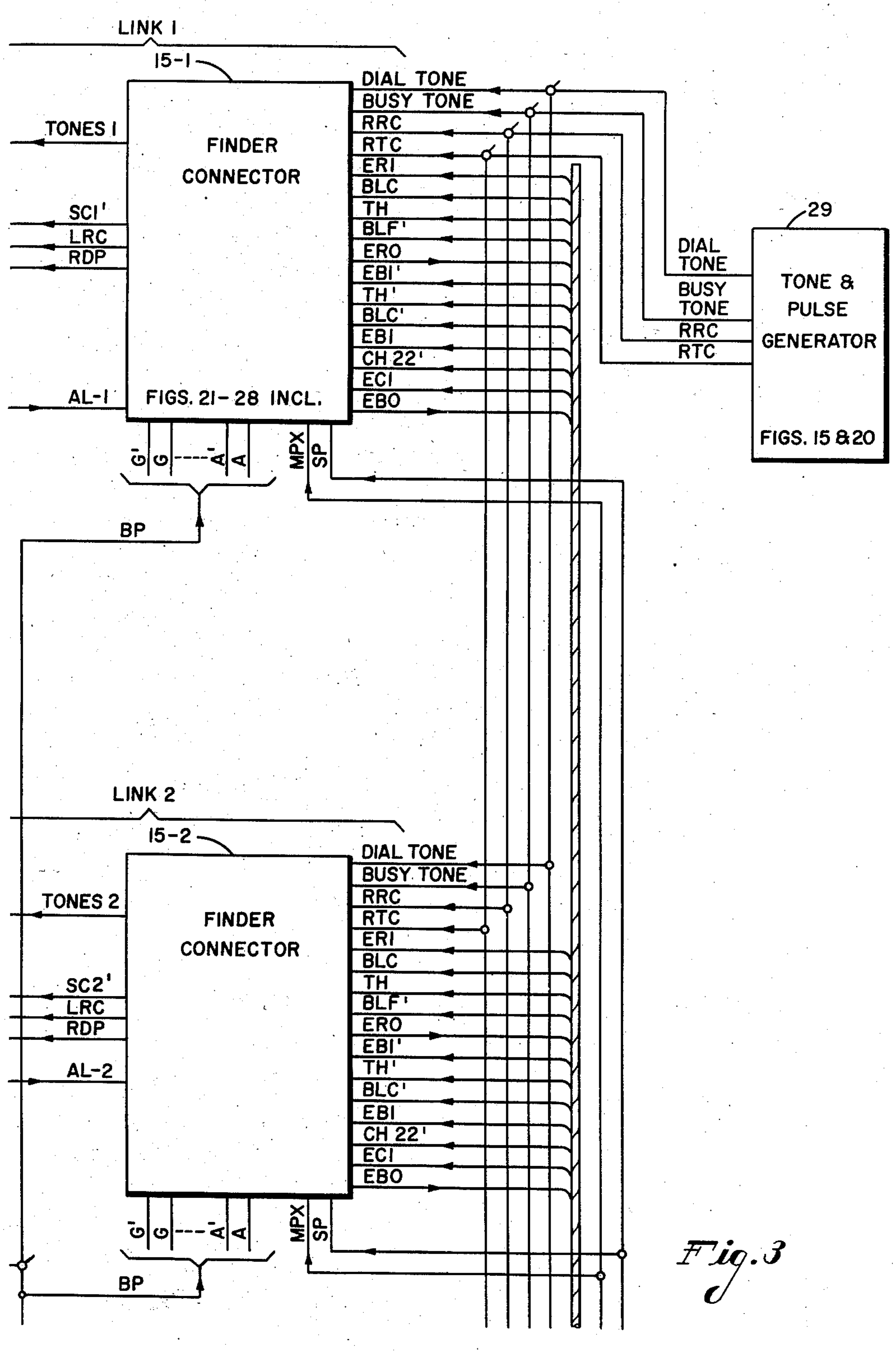
Figure 4:
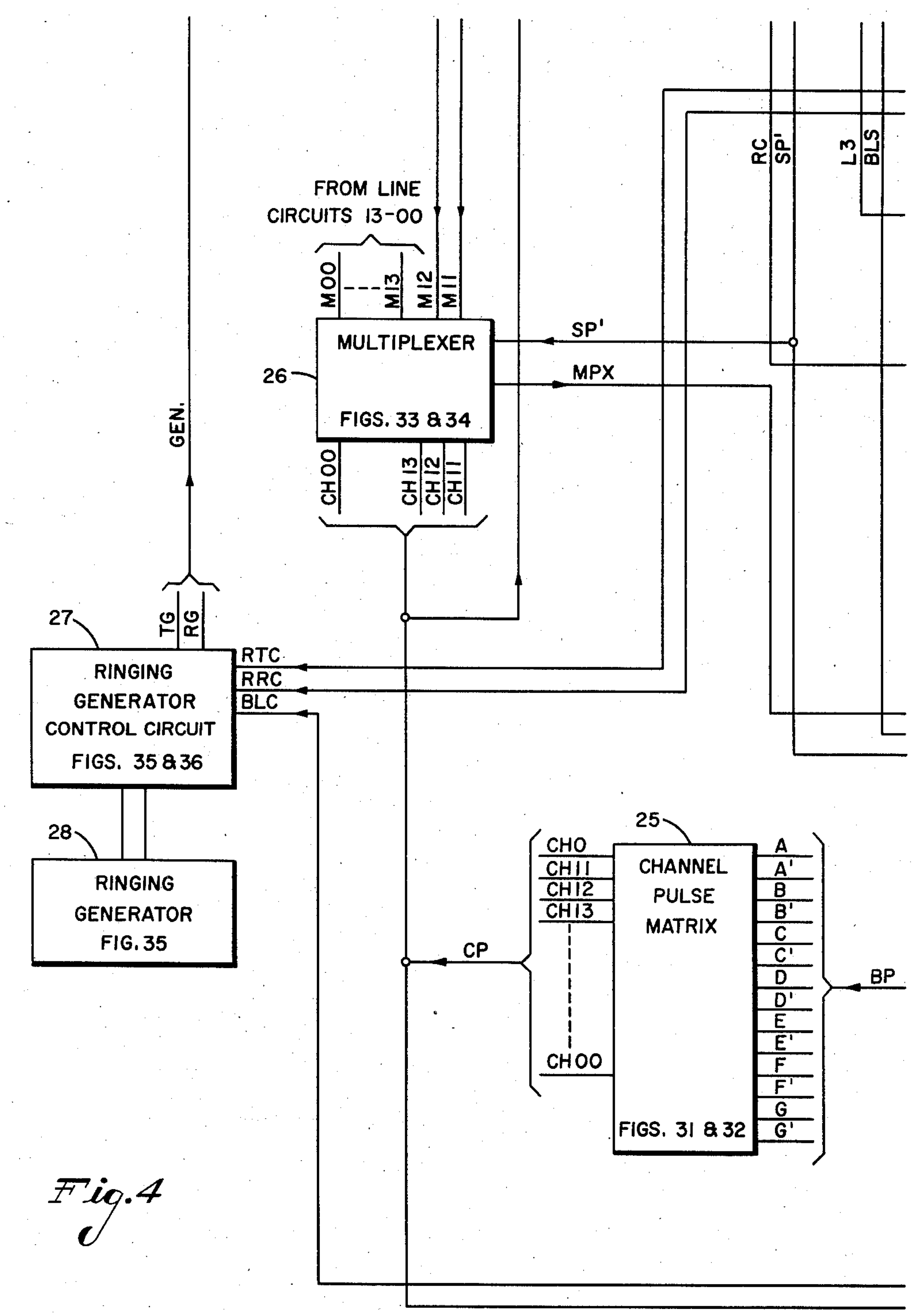
Figure 5:
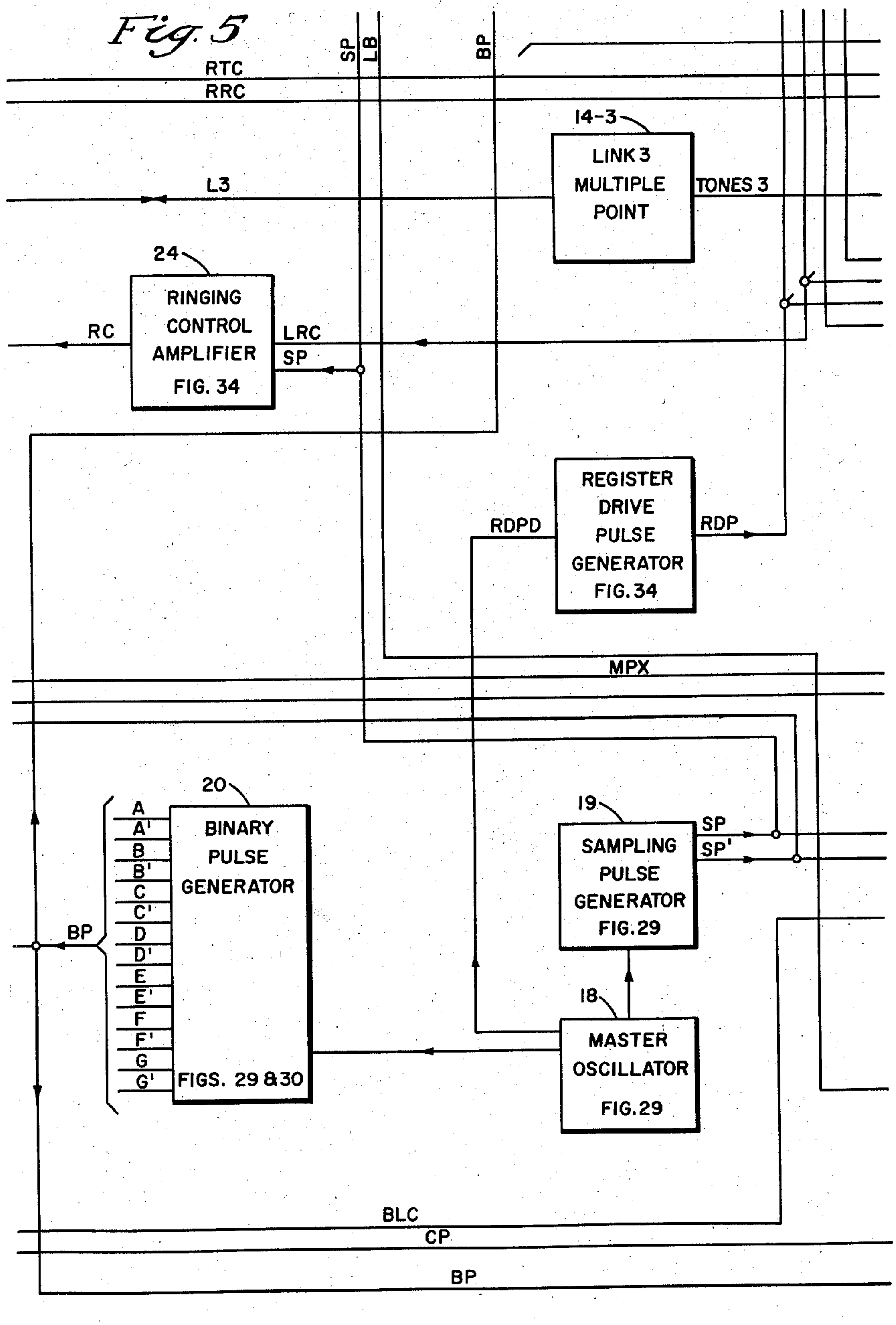
Figure 6:
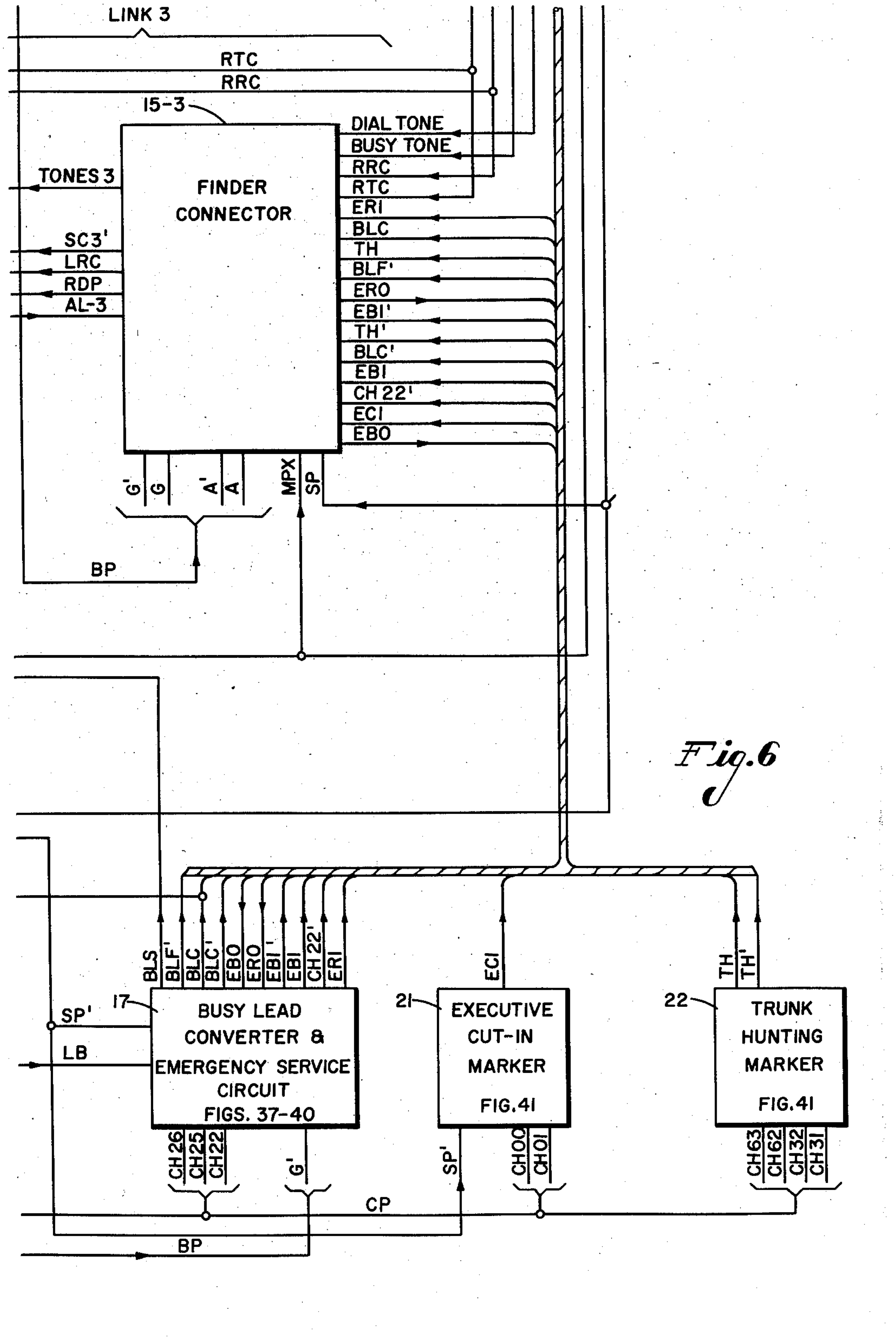
Figure 7:
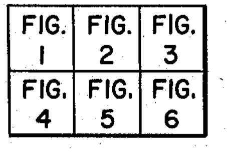
Fig. 7 shows the recommended arrangement of the block diagram drawings.
Figure 8:
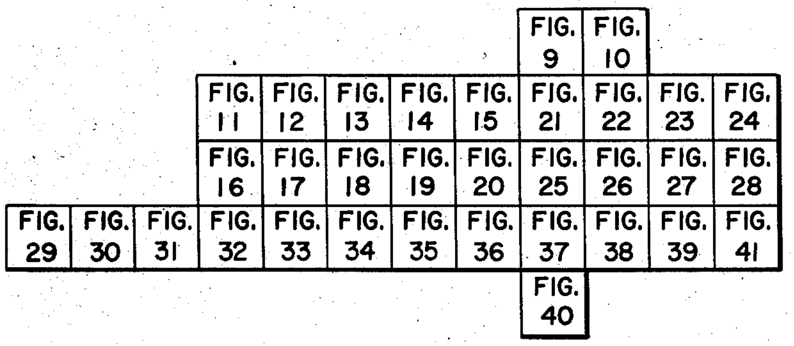
Fig. 8 shows the recommended arrangement of the detailed circuit drawings to show the invention.

The common equipment is defined as the equipment which is common to the entire switchboard. No duplication of these circuits would be required for a switchboard containing more than one hundred lines. The common equipment, which is shown in Figs. 3, 4 and 5, comprises master oscillator 18, binary pulse generator 20, channel pulse matrix 25, the register drive pulse generator 23, tone and pulse generator 29, sampling pulse generator 19, ringing generator control circuit 27, and ringing generator 28.

*Master oscillator 18, binary pulse generator 20, channel pulse matrix 25*

The purpose of the pulse generating circuits of the common equipment is to set up the multiplex time position timing frame and to transmit suitable timing pulses to the various switching components of the system in accordance with the basic multiplex frame. In the disclosed binary arrangement, a frame is defined as the time period required for the multiplexing circuits to scan one hundred and twenty-eight time positions. Each of the one hundred lines of the disclosed system is assigned an individual time position in each of the repetitive time position frames. In order to minimize confusion in the understanding of the system, the lines of the system have been assigned binary numbers which correspond to their directory numbers. For example, line 11 is assigned to the eleventh binary number or 0001011, line 12 is assigned to the twelfth binary number 0001100, and line 00 is assigned to the one hundred tenth binary number 1101110.

The time position multiplex frame is made to repeat cyclically in a continuous fashion at a rate determined by the output of the fifty kc. master oscillator 18. The output signal from master oscillator 18 is coupled to a flip-flop scale of two divider, in binary pulse generator circuit 20, which divider flips alternately from one stable state to the other in response to each oscillation of master oscillator 18. The output of this flip-flop is a square wave with a twenty microsecond positive alternation and a twenty microsecond negative alternation. The output of this flip-flop is coupled to a second identical flip-flop which further divides the signal by two so that its output comprises a square wave of forty microseconds in each alternation. The second flip-flop is coupled to a third, the third to a fourth, and so on until seven stages of division have been coupled together in tandem fashion. The output of the last stage comprises a square wave with a one thousand two hundred and eighty microsecond positive alternation and a one thousand two hundred and eighty microsecond negative alternation. Since a divider stage or flip-flop comprises two identical stages operating in opposition, two square wave outputs can be taken from each stage; one being in phase opposition to the other.

In order to differentiate between the square wave output signals derived from the opposite sides of each binary divider stage, a letter designation is assigned to one of the outputs, and a similar letter designation with a prime symbol is assigned to the other output. Thus, the two outputs of the first binary divider are labeled A and A′, the two outputs of the second divider are labeled B and B′, and the outputs of the seventh binary divider are labeled G and G′. The relative phasing of the waveforms on these fourteen output conductors is shown in detail on the binary pulse chart of Figs. 42–45, inclusive.

It is now necessary to derive from these fourteen waveforms individual channel pulses on individual conductors associated with each line of the system. These individual channel pulses occur once each frame and have a duration of twenty microseconds. Since with seven binary stages, we can count from zero to one hundred and twenty-seven, there exist one hundred and twenty-eight discrete time intervals in each frame. Each time interval is twenty microseconds in duration, so that one frame is completed in two thousand five hundred and sixty microseconds (one complete cycle of the binary pulse generator divider stage providing the G and G′ outputs). The frames occur, therefore, at a frequency of approximately three hundred and ninety c.p.s. The individual time channel pulses are derived from the binary waveforms by means of the channel pulse matrix circuit 25. For this purpose the A–G′ conductors are connected from binary pulse generator 20 to the channel pulse matrix 25 by binary pulse cable BP.

Channel pulse 11, which identifies line 11 throughout the system, is represented by the binary number 0001011. If the wiring of the channel pulse matrix is such as to combine the fourteen input conductors in a manner prescribed by this binary number representation, then a pulse will be obtained in the eleventh time position from the start of the frame. Channel pulse CH11 is graphically illustrated at the lower left of Fig. 44. Following a path vertically up through the chart, it is evident that the A′ waveform is positive during this time interval. The B′ waveform is also positive during this interval, as well as the C waveform, the D′ waveform, the E waveform, the F waveform, and the G waveform. Thus, if the conductors A′, B′, C, D′, E, F and G are connected to the input terminals of an "and" gate for positive signals, the output will contain a positive pulse in time position 11. If a zero is substituted for an unprimed letter and a one is substituted for a primed letter, then, reading from right to left, it is seen that the binary representation for 11 is 0001011; corresponding to A′, B′, C, D′, E, F and G.

Similary, it can be seen that a combination of A, B, C′, D′, E, F and G gives a positive output pulse in time position 12, denoted as CH12, and the combination A, B′, C′, D′, E, F′ and G′ gives a positive pulse in the one hundred and tenth time position, denoted CH00.

For any one gate in the channel pulse matrix this simultaneous occurrence exists during one of the twenty microsecond channel intervals and repeats once each frame. The output of the channel pulse matrix is coupled by the channel pulse cable CP to the line switches, the multiplexer 26, the busy lead converter and emergency service circuit 17, executive cut-in marker 21 and trunk hunting marker 22. It can be seen from the trunking diagram that conductors CH11 and CH0 and conductors CH12 and CH11, which are all carried in cable CP, are connected to the line switches LS11 and LS12, respectively. By the connection of conductor CH11 to line switch LS11, such line switch only is conditioned to be controlled to establish a talking path therethrough by switch control pulses appearing in time position 11, which position corresponds with the time position identity of the line to which LS11 is connected. Similarly, channel pulse conductor CH12 is connected to line switch LS12 to identify that line switch as being associated with line circuit 12 for talking path control. Channel pulse conductors CH0 and CH11 are additionally connected to line switches LS11 and LS12, respectively, only for the purpose of discontinuing the application of ringing signals over conductors RY11 and RY12 to line circuits 11 and 12, respectively, at the end of each ringing cycle and when the call is answered, as will be later described. Channel pulse conductors CH11–CH00 are connected to the multiplexer 26 to control the multiplexer in its operation of sampling each of the lines in turn for supervisory information as will be described more fully hereinafter. Channel pulse conductors CH22, CH25 and CH26 are connected to the busy lead converter and emergency service circuit 17 to identify the emergency service, quarterdeck, and pilot house lines to that circuit. Channel pulse conductors CH31, CH32, CH62 and CH63 are connected to trunk hunting marker circuit 22 to identify the two trunk groups 31–33 and 62–64, respectively. As previously stated, the last lines of the trunk line groups are not marked as trunk lines by circuit 22.

*Register drive pulse generator 23*

The register drive pulse generator 23, which is controlled over conductor RDPD from the master oscillator 18, serves to generate a ten microsecond register drive pulse in response to the negative-going portion of the master oscillator waveform. The output pulse on register drive pulse conductor RDP is a ten microsecond pulse occurring simultaneously with the first ten microsecond period of each channel pulse interval. Conductor RDP is connected in multiple to all of the finder-connector links and the pulses thereon are utilized to control the stepping operation of the finder registers.

*Sampling pulse generator 19*

Sampling pulse generator 19 is also controlled by master oscillator 18 and is utilized to generate negative and positive sampling pulses of ten microsecond duration. The negative pulses are coupled over conductor SP to the switch bank translator 13, ringing control amplifier 24, and the finder-connector links. The positive sampling pulses are coupled by conductor SP′ to the line switch circuits, the multiplexer 26, the busy lead converter and emergency service circuit 17, and executive cut-in marker 21. The sampling pulses on conductors SP and SP′ occur in the center of each time channel. That is, they begin five microseconds after the beginning of each time channel and terminate five microseconds before the channel pulse terminates. The sampling pulses are gated with the channel pulses throughout the system to give ten microsecond pulses in the time position of any given line.

*Tone and pulse generator 29*

The tone and pulse generator 29 of Fig. 3 is utilized to generate the dial tone and busy tone signals and also to generate the secondary multiplexing timing signals for controlling the sequence of application of ringing signals to the tip and ring conductors of the lines. The dial tone and busy tone signals are both derived from a two hundred cycle non-symmetrical rectangular waveform generated in a free-running multivibrator. This waveform is coupled to the dial tone conductor which is connected to all of the connectors of the system. The waveform is also gated with the output of a one c.p.s. free-running multivibrator to produce a sixty i.p.m. busy tone signal. Binary dividers are also provided in the circuit to convert the one c.p.s. signals into the timing signals for setting up the ringing control sequence. The ring tip control conductor RTC carries a negative one-second timing pulse occurring at a rate of one pulse every four seconds. The ring-ring control conductor RRC carries a similar waveform but timed so as to be one hundred and eighty degrees out of phase with the timing signal on conductor RTC. In other words, during a first one-second time interval, a negative signal appears on conductor RTC, during a second one-second time interval, no signal appears on either conductor, during a third one-second time interval, a negative signal appears on conductor RRC, and during a fourth one-second time interval, no signal appears on either conductor. Conductors RTC and RRC are connected to all of the connectors of the system and also to the ringing generator control circuit 27.

*Ringing generator control 27 and ringing generator 28*

Ringing generator control circuit 27 controls the operation of ringing generator 28 and the application of ringing power received from generator 28 to the tip generator and ring generator conductors TG and RG. As long as any line in the exchange is off-hook, as signified by busy marking pulses on busy line connector conductor BLC, to be later described, ringing generator 28 is energized to generate the ringing frequency. In accordance with the timing pulses received over conductors RTC and RRC from tone and pulse generator circuit 29, ringing generator control circuit 27 applies the ringing frequency first to the tip generator conductor TG and then to the ring generator conductor RG. Conductors TG and RG are connected by the generator cable GEN to all of the line circuits of the system.

*Group common equipment*

Figure 2:
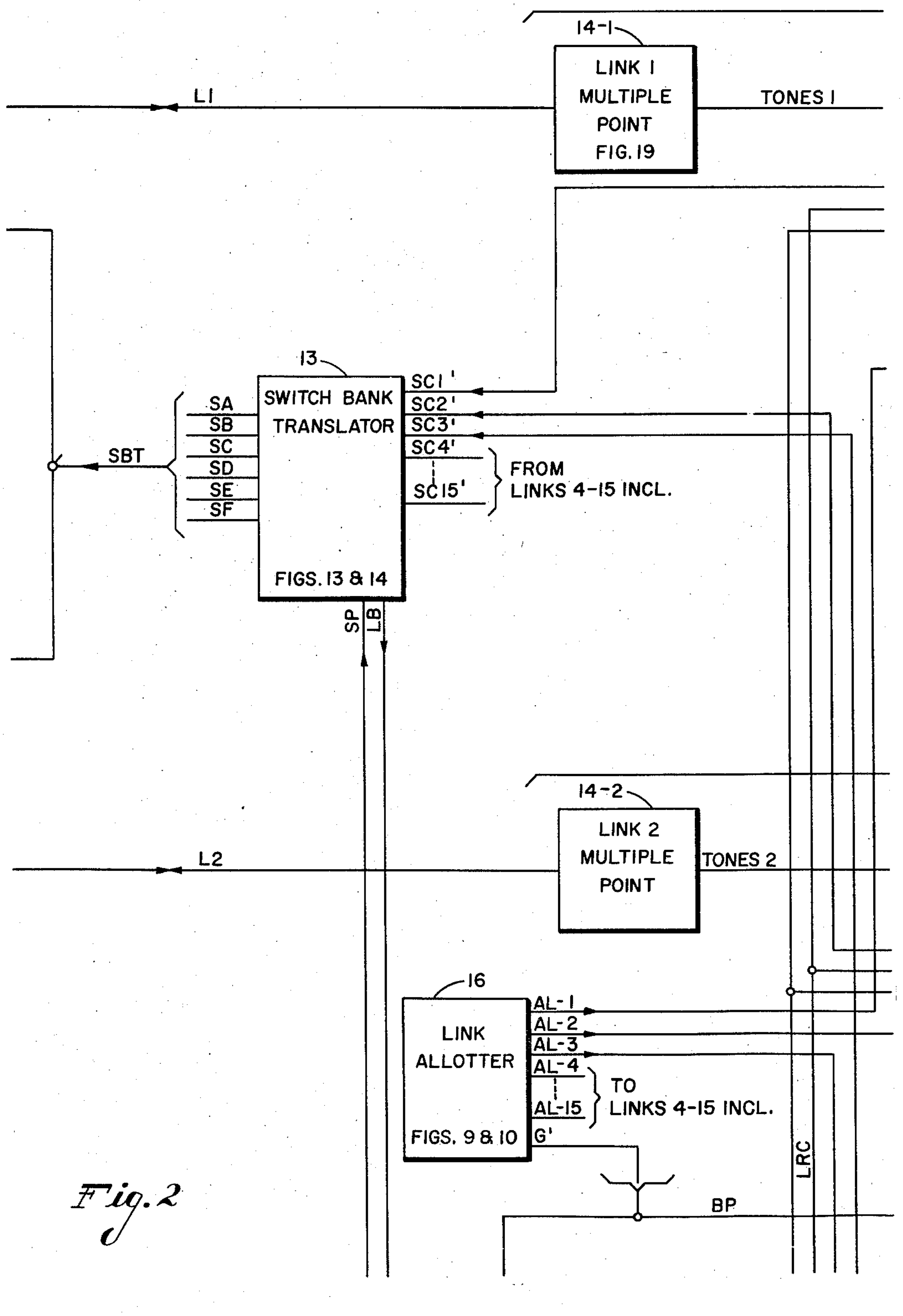

The group common equipment will now be described with reference to the trunking diagram. The circuits included under this heading are those which are common to each link group within the switchboard. If the lines are divided into one hundred line groups, the group of finders and connectors serving one of the line groups is considered a single link group and thus would be served by one set of the group common equipment. For a one hundred line switchboard, only one group would be provided and hence only one set of group common equipment would be necessary. The circuits included in this category are multiplexer 26 (Fig. 4), ringing control amplifier 24 (Fig. 5), busy lead converter and emergency service circuit 17 (Fig. 6), executive cut-in marker 21 (Fig. 6), trunk hunting marker 22 (Fig. 6), link allotter 16 (Fig. 2), and switch bank translator 13 (Fig. 2).

*Multiplexer 26*

The purpose of the multiplexer is to commutate the one hundred supervisory signals received over the multiplexer control conductors, such as M11 and M12 from line circuits 11 and 12, respectively, from the one hundred line circuits in such a way that each line is sampled at a precise predetermined time occurring once during the two thousand five hundred and sixty microsecond frame as set up by the binary pulse generator 20 and channel pulse matrix 25 in the previously described common equipment. It will be recalled that the frame is divided into one hundred and twenty-eight equal twenty microsecond channel intervals, one hundred and one of which are used for the hundred lines of the system. During each such channel interval, a short sample of the supervisory information is taken in such a way that if the line is on-hook, no output signal is derived, and if line current is flowing, a full amplitude output signal, in the form of a ten microsecond pulse occurring approximately at the center of the channel interval, is derived. For this purpose, the channel pulse for any particular line is gated with the multiplexer input conductor for that line and with the ten microsecond sampling pulse on conductor SP′. If that particular line is off-hook, an output pulse is obtained on the multiplexer output conductor MPX. For example, channel pulse CH11 is gated with multiplexer input conductor M11 and with the sampling pulse conductor SP′ so that whenever station 211, which is connected to the line which terminates in line circuit 11, is off-hook, a ten microsecond multiplexer input pulse in the center of time position 11 will be developed by the multiplexer. Similarly, channel pulse CH12 is gated with M12 and SP′ so that a multiplexer pulse in the center of time position 12 is developed whenever station 912 is off-hook. The developed multiplexer pulses are combined and applied to the multiplexer output conductor MPX. Thus, the output of the multiplexer 26 comprises a series of negative ten microsecond pulses lying within the channel pulse interval, one each for each line which is off-hook. Conductor MPX is connected to all of the line finder-connectors of the link group.

*Ringing control amplifier 24*

The ringing control amplifier 24 serves to gate the ringing control signals received from the connectors over conductor LRC with the sampling pulses on conductor SP, to amplify the resulting ten microsecond pulses, and to apply these pulses to the ringing control conductor RC. Ringing control pulses in the time position of a particular line appear on conductor LRC whenever that particular line has been seized by a connector and ringing is to take place. It will be recalled that secondary multiplexing is utilized to control the side of line ringing with tip and ring parties each being rung during different one-second intervals in each four-second cycle. Therefore, since the frame rate is approximately three hundred and ninety c.p.s., ringing control pulses in the time position of any particular called line appear three hundred and ninety times in succession on conductors LRC and RC and then disappear for three seconds. Conductor RC is connected to all of the line switch circuits and the pulses appearing thereon are utilized to control the application of ringing power on a fully selective basis to the line circuits individually associated with the line switches.

*Busy lead converter and emergency service circuit 17*

The primary functions of circuit 17 are to amplify busy marking pulses received from the finders and connectors, to generate artificial busy marking pulses in accordance with emergency service requirements, to redistribute the busy marking pulses to the finders and connectors of the system, and to perform certain operations in conjunction with the executive cut-in service. The various functions will be described in turn.

It will be remembered that the links of the system apply switch control pulses in the time positions of calling and called lines to their individual switch control conductors, such as conductor SC1′ for link 1. The pulses appearing on all of the switch control conductors are combined, or mixed, in the switch bank translator 13 and applied to a single link busy conductor LB as busy marking pulses, and routed to the busy lead converter circuit 17. It will also be remembered that it is necessary to generate busy marking pulses in the time position of the line circuit connected in multiple with the emergency service line circuit when the emergency service number is dialed. Whenever a busy marking pulse in the time position of the emergency service line 22 is received over conductor LB, circuit 17 generates an artificial busy marking pulse in the time position of either line 25 or 26, depending upon which line is connected in multiple with the emergency service line.

Circuit 17 amplifies and repeats the busy marking pulses received over conductor LB to the busy line connector conductors BLC and BLC′ with the exception that busy marking pulses appearing in the time position of the emergency service line 22 are removed so that that line will appear as idle to the connectors at all times. Also, circuit 17 applies the artificial busy marking pulses to conductors BLC and BLC′. Conductors BLC and BLC′ are connected to all of the connectors of the system. Conductor BLC is also connected to the ringing generator control circuit 27 as previously mentioned. Circuit 17 also amplifies and repeats the busy marking pulses received over conductor LB to the busy line finder conductor BLF′, which conductor is connected to all of the line finders of the system. In addition, circuit 17 applies a permanent busy marking pulse in the time position of the emergency service line 22 and the artificial busy marking pulses to conductor BLF′.

Whenever a calling line associated with a particular link is an executive line, an executive release pulse in the time position of the desired called line is applied to the executive right of way output conductor ERO by the connector of that link provided that the desired called line is busy, and further provided that the desired called line is not already engaged in an executive call. An executive release pulse appearing on conductor ERO from any one of the links is amplified by circuit 17 and applied to the executive right of way input conductor ERI which extends to the connector circuits. A pulse on conductor ERI serves to forcibly release the link which is handling a call from either a calling or a called line which corresponds in time position with the pulse on conductor ERI. Circuit 17 also functions to generate a false finder and a false connector busy pulse at this time to prevent other links from seizing the lines of the forcibly released connections since these lines are off-hook at this time. The six millisecond false connector busy pulse thus generated is applied to conductors BLC and BLC′, and the one hundred millisecond false finder busy pulse thus generated is applied to conductor BLF′ at this time.

Connector circuits which are handling calls in which either the calling line or the called line is an executive line, release executive busy marking pulses in the time positions of both lines on the executive busy output conductor EBO. These pulses are amplified by circuit 17 and returned to the connectors over executive busy input conductors EBI and EBI′. Pulses on these conductors are utilized in the connectors to prevent the connectors from releasing an executive release pulse on conductor ERO if the desired line is already busy in an executive call. Thus, a second executive call cannot override a first executive call.

Busy line switch conductor BLS, which extends from circuit 17 to the line switch circuits, carries busy marking pulses in the time positions of all lines marked as busy by the links of the system. In other words, the pulses appearing on conductor LB are merely amplified and then applied to conductor BLS. These busy marking pulses are utilized to prevent the controlling bi-stable circuits in the line switch circuits from restoring after they have been initially operated by switch control pulses. When a particular call is terminated, such as when the calling line goes on-hook or when a call is forcibly released by executive cut-in, the link used for setting up the call terminates the application of switch control pulses in the time positions of the calling and called lines to the switch control conductor associated with that link. Thus, the busy marking pulses derived therefrom in those time positions disappear from the LB and BLS conductors. The controlling bi-stable circuits in the line switches associated with the calling and called lines are restored to normal when the busy marking pulses in those time positions no longer appear on conductor BLS. Circuit 17 also serves the minor function of inverting the emergency service channel pulse CH22 and applying it to the conductor CH22′ which extends to the connector circuits.

*Executive cut-in marker 21*

Channel pulse conductors CH01 and CH00, which identify the time positions of the executive lines 01 and 00, are connected to the executive cut-in marker 21. The channel pulses appearing on conductors CH01 and CH00 are gated with the sampling pulses on conductor SP′, amplified and then applied as executive cut-in marking pulses to a single executive cut-in conductor ECI which is connected to all of the connectors of the system. Conductor ECI thus carries at all times such ten microsecond pulses which occur within time channels 01 and 00.

*Trunk hunting marker 22*

Channel pulse conductors CH31, CH32, and CH62, CH63, which identify the time positions of all but the last lines of the trunk groups comprising lines 31—33 and 62–64, respectively, are connected to the trunk hunting marker 22. The channel pulses of the trunk group lines are amplified and applied as trunk markings pulses to a single trunk hunting conductor TH′ which extends to all of the connectors of the system. These channel pulses are also inverted, amplified, and applied as trunk marking pulses to a single trunk hunting conductor TH which extends to all of the connectors of the system. Therefore, conductor TH′ carries twenty microsecond positive pulses in time positions 31, 32, 62 and 63, and conductor TH carries twenty microsecond negative pulses in these same time positions.

*Link allotter 16*

The link allotter 16 is employed to allocate the line finder-connector links, in sequence, to handle calls. Fifteen allotter control conductors, which are labeled AL–1 to AL–15, extend from the allotter to the links. One of the AL conductors is connected to both the finder and connector of each link. For example, conductor AL–1 is connected to both the line finder and connector of link 1. An enabling potential is applied by the allotter to only one of the fifteen conductors at any one time to thereby enable the finder of the link associated with that AL conductor to seize a calling line and also enable the connector of that link to seize a called line.

The allotter comprises four binary divider stages which control the application of the enabling potential to just one of the AL conductors at any one time. Conductor G′ from binary pulse generator 20 is connected to the link allotter 16 for the purpose of stepping the binary stages in the allotter. Since a pulse appears on conductor G′ just once during each time position frame, the allotter is stepped at the frame rate. Thus, each link is allotted in turn for a period of time equal to the time duration of a time position frame and the sequence of allotting repeats continuously.

*Switch bank translator 13*

The purpose of the switch bank translator 13 is to convert the fifteen switch control conductors SC1′–SC15′ from fifteen conductors to a two out of six combination. It will be remembered that each line switch must be able to connect its associated line to any one of the fifteen link multiple points. If fifteen switch control conductors were connected to the line switch circuits, fifteen bistable circuits would be required in each line switch to selectively control the conductivity of the fifteen bilateral transistor switches contained in each line switch circuit. According to this invention, by combining the fifteen switch control conductors into a two out of six combination, it is possible to control the fifteen bilateral transistor switches in each line switch with only six bistable circuits. By the use of suitable gating circuits in the switch bank translator 13, the switch control conductors are converted into two out of six combination. The pulses appearing on the switch control conductors are then amplified and gated with the sampling pulses on conductor SP to form ten microsecond switch control pulses. To more fully illustrate the operation of the circuit, assume that conductor SC1' from link 1 carries pulses in the time positions of lines 11 and 12. The switch bank translator applies these pulses to two conductors internal to the circuit, amplifies the pulses, gates each pulse with the sampling pulses on conductor SP, and then applies the resulting pulses to the two output conductors SA and SB providing a two out of six combination. Thus, both conductors SA and SB now carry ten microsecond switch control pulses in the time channels 11 and 12. Pulses appearing on conductor SC2' from link 2 appear on the combination of the two output conductors SA and SC. Similarly, pulses appearing on any given switch control conductor appear on a unique combination of two of the output conductors. The six output conductors SA–SF are connected by switch bank translator cable SBT to each of the line switch circuits.

As previously mentioned, the switch bank translator 13 also functions to mix the pulses appearing on all fifteen switch control conductors and to release these pulses as busy marking pulses over a single link busy conductor LB which extends to the busy lead converter circuit 17.

*Voice path*

Figure 1:
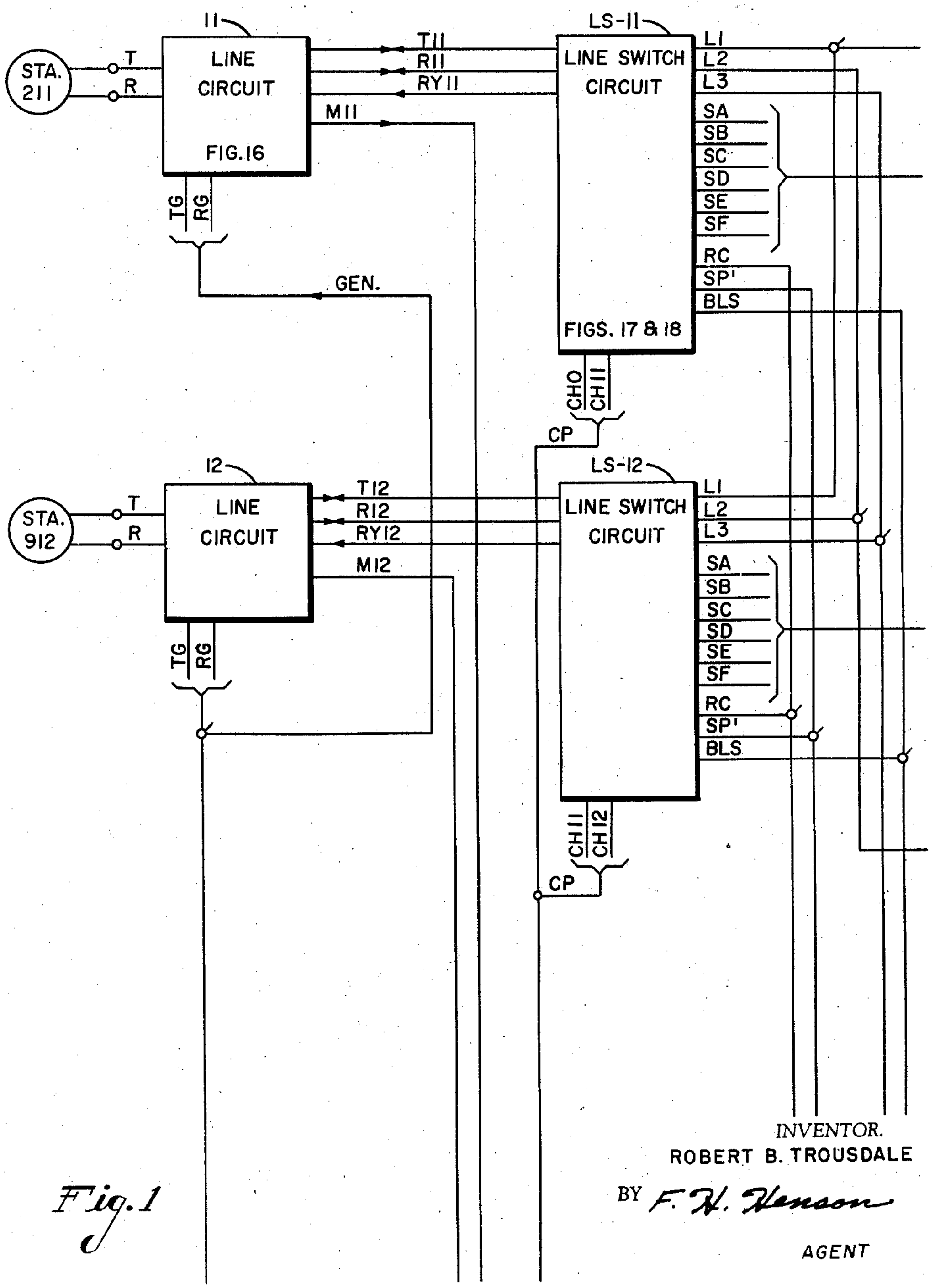

The voice path will now be described in conjunction with the trunking diagram. The voice path comprises the one hundred line circuits of the system, of which line circuits 11 and 12 are illustrated, the one hundred line switch circuits, of which line switch circuits LS11 and LS12 are illustrated, and the fifteen link multiple points, of which 14–1, 14–2 and 14–3 are illustrated. The line circuits and line switch circuits are shown in Fig. 1 while the link multiple points are shown in Figs. 2 and 5 of the trunking diagram.

*Line circuit 11*

The functions of the line circuit are to provide battery feed potential to the line, to provide a supervisory potential indicative of line current, to transmit the speech currents appearing on the line to the line switch circuit individually associated with that line circuit, and to apply ringing generator potentials to the line at times when stations on that line are to be signaled.

It can be seen that line circuit 11 terminates the tip and ring conductors T and R, respectively, of the line extending to subscriber's substation 211. The tip conductor is connected to the outside terminal of a first primary winding and the ring conductor is connected to the outside terminal of a second primary winding of a two primary winding repeat coil in the line circuit. Battery feed for the stations on the line is provided by a ground connection through a resistor to the inside terminal of the winding to which the tip conductor is connected and a minus forty-eight volt battery connection through a resistor to the inside terminal of the winding to which the ring conductor is connected. The inside terminals of the primary repeat coil windings are connected together by a capacitor to complete a series aiding path through the repeat coil primary windings for the speech currents. The speech signals are inductively coupled to a secondary winding of the repeat coil and transmitted over conductors T11 and R11 to line switch circuit LS11.

The multiplexer input conductor M11, which extends to the multiplexer 26, is connected to the inside terminal of the primary winding to which the ring conductor is connected. When the station or stations on the line are on-hook, no line current flows and conductor M11 stands at minus forty-eight volts. When a station on the line is off-hook, line current flows and the potential of conductor M11 rises to a potential corresponding to the voltage drop across the minus forty-eight volt battery feed resistor. This two-valued potential variation serves as a supervisory signal which controls whether or not a multiplexer pulse is generated in time position 11 by the multiplexer 26 as previously described.

Ringing frequency is applied to either the tip or ring conductor of the line by a relay in line circuit 11 whenever a station on the line is called. The relay, when operated, serves to connect tip generator conductor TG to the tip conductor and ring generator conductor RG to the ring conductor. The operation of the relay is controlled over conductor RY11 from line switch circuit LS11.

*Line switch circuit LS11*

Line switch circuit LS11 is utilized to selectively connect the speech currents received over conductors T11 and R11 from line circuit 11 to any one of the link multiple points. In a fifteen link system, line switch 11 may comprise fifteen bilateral switches. Each bilateral switch may comprise a single transistor having two emitter-collector electrodes and a base electrode. One emitter-collector electrode of each of the fifteen transistors is connected to conductor T11 while the second emitter-collector electrode of each transistor is connected to a different one of the link multiple points by link conductors such as L1, L2 and L3, which extend from line switch 11 to link multiple points 14–1, 14–2 and 14–3, respectively. Conductor R11 and all of the other line circuit ring conductors are connected to a common potential so that it is necessary to switch only the tip conductors of the lines. By suitable connections to their base electrodes, all fifteen bilateral transistor switches are normally held non-conductive and thus block speech current flow between line circuit 11 and the fifteen link multiple points.

As previously explained, the fifteen bilateral transistor switches are controlled by six bi-stable circuits on a two out of six basis. That is, the base electrode of each transistor is connected to a unique combination of two out of the six bi-stable circuits. The six bi-stable circuits are controlled in turn by switch control pulses appearing on conductors SA–SF, which extend from switch bank translator 13 in cable SBT. It will be recalled that in the description of the switch bank translator it was explained that switch control pulses appearing on conductor SC1' from link 1 are applied to both conductors SA and SB. Conductors SA–SF are individually gated with channel pulse conductor CH11 in line switch 11 in such fashion that the first bi-stable circuit is transferred to its second operated condition only if a pulse in time position 11 is received over conductor SA, the second bi-stable circuit is operated to its second condition only if a pulse in time position 11 is received over conductor SB, etc. When the first and second bi-stable circuits are operated to their second condition, the bilateral transistor switch between conductor T11 and the link 1 multiple point 14–1 is rendered conductive. Similarly, as previously described, switch control pulses on conductor SC2' are applied to conductors SA and SC. Pulses in time position 11 on conductors SA and SC serve to operate the first and third bi-stable circuits in line switch LS11 to their second condition. When the first and third bi-stable circuits are operated to their second condition, the bilateral transistor switch between conductor T11 and link 2 multiple point 14-2 is rendered conductive.

Thus it can be seen that according to the invention, the conductors SA–SF carry both link identification and line identification information. Line information is carried by the time position occupied by switch control pulses on the conductors and link information is carried by the particular combination of conductors used to transmit the pulses.

Once the bi-stable circuits are triggered to their second operated condition, they remain in that condition as long as busy pulses in the time position of their associated line are present on conductor BLS, which extends from the busy lead converter circuit 17. Thus, the line is continuously connected through one of the bilateral transistor switches to one of the link multiple points until the line finder and connector of that link are released at the termination of the call.

The line switch circuit LS11 also controls the operation of the relay, in line circuit 11, which applies ringing generator power to the line conductors when a station on the line is called. Ringing control conductor RC, which extends to line switch LS11 from ringing control amplifier 24, is gated with the channel pulse conductor CH11 in such fashion that a ringing control flip-flop in line switch LS11 is operated to its second operated condition only if ringing control pulses appear in time position 11. Channel pulse conductor CH0 is connected to line switch LS11 for the purpose of restoring the ringing control flip-flop to normal. If ringing control pulses persist in time position 11, the flip-flop will be re-triggered in that time position immediately after being restored during time position zero. Thus, in each time frame during the period in which a station on the line is to be rung, the ringing control flip-flop in LS11 is operated to its second condition for two thousand five hundred and forty microseconds and restored to its first operated condition for twenty microseconds. The relay in line circuit 11 will remain operated over the twenty microsecond period while the flip-flop is restored to its first operated condition. At the completion of the one-second ringing interval or when the call is answered, ringing control pulses in time position 11 are removed from conductor RC and the ringing control flip-flop is not re-triggered but rather remains in its first operated condition. This action allows the relay in line circuit 11 to release and thus remove ringing generator power from the line.

The line switch circuits associated with all of the lines except the emergency service line are identical to LS11. The line switch for the emergency service line (not shown in the trunking diagram) differs from line switch LS11 only in that fifteen instead of a combination of two out of six bi-stable circuits are provided to control the fifteen bilateral transistor switches. The fifteen bi-stable circuits are controlled directly by the SC1′–SC15′ conductors rather than on a two out of six basis since the emergency service line switch must be capable of connecting the emergency service line circuit to any number of multiple points simultaneously. An emergency service reset conductor, which extends from the link to the bi-stable circuit which controls the conductivity of the bilateral transistor switch between the emergency service line and the multiple point for that link, is provided for the purpose of restoring the bi-stable circuit to its first operated condition at the termination of the call. A resetting potential is applied to this conductor whenever the link is in a released condition. The emergency service line switch is shown in detail in Figs. 11 and 12 of the drawings.

*Link 1 multiple point 14–1*

The link multiple point for each link serves to tie together the second emitter-collector electrodes of all of the bilateral transistor switches, associated with that particular link, so that a talking circuit can be completed between any two selected bilateral transistor switches. For example, the first bilateral transistor switch in LS11 and the first bilateral transistor switch in LS12 are both connected by conductor L1 to the link 1 multiple point 14–1 for this purpose. Similarly, the second bilateral transistor switches in LS11 and LS12 are both connected by conductor L2 to the link 2 multiple point 14–2 and the third bilateral transistor switches in LS11 and LS12 are both connected by conductor L3 to the link 3 multiple point 14–3. The link multiple point also serves as an insertion point for supervisory tones, such as dial tone and busy tone, which are ordinarily required in a telephone system. The tones 1 conductor is connected from the finder-connector of link 1 to the link 1 multiple point 14–1 for this purpose.

*Call from station 211 to station 912*

It is believed that the remaining components of the system, namely, the line finder and the connector, and the overall operation of the system may best be generally described in conjunction with the trunking diagram by tracing a call through the system. For this purpose, assume that station 211 is calling station 912 and that link 1 is allotted by link allotter 16.

When the subscriber at station 211 removes his handset from its cradle, a loop circuit is completed over conductors T and R to line circuit 11. In response to the resulting current flow over the loop, the potential of the multiplexer input conductor M11 is altered in such manner that the multiplexer 26 functions to develop a multiplexer pulse in time position 11. As previously explained, this pulse is applied to the multiplexer output conductor MPX, which is multiply connected to all of the line finder and connector circuits of the system.

Since time position 11 is not yet marked as busy, the line finder of link 1 now seizes the calling line in response to the appearance on conductor MPX of a multiplexer or input pulse in time position 11. The finders of the system are of the normally searching type. That is, the finders, when idle, each generate finder gate pulses which step through the frame one at a time, channel after channel, in a continuous fashion. When the finder gate pulse developed by the allotted finder corresponds in time position with a multiplexer pulse on conductor MPX and that time position is not marked as busy by a busy marking pulse on conductor BLF′, the finder searching operation is terminated and the finder continues to generate finder gate pulses in that time position for the duration of the call.

Each of the finders comprises a register having seven flip-flop scale of two divider stages connected in tandem. Each side of each register stage is arranged to gate through to a common conductor the pulses appearing on one of the binary pulse conductors A–G′ when that side of the stage is operated. The finder registers are made to step in exact unison with the binary pulse generator 20 by the expedient of utilizing the finder gate pulse developed by the finder and the register drive pulse appearing on conductor RDP to step the finder register. Since the ten microsecond register drive pulse occurs once during each time channel, the finder register is stepped at fifty kc. To illustrate this operation, assume that a particular finder register is set so as to gate pulses in time position 55 to the finder gate conductor for the duration of a call. Next assume that at the time that the call from line 55 is terminated, the binary pulse generator is set so that a combination of the fourteen conductors A–G′ produces a pulse in time position 51. Since the finder register is set so as to gate through a combination of the conductors A–G′ which will produce a pulse in time position 55 only, no finder gate pulse is developed in time positions 51, 52, 53, or 54 as the binary pulse generator steps through these time positions. Hence, the finder register remains set for 55.

During the second ten microsecond period of the twenty microsecond time channel 55, as controlled by the register drive pulse, the finder gate pulse in time position 55 serves to step the finder register to position 56. Since the binary pulse generator has not yet advanced to time position 56, the finder remains set in that position. Ten microseconds after the beginning of time channel 56, the finder is stepped to position 57. It can be seen that the finder is now in phase with the binary pulse generator and will remain in phase until that finder seizes another line and thus terminates its searching operation. Each finder is allotted in turn for one pulse frame and is capable of seizing any calling line in the system during that one frame.

The multiplexer conductor MPX, the finder gate conductor internal to the finder, the allotter control conductor AL–1, the busy line finder conductor BLF′, and several conductors carrying information that the associated connector is reset are gated together in the finder portion of finder-connector 15–1. Since we assumed that link 1 was allotted (AL–1), that there is a multiplexer pulse on conductor MPX in time position 11, that the finder of link 1 is developing a finder gate pulse in time position 11, that time position 11 is not marked as busy by a busy marking pulse in that time position on conductor BLF′, and that the connector of link 1 is properly reset, an output pulse is obtained from the gate and the finder cuts through or seizes the line. As a result of cut through, the finder register is stopped in position 11, the finder gate pulse in time position 11 is gated through as a switch control pulse to switch control conductor SC1′, and the connector of link 1 is seized and enabled to respond to dial pulses occurring in time position 11.

The switch control pulse in time position 11 on conductor SC1′ is applied to conductors SA, SB and LB by the switch bank translator 13. Pulses in time position 11 appearing on conductors SA and SB are utilized to operate the first and second bi-stable circuits in line switch circuit LS11 to their second operated condition and thus bias the bilateral transistor switch between line circuit 11 and link 1 multiple point 14–1 for conduction. Thus, the calling line 11 is connected through to the link 1 multiple point. As previously described, the busy marking pulses on conductor LB are returned over conductors BLF′, BLC and BLC′ to the finders and connectors of the system by the busy lead converter circuit 17. Busy marking pulses in time position 11 on these conductors serve to mark line 11 as busy to all of the finders and connectors of the system.

After seizure and before the first digit is dialed, the connector of link 1 applies dial tone to the tones 1 conductor which extends to the link 1 multiple point 14–1. Since line 11 is connected through to that multiple point, the subscriber at station 211 hears dial tone and is informed that the connector is ready to receive dial impulses.

The connector utilizes a single register to register the three digits of the called line number. The connector register is similar to the finder register in that it is of the binary type and comprises seven flip-flop scale of two dividers connected in tandem. Each side of each stage is arranged to gate through to a common conductor the pulses appearing on one of the binary pulse conductors A–G′ when that side of the flip-flop is operated. Thus, the connector register can be set to combine the binary pulse conductors in any combination to produce a connector gate pulse in the time position of any desired called line.

The calling subscriber upon hearing the dial tone proceeds to dial the first digit "9" of the called line number. In the particular system being described, a prefix digit of "9" signifies that the called party is to be rung on the tip side of the line. In accordance with the dial impulses, the multiplexer pulses on conductor MPX disappear and reappear nine times corresponding to the nine break and remake intervals, respectively, of the dial. The nine impulses serve to step the connector register to a setting corresponding to the binary equivalent of the digit "9." A party selection flip-flop circuit in the connector is operated responsive to the registration of the digit "9" and the register is then reset so that it may be used to register the tens and units digits of the called line number. The operation of the party selection flip-flop signifies that the called line is to be rung over the tip conductor. If any other prefix digit had been dialed, the party selection flip-flop would not have been operated and the called line would be rung over the ring conductor. At the termination of the first digit, dial tone is removed from the tones 1 conductor.

The break intervals of the impulses of each digit are repeated by the connector to a delay circuit in the connector. This delay circuit is designed to remain unoperated on dial pulses but to operate when the calling line hangs up for a substantial period of time. Operation of the delay circuit serves to release the link, as will be described subsequently. In this manner, the finder is enabled to lock to a calling line even during dialing interruptions and releases only after a suitable release delay timing interval.

The binary counting register responds to the second digit of "1" by counting by tens. That is, the second digit is given a weight of ten in the register by applying the impulses to the second and fourth stages of the register. The third digit of "2" drives the register to a setting corresponding to the tens digit plus the units digit or to the binary equivalent of twelve. The register remains in its driven setting for the duration of the call. Thus, the connector register generates a connector gating pulse in time position 12 for the duration of the call.

A busy test is now made to determine if the generated connector gate pulse in the time position of the called line coincides in time position with busy marking pulses on conductor BLC. If the desired line is not marked as busy on conductor BLC, switch through occurs when the link is allotted and the connector gate pulse is released to switch control conductor SC1′. Switch bank translator 13 applies these switch control pulses, which occur in time position 12, to conductors SA, SB and LB. Pulses in time position 12 on conductors SA and SB serve to operate the first and second bi-stable circuits in line switch LS12 to their second operated condition and thus bias the bilateral transistor switch between line circuit 12 and the link 1 multiple point 14–1 for conduction. Thus, the called line is connected through to the link 1 multiple point. As previously described, the busy marking pulses on conductor LB are returned over conductors BLF′, BLC and BLC′ to the finders and connectors of the system by busy lead converter 17 and serve to mark line 12 as busy to all finders and connectors of the system.

Ringing control signals are now released in time position 12 to the ringing control amplifier 24 over conductor LRC. Since the called party is to be rung over the tip conductor, as determined by the operation of the party selection flip-flop, these pulses are released only during the interval when ringing potential appears on the tip generator conductor TG which originates in the ringing generator control circuit 27. As previously explained, this timing is controlled by one-second timing pulses on conductors RTC and RRC which originate in tone and pulse generator 29. If the called party is to be rung over the ring conductor of the line, the connector will function to release ringing control pulses to conductor LRC only when potential appears on ring generator conductor RG.

The ringing control pulses appearing on conductor LRC are amplified by ringing control amplifier 24 and transmitted over conductor RC to all of the line switch circuits of the system. Since conductor RC is gated with the individual channel pulse conductor of each line switch circuit, only the ringing control flip-flop in line switch LS12 is operated to its second operated condition responsive to the receipt of a ringing control pulse in time position 12 over conductor RC. In response to the operation of the ringing control flip-flop in line switch LS12, an operating potential is connected to conductor RY12 to operate the relay in line circuit 12. Since potential is applied to tip generator conductor TG at this time, station 912 is signaled over the tip conductor of the line. Ringing power at greatly reduced amplitude is also coupled, within line circuit 12, to conductor T12 and thus back over the previously established talking path to the calling party at station 211. This low amplitude ringing power is known as ring-back tone and serves to inform the calling party that the called line is being rung.

When the called party answers, a loop is closed to line circuit 12 and line current flows. Multiplexer 26 generates a multiplexer pulse in time position 12 and this pulse is effective in the connector of link 1 to terminate the transmission of ringing control pulses to the line switch associated with the called line circuit. As previously explained, the ring control flip-flop in LS12 is restored to normal during the time position immediately preceding time position 12 and the relay in line circuit 12 releases to disconnect ringing power from line 12. A talking connection is now completed between stations 211 and 912.

When the calling party hangs up, multiplexer pulses in the time position of the calling line are no longer produced and after a delay interval of approximately two hundred and fifty milliseconds, the delay circuit of the connector operates. The operation of the delay circuit of the connector restores the cut-through circuit of the finder to normal and thereby releases the connector and enables the finder register to resume its searching operation. When the finder and connector of link 1 release, switch control pulses in time positions 11 and 12 are no longer applied to conductor SC1'. Thus, busy marking pulses in time positions 11 and 12 no longer appear on conductors BLF', BLC and BLC' so that these lines are now marked as idle to all links of the system. Also, busy marking pulses in time positions 11 and 12 no longer appear on the busy line switch conductor BLS so that the first and second bi-stable circuits in both line switches LS11 and LS12 are restored to their first operated condition to thereby bias the bilateral transistor switches between line circuit 11 and the link 1 multiple point and between line circuit 12 and the link 1 multiple point nonconductive.

It is now necessary to return to the consideration of the connector circuit of link 1 and its operation with regard to the selection of a busy line, trunk hunting, and executive cut-in. It will be remembered that the connector register develops connector gate pulses in the time position of the called line at the completion of the units digit, that the trunk hunting marker 22 applies trunk marking pulses in time positions 31, 32, 62 and 63 to conductors TH and TH', and that the executive cut-in marker 21 applies executive marking pulses in time positions 01 and 00 to conductor ECI.

As previously mentioned, a busy test is made at the completion of the units digit. If the connector gate pulses coincide in time position with busy marking pulses on conductor BLC and the finder gate pulses in the time position of the calling line do not agree in time position with an executive cut-in marking pulse on conductor ECI, switch through does not occur, but instead, the busy circuit in the connector operates. The connector is locked in this condition until the call is abandoned by the calling party. Busy tone is gated to the tones 1 conductor whenever the busy circuit operates. If the finder gate pulses coincide in time position with executive cut-in pulses on conductor ECI, an executive cut-in circuit in the connector operates. As previously described in conjunction with the busy lead converter 17, the connector releases an executive release pulse on conductor ERO when the executive cut-in circuit operates provided that the called line is marked as busy on conductor BLC, that the called line is not engaged in another executive call as determined by the fact that there is no pulse in that time position on conductor EBI, and that the called line is not marked as a trunk hunting line on conductor TH. If an executive release pulse in the time position of the called line is released on conductor ERO, the link handling a call involving that line is forcibly released and the connector handling the executive call then switches through and the called line is rung, as previously described.

If the connector gate pulses coincide with busy marking pulses as well as trunk marking pulses, the trunk hunting circuit in the connector operates regardless of whether or not the calling line is an executive line. The trunk hunting circuit serves to gate a pulse to the connector register to advance the register one step into the time position of the next line of the group. If all of the lines of the trunk line group are busy, this operation continues until the last line of the group is reached. The connector register remains in a setting corresponding to the last line of the group since there is no trunk marking pulse in the time position of the last line of the group. If the calling line is an executive line, an executive release pulse is applied to conductor ERO to forcibly release the link which is handling a call involving the last line of the trunk line group. If the calling line is not entitled to executive right of way service, the busy circuit in the connector operates and busy tone is gated to the tones 1 conductor.

DETAILED DESCRIPTION

In the detailed description which follows, the components of the system are again divided into four categories, namely, common equipment, group common equipment, voice path, and control path, which will be described in turn.

In considering the detailed circuitry of the system components briefly described above, operation of these components will be analyzed insofar as possible in terms of functions which they perform in establishing the above described connection between lines 11 and 12 when station 211 calls station 912.

Throughout the detailed description of the system, the transistor types actually used in a tested model of the system are specifically identified. All of the transistors used in the system are of the junction type and all of the transistors, except the bilateral transistors utilized in the line switches, have been given the conventional notation of an arrow superimposed on the emitter electrode. The bilateral transistors have been given a notation of an arrow superimposed on both the so-called emitter and collector electrodes. This notation signifies that these transistors are bilateral in operation and have good amplification with either junction used as the emitter. Also in the conventional manner, the direction of the arrow designates whether the particular transistor is of the NPN or PNP junction type. An NPN junction transistor is identified by an arrow which points away from the base electrode while a PNP junction transistor is identified by an arrow which points toward the base electrode.

It might be well to mention at this time that insofar as the base and emitter of a transistor are concerned, the transistor is biased for conduction whenever the N-type material is negative with respect to the P-type material. Thus, a PNP junction transistor is biased for conduction whenever the base is negative with respect to the emitter, and an NPN junction transistor is biased for conduction whenever the base is positive with respect to the emitter.

*Common equipment*

MASTER OSCILLATOR 18

Figure 29:
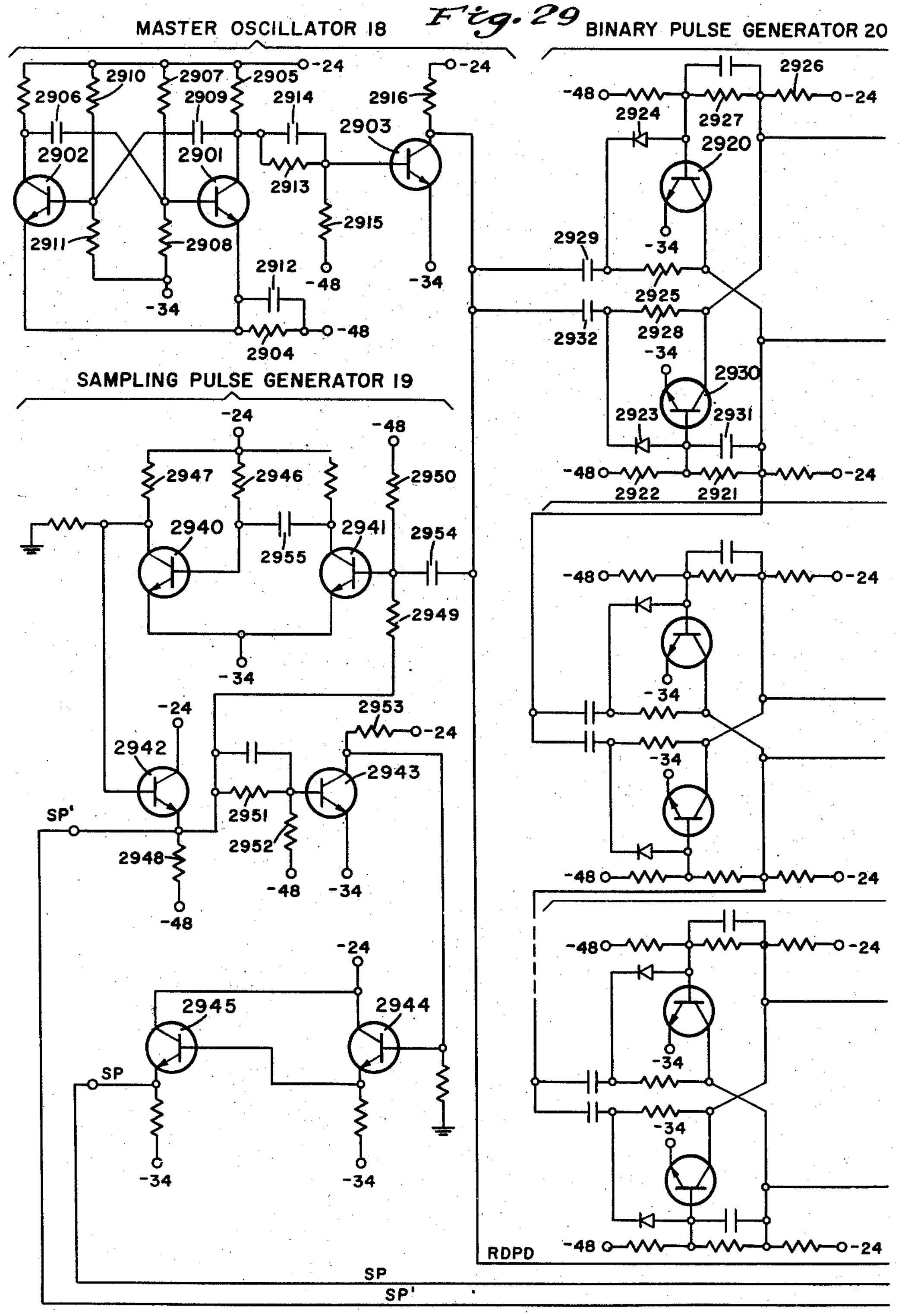

Master oscillator 18, which is shown in the upper left portion of Fig. 29, is designed to generate a fifty kc. nonsymmetrical, rectangular waveform. The exact frequency of the oscillator is not critical since all of the circuits in the entire switchboard are keyed or synchronized by the master oscillator.

The master oscillator comprises transistors 2901, 2902 and 2903, which may all be type 2N94A. Transistors 2901 and 2902 are connected in a free-running multivibrator configuration and the output signal from said multivibrator is coupled through the buffer and amplifier transistor 2903 to the binary pulse generator 20, the sampling pulse generator 19, and the register drive pulse generator 23. The circuits have been designed so that the binary pulse generator is triggered from the leading edge of the multivibrator waveform and the sampling pulse generator is triggered from the trailing edge of the waveform. By adjusting the multivibrator so that its output waveform comprises a five microsecond positive portion and a fifteen microsecond negative portion, the overall operation of the circuits is such that each sampling pulse is generated five microseconds after the beginning of each channel interval.

The multivibrator comprising transistors 2901 and 2902 is conventional in design. To briefly describe its operation, assume that transistor 2901 is conductive and that transistor 2902 has just started to conduct. The potential at the collector of transistor 2902 begins to drop from minus twenty-four volts to approximately minus thirty-two volts as determined by the voltage drop across emitter bias resistor 2904 due to current flow from minus twenty-four volts through resistor 2905, through conducting transistor 2901, and through resistor 2904 to minus forty-eight volts. The negative swing at the collector of transistor 2902 is coupled through capacitor 2906 to the base of transistor 2901 and renders 2901 non-conductive. Capacitor 2906 then charges toward a voltage value determined by the voltage division across resistors 2907 and 2908, which are connected to minus twenty-four volts and minus thirty-four volts, respectively. In response to the cessation of collector current flow in transistor 2901, the voltage at the collector of transistor 2901 rises from approximately minus thirty-two volts toward minus twenty-four volts. This positive voltage swing is coupled through capacitor 2909 to the base of transistor 2902 and assists in the build-up of conduction therein.

Capacitor 2906 continues to charge until the potential of the base of transistor 2901 becomes slightly positive with respect to its emitter potential. Transistor 2901 then begins to conduct again and its collector potential swings from minus twenty-four volts toward the emitter bias potential. This swing is reflected through capacitor 2909 and serves to render transistor 2902 non-conductive. Transistor 2902 remains non-conductive for the period of time required for capacitor 2909 to charge to a sufficient extent to bias the base of transistor 2902 positive with respect to its emitter.

The two transistors are alternately operated at a frequency of fifty kc. as determined by the impedance of capacitor 2906 in conjunction with resistors 2907 and 2908 and capacitor 2909 in conjunction with resistors 2910 and 2911. The capacitance values of capacitors 2909 and 2906 and the resistance values of resistors 2907, 2908, 2910 and 2911 are so proportioned that transistor 2901 is conductive for three-fourths of the cycle and non-conductive for one-fourth of the cycle. Thus, the multivibrator output signal, which is taken from across collector resistor 2905, is a rectangular wave which has a value of minus twenty-four volts for five microseconds of each cycle and has a value of approximately minus thirty-two volts for fifteen microseconds of each cycle. As previously mentioned, resistor 2904 is utilized to provide emitter bias for both transistors. The current through this resistor is substantially constant. By-pass capacitor 2912 serves to maintain the emitter bias potential during transfer of operation from one transistor to the other.

The output signal from the multivibrator is coupled through resistor 2913 and capacitor 2914 to the base of amplifier transistor 2903. Transistor 2903 is biased for non-conduction during the negative portion of the multivibrator output waveform by minus forty-eight volts through resistor 2915 in parallel with approximately minus thirty-two volts through resistor 2913. During the positive portion of the multivibrator output waveform, transistor 2903 is rendered fully conductive. The output signal from transistor 2903, which is taken from across collector load resistor 2916, has a value of minus thirty-four volts during the five microsecond period of each cycle when transistor 2903 is conductive and has a value of minus twenty-four volts during the fifteen microsecond period of each cycle when transistor 2903 is non-conductive.

BINARY PULSE GENERATOR 20

Figure 30:
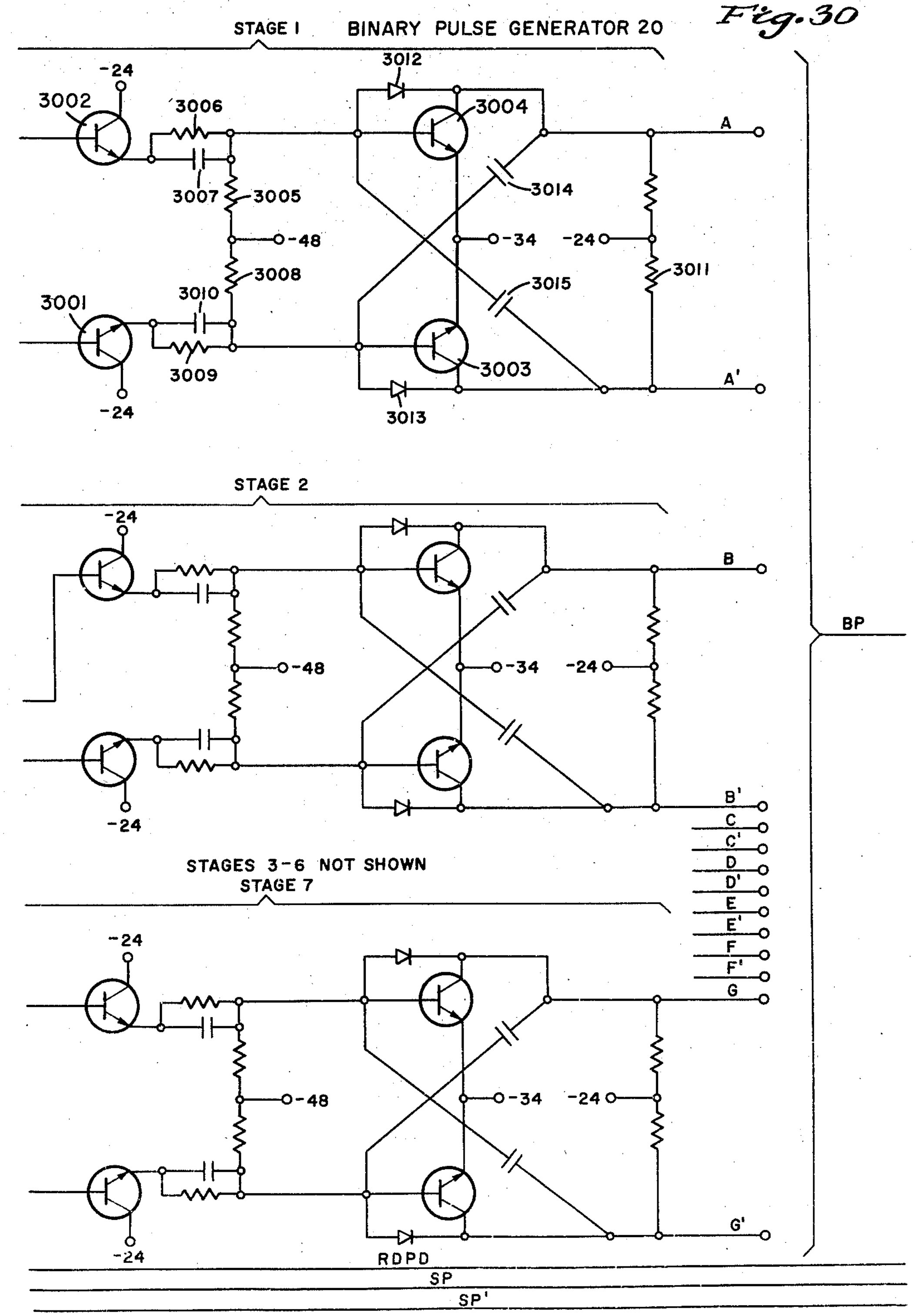

The binary pulse generator 20, which is shown in detail in Figs. 29 and 30, comprises seven identical stages, of which stages 1, 2 and 7 have been illustrated. Each stage comprises a frequency dividing flip-flop, a pair of emitter followers, and a pair of power output transistors. For example, stage 1 of the binary pulse generator comprises frequency dividing flip-flop transistors 2920 and 2930, emitter follower transistors 3001 and 3002, and power output transistors 3003 and 3004. All transistors used in the binary pulse generator may be type 2N94A.

The output signal from transistor 2903 in master oscillator 18 is coupled through steering diodes to the first stage flip-flop scale of two divider comprising transistors 2920 and 2930. This divider flips alternately from one stable state to the other in response to each oscillation of master oscillator 18. The output signal from the first stage, which is a square wave having a twenty microsecond positive alternation and a twenty microsecond negative alternation, is coupled through steering diodes to a second identical flip-flop in the second stage. The output of the second stage flip-flop scale of two divider is a square wave having a forty microsecond positive alternation and a forty microsecond negative alternation. The output of the second stage is coupled to a flip-flop in the third stage, the third to a fourth, and so on until seven stages of division have been coupled together in tandem fashion. The output of the seventh stage comprises a square wave having a one thousand two hundred and eighty microsecond positive alternation and a one thousand two hundred and eighty microsecond negative alternation.

For the purpose of describing the operation of stage 1 of the binary pulse generator 20, assume that transistor 2920 is conductive and that transistor 2930 is non-conductive. Since transistor 2920 is conductive, its collector terminal stands at minus thirty-four volts. Because of current flow from minus thirty-four volts through resistor 2921 and through resistor 2922 to minus forty-eight volts, the base of transistor 2930 and the anode terminal of steering diode 2923 stand at a potential slightly below minus thirty-four volts. The cathode terminal of diode 2924 also stands at minus thirty-four volts because of the connection through resistor 2925 to the collector of transistor 2920. Since the collector of transistor 2930 is returned to minus twenty-four volts through resistor 2926 and to the base of conducting transistor 2920 through resistor 2927 and since transistor 2930 is non-conductive, its collector stands at a potential slightly below minus twenty-four volts. Thus, the cathode terminal of steering diode 2923 stands at a potential slightly below minus twenty-four volts because of the connection through resistor 2928 to the collector of transistor 2930. It can be seen that diode 2923 is biased approximately ten volts in the reverse direction while diode 2924 has approximately zero bias applied thereto.

Under these conditions, emitter follower transistor 3002 is conductive since its base stands at approximately minus twenty-four volts and its emitter is returned to minus forty-eight volts through resistors 3005 and 3006. Thus, an output signal of approximately minus twenty-four volts is obtained at the emitter terminal of transistor 3002 and coupled through resistor 3006 and capacitor 3007 to the base of power output amplifier transistor 3004. Under these conditions, transistor 3004 is driven to saturation and conductor A stands at minus the thirty-four volts during the twenty microsecond periods when transistor 2920 is conductive and transistor 2930 is non-conductive.

Since the collector of transistor 2920 stands at minus thirty-four volts, the output signal from emitter follower transistor 3001 is approximately minus thirty-four volts. Transistor 3003 is biased for non-conduction since the potential of its base is slightly negative with respect to the minus thirty-four volt potential of its emitter. The base of transistor 3003 is returned to minus forty-eight volts through resistor 3008 and is coupled to the emitter of transistor 3001 by resistor 3009 and capacitor 3010. The output signal from transistor 3003, which is taken from across collector load resistor 3011 and coupled to succeeding circuits over conductor A′, thus stands at minus twenty-four volts during the twenty microsecond periods when transistor 2920 is conductive and transistor 2930 is non-conductive.

The power output amplifier stages are designed in such a way that the output buses may be loaded to approximately three hundred milliamperes peak. In order to minimize hole storage effects in the power output amplifiers, feedback diodes 3012 and 3013 are provided from collector to base on transistors 3004 and 3003, respectively. For this same purpose, capacitor 3014 is coupled from the collector of transistor 3004 to the base of transistor 3003 and capacitor 3015 is coupled from the collector of transistor 3003 to the base of transistor 3004. The rise and decay times of the output pulses are less than one microsecond.

It will be remembered that the output waveform from master oscillator 18 comprises a five microsecond negative portion and a fifteen microsecond positive portion. Capacitor 2929 in conjunction with resistor 2925 differentiates the leading edge of the negative portion of the waveform into a sharp negative pulse which is applied to the cathode terminal of diode 2924. The leading edge of the waveform is also differentiated by capacitor 2932 and resistor 2928 and the resulting negative pulse is applied to the cathode terminal of diode 2923. Since diode 2923 is biased ten volts in the reverse direction, the negative pulse applied to its cathode terminal is blocked from the base of transistor 2930. However, the negative pulse applied to the cathode terminal of diode 2924 is coupled through steering diode 2924 to the base of transistor 2920 and serves to render transistor 2920 non-conductive. When transistor 2920 is rendered non-conductive, the potential of its collector terminal rises from minus thirty-four volts to minus twenty-four volts. This positive swing is reflected through capacitor 2931 to the base of transistor 2930 and transistor 2930 becomes conductive. Power output amplifier transistor 3004 is made non-conductive and power output amplifier transistor 3003 is made conductive when transistor 2920 becomes non-conductive and transistor 2930 becomes conductive, respectively. Thus, during this twenty microsecond period, conductor A stands at minus twenty-four volts and conductor A′ stands at minus thirty-four volts.

The differentiated positive pulses, corresponding to the trailing edge of the negative portion of the master oscillator waveform, are blocked by both steering diodes. One of the next differentiated negative pulses will be conducted through diode 2923 and thus trigger transistor 2930 non-conductive and transistor 2920 conductive. Thus, these transistors are alternately flipped every twenty microseconds and the output signals on conductors A and A′ comprise fifty kc. square waves in phase opposition to each other. The signals appearing on conductors A and A′ are graphically illustrated in Figs. 42 and 43 of the drawings. The second stage of the binary pulse generator is triggered each time that transistor 2920 becomes conductive, or on alternate cycles of the master oscillator output waveform, as previously explained. Thus, the output of the second stage, which appears on conductors B and B′, comprises square waves of forty microsecond duration in each alternation and in phase opposition to each other.

The operation of the second to seventh stages of the binary pulse generator 20 is identical to the operation of the first stage except that the frequency of operation of each succeeding stage is halved. The signals appearing on conductors B–G′ are also graphically illustrated in Figs. 42 and 43 of the drawings.

CHANNEL PULSE MATRIX 25

Figure 31:
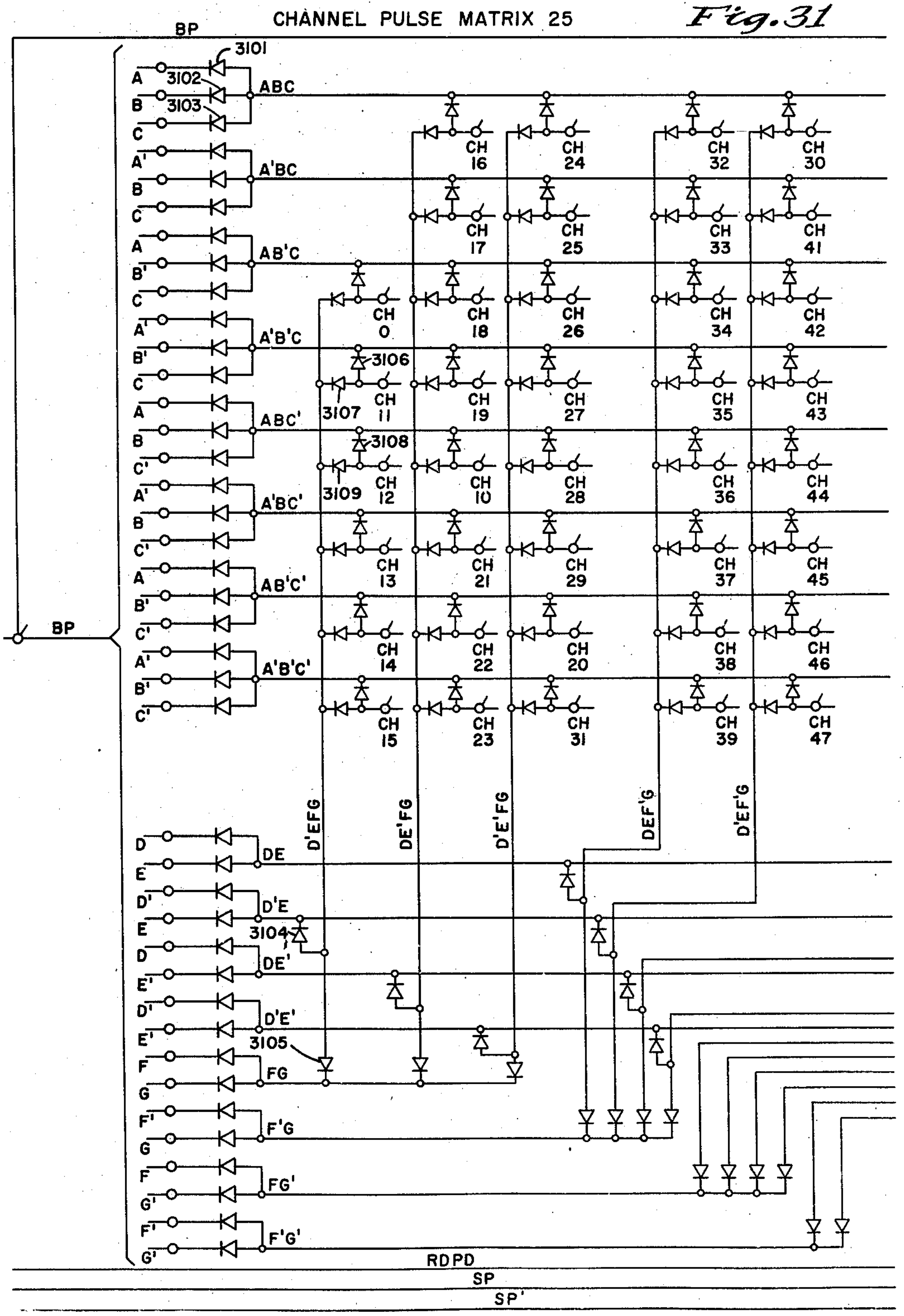
Figure 32:
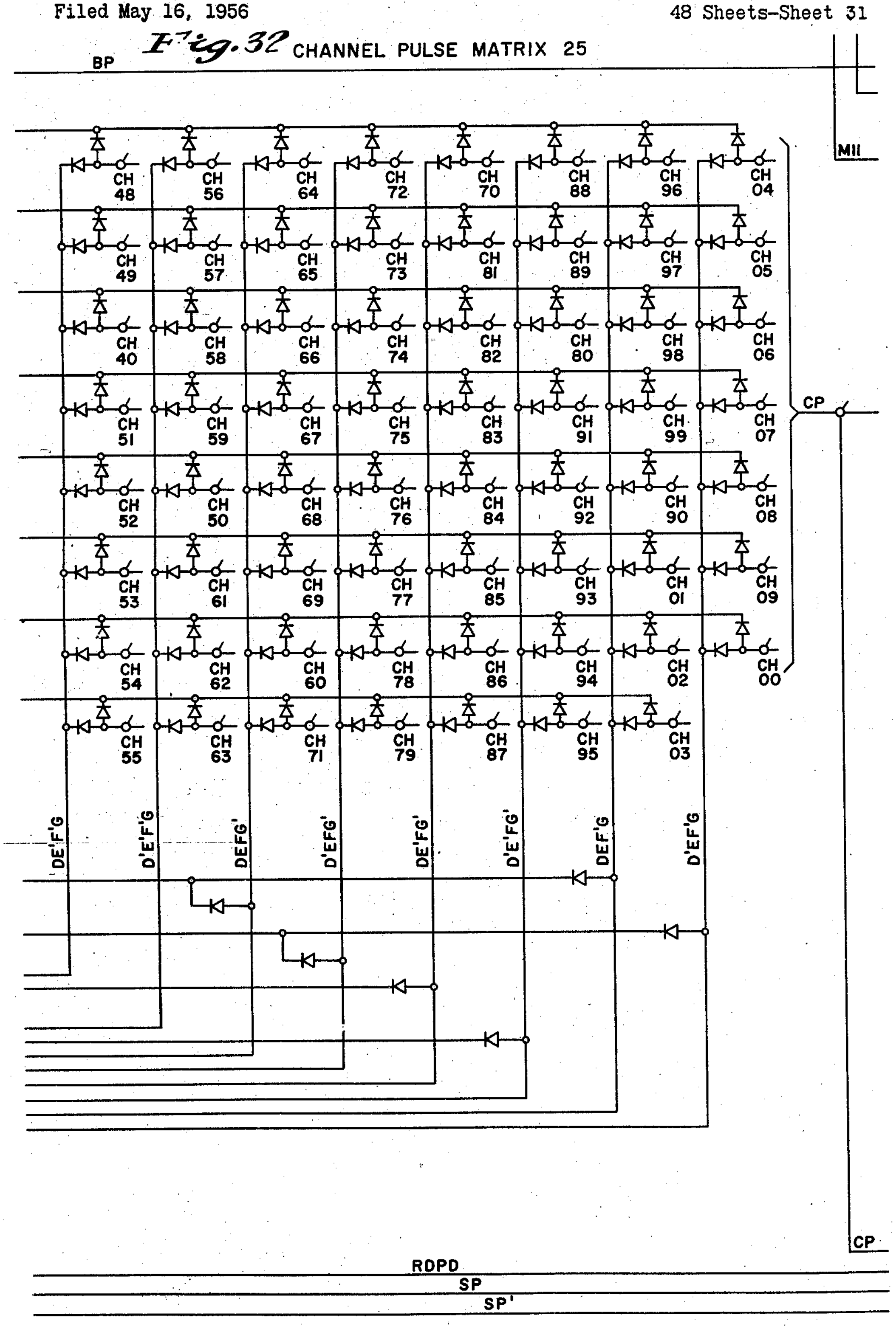

Figs. 31 and 32 show the complete schematic of the channel pulse matrix. This circuit comprises two hundred and sixty-eight diodes and is employed to generate one hundred and one individual channel pulses on one hundred and one output leads; corresponding to time positions 0 through 00. Zero corresponds to the channel interval just prior to eleven, and is used to reset the ringing circuit for line 11. The eleventh pulse is used to reset the ringing circuit for line 12, the twelfth pulse for line 13, and so on. Thus, one hundred and one consecutive channel pulses are required to handle the needs of the one hundred lines of the system.

To clarify the operation of the channel pulse matrix, as well as most of the remaining circuits in the switchboard, Boolean, or logic algebra, notation will be employed to describe the various waveforms, signals, and in many cases, the circuits themselves. A brief description of this notation follows, with particular attention to the manner in which it applies to the channel pulse matrix.

If a signal, such as the waveform on the A bus from the binary pulse generator, is inverted, the resulting signal is called A′. In this case, both the A and the A′ signals are available from the generator on two conductors. However, in certain cases, only one signal is available from a given source, and to obtain the prime equivalent, an inverting amplifier is employed. Note that if a primed signal is inverted, the unprimed equivalent is obtained. It is of importance to note that a prime does not indicate any particular polarity, such as positive or negative. In some cases, the unprimed signal may be a negative pulse, and in other cases, the unprimed signal may be a positive pulse. In the particular case of A and A′, these designate the two possible configurations of a square waveform alternating between minus twenty-four and minus thirty-four volts. It is obvious, of course, that it would be difficult to say which was the "positive" waveform. The designations are chosen arbitrarily, and are as shown on the binary pulse chart of Figs. 42–45.

When two or more signals are impressed on a diode gate, the resulting output is determined by the characteristics of the signals and by the configuration of the gate. If the gate comprises two or more diodes with the input signals coupled to the cathode terminals of the diodes and the anode terminals connected to the output terminal, then a negative output is obtained whenever any one or more of the inputs are negative. In this sense, the gate is called an "or" gate, and provides an output whenever the first or the second or the third (and so on) input is negative.

It is obvious that for this particular gate, a positive output is obtained when all of the inputs are positive. In this sense, the gate is called an "and" gate, and provides an output whenever the first and the second and the third (and so on) input is positive. It is, therefore, insufficient to say that a gate is an "or" gate or an "and" gate. A statement is also required relative to the assumed polarities involved.

Assume that the inputs to the gate in question are the signals A, B and C from the binary pulse generator 20.

The output will, of course, be negative whenever A, B or C is negative, and will be positive whenever A, B and C are positive. It makes little difference whether we call the gate an "and" gate or an "or" gate; the output waveform is the same in either case. A more positive and direct approach to the identification of the gate that avoids some of the pitfalls, which may occur as a result of neglect to state polarities, is to describe the gate in terms of the Boolean operation that it performs on the several inputs. This is accomplished simply by writing the symbols for the three inputs in an algebraic expression indicative of either multiplication or addition. For example, if the input pulses A, B and C are assumed to have a negative polarity, then the expression $A+B+C$ represents the output of an "or" gate which contains a negative output whenever any of the inputs are negative. Conversely (for the same configuration of diodes) if the input pulses are assumed to have positive polarity, then the expression ABC represents the output of an "and" gate which contains a positive output whenever all of the inputs are positive. Hence, knowing the input signals, the connection of the diodes (cathode input or anode input), and the Boolean expression of the output signal, it can be deduced whether the gate is acting in an "or" or "and" capacity, and also it can be deduced what the so-called "polarity" of the input and output signals is.

Referring to the upper left corner of Fig. 31, it will be observed that three diodes, namely, diodes 3101, 3102 and 3103, are employed to gate the three inputs A, B and C in such a way that ABC is derived. Since the expression ABC indicates an "and" gate action, and since the inputs are applied to the cathode terminals of the diodes, it follows that the sense of the input and output signals is positive. The waveform ABC is shown on the binary pulse chart of Figs. 42–45.

In a like manner, the other waveforms A′BC, AB′C, A′B′C, ABC′, A′BC′, AB′C′ and A′B′C′ are derived in the channel pulse matrix, and the waveforms are shown on the binary pulse chart.

It would be possible to derive the ABC waveforms by combining the A′, B′ and C′ waveforms in an "or" gate, to form $A'+B'+C'$. Upon analysis, however, this waveform would be negative rather than positive, and would have to be inverted if a positive version of ABC was required. Thus, we have shown a basic rule of Boolean algebra, namely, $$ABC=(A'+B'+C')'$$

or, expressed in another way, $$(ABC)'=A'+B'+C'$$

Once a derived waveform such as ABC is obtained, it may be used as an input to a succeeding gate. For example, if ABC is one input of an "and" gate, and DEFG is the second input, then the output of the gate is (ABC)(DEFG) or simply ABCDEFG. In the channel pulse matrix, this is carried one step further, and the DEFG input itself is the result of two stages of "and" gating, as follows:

$$(D)(E)=DE$$

$$(F)(G)=FG$$

$$(DE)(FG)=DEFG$$

Thus, to obtain a channel pulse described by the expression ABCDEFG, we split the gating up into [ABC][(DE)(FG)]. In this way, the final gate comprises two diodes, serving to gate together the two components ABC and DEFG. DEFG is derived from a two-diode gate combining the two components DE and FG.

Referring again to the channel pulse matrix of Figs. 31 and 32, we see that eight primary gates are employed to derive the waveforms DE, D′E, DE′, D′E′, FG, F′G, FG′ and F′G′. These eight waveforms are then used as the inputs to thirteen secondary gates. The first of these secondary gates comprises two diodes, namely, diodes 3104 and 3105, connected to D′E and FG. The output of this gate, therefore, is D′EFG. In a like manner, the outputs of the other twelve secondary gates carry the waveforms DE′FG, D′E′FG, DEF′G, D′EF′G, DE′F′G, D′E′F′G, DEFG′, D′EFG′, DE′FG′, D′E′FG′, DEF′G′ and D′EF′G′. These waveforms are shown on the binary pulse chart of Figs. 42–45. The particular combinations DEFG, DE′F′G′ and D′E′F′G′ are not provided, since they correspond to channel time positions earlier than channel pulse CH0 or later than channel pulse CH00.

The tertiary, or final stage of gating in the channel pulse matrix, combines the eight output leads from the first primary gating stage (the ABC's) with the thirteen output leads from the secondary gating stage (the DEFG's). There are exactly one hundred and one individual gates in the tertiary gating stage; corresponding to the one hundred and one output leads. Channel pulse CH11 is derived by combining the two waveforms A′B′C and D′EFG by means of diodes 3106 and 3107 to form A′B′CD′EFG. In a like manner, channel pulse CH12 is derived by gating ABC′ and D′EFG by means of diodes 3108 and 3109 to form ABC′D′EFG. These two examples are shown on the binary pulse chart. The remaining channel pulses are derived by combining the component waveforms, available on the horizontal and vertical buses of the channel pulse matrix, in a manner similar to the examples above.

REGISTER DRIVE PULSE GENERATOR 23

Figure 34:
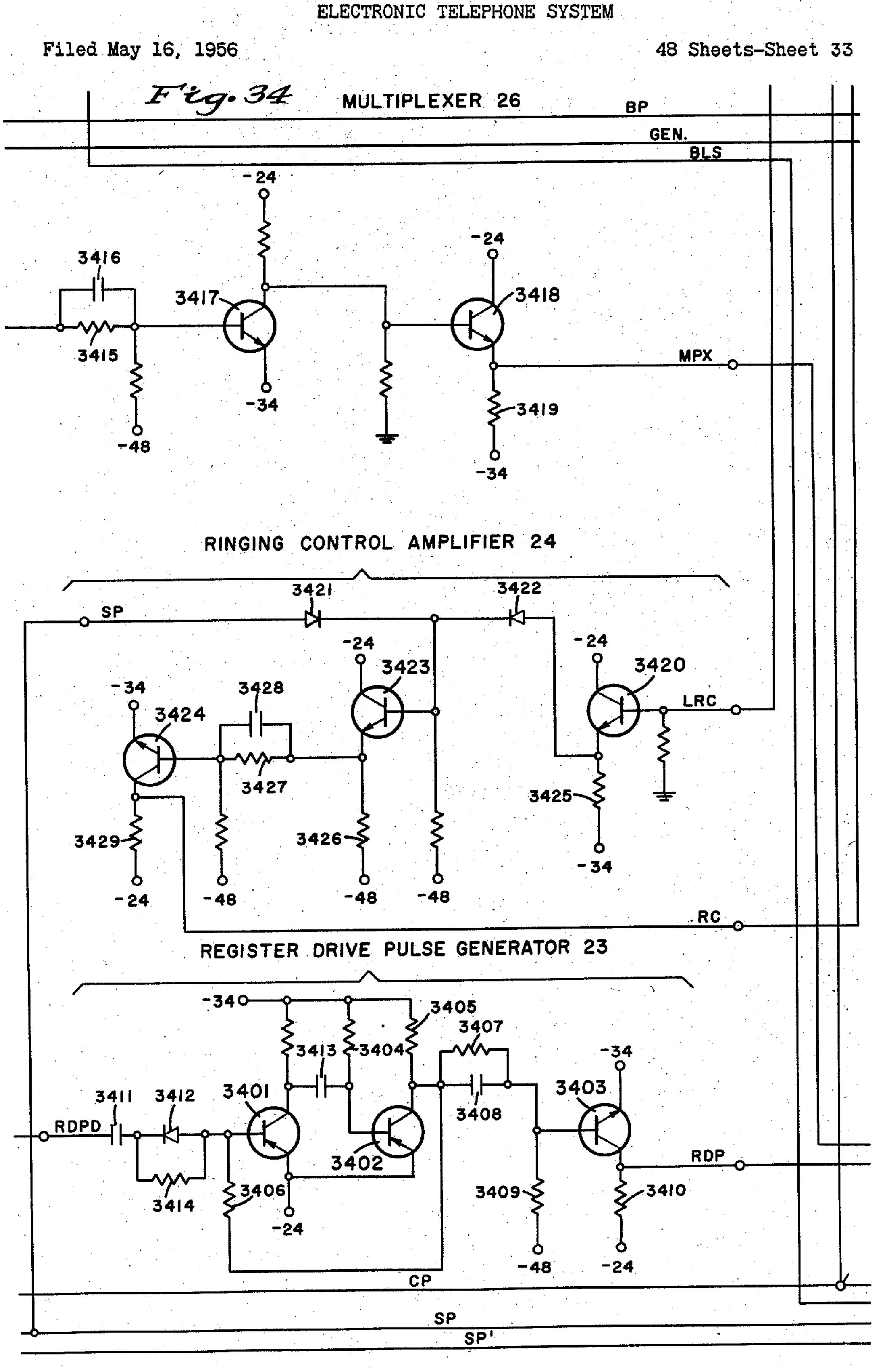

Register drive pulse generator 23 is shown in detail in Figure 34 of the drawings. The purpose of this circuit is to develop a ten microsecond pulse at the beginning of each channel pulse interval. The trailing edge of the register drive pulse is utilized to step the finder registers as previously explained in the general description. The circuit includes a one-shot multivibrator, comprising transistors 3401 and 3402, and an amplifier transistor 3403. Transistors 3401 and 3402 may be type 2N112 and transistor 3403 may be type 2N94A.

In the stable state of the multivibrator, transistor 3402 is conductive and transistor 3401 is non-conductive. Transistor 3402 is conductive since its base, which is returned to minus thirty-four volts through resistor 3404, is negative with respect to the minus twenty-four volt potential of its emitter. The output signal from the multivibrator, which is taken from across collector load resistor 3405, thus stands at minus twenty-four volts when the multivibrator is in its stable state. Transistor 3401 is biased for non-conduction at this time since its base is returned through resistor 3406 to the minus twenty-four volts appearing at the collector of transistor 3402. The output signal from the multivibrator is also applied through resistor 3407 and peaking capacitor 3408 to the base of transistor 3403. Since the emitter of transistor 3403 is returned to minus thirty-four volts and since the base of transistor 3403 is returned to a potential equal to the voltage division across resistors 3407 and 3409, which are returned to the minus twenty-four volts appearing at the collector of transistor 3402 and minus forty-eight volts, respectively, the base of transistor 3403 is positive with respect to the potential of its emitter and transistor 3403 is made fully conductive. Thus, the output signal from amplifier transistor 3403, which signal is taken from across collector load resistor 3410 and carried over conductor RDP to the links of the system, stands at minus thirty-four volts when the multivibrator is in its stable condition.

At the beginning of each channel interval when transistor 2903 in master oscillator 18 becomes conductive, the output signal, which appears on conductor RDPD, from the master oscillator swings from minus twenty-four volts to minus thirty-four volts. The leading edge of this negative portion of the waveform is differentiated into a sharp negative pulse by capacitor 3411 in conjunction with diode 3412 and resistor 3406. The resulting negative pulse is applied to the base of transistor 3401. Transistor 3401 becomes conductive and the potential appearing at its collector rises from minus thirty-four volts to minus twenty-four volts. This positive ten volt swing is coupled through capacitor 3413 to the base of transistor 3402 and renders transistor 3402 non-conductive. Since the potential appearing at the collector of transistor 3402 drops to minus thirty-four volts when transistor 3402 is non-conductive, transistor 3401 is held conductive through resistor 3406 as long as transistor 3402 remains non-conductive. Also, the minus thirty-four volt potential appearing at the collector of transistor 3402 biases transistor 3403 for non-conduction. When transistor 3403 becomes non-conductive, the register drive pulse generator output signal appearing on conductor RDP rises to minus twenty-four volts.

Transistor 3402 remains non-conductive until capacitor 3413 has discharged through resistor 3404 to a sufficient extent to make the base of transistor 3402 negative with respect to the emitter of transistor 3402. When transistor 3402 again becomes conductive, transistor 3401 becomes non-conductive and transistor 3403 becomes conductive, as previously described. The values of capacitance and resistance of capacitor 3413 and resistor 3404, respectively, are so chosen that transistor 3402 remains non-conductive for approximately ten microseconds. Thus, the output signal on conductor RDP stands at minus twenty-four volts for the first ten microsecond period of each twenty microsecond time channel and stands at minus thirty-four volts during the second ten microsecond period of each time channel. Resistor 3414 is utilized to discharge capacitor 3411 during the interval corresponding to the trailing edge of the negative portion of the master oscillator waveform. Diode 3412 prevents a positive pulse from being applied to the base of transistor 3401 at that time.

SAMPLING PULSE GENERATOR 19

Sampling pulse generator 19 is shown in detail in the lower left portion of Figure 29. The purpose of this circuit is to develop ten microsecond sampling pulses which occur in the approximate center of each channel interval. The sampling pulses are gated with channel pulses in various components of the system to give ten microsecond pulses in the time position of any given line. The circuit includes a one-shot multivibrator, comprising transistors 2940 and 2941, an emitter follower amplifier transistor 2942, an inverter amplifier transistor 2943, and two emitter follower transistors 2944 and 2945. All of the transistors used in this circuit may be type 2N94A.

In the stable state of the multivibrator, transistor 2940 is conductive and transistor 2941 is non-conductive. Transistor 2940 is conductive since its base, which is returned to minus twenty-four volts through resistor 2946, is positive with respect to the minus thirty-four volt potential of its emitter. The output signal from the multivibrator is taken from across collector load resistor 2947 and applied to the base of emitter follower transistor 2942. The output signal stands at minus thirty-four volts when the multivibrator is in its stable state. The output signal from emitter follower transistor 2942, which is taken from across emitter load resistor 2948 and applied to conductor SP′, also stands at minus thirty-four volts. Transistor 2941 is biased for non-conduction at this time since its base, which is returned through resistor 2949 to the minus thirty-four potential appearing at the emitter of transistor 2942 and through resistor 2950 to minus forty-eight volts, is negative with respect to the minus thirty-four volt potential of its emitter. Inverter amplifier transistor 2943 is also biased for non-conduction at this time since its base, which is returned through resistor 2951 to the minus thirty-four volt potential at the emitter of transistor 2942 and through resistor 2952 to minus forty-eight volts, is negative with respect to the minus thirty-four volt potential of its emitter. The output signal from transistor 2943, which is taken from across collector load resistor 2953 and coupled to emitter follower 2944, thus stands at minus twenty-four volts. Emitter follower transistor 2944 amplifies and repeats this signal to emitter follower transistor 2945 which further amplifies and repeats the signal to conductor SP. Thus it can be seen that when the multivibrator is in its stable state, minus thirty-four volts is applied to conductor SP′ and minus twenty-four volts is applied to conductor SP.

Capacitor 2954 and resistors 2949 and 2950 serve to differentiate the five microsecond negative pulse, which appears in the master oscillator output waveform at the beginning of each cycle, into a sharp negative pulse corresponding to the leading edge of the pulse and a sharp positive pulse corresponding to the trailing edge of the pulse. These pulses are applied to the base of transistor 2941. The negative pulse has no effect on transistor 2941 but the positive pulse renders transistor 2941 conductive and the potential appearing at its collector drops from minus twenty-four volts to minus thirty-four volts. This negative ten volt swing is coupled through capacitor 2955 to the base of transistor 2940 and renders transistor 2940 non-conductive. Since the potential appearing at the collector of transistor 2940 and at the emitter of transistor 2942 rises to minus twenty-four volts when transistor 2940 is non-conductive, transistor 2941 is held conductive through resistor 2949 as long as transistor 2940 is non-conductive. The signal appearing on conductor SP′ rises to minus twenty-four volts and transistor 2943 is rendered conductive. The potential appearing at the collector of transistor 2943 drops to minus thirty-four volts and is repeated by emitter follower transistors 2944 and 2945 to conductor SP.

Transistor 2940 remains non-conductive until capacitor 2955 has charged through resistor 2946 to a sufficient extent to make the base of transistor 2940 positive with respect to the emitter of transistor 2940. When transistor 2940 again becomes conductive, transistors 2941 and 2943 become non-conductive, as previously described. The values of capacitance and resistance of capacitor 2955 and resistor 2946, respectively, are so chosen that transistor 2940 remains non-conductive for approximately ten microseconds. Thus, the signal appearing on conductor SP′ stands at minus thirty-four volts during the first and last five microsecond intervals of each time channel and stands at minus twenty-four volts during the ten microsecond interval occurring at the center of each time channel. The signal appearing on conductor SP stands at minus twenty-four volts during the first and last five microsecond intervals of each time channel and stands at minus thirty-four volts during the ten microsecond interval occurring at the center of each time channel. In other words, the pulses appearing on conductor SP′ are the inverse of the pulses appearing on conductor SP.

TONE AND PULSE GENERATOR 29

Figure 15:
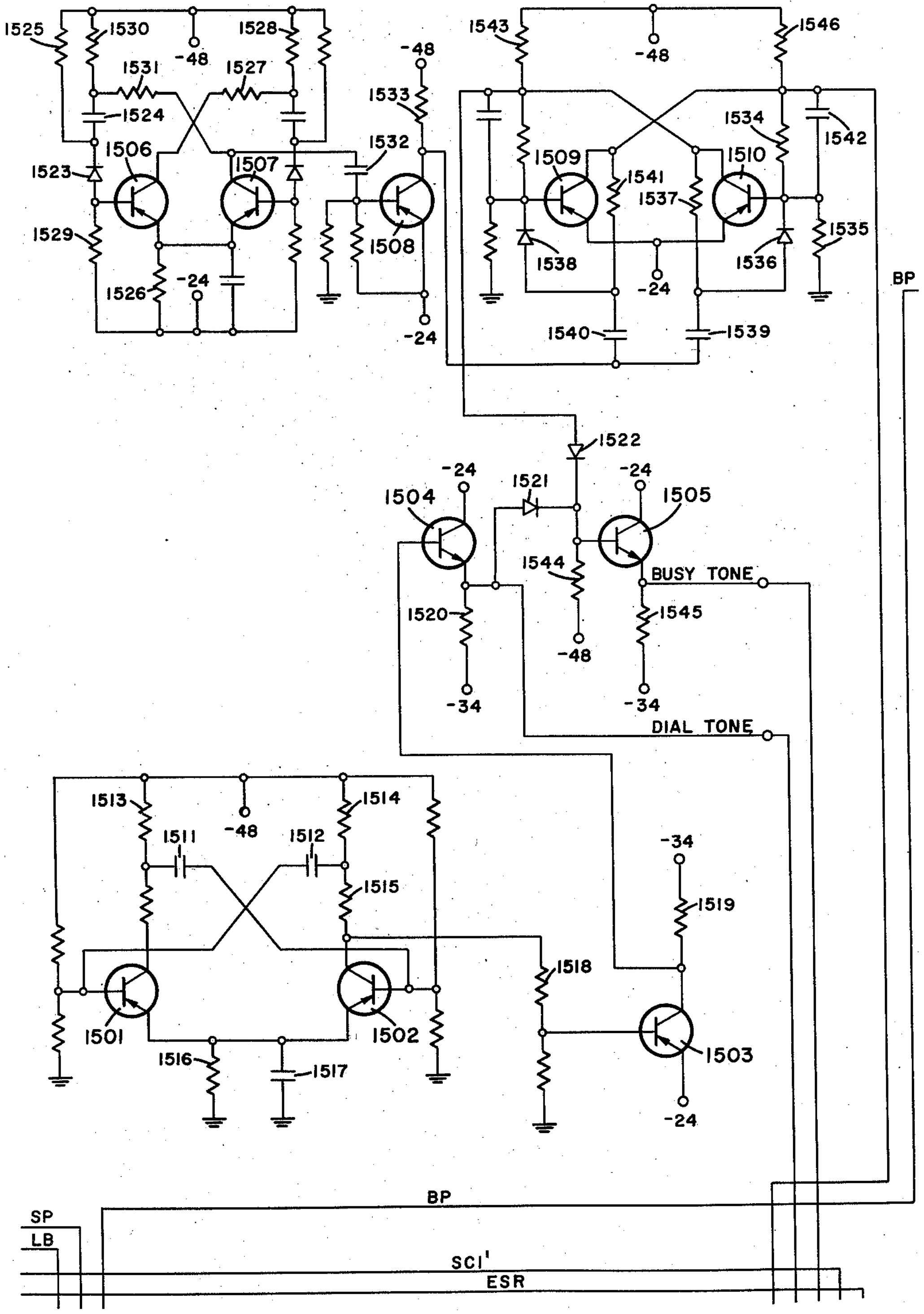
Figure 20:
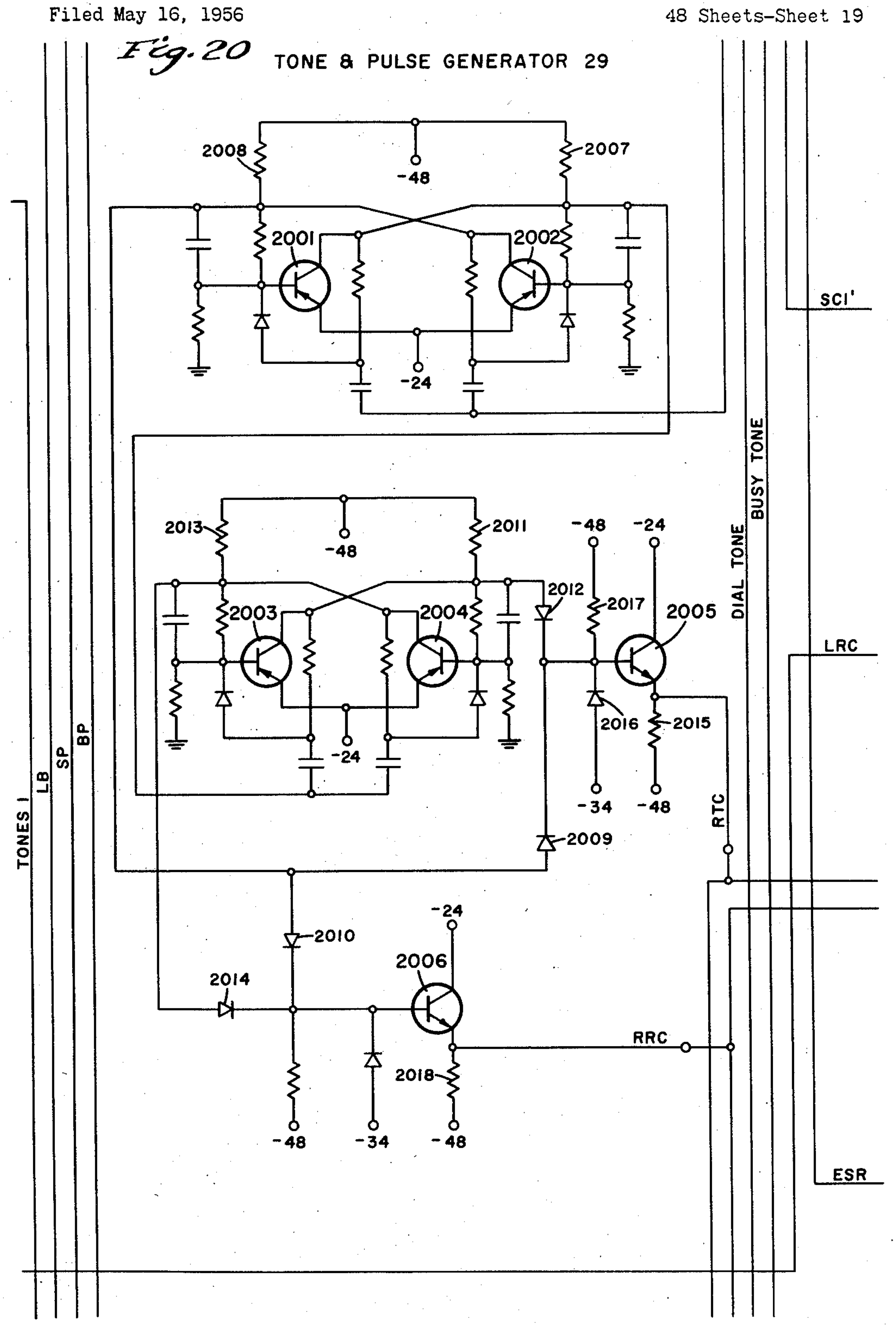

Tone and pulse generator 29 is shown in detail in Figs. 15 and 20 of the drawings. This circuit is designed to generate the dial tone and busy tone signals and also to generate the timing signals which control the application of ringing signals to the tip and ring conductors of the lines. The dial tone and busy tone signals are both derived from a two hundred c.p.s. non-symmetrical rectangular waveform generated in a free-running multivibrator comprising transistors 1501 and 1502. This wave form is coupled through dial tone amplifier transistor 1503 and dial tone emitter follower transistor 1504 to conductor dial tone, which is connected to all of the connectors of the system. The output signal from transistor 1504 is also gated with a one c.p.s. square wave in such fashion that the dial tone signal is interrupted at the rate of one c.p.s., or sixty i.p.m. This signal is the busy tone and is coupled through busy tone follower transistor 1505 to conductor busy tone, which is also connected to all of the connectors of the system.

The remainder of the circuits included in the tone and pulse generator are closely interrelated and operate in conjunction with a low-frequency oscillator and a three stage binary divider. Transistors 1506 and 1507 comprise the low-frequency oscillator, which is a free-running multivibrator operating at a frequency of two c.p.s. The square wave output signal from the multivibrator is coupled through amplifier transistor 1508 to the input of the first binary divider stage which comprises transistors 1509 and 1510. This stage serves to divide the two c.p.s. square wave by a factor of two, so that the frequency of its output signal is one c.p.s. A first output signal from the first divider stage is used to gate the dial tone signal to produce the busy tone signal, as previously described, while a second output signal from the first divider stage is coupled to the second binary divider stage which comprises transistors 2001 and 2002. The second divider stage operates at a frequency of one-half c.p.s. and its output signal is coupled to a third binary divider stage. The third binary divider stage comprising transistors 2003 and 2004, operates at a frequency of one-fourth c.p.s. The output signals from transistors 2002 and 2003 are gated together to form a first one-second pulse which occurs once every four seconds. This first one-second pulse is coupled through emitter follower transistor 2005 to the ring tip control conductor RTC. The output signals from transistors 2002 and 2004 are gated together to form a second one-second pulse which occurs once every four seconds. This second one-second pulse is coupled through emitter follower transistor 2006 to the ring-ring control conductor RRC. Conductors RTC and RRC are connected to all of the connectors of the system and to the ringing generator control circuit 27. Transistors 1501, 1502, 1503, 1506, 1507, 1508, 1509, 1510, 2001, 2002, 2003, and 2004 may be type 2N44. Transistors 1504, 1505, 2005 and 2006 may be type GT692.

The free running multivibrator comprising transistors 1501 and 1502 is conventional in design. The capacitance values of cross-coupling capacitors 1511 and 1512 and the resistance values of resistors 1513 and 1514 are so proportioned that transistor 1502 is conductive for the greater portion of each cycle. The two hundred c.p.s. output signal of the multivibrator, which is taken from across collector load resistors 1514 and 1515, stands at minus forty-eight volts when transistor 1502 is non-conductive and rises to approximately minus sixteen volts, as determined by the voltage division across resistors 1514, 1515 and 1516, when transistor 1502 is conductive. Resistor 1516 is utilized to provide emitter bias for both transistors. The current through this resistor is substantially constant. By-pass capacitor 1517 serves to maintain the emitter bias potential during transfer of operation from one transistor to the other.

The rectangular output waveform of the multivibrator is coupled through resistor 1518 to the base of transistor 1503. Transistor 1503 conducts on the portion of the waveform between approximately minus twenty-four volts and minus forty-eight volts. The output waveform appearing across resistor 1519 in the collector circuit of transistor 1503 is rectangular and swings between minus thirty-four volts and minus twenty-four volts. This waveform is repeated by emitter follower transistor 1504 and appears across emitter load resistor 1520. The output signal from transistor 1504 is coupled to conductor dial tone and to the anode terminal of diode 1521. Diode 1521 forms one input of the two-input busy tone gate comprising diodes 1521 and 1522. Before describing the operation of the busy tone gate, it is first necessary to describe the derivation of the one c.p.s. pulses applied to the anode terminal of diode 1522.

As previously described, the low-frequency oscillator comprising transistors 1506 and 1507 is a free running multivibrator operating at a frequency of two c.p.s. The multivibrator is conventional in design except that a diode is connected in series with the capacitor which couples the collector circuit of each transistor to the base circuit of the other transistor. The charging circuit for the capacitor is isolated from the base circuit of the transistor by the diode so that the frequency of operation of the multivibrator is made independent of the base circuit impedance, which may vary from transistor to transistor, or with temperature changes.

For the purpose of describing the operation of the multivibrator, assume that transistor 1506 is conducting and that transistor 1507 has just started to conduct. The potential at the collector of transistor 1507 begins to rise from minus forty-eight volts to a potential slightly below minus twenty-four volts as determined by the voltage drop across emitter bias resistor 1526 due to current flow from minus twenty-four volts through resistor 1526, conducting transistor 1506, and through resistors 1527 and 1528 to minus forty-eight volts. This positive voltage swing is coupled through capacitor 1524 and biases diode 1523 for non-conduction. The potential on the base of transistor 1506 drops to approximately minus twenty-four volts when diode 1523 is cut-off and thus transistor 1506 is rendered non-conductive. Capacitor 1524 now discharges through resistor 1525 toward minus forty-eight volts. When capacitor 1524 becomes discharged sufficiently to bias diode 1523 in the conducting direction, the capacitor continues to discharge toward a voltage value determined by the voltage division across resistors 1525 and 1529. Before the capacitor is discharged to this point, however, the base of transistor 1506 is made slightly negative with respect to its emitter potential and transistor 1506 begins to conduct. Transistor 1507 is then made non-conductive. The operation of the capacitor and diode associated with transistor 1507 is identical to the operation just described for the capacitor and diode associated with transistor 1506. As shown, the output signal is taken from across resistors 1530 and 1531 in the collector circuit of transistor 1507. The output signal is a square wave which swings between minus forty-eight volts and a voltage equal to the emitter bias potential of approximately minus twenty-four volts.

The square wave output signal from the multivibrator is differentiated and coupled through capacitor 1532 to the base of transistor 1508. The resulting output signal from transistor 1508 is taken from across resistor 1533 in the collector circuit of transistor 1508 and coupled to the input of the first binary divider stage comprising transistors 1509 and 1510. The operation of the binary divider stages in this circuit is similar to the operation of the binary divider circuits in the binary pulse generator 20 which were previously described. However, since PNP transistors are used in this circuit instead of NPN transistors, it is believed that a brief description of the operation of the first binary divider will aid in the understanding of the operation of the system.

For this purpose, assume that transistor 1509 is conductive and that transistor 1510 is non-conductive. Since transistor 1509 is conductive, its collector stands at minus twenty-four volts. The resulting voltage division across resistors 1534 and 1535, which are returned to the minus twenty-four volt potential appearing at the collector of transistor 1509 and ground potential, respectively, is applied to the base of transistor 1510 and holds transistor 1510 non-conductive. Diode 1536 is biased to approximately minus sixteen volts in the reverse direction since its cathode is connected to the base of transistor 1510 and its anode is returned through resistor 1537 to the approximately minus forty volt collector potential of non-conducting transistor 1510. Diode 1538 has approximately zero bias applied thereto since transistor 1509 is conductive at this time.

The positive going portion of the output waveform from amplifier transistor 1508 is differentiated by capacitor 1539 and resistor 1537 and capacitor 1540 and resistor 1541 into sharp positive pulses corresponding to the leading edge of the positive portion of the waveform and sharp negative pulses corresponding to the trailing edge of the waveform. The positive pulse differentiated by capacitor 1539 and resistor 1537 is blocked from the base of transistor 1510 since diode 1536 is biased approximately sixteen volts in the reverse direction. However, the positive pulse differentiated by capacitor 1540 and resistor 1541 is coupled through diode 1538 and serves to render transistor 1509 non-conductive. When transistor 1509 becomes non-conductive, the potential of its collector drops from minus twenty-four volts to approximately minus forty volts. This negative swing is coupled through capacitor 1542 and resistor 1534 to the base of transistor 1510 and transistor 1510 becomes conductive. The differentiated negative pulses corresponding to the trailing edge of the positive going portion of the input waveform are blocked by both diodes. The next positive pulse differentiated by capacitor 1539 and resistor 1537 will be conducted through diode 1536 and thus trigger transistor 1510 non-conductive and transistor 1509 conductive. Thus, transistors 1509 and 1510 are alternately flipped every one-half second.

A first output signal from the first binary divider is taken from across resistor 1543 in the collector circuit of transistor 1510 and applied to the anode of diode 1522 in the busy tone gate. This output signal stands at minus twenty-four volts whenever transistor 1510 is conductive and at approximately minus forty volts whenever transistor 1510 is non-conductive. The busy tone gate is an "or" gate for positive signals. That is, when either one of the input signals stands at minus twenty-four volts, the output of the gate is minus twenty-four volts. To illustrate the operation of the gate, assume that transistor 1510 is conductive and the output signal from the binary divider thus stands at minus twenty-four volts. Current flows from minus twenty-four volts through diode 1522 and through resistor 1544 to minus forty-eight volts. Because of the low forward impedance of conducting diode 1522, the cathode terminals of diodes 1522 and 1521 stand at minus twenty-four volts. Since the two hundred c.p.s. dial tone signal applied to the anode terminal of diode 1521 ranges between minus twenty-four volts and minus thirty-four volts, diode 1521 blocks the dial tone signal. During the one-half second period of each cycle in which transistor 1510 is non-conductive and the output signal from the first binary divider stands at approximately minus forty volts, diode 1522 is biased in the reverse direction and the two hundred c.p.s. dial tone signal is applied to the base of busy tone emitter follower transistor 1505. The resulting busy tone signal is taken from across resistor 1545 in the emitter circuit of transistor 1505 and conducted over conductor busy tone to the connectors of the system. Thus, the busy tone signal is a two hundred c.p.s. rectangular waveform which is "on" for one-half second and "off" for one-half second in each one-second interval.

A second output signal from the first binary divider is taken from across resistor 1546 in the collector circuit of transistor 1509 and applied to the input of the second binary divider comprising transistors 2001 and 2002. The operation of the second binary divider is identical to the operation of the first binary divider except that the frequency of operation is halved. Each time that transistor 1509 becomes conductive, the resulting positive pulse serves to trigger the second binary divider. The second binary divider is thus operated at a frequency of one-half c.p.s.

A first output signal from the second binary divider is taken from across resistor 2007 in the collector circuit of transistor 2001 and applied to the input of the third binary divider. Each time that the transistor 2001 becomes conductive, the resulting positive pulse serves to trigger the third binary divider. The third binary divider thus operates at a frequency of one-fourth c.p.s.

A second output signal from the second binary divider is taken from across resistor 2008 in the collector circuit of transistor 2002 and applied to the anode terminals of diodes 2009 and 2010. A first output signal from the third binary divider is taken from across resistor 2011 in the collector circuit of transistor 2003 and applied to the anode terminal of diode 2012. A second output signal from the third binary divider is taken from across resistor 2013 in the collector circuit of transistor 2004 and applied to the anode terminal of diode 2014. Diodes 2009 and 2012 comprise a first "and" gate for negative signals and diodes 2010 and 2014 comprise a second "and" gate for negative signals. The output signal from the first gate is coupled to ring tip emitter follower transistor 2005 and the output signal from the second gate is coupled to ring-ring emitter follower transistor 2006.

Examining the first gate, it can be seen that as long as either transistor 2002 or 2003 is conductive, minus twenty-four volts will be conducted through either diode 2009 or diode 2012, respectively, and applied to the base of transistor 2005 and thus appear across resistor 2015 in the emitter circuit of transistor 2005. During one second of each four-second time interval, both transistors 2002 and 2003 are non-conductive and the anode terminals of diodes 2009 and 2012 stand at approximately minus forty volts. At this time, the base of transistor 2005 drops to minus thirty-four volts because of conduction from minus thirty-four volts through limiting diode 2016 and resistor 2017 to minus forty-eight volts. The signal appearing across emitter load resistor 2015 of course drops to minus thirty-four volts at this time. Conductor RTC stands at minus twenty-four volts for three seconds and stands at minus thirty-four volts for one second during each four-second ringing cycle.

Similarly, the output of the second gate drops to minus thirty-four volts only during the one-second interval when both transistors 2002 and 2004 are non-conductive. Thus, the output signal appearing across resistor 2018 in the emitter circuit of transistor 2006 and which is applied to the ring-ring control conductor RRC, stands at minus thirty-four volts for one second and stands at minus twenty-four volts for three seconds during each four-second ringing cycle.

To illustrate the timing, assume that transistors 1509, 2001 and 2003 are conductive. The ouput of the second gate will be minus thirty-four volts at this time since both transistors 2002 and 2004 are non-conductive and minus thirty-four volt potential appears on conductor RRC. Conductor RTC stands at minus twenty-four volts since transistor 2003 is conductive. The first pulse from the two c.p.s. multivibrator renders transistor 1510 conductive but since the second and third binary dividers remain in their original setting, minus thirty-four volts is applied to conductor RRC and minus twenty-four volts is applied to conductor RTC. The second pulse renders transistors 1509 and 2002 conductive. Both conductors RTC and RRC stand at minus twenty-four volts at this time since transistor 2002 is conductive. The third pulse merely renders transistor 1510 conductive. The fourth pulse renders transistors 1509, 2001 and 2004 conductive. A minus thirty-four volt signal now appears on conductor RTC since both transistors 2002 and 2003 are non-conductive. Conductor RRC stands at minus twenty-four volts since transistor 2004 is conductive. The fifth pulse merely renders transistor 1510 conductive. The sixth pulse renders transistors 1509 and 2002 conductive. Conductor RTC returns to minus twenty-four volts since transistor 2002 is now conductive. The seventh pulse merely renders transistor 1510 conductive. The eighth pulse renders transistors 1509, 2001 and 2003 conductive to complete the cycle. It should be apparent that the one-second negative pulses appearing on conductors RRC and RTC are spaced by one-second intervals.

RINGING GENERATOR CONTROL CIRCUIT 27 AND RINGING GENERATOR 28

Figure 35:
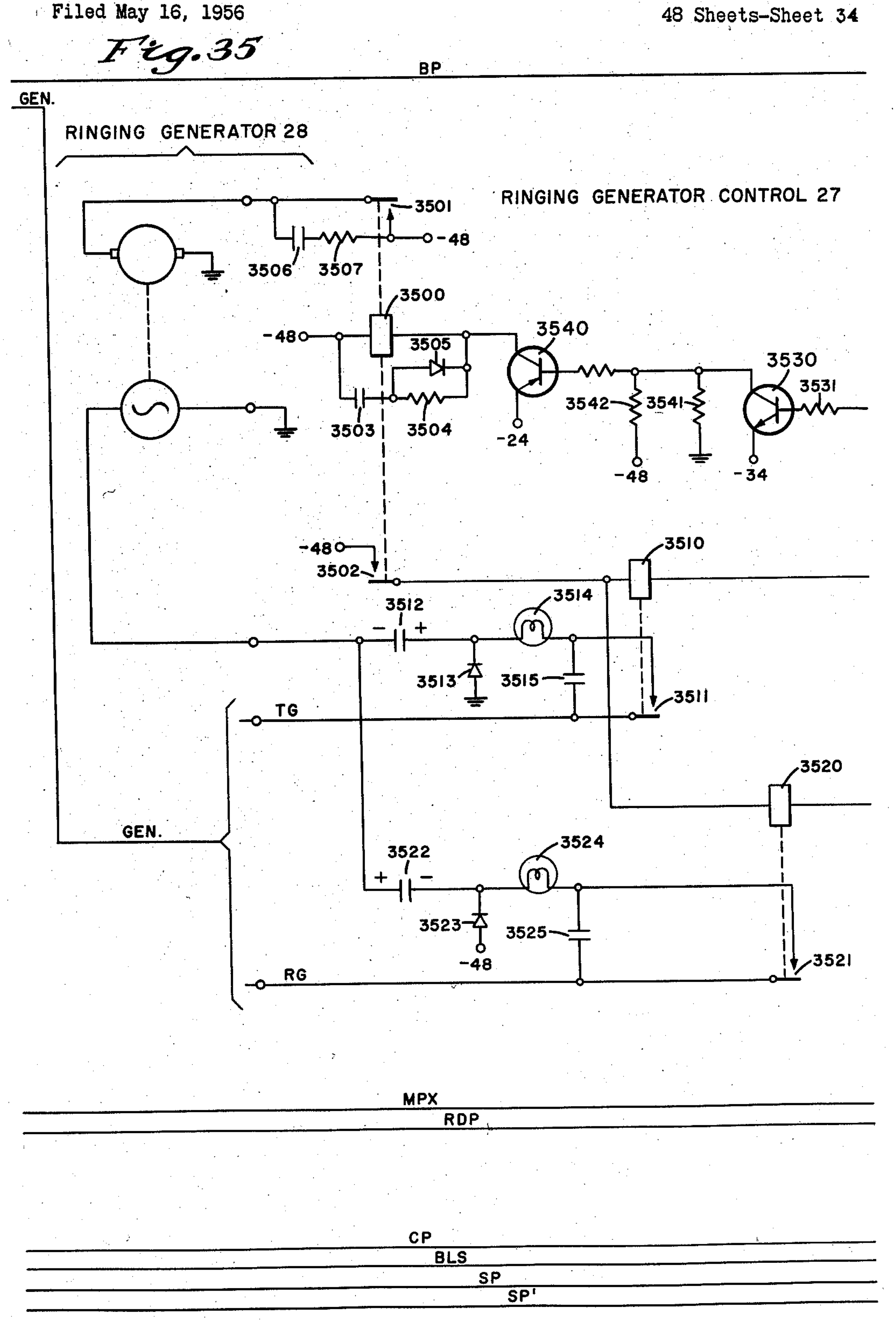
Figure 36:
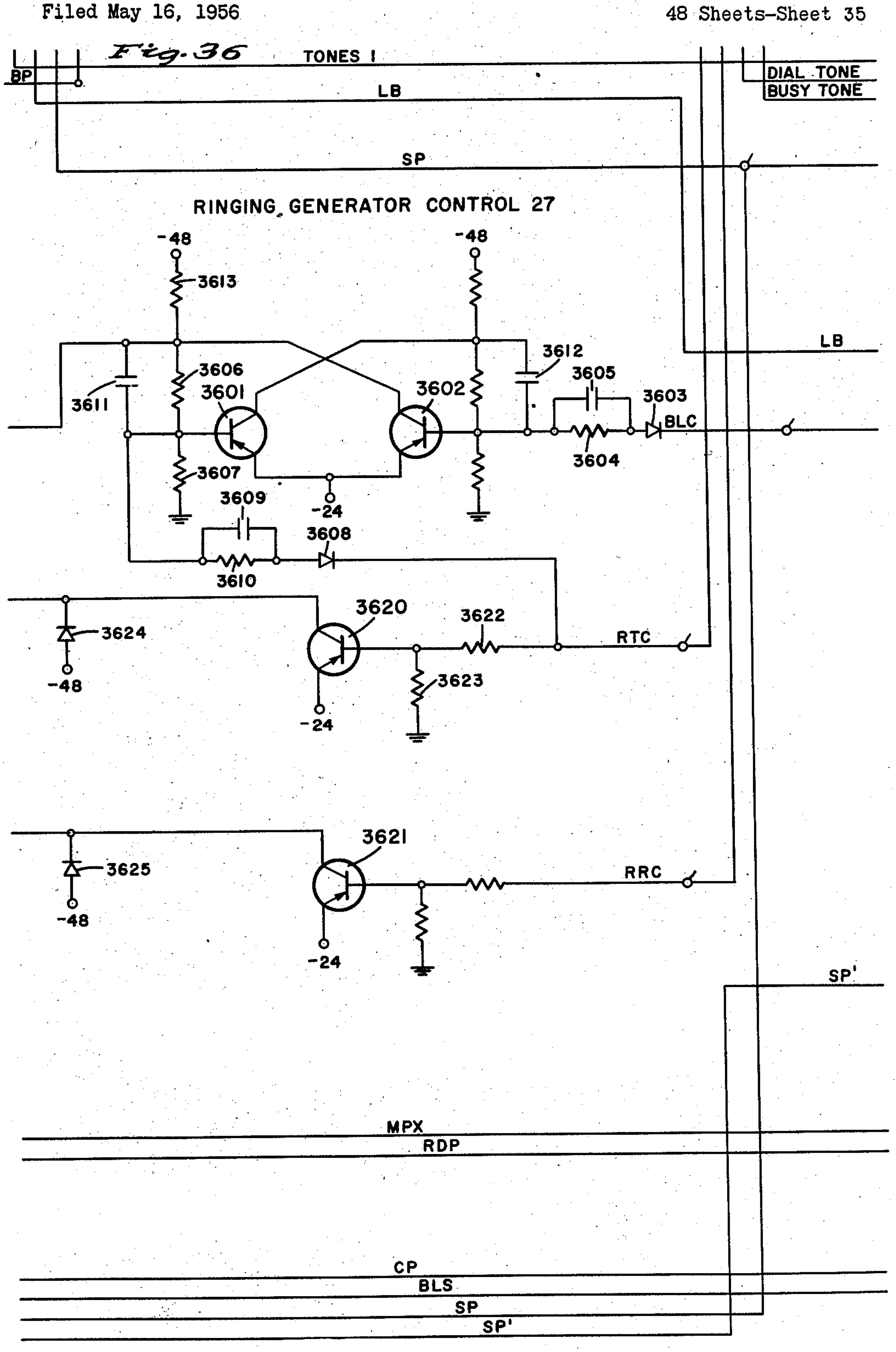
Figure 37:
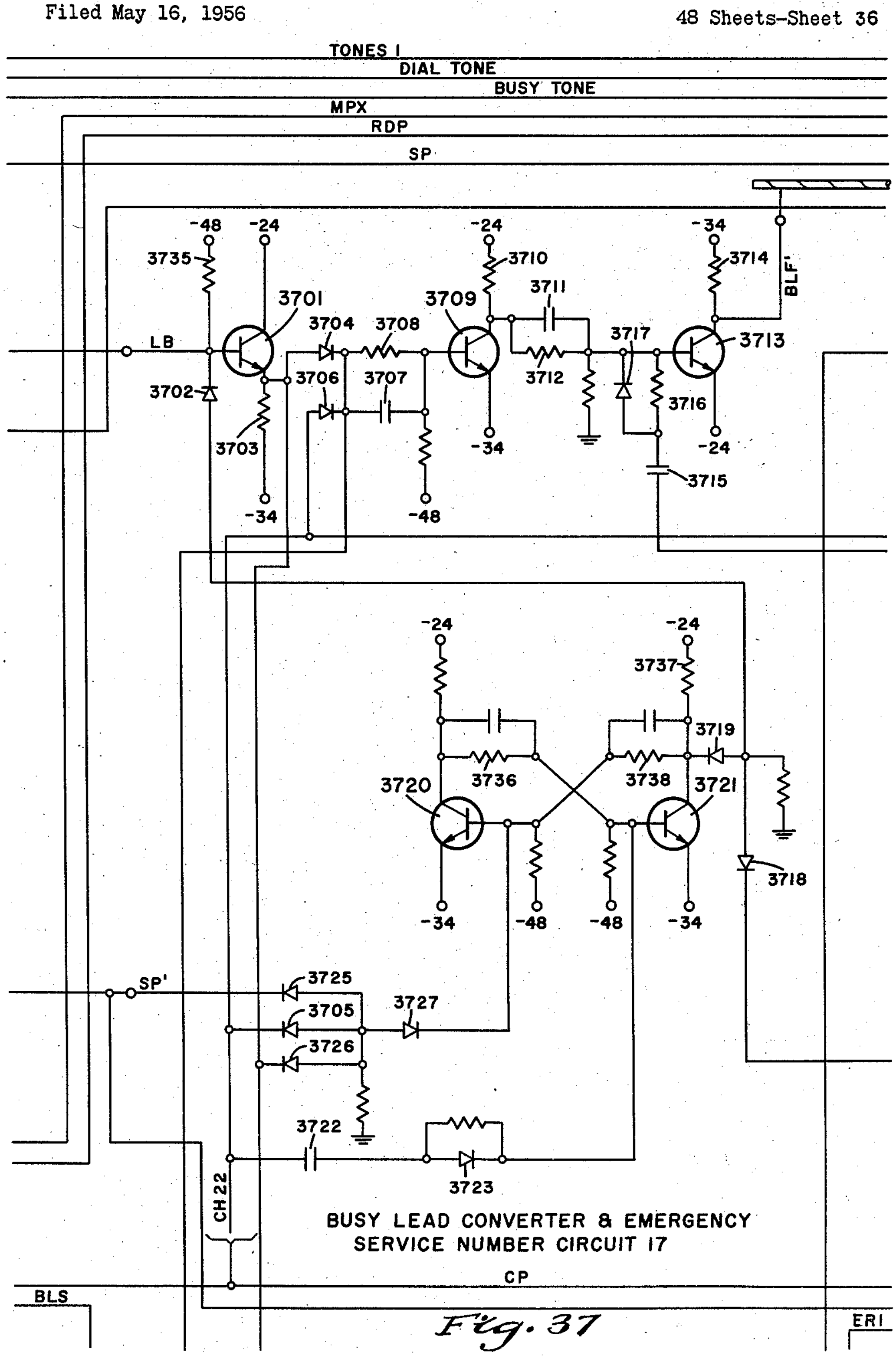
Figure 38:
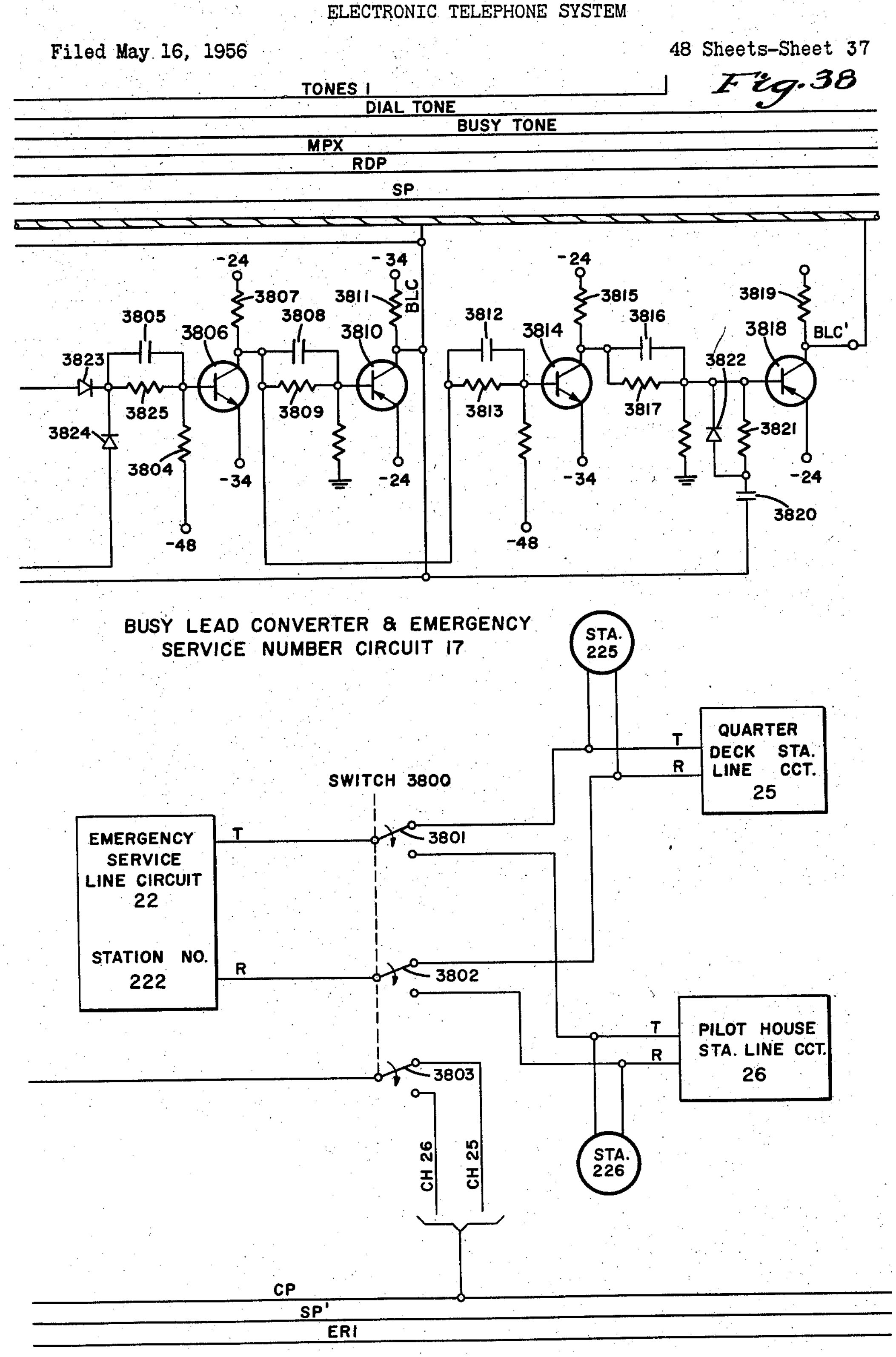
Figure 39:
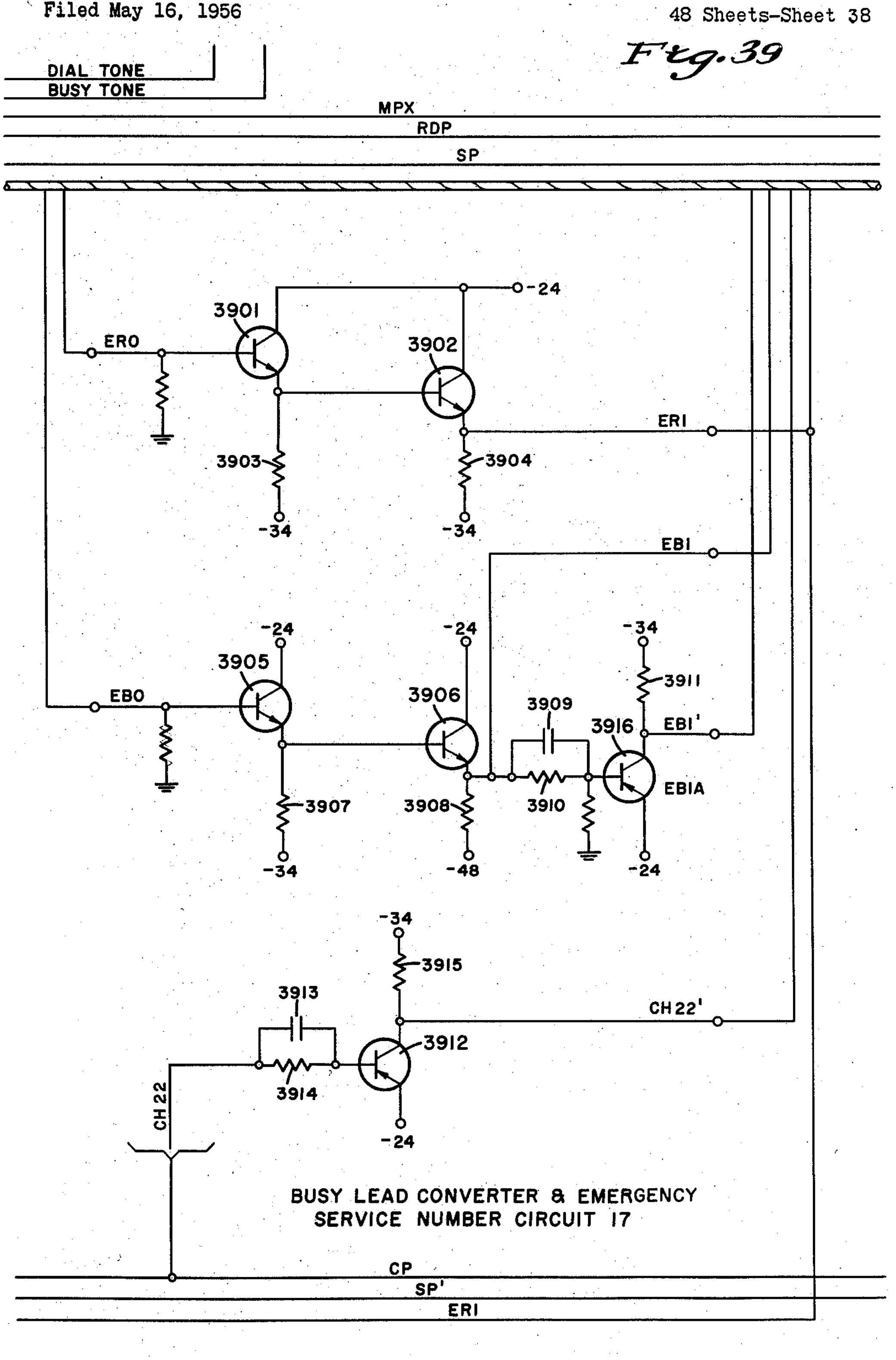
Figure 40:
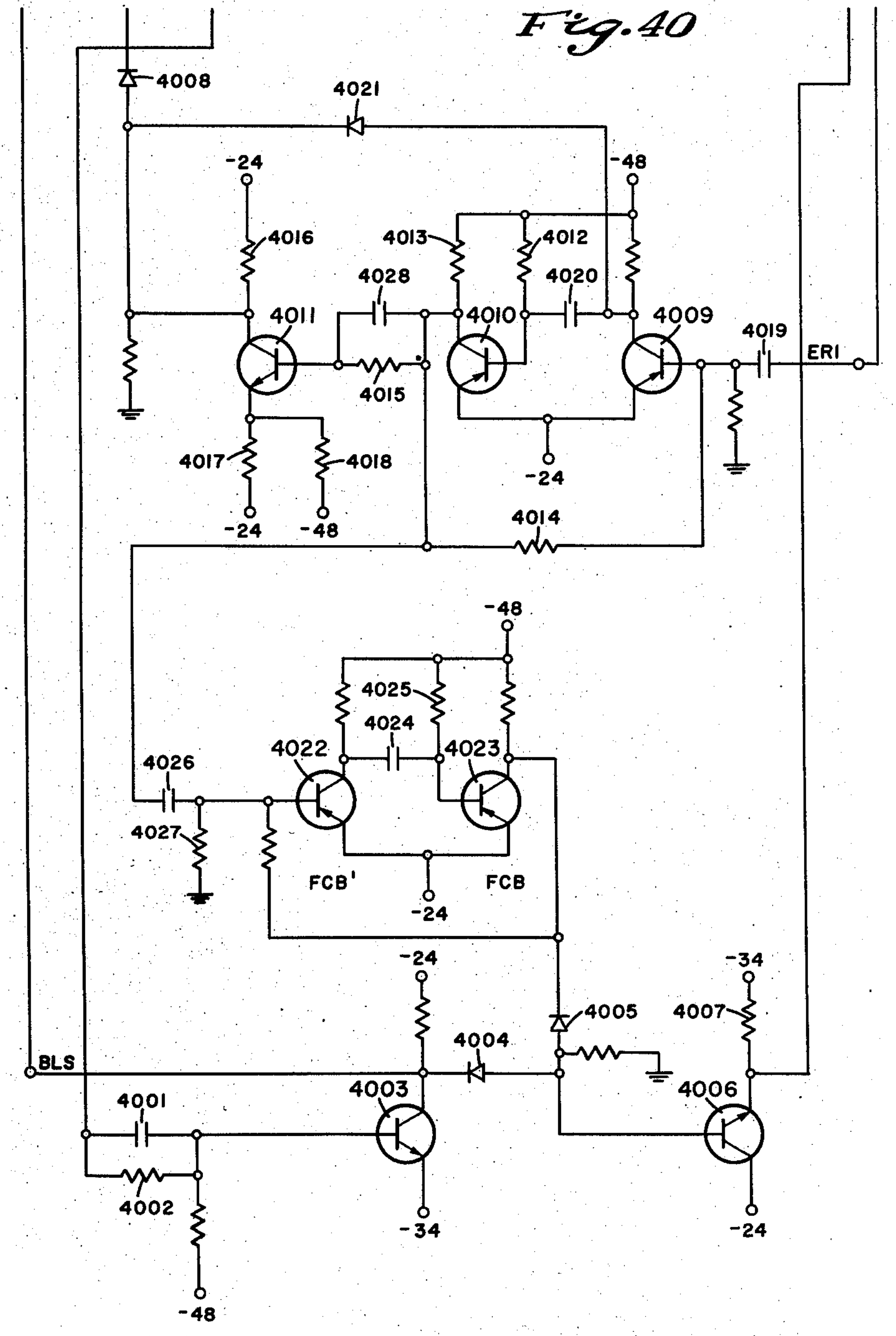

The ringing generator control circuit 27 is shown in detail in Figs. 35 and 36 and the ringing generator 28 is shown at the left portion of Fig. 35 of the drawings. The ringing generator control circuit includes relays 3510 and 3520 which are utilized for interrupting the ringing power received from ringing generator 28 in accordance with the ringing pattern set up by the ringing cycle circuits in tone and pulse generator 29. Relay 3500 is included in circuit 27 for the purpose of turning "on" the motor generator set 28 whenever calls are being handled in the system.

The ringing motor generator start relay 3500 is controlled by a busy pulse detecting flip-flop circuit comprising transistors 3601 and 3602. For the purpose of describing the control of relay 3500, assume that at least one line of the system is off-hook and that a negative busy pulse in the time position of that line appears on conductor BLC. The negative pulse on conductor BLC is coupled through diode 3603, capacitor 3604, and resistor 3605 to the base of transistor 3602. If transistor 3602 is non-conductive, the negative pulse will render it conductive. If transistor 3602 is already conductive, the negative pulse will have no effect and transistor 3602 remains conductive. Whenever transistor 3602 is conductive, transistor 3601 is, of course, non-conductive since the collector potential of transistor 3602 rises from approximately minus thirty-eight volts, as determined by the voltage division across resistors 3613 and 3606, to minus twenty-four volts. With transistor 3602 conductive, the base of transistor 3601 is made slightly positive with respect to the minus twenty-four volt potential of its emitter since the base of transistor 3601 is returned through resistor 3506 to the collector of transistor 3602 and through resistor 3607 to ground potential. Transistor 3602 remains conductive until transistor 3601 is subsequently triggered by the waveform on conductor RTC. This resetting trigger occurs once every four seconds as determined by the ringing cycle control circuit in tone and pulse generator 29. The negative pulse appearing on conductor RTC is coupled through diode 3608, capacitor 3609, and resistor 3610 to the base of transistor 3601 and serves to render transistor 3601 conductive and transistor 3602 non-conductive. Immediately after the leading edge of the waveform on conductor RTC is utilized to reset the multivibrator, however, a busy pulse appears on conductor BLC and retriggers transistor 3602. Since the busy pulses for a single line occur at the rate of three hundred ninety c.p.s., there is a maximum of 2.56 milliseconds of "off" time for transistor 3602. Additional calls, in in causing additional busy pulses to be produced, cause the effective busy pulse repetition frequency to increase, which reduces the maximum "off" time of transistor 3602 to some value less than 2.56 milliseconds. Cross coupling capacitors 3611 and 3612 are provided in the circuit so that the collector swing of the triggered transistor may be coupled in full to the base of the other transistor and thus trigger it non-conductive.

The output signal from the multivibrator is derived across resistor 3613 in the collector circuit of transistor 3602 and coupled by resistor 3531 to the base of amplifier transistor 3530. The output signal from the multivibrator stands at minus twenty-four volts whenever one or more links have been taken into use. Every four seconds, however, there exists a minus thirty-eight volt spike in the waveform, the maximum duration of which is 2.56 milliseconds. When all links are released, of course, no more busy pulses are generated and the multivibrator output returns to its approximately minus thirty-eight volt value incident to the receipt of the next resetting pulse over conductor RTC. Transistor 3530 amplifies and inverts the positive output from the multivibrator and serves to drive transistor 3540 to saturation. When the output signal from the multivibrator is approximately minus thirty-eight volts, transistor 3530 is cut-off and the potential at the base of transistor 3540 rises to approximately minus sixteen volts as determined by the voltage division across bleeder resistors 3541 and 3542. Under these conditions, transistor 3540 is also cut-off. However, when the output signal from the multivibrator stands at minus twenty-four volts, the output signal from transistor 3530 is minus thirty-four volts and transistor 3540 is driven to saturation. When transistor 3540 is driven to saturation, its output signal stands at minus twenty-four volts and relay 3500, which is connected in the collector circuit of transistor 3540, is operated. Storage capacitor 3503 and charge current limiting resistor 3504 and diode 3505 are connected across the winding of relay 3500 to prevent the relay from chattering or releasing during the 2.56 millisecond intervals. Contacts 3501 on relay 3500 thus close an energizing circuit to the motor of motor generator set 28 as long as any line in the system is in an off-hook condition. Capacitor 3506 and resistor 3507 provide spark protection for contacts 3501.

The generator of motor generator 28 produces a twenty c.p.s., eighty volt R.M.S. output. One terminal of the generator is grounded so that the instantaneous voltage appearing at the other terminal of the generator swings between minus one hundred and thirteen volts and plus one hundred and thirteen volts. The output of the generator is coupled to a first clamping circuit comprising electrolytic capacitor 3512 and diode 3513, and to a second clamping circuit comprising electrolytic capacitor 3522 and diode 3523. The clamping circuit comprising capacitor 3512 and diode 3513 functions to clamp the negative peak of the ringing signal to ground. The resulting signal, which swings between ground and plus two hundred twenty-six volts is coupled through ballast lamp 3514 and contacts 3511 on relay 3510 to the tip generator conductor TG during periods when relay 3510 is operated. The clamping circuit comprising capacitor 3522 and diode 3523 functions to clamp the positive peak of the signal to minus forty-eight volts. The resulting signal, which swings between minus forty-eight volts and minus two hundred and seventy-four volts, is coupled through ballast lamp 3524 and contacts 3521 on relay 3520 to ring generator conductor RG during periods when relay 3520 is operated.

Consider the clamping circuit comprising capacitor 3512 and diode 3513 and assume that the generator output signal stands at minus one hundred and thirteen volts. Diode 3513 is poled so as to conduct so that capacitor 3512 charges to a potential of minus one hundred and thirteen volts and conductor TG is maintained at ground potential because of the low forward impedance of diode 3513. When the ringing voltage changes to plus one hundred and thirteen volts, the difference between the plus one hundred and thirteen volt potential applied and the minus one hundred and thirteen volts across the capacitor appears across the load as an output voltage of plus two hundred and twenty-six volts.

The clamping circuit comprising capacitors 3522 and diode 3523 is, of course, operated in the reverse manner. When the ringing generator output stands at plus one hundred and thirteen volts, diode 3523 is poled so as to conduct, capacitor 3522 charges to plus one hundred and thirteen volts, and conductor RG is maintained at minus forty-eight volts. When the potential of the ringing generator output changes to minus one hundred and thirteen volts, the difference between the applied voltage and the voltage across capacitor 3522 appears across the load as an output voltage of minus two hundred and seventy-four volts.

Capacitors 3515 and 3525 bridge contacts 3511 and 3521, respectively, for the purpose of preventing arcing when these contacts are being opened or closed. Conductors TG and RG are connected by cable GEN to all of the line circuits of the system, where they provide the power to operate the ringers of the telephones provided in the system.

The operation of relays 3510 and 3520 is controlled by signals received over conductors RTC and RRC, respectively, from tone and pulse generator 29. It will be remembered that conductor RTC stands at minus twenty-four volts for a three-second interval and at minus thirty-four volts for a one-second interval during each four-second ringing cycle. The voltage division across resistors 3622 and 3623 when conductor RTC stands at minus twenty-four volts is such that transistor 3620 is cut-off. When conductor RTC stands at minus thirty-four volts, transistor 3620 is driven to saturation and relay 3510, which is connected in the collector circuit of transistor 3620, is operated. Thus, relay 3510 is operated to close contacts 3511 for a one-second interval during each four second ringing cycle. Similarly, relay 3520 is operated under control of amplifier transistor 3621 during a different one-second interval of each four-second ringing cycle. As previously described, relays 3510 and 3520 operate and release in accordance with the ringing pattern, whereby relay 3510 is operated for one second, then is released for one second, after which time relay 3520 is operated for one second. After one more silent period, relay 3510 is operated once more, giving a complete four-second ringing cycle. During the time that relay 3510 is operated, a ringing signal which swings between ground and plus two hundred and twenty-six volts is applied to conductor TG and the ringers on the tip side of the divided ringing party lines are operated, subject to connector control. During the time that relay 3520 is operated, a ringing signal which swings between minus forty-eight volts and minus two hundred and seventy-four volts is applied to conductor RG to operate ringers on the ring side of divided ringing party lines, again subject to connector control. Ringers on bridged ringing private lines are rung during the period that the second, or ring side, relay 3520 is operated.

It is to be noted that relays 3510 and 3520 do not operate unless the ringing generator is running since the windings of these relays are returned to minus forty-eight volts through contacts 3502 on relay 3500. Diodes 3624 and 3625 are connected in parallel with the windings of relays 3510 and 3520, respectively, to short circuit the inductive surge generated in the relays when they are deenergized at the termination of their respective one-second ringing intervals. As used in this circuit, transistors 3601, 3602, 3620 and 3621 may be type 2N44, transistor 3530 may be type GT692, and transistor 3540 may be type GT550.

*Group Common Equipment*

MULTIPLEXER 26

Figure 33:
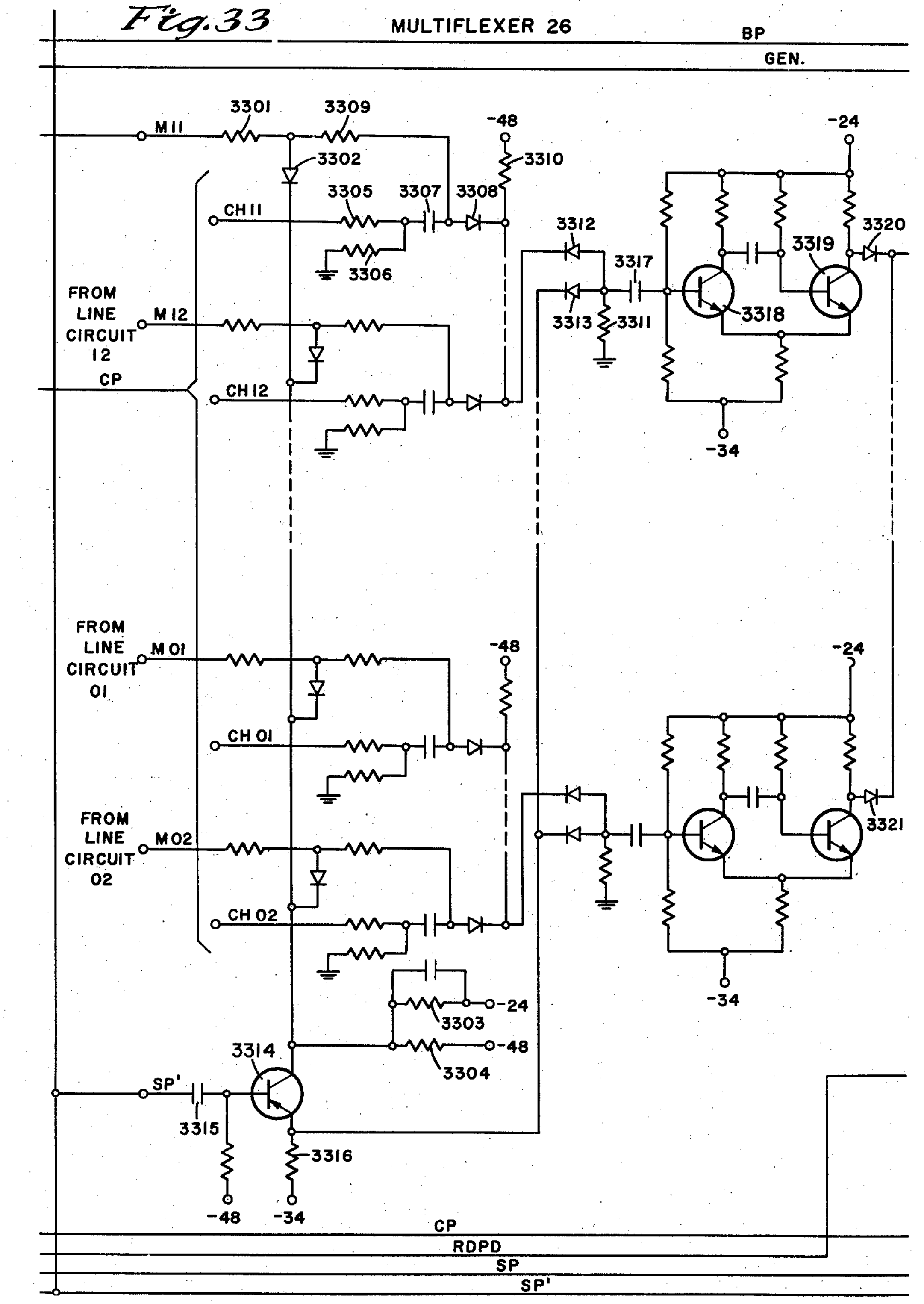

The purpose of the multiplexer, shown in Figs. 33 and 34 of the drawings, is to commutate the one hundred supervisory signals received over the multiplexer control conductors from the one hundred line circuits in such a way that each line is sampled at a precise predetermined time occurring once during the two thousand five hundred and sixty microsecond frame, as set up by the binary pulse generator 20 and channel pulse matrix 25. It will be recalled that the frame is divided into one hundred and twenty-eight equal twenty microsecond channel intervals, one hundred of which are assigned to individual lines of the system. During each such channel interval, a short sample of the supervisory information is taken in such a way that if the line is on-hook, no output signal is derived and if line current is flowing, a full amplitude output signal, in the form of a ten microsecond pulse occurring approximately at the center of the channel pulse interval, is derived.

The multiplexer is arbitrarily split up into ten identical subcircuits, the outputs of which are combined in a common output stage. Each subcircuit serves ten lines, which may or may not be consecutively related. Portions of two subcircuits are shown in Fig. 33. At the upper left of Fig. 33 is shown a portion of the subcircuit for lines 11—10. Only the multiplexer control conductors from lines 11 and 12 have been illustrated as connected to the subcircuit but it is to be understood that the multiplexer control conductors from lines 13—10 are connected to the subcircuit in an identical fashion. At the lower left of Fig. 33, multiplexer control conductors M01 and M02 from lines 01 and 02, respectively, are shown connected to the subcircuit for lines 01–00. It is to be understood that the multiplexer control conductors from lines 03–00 are connected to this subcircuit in an identical fashion. Also, eight subcircuits identical to those illustrated are provided for each ten line group of lines 21–90.

Within each subcircuit is an individual gating stage for each line of the system. For example, in the subcircuit for lines 11—10, an individual gating stage is provided for line 11 to gate the multiplexer control conductor M11 from line circuit 11 with the channel pulse in the eleventh time position appearing on conductor CH11. Multiplexer control conductor M11 from line circuit 11 is coupled through resistor 3301 to the anode terminal of voltage limiter diode 3302. The cathode terminal of diode 3302 is returned to a potential of approximately minus forty-two volts, as determined by the voltage division across resistors 3303 and 3304, so that the control potential is limited to the range from minus forty-eight to minus forty-two volts. When the line is on-hook, the control potential is approximately minus forty-eight volts, and when the line is off-hook, the control potential becomes minus forty-two volts at the limiter. Each channel pulse gate of the channel pulse matrix 25 is terminated in a pair of equal value resistors provided in each gating stag of the multiplexer. For example, channel pulse conductor CH11 terminates in resistors 3305 and 3306 in the gating stage for line 11 in the multiplexer. Since the matrix output is a ten volt signal, the signal derived from the center point of the two resistors 3305 and 3306 is a five volt pulse. This five volt pulse is coupled through capacitor 3307 to the anode terminal of diode 3308. The output terminal of the voltage limiter diode 3302 is coupled through resistor 3309 to the anode terminal of diode 3308.

When line circuit 11 is on-hook and a minus forty-eight volt potential is applied to conductor M11, diode 3308 is blocked and does not pass the channel pulse CH11. Under these conditions, diode 3308 is biased approximately six volts in the negative direction since its anode stands at minus forty-eight volts and its cathode stands at approximately minus forty-two volts as determined by the voltage division across resistors 3310 and 3311 due to current flow from ground through resistor 3311, diode 3312, and through resistor 3310 to minus forty-eight volts.

When a station on line 11 is off-hook and conductor M11 stands at minus forty-two volts, diode 3308 is biased for conduction and the five volt channel pulse coupled through capacitor 3307 is conducted through diode 3308 to the output bus of the subcircuit. Channel pulses gated by other gating stages in the same subcircuit are combined on this output bus and together are coupled to an "and" gate for positive pulses individual to each subcircuit. For the subcircuit for lines 11—10, the individual subcircuit "and" gate comprises diodes 3312 and 3313.

Sampling pulses of positive polarity appearing on conductor SP′ are coupled through sampling pulse follower transistor 3314. Transistor 3314, which may be type 2N44, is employed to shift the D.-C. operating level of the sampling pulse from its normal minus twenty-four to minus thirty-four volt range to a minus thirty-four to minus forty-two volt range. Two volts of the sampling pulse are clipped off in the process. In the absence of sampling pulses, transistor 3314 is conductive and its output signal, which is taken from across emitter load resistor 3316, stands at minus forty-two volts since the collector of transistor 3314 is returned to the junction point of resistors 3303 and 3304. The positive sampling pulses appearing on conductor SP′ and coupled through capacitor 3315 render transistor 3314 nonconductive and the output signal from transistor 3314 rises to minus thirty-four volts. The output signal is coupled to the cathode terminal of diode 3313 as well as to the second input of each subcircuit "and" gate, where it serves to shorten the gated channel pulses to the ten microsecond sampling pulse duration.

The output signal from the "and" gate comprising diodes 3312 and 3313 is coupled through capacitor 3317 to the one-shot multivibrator comprising transistors 3318 and 3319. Transistors 3318 and 3319 may be type 2N94A. The multivibrator acts as a regenerative amplifier to regain the standard pulse amplitude of ten volts for the multiplexer pulses developed in its associated subgroup. The operation of this multivibrator is identical to the operation of the multivibrator in the sampling pulse generator 19, which was previously described. Transistor 3319 is normally conductive and transistor 3318 is normally non-conductive. A positive pulse coupled through capacitor 3317 renders transistor 3318 conductive and transistor 3319 non-conductive. Transistor 3319 remains non-conductive for approximately ten microseconds and then becomes conductive to render transistor 3318 non-conductive. Thus, in response to each positive pulse coupled through capacitor 3317, the multivibrator generates a ten volt positive ten microsecond pulse.

The outputs of the ten subgroup pulse amplifier stages are combined in a ten input "or" gate for positive pulses, of which input diodes 3320 and 3321 are shown. The positive pulse or pulses appearing at the output of the "or" gate are coupled through resistor 3415 and capacitor 3416 to the base of master amplifier transistor 3417. Transistor 3417, which may be type 2N94A, amplifies and inverts the pulses and applies the resulting pulses to the base of emitter follower transistor 3418. The output signal from emitter follower transistor 3418, which may be type 2N94A, is taken from across emitter load resistor 3419 and applied to conductor MPX. Thus, the output of the multiplexer, appearing on conductor MPX, is a series of negative ten microsecond pulses, lying within the channel pulse time intervals of all lines which are off-hook.

RINGING CONTROL AMPLIFIER

Ringing control amplifier 24 is shown in detail in Fig. 34 of the drawings. This circuit functions to gate the ringing control signals received from the connectors over conductor LRC with the sampling pulses appearing on conductor SP, to amplify the resulting ten microsecond pulses, and to apply them to the ringing control conductor RC. The circuit comprises an emitter follower transistor 3420, an "and" gate for negative signals comprising diodes 3421 and 3422, emitter followed transistor 3423, and an inverter amplifier transistor 3424. As used in this circuit, transistors 3420, 3423 and 3424 may be type 2N94A.

Conductor LRC, which is coupled to the base of transistor 3420, carries negative pulses in the time positions of all lines which have been seized by connectors of the group and on which ringing is to take place. Conductor LRC stands at minus twenty-four volts except during the twenty microsecond channel intervals of lines which are to be rung. During these time intervals, the potential of conductor LRC drops to minus thirty-four volts. Emitter follower transistor 3420, which is normally conductive and is cut off by each negative pulse appearing on conductor LRC, repeats the negative pulse across emitter load resistor 3425. The output signal is taken from across resistor 3425 and coupled to the anode terminal of diode 3422, which forms one input of an "and" gate for negative signals. Negative sampling pulses appearing on conductor SP are applied to the anode terminal of diode 3421, which forms the other input of the gate. The waveform appearing on conductor SP stands at minus twenty-four volts during the first and last five microsecond intervals and at minus thirty-four volts during the ten microsecond middle interval of each time channel. As long as either transistor 3420 is conductive or conductor SP stands at minus twenty-four volts, the output of the gate is minus twenty-four volts. During the ten microsecond middle period of the channel interval of a line marked with a ringing control pulse, however, the output of the gate, which is coupled to the base of emitter follower transistor 3423, stands at minus thirty-four volts.

The output signal from transistor 3423 appearing across emitter load resistor 3426 is, of course, a replica of the output of the gate. The negative pulses appearing across emitter load resistor 3426 are coupled through resistor 3427 and capacitor 3428 to the base of transistor 3424. Transistor 3424 amplifies and inverts the pulses. The positive pulses appearing across collector load resistor 3429 are coupled to ringing control conductor RC. Thus, the output signal from the ringing control amplifier 24, appearing on conductor RC, is a series of positive ten microsecond pulses, lying within the channel pulse time intervals of all lines which have been seized by the connectors of the group and are to be rung. Conductor RC is multipled to all of the line switches of the one hundred line group.

BUSY LEAD CONVERTER AND EMERGENCY SERVICE NUMBER CIRCUIT 17

The primary functions of circuit 17, which is shown in detail in Figs. 37, 38, 39 and 40 of the drawings, are to amplify busy marking pulses received from the finders and connectors of the group, to generate artificial busy marking pulses in accordance with the emergency service requirements, to redistribute the busy marking pulses to the finders and connectors, and to perform certain operations in conjunction with the executive cut-in service.

It will be remembered that the links of the system release switch control pulses in the time positions of calling and called lines over their individual switch control conductors to the switch bank translator 13. Switch bank translator 13 commutates the pulses appearing on all of the switch control conductors to a single link busy conductor LB, which is coupled to the base circuit of emitter follower transistor 3701 in the busy lead converter circuit. Conductor LB carries positive pulses in the time positions of all lines of the one hundred line group which are either calling or being called. Conductor LB normally stands at minus thirty-four volts and rises to minus twenty-four volts during the twenty microsecond time period of each busy line. It is to be noted that the cathode terminal of diode 3702 is also connected to the base of transistor 3701. Diode 3702 is used to couple artificial busy pulses to transistor 3701, as will be described in subsequent paragraphs.

The output signal from transistor 3701 is taken from across emitter load resistor 3703 and coupled to the anode terminal of diode 3704, the cathode terminal of diode 3705, and through capacitor 4001 and resistor 4002 to the base of link busy inverter transistor 4003. Transistor 4003 is normally biased for non-conduction so that conductor BLS and the cathode terminal of diode 4004, which are both connected to the collector of transistor 4003, normally stand at minus twenty-four volts. Each minus twenty-four volt positive going pulse received from transistor 3701 renders transistor 4003 conductive so that the potential of conductor BLS and the cathode terminal of diode 4004 drops to minus thirty-four volts. The negative busy marking pulses are coupled over conductor BLS to the line switch circuits and there perform the function of preventing the release of the bi-stable circuits which control the bi-lateral transistor switches once these bi-stable circuits have been operated.

Diode 4004 forms one input of a two-input "or" gate for negative pulses. Diode 4005, which forms the other input of this gate, is concerned with the application of a false connector busy signal in conjunction with the executive right of way feature. This operation will be described in subsequent paragraphs.

The output signal from the gate comprising diodes 4004 and 4005 is coupled to the base of emitter follower transistor 4006. The negative busy pulses comprising the output signal from the gate are repeated by transistor 4006 across emitter load resistor 4007. The output signal from transistor 4006 is coupled to the anode terminal of diode 3823.

Diodes 3823 and 3824 form the inputs of a two-input "and" gate for negative pulses. Channel pulse conductor CH22 is coupled to the anode terminal of diode 3824. Conductor CH22 stands at minus thirty-four volts during the entire pulse frame except for the twenty microsecond interval of channel pulse 22. During time position 22, conductor CH22 rises to minus twenty-four volts.

It will be remembered that the emergency service line 22 must be marked as idle to the connectors at all times. The purpose of the gate comprising diodes 3823 and 3824 is to inhibit or block pulses in time channel 22, which may appear in the output signal from transistor 4006, so that busy pulses in that time channel will not appear on the busy line connector conductors BLC and BLC'. In the absence of negative pulses in the output signal from transistor 4006, the output signal from the gate stands at minus twenty-four volts because of current flow from minus twenty-four volts through transistor 4006, diode 3823, and through resistors 3825 and 3804 to minus forty-eight volts. A minus thirty-four volt pulse appearing in the output of transistor 4006 in any time channel except time channel 22 causes the output signal from the gate to drop to minus thirty-four volts since conductor CH22 also stands at minus thirty-four volts at that time. A minus thirty-four volt pulse appearing in the output signal from transistor 4006 in time channel 22 is blocked, however, since conductor CH22 stands at minus twenty-four volts at that time and the output signal from the gate remains minus twenty-four volts.

The negative busy marking pulses conducted through diode 3823 are coupled through resistor 3825 and capacitor 3805 to the base of driver transistor 3806. Transistor 3806, which is normally conductive from the minus twenty-four volt output of the inhibitor gate, is cut off by each negative pulse coupled through diode 3823. The output signal from transistor 3806, which is taken from across collector load resistor 3807, thus comprises positive pulses. The output signal from transistor 3806 is coupled through capacitor 3808 and resistor 3809 to the base of transistor 3810. The pulses are inverted once more by transistor 3810 and appear across collector load resistor 3811 and on the busy line connector conductor BLC as negative pulses. The output signal from transistor 3806 is also coupled through capacitor 3812 and resistor 3813 to the base of transistor 3814. Transistor 3814, which is non-conductive when the output signal from transistor 3806 stands at minus thirty-four volts, is rendered conductive by each positive pulse appearing in the output signal from transistor 3806. The output signal from transistor 3814 is taken from across collector load resistor 3815 and coupled through capacitor 3816 and resistor 3817 to the base of transistor 3818. Transistor 3818, which is non-conductive when the output signal from transistor 3814 stands at minus twenty-four volts, is rendered conductive by each negative pulse appearing in the output signal from transistor 3814. Thus, the output signal from transistor 3818, which appears across collector load resistor 3819 and is coupled to busy line connector conductor BLC', comprises positive busy marking pulses.

As previously mentioned, the output signal from transistor 3701 is also coupled to the anode terminal of diode 3704. Diodes 3704, 3706 and 4008 form the inputs of an "or" gate for positive signals. Channel pulse conductor CH22 is coupled to the anode terminal of diode 3706. Diode 4008 is concerned with the application of a false finder busy pulse in conjunction with the executive right of way feature and its function will be described in subsequent paragraphs.

It can be seen that the output signal from this gate comprises positive busy marking pulses in the time positions of all busy lines coupled through diode 3704 plus a positive pulse in time channel 22 coupled through diode 3706. Thus, emergency service line 22 is marked as busy to the line finders of the system at all times. The output signal from the gate is coupled through capacitor 3707 and resistor 3708 to the base of inverter amplifier transistor 3709. Transistor 3709, which is non-conductive when the output signal from the gate stands at minus thirty-four volts, is rendered conductive by each positive pulse appearing in the output signal from the gate. The resulting negative pulses appearing across collector load resistor 3710 are coupled through capacitor 3711 and resistor 3712 to the base of inverter amplifier transistor 3713. Transistor 3713, which is nonconductive when the output signal from transistor 3709 stands at minus twenty-four volts, is rendered conductive by each negative pulse appearing in the output signal from transistor 3709. The resulting positive pulses appearing across load resistor 3714 are coupled over busy line finder conductive BLF' to all of the line finders of the group.

A feedback circuit is provided for coupling the output signal from transistor 3810 back to the base circuits of transistors 3713 and 3818. The collector of transistor 3810 is coupled to the base of transistor 3818 through capacitor 3820 and resistor 3821 in parallel with diode 3822. The collector of transistor 3810 is also coupled to the base of transistor 3713 through capacitor 3715 and resistor 3716 in parallel with diode 3717. This feedback circuit is employed to help overcome hole storage effects in the output amplifiers and serves to improve pulse rise and decay times.

It is now necessary to consider the operation of the circuit in conjunction with the emergency service requirements for the generation of artificial busy pulses. It will be remembered that an emergency service line circuit is assigned for the purpose of providing the emergency service feature. Emergency service line circuit 22, which has directory number "222," is shown in block form in Fig. 38. Line circuit 22 could have a substation associated with it, which substation would be used only for emergency service calls. In the disclosed arrangement, line circuit 22 does not have a substation individually associated with it but instead, the line conductors T and R are multipled to the line conductors of either line circuit 25 or line circuit 26 as determined by the positioning of the emergency service number switch 3800. Although the conductors on the equipment side of these line circuits have not been shown, it is to be understood that line circuits 22, 25 and 26 are identical to line circuit 11, which is shown in detail in Fig. 16. It can be seen that when switch 3800 is in its upper position, the T and R conductors of line circuit 22 are connected to the T and R conductors of line circuit 25 by wipers 3801 and 3802, respectively. Calls made to directory number "222" or to directory number "225" will serve to ring station 225 under control of either line circuit 22 or line circuit 25, respectively. Since the busy lead converter is arranged to mark line circuit 22 as busy to the finders at all times, calls originated at station 225 are handled through line circuit 25. Similarly, when switch 3800 is in its lower position, wipers 3801 and 3802 connect the T and R conductors of line circuit 22 in multiple with the line conductors of line circuit 26. With the switch in this position, calls made to directory number "222"

or to directory number "226," will serve to ring station 226 either under control of line circuit 22 or line circuit 26, respectively. Calls originated at station 226 are routed through line circuit 26.

Wiper 3803 on switch 3800 serves to connect either channel pulse conductor CH25 or channel pulse conductor CH26 to the cathode terminal of diode 3718. Diodes 3718 and 3719 comprise a two-input "and" gate for positive signals. The purpose of this gate is to allow pulses in the time position of the line circuit which is connected in multiple with line circuit 22 to be applied to the busy amplifier circuits whenever line circuit 22 is seized by a connector.

If it be assumed that line circuit 25 is connected in multiple with line circuit 22 and that someone has dialed the emergency service number "222," station 225 will be rung under control of line circuit 22. The seizing connector, of course, generates switch control pulses only in the time position of line circuit 22. It is, therefore, necessary for circuit 17 to generate an artificial busy marking pulse in the time position of line circuit 25 so that a line finder will not seize line circuit 25 when station 225 goes off-hook when the call is answered. Line circuit 25 must also be marked busy to the connectors at this time since station 225 is busy in a call.

The signal applied to the cathode terminal of diode 3719 serves the purpose of gating a channel pulse in time position 25, appearing on the cathode terminal of diode 3718, through to the anode terminal of diode 3702 and thus to the base of transistor 3701 only when line circuit 22 is seized by a connector. To understand the derivation of this signal, it is necessary to consider the operation of transistors 3720 and 3721 and their associated circuit components.

Diodes 3705, 3725 and 3726 comprise a three-input "and" gate for positive signals. As previously mentioned, the output signal from transistor 3701, which comprises positive pulses in the time positions of all busy lines, is coupled to the cathode terminal of diode 3705. Channel pulse conductor CH22, which carries positive pulses in time position 22, is coupled to the cathode treminal of diode 3725 and sampling pulse conductor SP′, which carries ten microsecond positive pulses in the center portion of each time channel, is coupled to the cathode terminal of diode 3726. Since the potential of all three signals swings between minus thirty-four volts and minus twenty-four volts, the output of the gate is minus thirty-four volts at all times except during the ten microsecond center portion of time channel 22 when line circuit 22 has been seized by a connector and a positive pulse in that time position appears in the output signal from transistor 3701. The output signal from the gate is coupled through diode 3727 to the base of transistor 3720.

Transistors 3720 and 3721 are connected as a flip-flop circuit. In the normal setting of the circuit, transistor 3721 is conductive and transistor 3720 is non-conductive. When triggered by a positive pulse appearing in the output signal from the previously described gate, transistor 3720 becomes conductive and transistor 3721 becomes non-conductive. This second operating condition persists for two thousand five hundred and fifty-five microseconds, or until the beginning of channel pulse interval 22 in the next pulse frame. At this instant, a positive channel pulse appears on conductor CH22. The leading edge of this pulse is coupled through a small capacitor 3722 and diode 3723 to the base of transistor 3721, thus rendering transistor 3721 conductive and triggering the flip-flop back to its original condition. After a five microsecond interval has elapsed, the sampling pulse is generated, and if a busy pulse in time position 22 is still present on the input cathode of diode 3705, an output will be derived from the "and" gate and the flip-flop will be triggered back to its second condition. Therefore, if busy pulses persist in time position 22, transistor 3721 will remain conductive for five microseconds and non-conductive for two thousand five hundred and fifty-five microseconds of every frame. If no busy pulse is present in time position 22, transistor 3721 remains conductive continuously, thus applying a minus thirty-four volt potential to the cathode of diode 3719. This inhibits transmission of the artificial busy pulse from switch 3800 through diode 3718 to diode 3702. When busy pulses are present, the collector of transistor 3721 and hence the cathode terminal of diode 3719 stand at minus twenty-four volts during all time positions other than 22 and in particular, during time positions 25 and 26. Thus, the selected artificial busy-busy pulse in time position 25 or 26 is permitted to pass through the gate diode 3718 and to the "or" gate diode 3702.

As previously described in the general description, whenever a calling line associated with a particular link is an executive line, an executive release pulse in the time position of the desired called line is applied to the executive release output conductor ERO by the connector of that link provided that the desired called line is busy and further provided that the desired called line is not already engaged in an executive call. Pulses appearing on conductor ERO are amplified by the busy lead converter circuit and applied to the executive release input conductor ERI which extends to the connector circuits. A pulse on conductor ERI serves to forcibly release the link which is handling a call involving the desired called line.

Conductor ERO is coupled to the base circuit of emitter follower transistor 3901. Transistor 3901 repeats the negative pulses received over conductor ERO across emitter load resistor 3903 and thus to the base of emitter follower transistor 3902. Transistor 3902 repeats the negative pulses across emitter load resistor 3904 and thus to conductor ERI. As previously mentioned, conductor ERI is connected to all of the connectors of the system. The negative pulses appearing on conductor ERI are also coupled through capacitor 4019 to the base of transistor 4009.

The purpose of transistors 4009, 4010 and 4011 is to generate a one hundred millisecond false finder busy pulse whenever a pulse is received over conductor ERI. Since the link handling a call to or from the line desired by the calling executive is forcibly released, it is necessary to apply a false busy pulse to the conductor BLF′ at this time to prevent other finders from seizing the forcibly released lines. Transistors 4009 and 4010 are connected together in a single shot multivibrator configuration and the output signal from the multivibrator is coupled to inverting amplifier transistor 4011. Transistor 4010 is normally conductive because of the connection from its base through resistor 4012 to minus forty-eight volts. The output signal from the multivibrator, which is taken from across collector load resistor 4013, thus normally stands at minus twenty-four volts and transistor 4009 is held non-conductive because of the connection through resistor 4014 between the collector of transistor 4010 and the base of transistor 4009.

The output signal from the multivibrator is also coupled through resistor 4015 and capacitor 4028 to the base of transistor 4011. Transistor 4011 is conductive during the time that the multivibrator is in its stable condition since its base is positive with respect to the approximately minus forty-four volt potential of its emitter as determined by the voltage division across emitter circuit resistors 4017 and 4018. The output signal from transistor 4011, which is taken from across collector load resistor 4016, thus normally stands at approximately minus forty-four volts. The output signal from transistor 4011 is coupled to the anode terminal of diode 4008. Diode 4008 forms one input of the "or" gate for positive pulses which controls the busy line finder amplifier transistors 3709 and 3713, as previously described.

When a negative pulse appears on conductor ERI and is coupled through capacitor 4019, transistor 4009 is rendered conductive and the potential of its collector rises to minus twenty-four volts. This positive swing is coupled through capacitor 4020 to the base of transistor 4010 and renders transistor 4010 non-conductive. When transistor 4010 becomes non-conductive, transistor 4011 is rendered non-conductive and the output signal appearing across collector load resistor 4016 rises to minus twenty-four volts. Transistor 4009 is held conductive through resistor 4014 as long as transistor 4010 is non-conductive.

Transistor 4010 remains non-conductive until capacitor 4020 has discharged through resistor 4012 to a sufficient extent to make the base of transistor 4010 negative with respect to the emitter of transistor 4010. When transistor 4010 again becomes conductive, transistor 4009 becomes non-conductive and transistor 4011 becomes conductive, as previously described. The values of capacitance and resistance of capacitor 4020 and resistor 4012, respectively, are so chosen that transistor 4010 remains non-conductive for approximately one hundred milliseconds. Thus, the output signal from transistor 4011, which is coupled through diode 4008, comprises a one hundred millisecond positive pulse which is added with the positive link busy pulses coupled through diode 3704 and the position channel pulses in time position 22 coupled through diode 3706. The one hundred millisecond pulse is processed and repeated by transistors 3709 and 3713 and coupled to conductor BLF′ exactly as previously described. Thus, during the one hundred millisecond period of the false finder busy pulse, the finders of the system cannot seize any calling line. In other words, all lines of the system are marked busy to the finders for the duration of the false finder busy pulse.

Diode 4021 couples the collector of transistor 4011 to the collector of transistor 4009 for the purpose of rapidly discharging capacitor 4020 through conducting transistor 4011 when transistor 4009 becomes non-conductive at the termination of the generation of the timed pulse. This feature is provided so that the one-shot multivibrator can respond to another pulse on conductor ERI which will occur if another connector should release a pulse on conductor ERO shortly after the preceding false finder busy pulse has terminated.

It is also necessary to generate a false connector busy pulse at this time. Transistors 4022 and 4023 are provided for this purpose. Transistors 4022 and 4023 are connected as a single shot multivibrator in which transistor 4023 is normally conductive and transistor 4022 is normally non-conductive. The operation of this multivibrator is identical to the operation of the false fiinder multivibrator, just described, except that the values of capacitance and resistance of capacitor 4024 and resistor 4025, respectively, are so chosen that transistor 4023 remains non-conductive for approximately six milliseconds. This multivibrator is triggered by the leading edge of the negative pulse appearing at the collector of transistor 4010 when transistor 4010 is rendered non-conductive by a negative pulse occurring on conductor ERI. The one hundred millisecond negative pulse appearing at the collector of transistor 4010 is differentiated by capacitor 4026 and resistor 4027 into a sharp negative pulse corresponding to the leading edge of said one hundred millisecond pulse and a sharp positive pulse corresponding to the trailing edge of said pulse. The differentiated negative pulse triggers transistor 4022 conductive and transistor 4023 non-conductive. The six millisecond negative pulse appearing at the collector of transistor 4023 is coupled through diode 4005 to the base of transistor 4006. Thus, the six millisecond negative pulse is processed and repeated to the busy line connector conductors BLC and BLC′ exactly as if it were a twenty microsecond negative pulse coupled through diode 4004. The connectors of the system are thus unable to seize any line of the group during this six millisecond period.

As described in the general description, the connectors which are handling calls in which an executive line is either the calling or the called line release executive busy pulses in the time position of both lines to conductor EBO. These pulses are amplified by circuit 17 and returned to the connectors over conductors EBI and EBI′. The executive busy pulses appearing on conductor EBI and EBI′ prevent the connectors from releasing an executive release pulse on conductor ERO in these time positions since the desired line is marked as already busy in an executive call. Thus, a second executive call cannot override a first executive call.

Each negative pulse appearing on conductor EBO serves to cut off normally conducting emitter follower transistor 3905. The negative pulses appearing across emitter load resistor 3907 serve to cut off normally conducting emitter follower transistor 3906. The negative pulses appearing across emitter load resistor 3908 are coupled to the connectors by executive busy input conductor EBI and through capacitor 3909 and resistor 3910 to the base of normally non-conducting inverter amplifier transistor 3916. Each negative pulse appearing in the output signal from transistor 3906 renders transistor 3916 conductive and the positive pulses appearing across resistor 3911 in the collector circuit of transistor 3916 are coupled to the connectors by executive busy input conductor EBI′.

Circuit 17 also serves the minor function of inverting the emergency service channel pulse CH22 and applying it to conductor CH22′ which extends to the connectors. Inverter amplifier transistor 3912 is provided for this purpose. Each positive pulse, appearing on conductor CH22 and coupled through capacitor 3913 and resistor 3914 to the base of normally conducting transistor 3912, serves to cut off transistor 3912. The output signal from transistor 3912 is taken from across collector load resistor 3915 and applied to conductor CH22′. The output signal thus comprises a negative pulse in time channel 22 during each pulse frame.

As used in this circuit, transistors 3701, 3709, 3720, 3721, 3724, 3806, 3814, 3902, 3906, 4003 and 4006 may be type 2N94A, transistors 3713, 3810, 3818 and 3916 may be type 2N112, transistors 3901, 3905 and 4011 may be type GT692, and transistors 3912, 4009, 4010, 4022 and 4023 may be type 2N44.

EXECUTIVE CUT-IN MARKER 21

Figure 41:
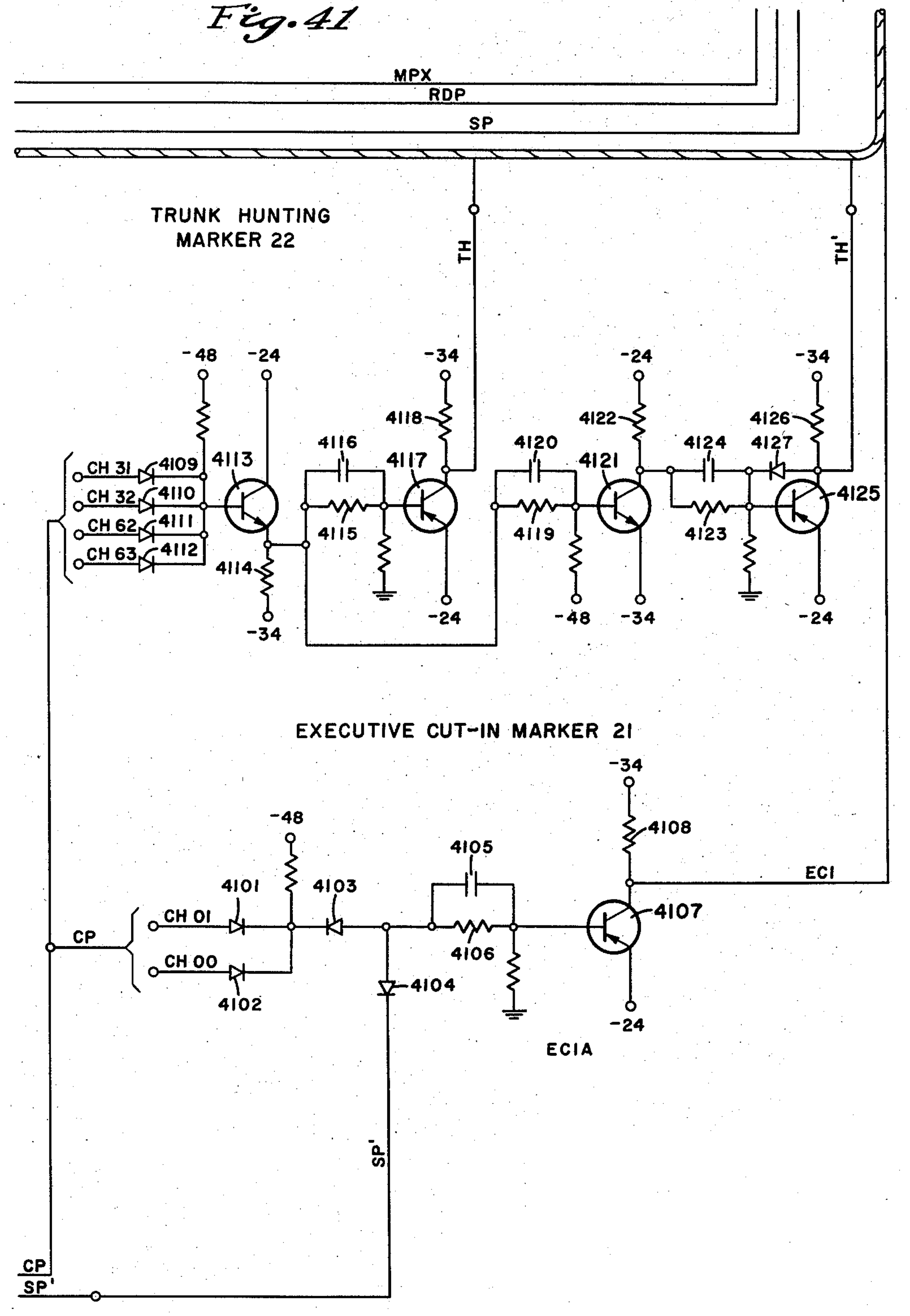
Figure 42:
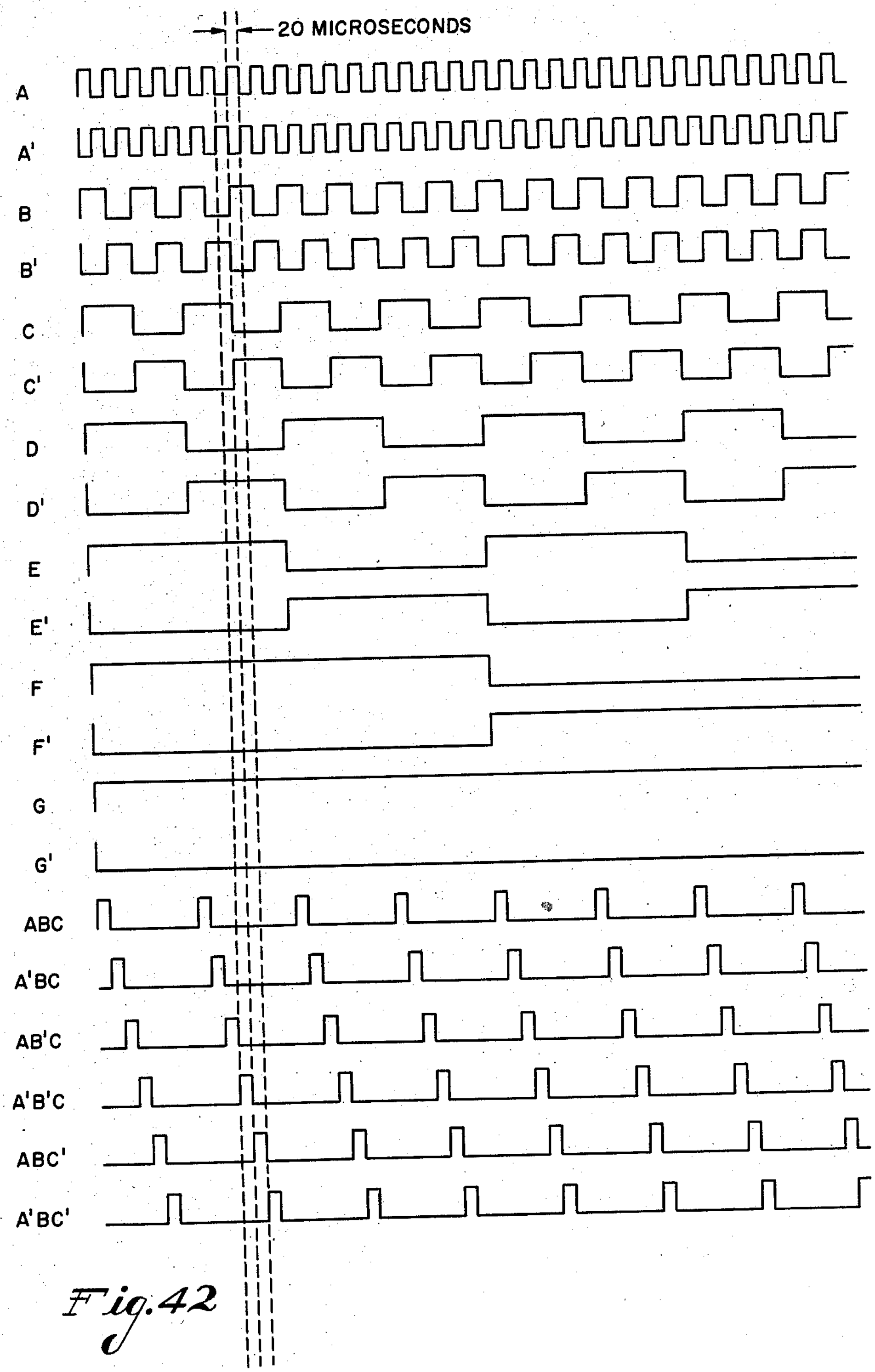

The purpose of the executive cut-in marker 21, which is shown in detail in Fig. 41 of the drawings, is to gate channel pulses in the time positions of executive lines with sampling pulses, to amplify the resulting pulses, and then to apply them to a single executive cut-in conductor ECI. Conductor ECI is multipled to all of the connectors and the executive marking pulses appearing on this conductor identify the time positions of lines which are to be given executive service.

In the illustrated embodiment of the invention, lines 01 and 00 have been designated as executive lines. For this purpose, channel pulse conductor CH01 is shown connected to the anode terminal of diode 4101 and channel pulse conductor CH00 is shown connected to the anode terminal of diode 4102. Diodes 4101 and 4102 form an "or" gate for positive signals. The output signal from this gate, which is coupled to the cathode terminal of diode 4103, stands at minus thirty-four volts except during channel intervals 01 and 00 at which time it rises to minus twenty-four volts. Diodes 4103 and 4104 comprise an "and" gate for positive signals. Sampling pulse conductor SP′, which carries positive ten microsecond pulses in the middle portion of each time channel, is connected to the cathode terminal of diode 4104. The output of this gate is normally minus thirty-four volts but rises to minus twenty-four volts during the ten microsecond center portion of both time channel 01 and time channel 00.

The output signal from the gate comprising diodes 4103 and 4104 is coupled through capacitor 4105 and resistor 4106 to the base of inverting amplifier transistor 4107, which may be type 2N112. Normally conducting transistor 4107 is cut off by each of the positive pulses coupled through capacitor 4105. The output signal from transistor 4107 appearing across resistor 4108 in the collector circuit of transistor 4107 and on conductor ECI thus comprises ten microsecond negative executive marking pulses appearing in the center portions of time channels 01 and 00.

TRUNK HUNTING MARKER 22

The purpose of trunk hunting marker 22, which is shown in Fig. 41 of the drawings, is to apply negative trunk marking pulses in the time positions of all lines of each trunk group, except the last line of each group, to a single trunk hunting conductor TH and to apply positive trunk marking pulses in the time positions of all lines of each trunk group, except the last line of each trunk group, to a single trunk hunting conductor TH'. Conductors TH and TH' are multipled to all of the connectors of the group and the pulses appearing on these conductors serve to mark the lines as trunk lines to the connectors so that the connectors will automatically hunt for an idle one of the trunk lines if a busy one of the marked lines is called.

In the disclosed embodiment, lines 31, 32 and 33 have been designated as comprising a first trunk line group and lines 62, 63 and 64 have been designated as comprising a second trunk line group. For this purpose, channel pulse conductors CH31, CH32, CH62 and CH63 are shown connected to the anode terminals of diodes 4109, 4110, 4111 and 4112, respectively. Diodes 4109, 4110, 4111 and 4112 comprise an "or" gate for positive signals. The output signal from this gate, which is coupled to the base of emitter follower transistor 4113, comprises positive pulses in time channels 31, 32, 62 and 63. Transistor 4113 is non-conductive as long as the output of the gate is minus thirty-four volts and is rendered conductive by each of the positive pulses coupled through the gate. The output signal from transistor 4113 is taken from across resistor 4114 in the emitter circuit of transistor 4113.

The output signal from transistor 4113 is coupled through resistor 4115 and capacitor 4116 to the base of inverter amplifier transistor 4117. Transistor 4117, which is normally conductive, is cut off by each positive pulse appearing in the output of transistor 4113. The output signal from transistor 4117 is taken from across collector load resistor 4118 and applied to conductor TH. The signal on conductor TH thus comprises negative pulses in time positions 31, 32, 62 and 63. The output signal from transistor 4113 is also coupled through resistor 4119 and capacitor 4120 to the base of inverter amplifier transistor 4121. Transistor 4121 is normally cut off and is rendered conductive by each positive pulse appearing in the output of transistor 4113. The output signal from transistor 4121 is taken from across collector load resistor 4122 and coupled through resistor 4123 and capacitor 4124 to the base of inverter amplifier transistor 4125.

Transistor 4125, which is cut off as long as the output of transistor 4121 is minus twenty-four volts, is rendered conductive by each negative pulse appearing in the output of transistor 3121. The output signal from transistor 4125, which is taken from across collector load resistor 4126 and applied to conductor TH', thus comprises positive pulses in time positions 31, 32, 62 and 63. Diode 4127 couples the collector of transistor 4125 to the base of transistor 4125 for the purpose of reducing hole storage effects and thus improves the rise and decay times of the pulses.

As used in this circuit, transistors 4113 and 4121 may be type 2N94A and transistors 4117 and 4125 may be type 2N112.

LINK ALLOTTER 16

Figure 9:
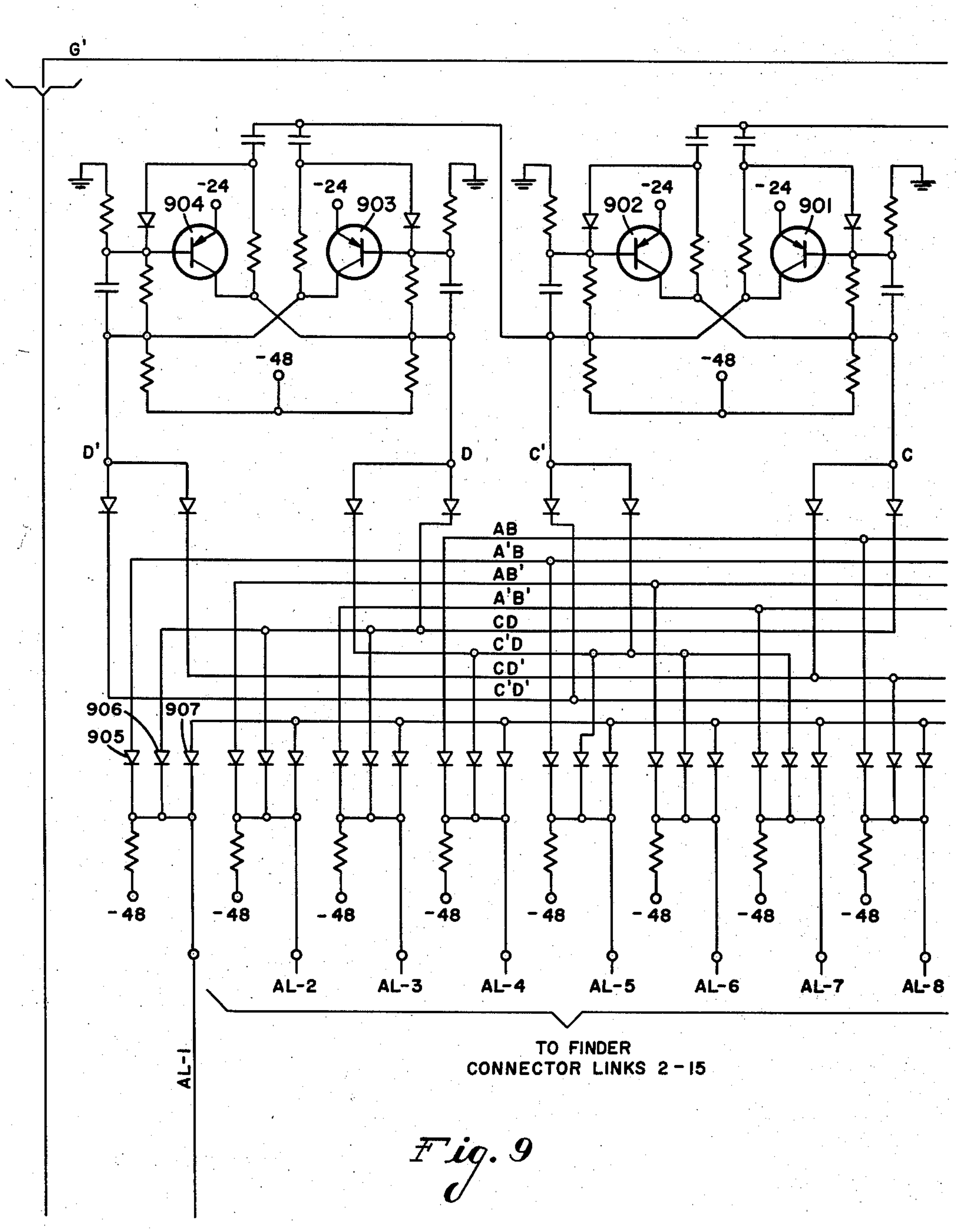
Figure 10:
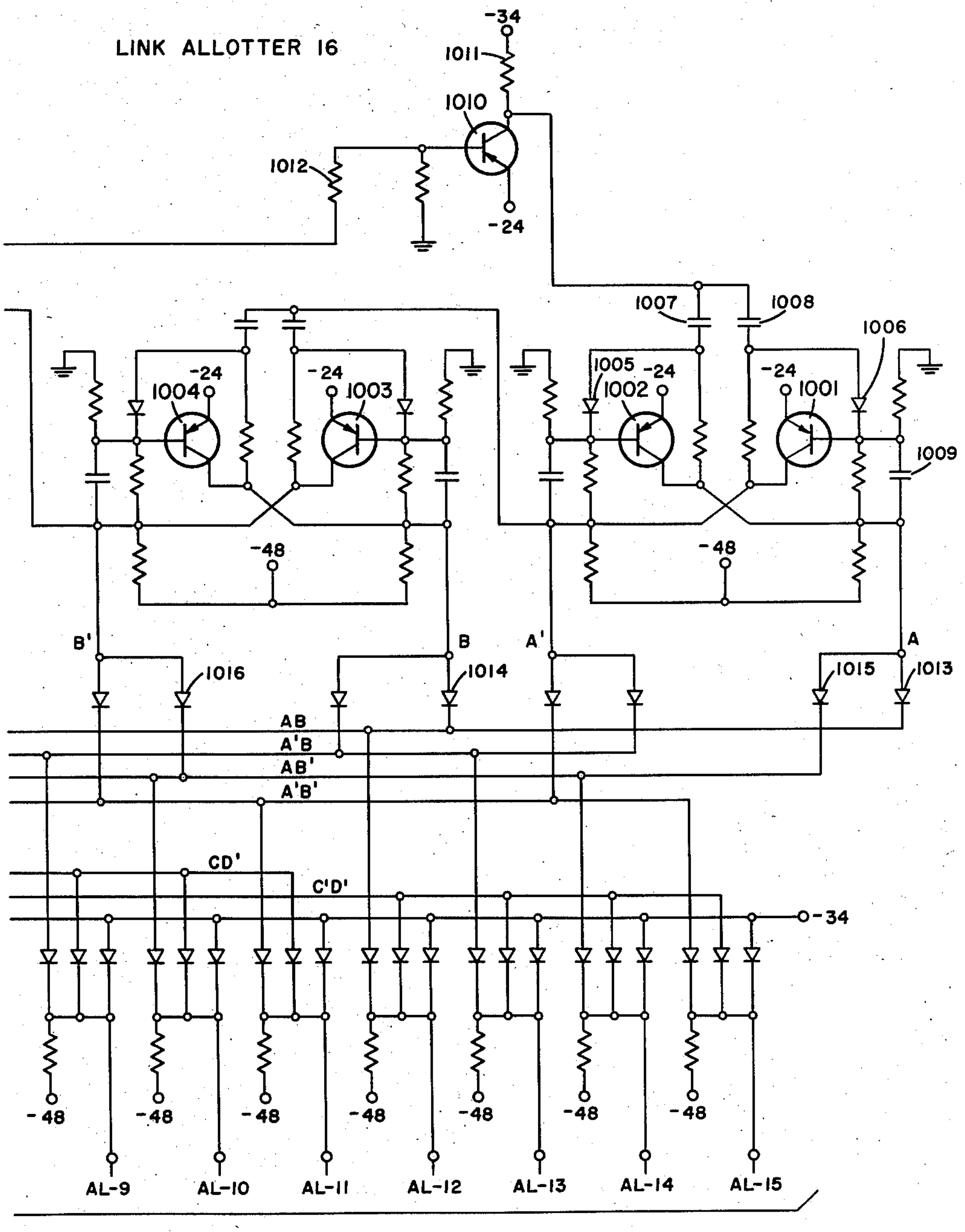

Link allotter 16, which is shown in detail in Figs. 9 and 10 of the drawings, is employed to allocate the finder-connector links in sequence to handle calls. The line finder of each link is enabled to seize a calling line and the connector of each link is enabled to seize a selected called line only when that link is allotted for use. The allotter circuit comprises, for a fifteen link system, eight transistors connected as a four-stage binary divider chain, a sixty-one diode matrix controlled by the binary chain which serves to gate an operating signal over one of the allotter conductors AL–1 to AL–15 to the finder-connector link corresponding to the setting of the binary chain, and an amplifier transistor for stepping the binary divider chain once each pulse frame. Since each pulse frame is two thousand five hundred and sixty microseconds in duration, the binary divider chain is stepped at approximately three hundred ninety c.p.s.

The four-stage binary divider comprises transistors 1001, 1002, 1003, 1004, 901, 902, 903 and 904. The operation of each stage of the binary divider in allotter 16 is identical to the operation of each stage of the three-stage binary divider chain in the tone and pulse generator 29 which was previously described. Briefly, the "on" side of a particular stage is triggered "off" by each positive triggering pulse. Examining the first stage and assuming that transistor 1002 is conductive, it can be seen that a positive pulse coupled through capacitor 1007 and steering diode 1005 renders transistor 1002 non-conductive. The resulting negative swing at the collector of transistor 1002 is coupled through capacitor 1009 to the base of transistor 1001 and renders transistor 1001 conductive. The resulting positive swing at the collector of transistor 1001 is then coupled to the second stage comprising transistors 1003 and 1004 and renders the conducting transistor in that stage non-conductive in the manner just described for the first stage. The next positive trigger pulse is coupled through capacitor 1008 and steering diode 1006 to the base of transistor 1001 and renders that transistor non-conductive. The second stage is not triggered when transistor 1001 becomes non-conductive since the swing at the collector of transistor 1001 is negative and is thus blocked by the steering diodes in the second stage.

The positive pulses for triggering the first stage of the divider are derived from the output signal of transistor 1010, which output signal appears across collector load resistor 1011. Transistor 1010 is driven by the waveform appearing on conductor G' from the binary pulse generator 20. It will be recalled that the waveform on conductor G' stands at minus thirty-four volts during the first half of each pulse frame and rises to minus twenty-four volts during the second half of each pulse frame. Conductor G' is coupled through resistor 1012 to the base of transistor 1010. Transistor 1010 is conductive whenever the waveform on conductor G' stands at minus thirty-four volts and is cut off whenever the waveform on conductor G' stands at minus twenty-four volts. At the beginning of each pulse frame when the waveform on conductor G' drops to minus thirty-four volts, transistor 1010 is rendered conductive and the output signal appearing across resistor 1011 rises to minus twenty-four volts. The leading edge of this positive going signal is coupled through one of the steering diodes 1005 and 1006 to the base of either transistor 1002 or transistor 1001, respectively. Thus, the binary divider chain is triggered at the beginning of each pulse frame and one of the links is allotted during each complete pulse frame.

Two outputs are taken from each stage of the binary divider chain. In the first stage, output conductor A is connected to the collector of transistor 1002 and output conductor A' is connected to the collector of transistor 1001. When transistor 1002 is conductive and transistor 1001 is non-conductive, conductor A stands at minus twenty-four volts and conductor A′ stands at approximately minus thirty-four volts. When transistor 1001 is conductive and transistor 1002 is non-conductive, conductor A′ stands at minus twenty-four volts and conductor A stands at approximately minus thirty-four volts. Similarly, the waveform on conductor B is in phase opposition with the waveform of B′, C is in phase opposition with C′, and D is in phase opposition with D′. Each output conductor from each stage is connected to two of eight primary two-input "and" gates for negative signals in the diode matrix. For example, conductors A and B are connected to the anode terminals of diodes 1013 and 1014, respectively, which diodes form the two inputs of a first primary gate. Conductor A is also connected to the anode terminal of diode 1015 and conductor B′ is connected to the anode terminal of diode 1016, which two diodes form the inputs of a second primary gate. It can be seen that the outputs of the primary gates are AB, A′B, AB′, A′B′, CD, C′D, CD′, and C′D′. The outputs of the primary gates are connected in unique combinations to two inputs of each of fifteen secondary gates. For example, output conductor A′B is connected to the anode terminal of diode 905 and output conductor CD is connected to the anode terminal of diode 906 in the secondary gate corresponding to the first link. Diode 907, which forms the third input of this "and" gate for negative pulses, is employed to clamp the negative signal realized at the output of the gate to minus thirty-four volts. The output waveforms of the fifteen secondary gates are A′BCD, AB′CD, A′B′CD, ABC′D, A′BC′D, AB′C′D, A′B′C′D, ABCD′, A′BCD′, AB′CD′, A′B′CD′, ABC′D′, A′BC′D′, AB′C′D′, and A′B′C′D′. It is to be noted that the sixteenth possible combination of the eight conductors, or ABCD, does not appear since only fifteen links are provided.

If it be assumed that transistors 1001, 1003, 901 and 903 are conductive and thus conductors A, B, C and D stand at minus thirty-four volts, none of the links are allotted since the output of each of the fifteen secondary gates stands at minus twenty-four volts. At the beginning of the next pulse frame, transistor 1001 is rendered nonconductive, transistor 1002 conductive, and transistors 1003, 901 and 903 remain conductive. Thus, conductors A′, B, C and D stand at minus thirty-four volts. The secondary gate comprising diodes 905, 906 and 907 thus has an output signal which stands at minus thirty-four volts appearing on conductor AL–1 and link 1 is allotted for the entire pulse frame.

At the beginning of the next pulse frame, transistor 1002 is rendered non-conductive, transistor 1001 is rendered conductive, transistor 1003 is rendered non-conductive, transistor 1004 is rendered conductive and transistors 901 and 903 remain conductive. The signal appearing on conductor AL–1 rises to minus twenty-four volts since conductors A′ and B now stand at minus twenty-four volts. Conductors A, B′, C and D now stand at minus thirty-four volts, conductor AL–2 stands at minus thirty-four volts, and the second finder-connector link is allotted for use. Similarly, the third link is allotted during the next succeeding pulse frame and the other links are allotted, one at a time, in turn, until all fifteen links have been allotted. Following the sixteenth pulse frame during which no link is allotted, link 1 is again allotted and the cycle repeats.

SWITCH BANK TRANSLATOR 13

Figure 13:
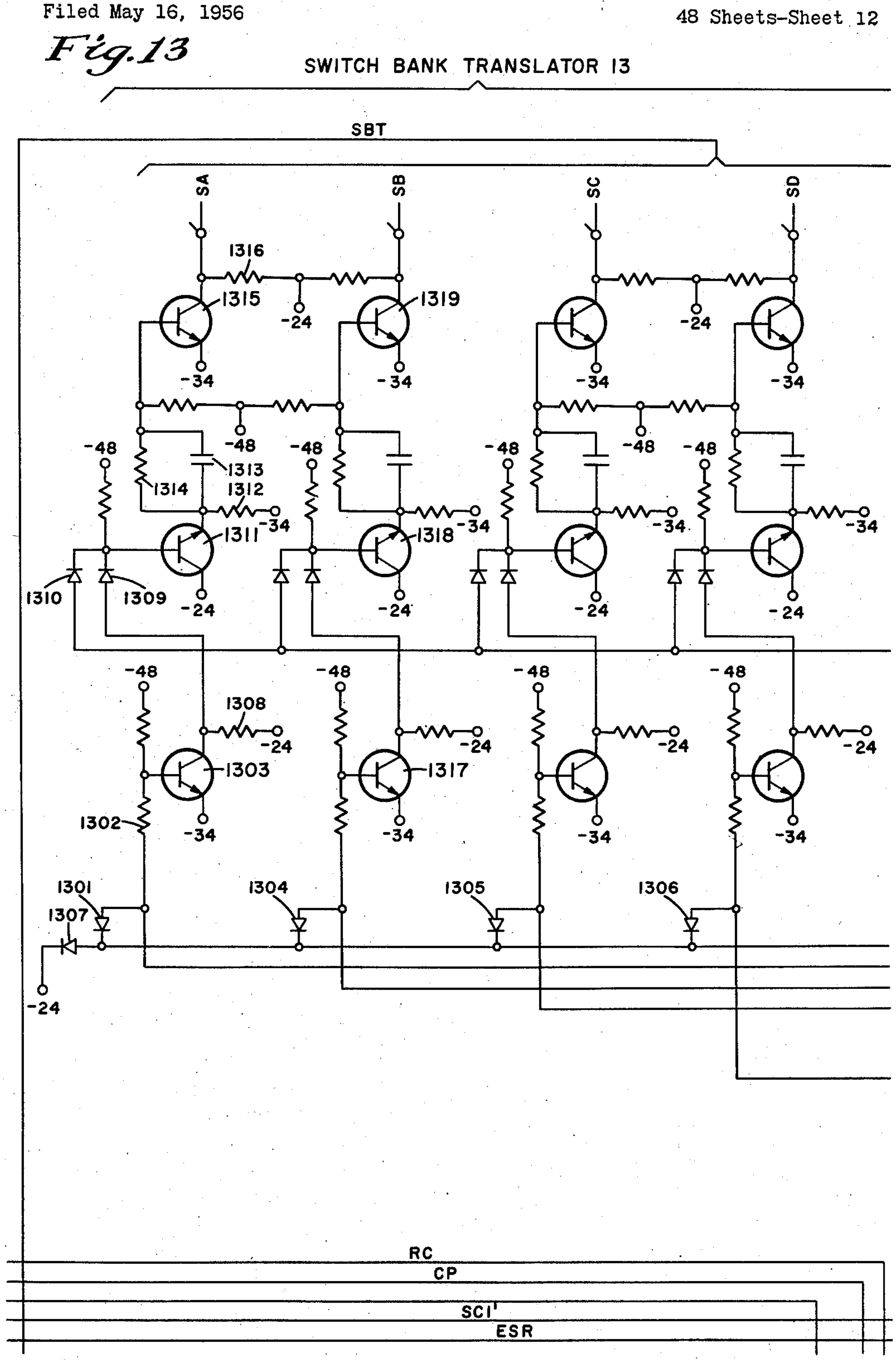
Figure 14:
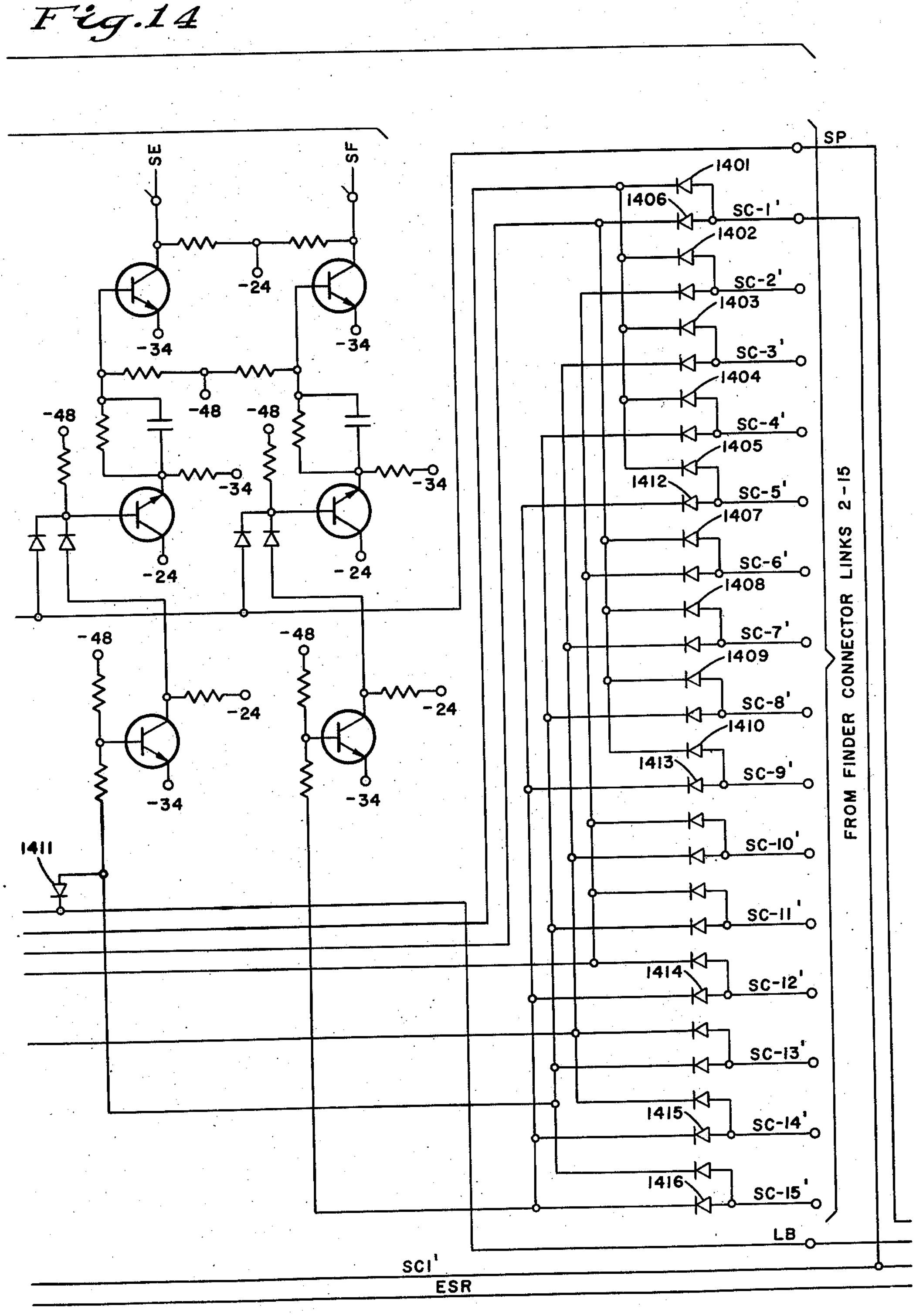

The switch bank translator 13 is shown in detail in Figs. 13 and 14 of the drawings. This circuit serves to translate switch control pulses appearing on conductors SC1′–SC15′, inclusive, from the links of the system to a unique combination of two out of six of the conductors SA–SF, inclusive. The circuit also functions to commutate the switch control pulses from all of the conductors SC1–SC15′ and apply them as busy marking pulses to a single link busy conductor LB which extends to the busy lead converter circuit 17.

It will be recalled that each finder-connector link has associated with it a bilateral transistor switch for each line, which switch is operated responsive to switch control pulses in the time position of its associated line. The switch control pulses in the time positions of calling and called lines are generated in the line finder-connector link and released over the switch control conductor individual to that link to the switch bank translator 13 and also to the line switch associated with the emergency service line 22. In the line switch for the emergency service line 22, each of the switch control conductors directly controls the bi-stable circuit which, in turn, controls the bilateral transistor switch for that link. In other words, fifteen bi-stable circuits are provided to control the fifteen bilateral transistor switches. As previously mentioned, this individual control of the emergency service line switch is necessary since the emergency service line must be capable of being connected in any number of calls simultaneously. However, the line switches for lines 11–21 and 23–00 are controlled on a two out of six coordinate control basis.

The number of switches (X) which can be controlled by a given number of conductors, N, via a two-resistor matrix per switch, is given by the formula $$X=\frac{N(N-1)}{2}$$

conductors are required to control the switches. The diode gates are the right edge of the drawing, which will be described in more detail in a subsequent parargraph, serve to gate pulses appearing on the switch control conductors in unique combinations to conductors SA–SF as follows:

SC1′ to SA and SB
SC2′ to SA and SC
SC3′ to SA and SD
SC4′ to SA and SE
SC5′ to SA and SF
SC6′ to SB and SC
SC7′ to SB and SD
SC8′ to SB and SE
SC9′ to SB and SF
SC10′ to SC and SD
SC11′ to SC and SE
SC12′ to SC and SF
SC13′ to SD and SE
SC14′ to SD and SF
SC15′ to SE and SF Each of the conductors SA–SF is multiplied to one of the bi-stable circuits in each of the ninety-nine line switches. For example, conductor SA is multipled to the first bi-stable circuit in each line switch, conductor SB is multipled to the second bi-stable circuit in each line switch, conductor SC is multipled to the third bi-stable circuit, etc.

If it be assumed that switch control conductor SC1′ carries pulses in time positions 11 and 12, as it will whenever station 211 calls station 912 via link 1, these switch control pulses will be repeated on conductors SA and SB. Since the bi-stable circuits in the line switches are time position sensitive and since these pulses appear only on conductors SA and SB, only the first and second bi-stable circuits in line switches 11 and 12 will be triggered to their operated conditions. The line switches are so designed that when both the first and second bi-stable circuits are operated, the bilateral transistor switch between the line circuit associated with that line switch and the link 1 multiple point is rendered conductive. Thus, both line circuits 11 and 12 are cut through to the link 1 multiple point.

From the above list of combinations, it can be seen that conductor SA carries switch control pulses derived from switch control conductors SC1′–SC5′, inclusive. For this reason, conductors SC1′–SC5′, inclusive, are connected to the anode terminals of diodes 1401–1405, inclusive, respectively. Diodes 1401–1405, inclusive, comprise a five-input "or" gate for positive signals. In the absence of switch control pulses, the output signal from this gate, which is coupled to the anode terminal of diode 1301 and through resistor 1302 to the base of inverter amplifier transistor 1303, stands at minus thirty-four volts. Current flows from minus thirty-four volts through diodes 1401–1405, through diode 1301, over conductor LB, and through resistor 3735 to minus forty-eight volts in busy lead converter circuit 17. Diodes 1301, 1304, 1305, 1306 and 1411 comprise a five-input "or" gate for positive signals, which gate serves to commutate the pulses from the switch control conductors to the link busy conductor LB.

A positive going minus twenty-four volt switch control pulse appearing on any one of the switch control conductors SC1′–SC5′ is coupled through one of the diodes 1401–1405 and through diode 1301 to conductor LB and also through resistor 1302 to the base of normally cut-off transistor 1303. Thus, each positive pulse appearing in the output signal from the gate comprising diodes 1401–1405 is gated through diode 1301 to conductor LB and also serves to render transistor 1303 conductive. Diode 1307 is employed to clamp the positive swing of the pulses appearing on conductor LB to minus twenty-four volts.

The output signal from transistor 1303, which is taken from across collector load resistor 1308 and coupled to the anode terminal of diode 1309, comprises negative pulses in the time positions of all lines seized by the first five links. Sampling pulse conductor SP, which carries negative ten microsecond pulses in the center portion of each time channel, is connected to the anode terminal of diode 1310. Diodes 1309 and 1310 comprise an "and" gate for negative signals. The output signal from this gate, which is coupled to the base of emitter follower transistor 1311, comprises a negative ten microsecond pulse in the center portion of the time channel of each line seized by links 1–5. Normally conducting transistor 1311 is cut off by each of the negative pulses and the resulting negative pulses appearing across its emitter load resistor 1312 are coupled through capacitor 1313 and resistor 1314 to the base of inverter amplifier 1315. Transistor 1315, which is conductive as long as the output of transistor 1311 stands at minus twenty-four volts, is cut off by each negative pulse appearing in the output signal from transistor 1311. The resulting positive pulses appearing across collector load resistor 1316 are applied to conductor SA and carried in cable SPT to the line switch circuits.

It will be obvious by inspection that the other subcircuits are identical to the subcircuit just described. For example, positive pulses appearing in the output signal from the "or" gate for positive signals comprising diodes 1406–1410, inclusive, are coupled through diode 1304 to conductor LB and are amplified by transistor 1317, gated with the sampling pulse appearing on conductor SP, and then amplified by transistors 1318 and 1319 and applied to conductor SB. It will be noted that no diode has been provided for coupling the output of the "or" gate comprising diodes 1412–1416, inclusive, to conductor LB. A diode is not required for this purpose since the pulses appearing on conductors SC5′, SC9′, SC12′, SC14′ and SC15′ are coupled through one or more of the diodes 1301, 1304, 1305, 1306 and 1411 to conductor LB. All of the transistors used in this circuit may be type 2N94A.

*Voice path*

LINE CIRCUIT 11

Figure 16:
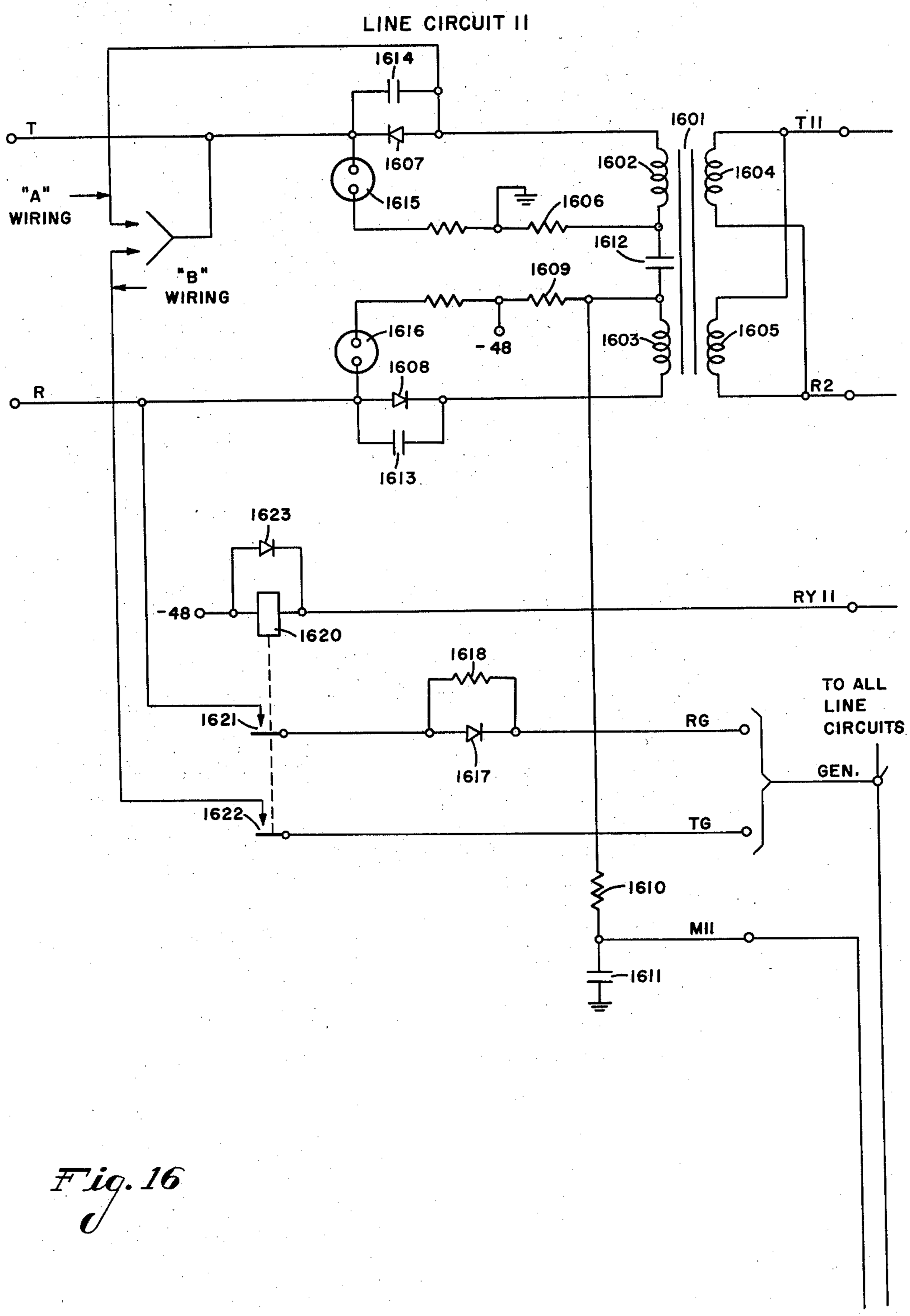

Line circuit 11, which is shown in detail in Fig. 16 of the drawings, may be used either for single party service or for two-party service. As previously mentioned, the ringer at the associated station is bridged across the line for single party service, while for two-party service, the ringers at the associated stations are connected from tip conductor T to ground and from ring conductor R to ground, as is conventional for divided line ringing. Optional wiring A and B has been shown for the purpose of adapting the line circuit for either type of service. Wiring A is used for single party service and wiring B is used for divided line ringing service.

Transformer 1601, which is shown at the upper right of Fig. 16, serves the function of coupling voice currents through to the bilateral transistor switches in the line switch associated with line circuit 11. Transformer 1601 comprises primary windings 1602 and 1603 and secondary windings 1604 and 1605. Battery feed is given the associated station or stations through the primary windings.

Assume that a station on the line terminating in line circuit 11 goes off-hook. Line current flows over the extended loop circuit from ground through resistor 1606, winding 1602 of transformer 1601, diode 1607 over conductor T, through the station subset and back over conductor R, through diode 1608, winding 1603, and through supervisory resistor 1609 to minus forty-eight volts. Diodes 1607 and 1608 are poled so as to conduct the line current. It is to be noted that when the station or stations on the line are on-hook, there is no voltage drop across supervisory resistor 1609 and conductor M11, which extends to the multiplexer 26, stands at minus forty-eight volts. Because of line current flow when a station on the line goes off-hook, a voltage drop exists across resistor 1609 and the potential of conductor M11 rises to minus twenty-four volts or less, as determined by the loop resistance. For a one thousand five hundred ohm loop, approximately twenty-five milliamperes of current flows in the loop which gives rise to a supervisory potential of approximately minus forty-three volts. For zero ohm loops, the supervisory potential may reach minus twenty-four volts. This raised voltage level serves to indicate to the multiplexer that line 11 is in an off-hook condition.

Dial impulses generated at the substation are, of course, reproduced on conductor M11 as the current flow through resistor 1609 is interrupted and re-established, and the corresponding voltage drop across said resistor disappears and reappears, respectively. The voltage drop across the supervisory resistor 1609 is transmitted through a low-pass filter comprising resistor 1610 and capacitor 1611 to conductor M11. The multiplexer 26, as previously described, responds to an off-hook condition on line 11 by generating a pulse in time position 11 in each pulse frame. When line 11 is in an on-hook condition and during each dial impulse interval, the multiplexer does not generate pulses in time position 11.

Voice signals appear across the primary windings 1602 and 1603 of transformer 1601 and are induced in the parallel connected secondary windings 1604 and 1605 at impedance levels dependent upon the particular turns ratio. The transformer employed in the tested model of the system had a turns ratio of 1.33 to 1, so that the secondary impedance level and hence the operating impedance level of the voice path was approximately three hundred and forty ohms, based on a six hundred ohm line impedance. Capacitor 1612 by-passes supervisory resistor 1609 for voice frequencies but permits dial impulses to appear across the resistor and thus on conductor M11. Conductors T11 and R11 are connected to the bilateral transistor switches in the individually associated line switch and to the link multiple points, respectively. It can be seen from the above that the line circuit functions to separate supervisory signals from voice signals and to route the supervisory signals to the multiplexer and the voice signals to the voice path.

When a station on line circuit 11 is called, ringing power, transmitted over conductors TG and RG from the ringing generator control circuit 27, is applied either to the tip or ring side of the line through either operated contacts 1622 or 1621, respectively, on ringing relay 1620. Relay 1620 is operated under control of the ringing circuit in line switch LS11 over conductor RY11. The ringing circuit in line switch 11 is, in turn, controlled by the connector seizing the called line, as previously described. Relay 1620 is operated either during the tip ringing interval or during the ring ringing interval as determined by the seizing connector. It will be recalled that an operating voltage is applied to conductor RY11 at the same time that ringing power is applied to conductor TG if the line is to be rung on the tip side, and an operating voltage is applied to conductor RY11 at the same time that ringing power is applied to conductor RG if the line is to be rung on the ring side.

It will be recalled that the ringing voltage on conductor RG varies between minus forty-eight volts and minus two hundred and seventy-four volts. When this potential is applied to the ring conductor, diode 1608 is rendered non-conductive for the entire voltage cycle since its cathode terminal is returned to minus forty-eight volts through winding 1603 and resistor 1609. Diode 1608 thus isolates the speech transformer 1601 from the line during ring ringing. High frequency ripple potentials on the ringing voltage waveform are coupled through the small capacitor 1613 shunting diode 1608 and are transmitted through the line transformer and the voice circuits of the system back to the calling line. This signal is ring-back tone and indicates that ringing voltage is actually being applied to the called line.

It will also be recalled that the ringing voltage on conductor TG varies between ground and plus two hundred and twenty-six volts. When this potential is applied to the tip conductor, diode 1607 is rendered nonconductive for the entire voltage cycle since its anode terminal is returned to ground through winding 1602 and resistor 1606. Diode 1607 thus isolates the speech transformer 1601 from the line during tip ringing. The high frequency ripple potentials on the ringing voltage waveform are coupled through capacitor 1614 and back over the voice circuits to the calling line and are heard as ring-back tone.

When a line is being rung, ringing current flows from the ringing generator, through either contacts 1621 or 1622 on relay 1620, over either conductor R or T, respectively, and through the series connected capacitor and ringer at the substation to ground. The ringer represents a very high inductance in this circuit and if the ringing voltage is interrupted suddenly, a very high transient voltage may be developed across the ringer. This voltage may then appear across either blocking diode 1608 or blocking diode 1607, thus endangering the unit and bringing about circuit failure. To avoid this, neon lamps 1615 and 1616 are provided in the circuit. When the ringing voltage is interrupted at such a point in the ringing cycle that dangerous inductive kick potentials are developed across the ringer, one of the neon lamps, depending upon which side of the line is being rung, is rendered conductive to place a shunt across the line and thereby protect the diode in that side of the line. The breakdown voltage of the neon lamps is in the order of seventy volts so that one of the lamps is normally illuminated during a portion of each ringing cycle. Thus, there is provided a visual indication at the line circuit as to which side of the line is being rung.

When the line circuit is to be used for bridged ringing single party service, A wiring is provided and B wiring is omitted. This disconnects the circuit from the tip generator source appearing on conductor TG and shorts out diode 1607 in the tip side of the line. Bridged ringing line circuits are rung by operating relay 1620 during the ring ringing interval. Ringing power is applied over conductor RG, through diode 1617, through operated contacts 1621, over conductor R, through the substation capacitor and ringer, back over the tip side of the line through winding 1602 and through resistor 1606 to ground. If relay 1620 is mistakenly caused to operate during the tip ringing interval, the telephone will not be rung and no ring-back tone will be heard.

When a party on the line answers, regardless of the type of ringing used, line current flows and produces a voltage drop across supervisory resistor 1609. The multiplexer then generates pulses in time position 11 to indicate that line 11 is in an off-hook condition. The first pulse generated by the multiplexer in time position 11 controls the seizing connector to terminate the development of ring control pulses in time position 11 and thus release relay 1620 to trip the ringing.

Diode 1617 and parallel connected resistor 1618 are placed in the ring generator conductor RG to prevent false ringing trip in line circuit 11 when line circuit 11 is being rung simultaneously with another line and the other line goes off-hook. Since conductors RG and TG are multipled to all of the line circuits, line current flowing in the answering line would also flow over conductor RG, through contacts 1621, and through supervisory resistor 1609 to minus forty-eight volts in line circuit 11 in the absence of diode 1617 and resistor 1618. Diode 1617 is poled so as to conduct the negative ringing voltage appearing on conductor RG and to block the flow of line current from other lines, as just described.

LINE SWITCH CIRCUIT LS11

Figure 17:
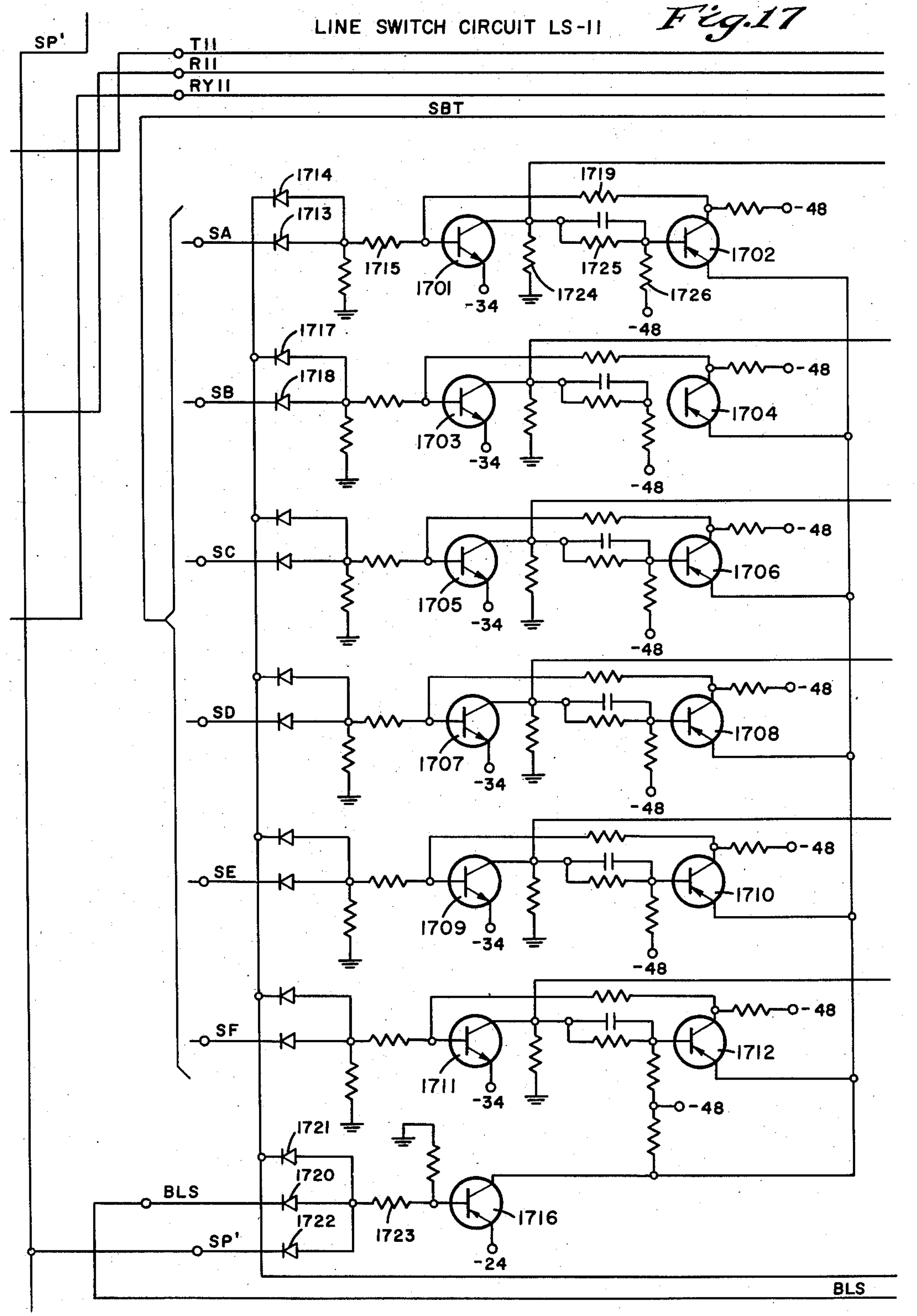
Figure 18:
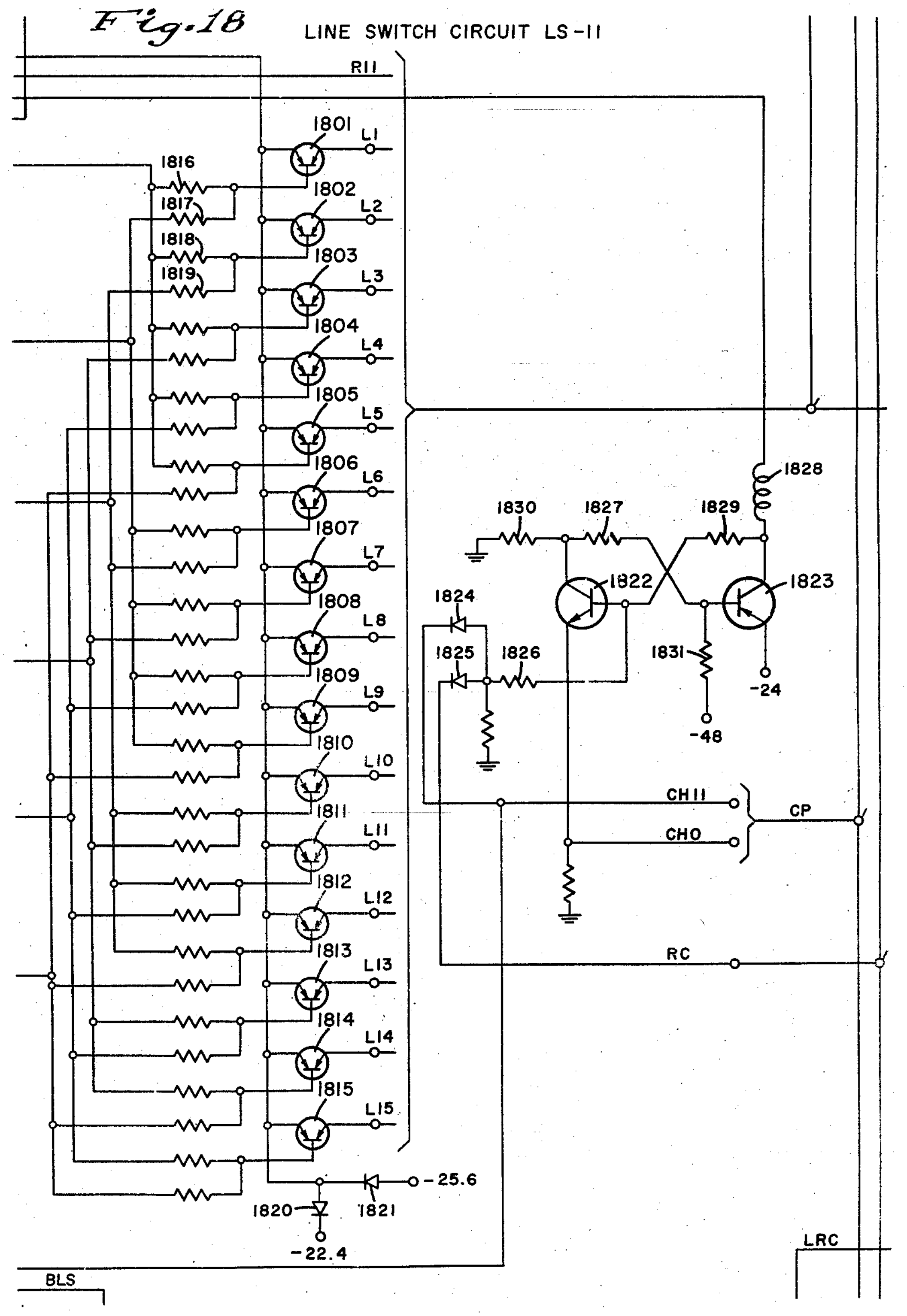

Line switch circuit LS11, which is individually associated with line circuit 11, is shown in detail in Figs. 17 and 18 of the drawings. The line switches for lines 12—21 and 23—00 are identical to line switch LS11. The purpose of this circuit is to provide means for selectively connecting the voice signals received over conductor T11 from line circuit 11 to any one of the fifteen link multiple points. For this purpose, fifteen bilateral transistor switches comprising transistors 1801–1815, inclusive, are provided in the circuit. Tip conductor T11 from line circuit 11 is connected to the left emitter collector electrode of each of the bilateral transistors 1801–1815. The right emitter collector electrode of each of these bilateral transistors is connected to one of the link multiple points over conductors L1–L15, inclusive. Thus when operated, transistor 1801 connects conductor T11 to link 1 multiple point 14–1 over conductor L1, transistor 1802 connects conductor T11 to link 2 multiple point 14–2 over conductor L2, etc. Ring conductor R11 from line circuit 11 enters LS11 paired with conductor T11 and is fed directly to the fifteen link multiple point transformers. The ring conductors from all of the line circuits of the one hundred line group are connected to a common potential at the link multiple point so that it is necessary to switch only the tip conductors.

The conductivity of bilateral transistors 1801–1815 is controlled on a two out of six basis by the six complimentary flip-flop or flip-flip circuits comprising transistors 1701–1712, inclusive, via a two resistor matrix in the base circuit of each of the bilateral transistors. The base circuit of each bilateral transistor is connected to a unique combination of two out of six of the flip-flip circuits. For example, it can be seen that the base of bilateral transistor 1801 is coupled through resistor 1816 to the collector of transistor 1701 in the first flip-flip circuit comprising transistors 1701 and 1702, and through resistor 1817 to the collector of transistor 1703 in the second flip-flip circuit comprising transistors 1703 and 1704. Similarly, the base of bilateral transistor 1802 is coupled through resistor 1818 to the collector of transistor 1701 in the first flip-flip circuit, and through resistor 1819 to the collector of transistor 1705 in the third flip-flop circuit comprising transistors 1705 and 1706.

When line circuit 11 is not engaged by any of the finder-connector links, both transistors in each of the six flip-flip circuits are non-conductive. The output signal taken from each of the flip-flip circuits stands at minus two volts since the collectors of transistors 1701, 1703, 1705, 1707, 1709 and 1711 in the first to sixth flip-flip circuits, respectively, stand at minus two volts because of the voltage division in each circuit corresponding to the voltage division across resistors 1724, 1725 and 1726 in the first flip-flip circuit. Thus, the output signal from each of the fifteen resistor matrices and the base of each of the bilateral transistors stands at minus two volts. Since both emitter collector electrodes of each bilateral transistor are returned to minus twenty-four volts, the bilateral transistors have applied thereto a twenty-two volt reverse bias. Examining transistor 1801, it can be seen that its right emitter collector electrode is returned over conductor L1, through the lower winding of the link 1 multiple point transformer 1901 in Fig. 19 to minus twenty-four volts, and that its left emitter collector electrode is returned over conductor T11, through windings 1604 and 1605 of transformer 1601 in line circuit 11, and over conductor R11 to minus twenty-four volts in Fig. 19. Since the peak to peak signal excursion on conductor T11 is limited to 3.2 volts by the action of diodes 1820 and 1821, line transients, dialing signals and the like, are safely limited so that normally "off" bilateral transistors are never driven to conduction by signals originating on the line. The limiting diodes 1820 and 1821 are connected from conductor T11 to minus 22.4 volts and minus 25.6 volts, respectively. Since these potentials are plus 1.6 volts and minus 1.6 volts with respect to the conductor R11 return potential of minus twenty-four volts, the peak to peak signals are limited to 3.2 volts.

The flip-flip circuits are controlled by switch control pulses appearing on conductors SA–SF from the switch bank translator 13 in the time position of line circuit 11. It will be recalled that switch control pulses from a particular link are applied to a unique combination of two of the conductors SA–SF. In line switch circuit LS11, each of the SA–SF conductors is individually connected to one input of a two-input "and" gate for positive signals. Channel pulse conductor CH11 is connected to the other input of each gate. For example, conductor SA is connected to the cathode terminal of diode 1713 and channel pulse conductor CH11 is connected to the cathode terminal of diode 1714. The output signal from this "and" gate for positive signals normally stands at minus thirty-four volts and rises to minus twenty-four volts when a switch control pulse in time position 11 is transmitted over conductor SA. The output signal from this gate is coupled through resistor 1715 to the base of transistor 1701. The first positive pulse appearing in the output signal from the gate triggers transistor 1701 conductive and the potential of its collector drops to minus thirty-four volts.

Transistor 1702 is also rendered conductive since its base, which is returned to the minus thirty-four volt potential appearing at the collector of transistor 1701 through resistor 1725, is negative with respect to the minus twenty-four volt potential of its emitter. The minus twenty-four volt potential of the emitter electrodes of transistors 1702, 1704, 1706, 1708, 1710 and 1712 is derived through normally conducting transistor 1716. Transistor 1716 is employed to reset the flip-flip circuits at the termination of the call. Its operation will be described in a subsequent paragraph. Transistor 1701 is held conductive once it is triggered "on" since its base is returned to the minue twenty-four volt potential appearing at the collector of conducting transistor 1702 through resistor 1719.

Assume that line 11 goes off-hook and that line circuit 11 is seized by the line finder of link 1. In this case, a ten microsecond positive pulse in time position 11 will appear on conductors SA and SB as described in the description of the switch bank translator 13. Since there is a positive pulse on conductors SA and SB which agrees in time position with the positive pulses appearing on channel pulse conductor CH11, the pulse appearing on conductor SA is coupled through diode 1713 to the base of transistor 1701 and the positive pulse appearing on conductor SB is coupled through diode 1718 to the base of transistor 1703. Transistors 1701 and 1702 in the first flip-flip circuit and transistors 1703 and 1704 in the second flip-flip circuit are rendered conductive, as explained above. The potential appearing at the collector electrodes of transistors 1701 and 1703 drops to minus thirty-four volts and remains there even after the output signal of the gate returns to minus thirty-four volts.

Since link 1 has seized line 11, no other link can seize that line and no pulses in time channel 11 will appear on conductors SC–SF, inclusive, for the duration of the call assumed to be in progress. Therefore, the third to sixth flip-flip circuits, inclusive, remain in their "off" condition.

It can be seen that with only the first and second flip-flip circuits in their "on" condition, the bases of bilateral transistors 1810–1815, inclusive, remain at minus two volts while the bases of bilateral transistors 1802–1809, inclusive, are now at minus seventeen volts since one resistor in each two-resistor matrix is returned to minus thirty-four volts while the other equal valued resistor is returned to minus two volts. A minus seven volt reverse bias on the bilateral transistors is, of course, sufficient to prevent any signal from passing through these transistors since the signal is limited to 3.2 volts peak to peak. Resistors 1816 and 1817 are both returned to minus thirty-four volts at this time so that bilateral transistor 1801 is supplied with approximately eight hundred and thirty microamperes of forward base current and transistor 1801 is turned "on" to connect tip conductor T11 to conductor L1. Since conductor L1 is connected to link 1 multiple point 14–1, a talking path for the bilateral transmission of voice signals is completed between line circuit 11 and the link 1 multiple point.

If it be assumed that station 211 is calling station 912 via link 1, the connector of link 1 releases switch control pulses in time position 12 and, through the action of the switch bank translator 13, these pulses appear on conductors SA and SB. The first and second flip-flip circuits in line switch LS12, which is identical to LS11 just described, are turned "on" and the first bilateral transistor in LS12 is rendered conductive to connect tip conductor T12 from line circuit 12 to the link 1 multiple point. A connection for the transmission of voice signals is now completed between line circuit 11 and line circuit 12. It can be seen that the disclosed system is single ended in operation. That is, either the line finder or the connector of a link can control the same voice switch to selectively connect the line to the multiple point associated with that link.

Since both of the so-called emitter collector electrodes of transistor 1801 are returned to minus twenty-four volts, the instantaneous value and direction of the voice signals determines which of the electrodes functions as an emitter and which of the electrodes functions as a collector. During the positive half-cycles of speech current transmitted from line circuit 11 to line circuit 12, the junction between the left emitter collector electrode and the base of transistor 1801 functions as an emitter junction and the junction between the right emitter collector electrode and the base conducts current as if it were a saturated collector. During the negative half-cycles of speech current transmitted from line circuit 11 to line circuit 12, the junction between the right emitter collector electrode and the base functions as an emitter junction and the junction between the left emitter collector electrode and the base functions as a collector junction. The operation is, of course, the reverse for signals transmitted from line circuit 12 to line circuit 11;

That is, the right emitter collector electrode functions as an emitter during positive half-cycles and as a collector during negative half-cycles.

It will be recalled that negative busy marking pulses in time position 11 appear on conductor BLS from the busy lead converter circuit 17 as long as line circuit 11 is seized by any link. Conductor BLS is connected to the cathode terminal of diode 1720 which forms one input of a three-input gate comprising diodes 1720, 1721 and 1722. Channel pulse conductor CH11 is connected to the cathode terminal of idode 1721 and sampling pulse conductor SP′ is connected to the cathode terminal of diode 1722. This gate may be considered as either an "and" gate for positive signals or an inhibitor gate. It will be recalled that conductor CH11 normally stands at minus thirty-four volts and rises to minus twenty-four volts during channel pulse interval 11, the signal on conductor SP′ rises from minus thirty-four volts to minus twenty-four volts during the middle portion of each time channel, and that the signal on conductor BLS drops from minus twenty-four volts to minus thirty-four volts during the time position of each busy line. The output signal from this gate stands at minus thirty-four volts at all times except during the ten microsecond center portion of time channel 11 when time channel 11 is not marked as busy by a busy pulse on conductor BLS. Thus, as long as time channel 11 is marked busy, the output of the gate remains minus thirty-four volts. The output signal from the gate is coupled through resistor 1723 to the base of inverter amplifier transistor 1716. Transistor 1716 is fully conductive as long as line circuit 11 is busy and its collector potential, and thus the emitter potential of transistors 1702, 1704, 1706, 1708, 1710 and 1712, stands at minus twenty-four volts.

When the station on linke 11 hangs up, the busy marking pulses in time position 11 are removed from conductor BLS. Conductor BLS then stands at minus twenty-four volts during time position 11 and a positive pulse is conducted through the gate comprising diodes 1720, 1721 and 1722 to render transistor 1716 non-conductive. The potential at the collector of transistor 1716 and the emitters of the flip-flip circuit transistors drops to minus forty-eight volts. Previously operated transistors 1702 and 1704 are now rendered non-conductive since their emitters are negative with respect to the minus thirty-four volt potential of their bases. Transistors 1701 and 1703 are also rendered non-conductive when transistors 1702 and 1704, respectively, become non-conductive. Examining the first flip-flip circuit, it can be seen that the collector of transistor 1702 drops to approximately minus forty volts when transistor 1702 becomes non-conductive. The base of transistor 1701 becomes negative with respect to the emitter of transistor 1701 because of the coupling through resistor 1719 and transistor 1701 becomes non-conductive. The flip-flip circuits remain "off" until switch control pulses in time position 11 again appear on two of the conductors SA–SF when line circuit 11 initiates or receives another call. With all the flip-flops "off," all of the bilateral transistors are biased for non-conduction and signals appearing on tip conductor T11 will not be passed to any of the link multiple points.

Line switch LS11 also includes a ringing control circuit comprising transistors 1822 and 1823 for controlling the operation of ringing relay 1620 in line circuit 11. Transistors 1822 and 1823 are connected as a flip-flip circuit in which both transistors are normally non-conductive so that no current flows in the collector circuit of transistor 1823 and the winding of relay 1620, which is connected in the collector circuit of transistor 1823. When transistor 1823 is rendered conductive, relay 1620 in line circuit 11 is operated so that ringing power is applied to either the tip or ring side of line 11, as explained in the description of line circuit 11. The flip-flip circuit is controlled by a two-input "and" gate for positive signals comprising diodes 1824 and 1825. Channel pulse conductor CH11 is connected to the cathode terminal of diode 1824 and the ringing control conductor RC from the ringing control amplifier 24 is connected to the cathode terminal of diode 1825. The anode terminals of diodes 1824 and 1825 are connected through resistor 1826 to the base of transistor 1822.

It will be recalled that conductor RC carries positive ringing control pulses in the time positions of lines to be rung. These pulses occur only during the time that the particular party is to be rung. That is, pulses occur during the one-second ring ringing interval or during the one-second tip ringing interval of the ringing cycle depending upon the particular value of the first digit dialed into the connector. The first positive pulse in time position 11 appearing on conductor RC produces a positive pulse in the output signal from the gate and triggers transistor 1822 conductive. The emitter of transistor 1822 is returned to channel pulse conductor CH0 which stands at minus thirty-four volts except during time channel 0, which immediately precedes time channel 11 in the pulse frame. When transistor 1822 becomes conductive, its collector potential drops to minus thirty-four volts and because of the connection through resistor 1827 to the base of transistor 1823, transistor 1823 also becomes conductive. Collector current flows in transistor 1823, through choke coil 1828 over conductor RY11 and through the winding of relay 1620 to minus forty-eight volts. Transistor 1822 remains conductive after being triggered "on" since its base is returned through resistor 1829 to the minus twenty-four volt potential appearing at the collector of conducting transistor 1823.

When one hundred and twenty-seven time positions have elapsed after the flip-flip is turned "on," the potential on conductor CH0 rises to minus twenty-four volts and transistor 1822 is rendered non-conductive since its emitter is slightly positive with respect to its base. Transistor 1823 is also rendered non-conductive since its base is now positive with respect to its emitter because of the voltage division across resistors 1830, 1827 and 1831. If a positive pulse appears on conductor RC in time position 11, the flip-flip circuit is again turned "on." In normal operation, there will be a string of approximately three hundred and ninety successive ringing control pulses in time position 11 gated by the "and" gate comprising diodes 1824 and 1825 during each ringing interval so that during this period the flip-flip circuit is "on" for two thousand five hundred and forty microseconds, then "off" for twenty microseconds, "on" again for two thousand five hundred and forty microseconds, and then "off" again for twenty microseconds, etc., until the end of the ringing tip or ringing ring interval. Relay 1620 will remain operated during the twenty microsecond "off" periods of the flip-flip circuit. When positive pulses in time position 11 no longer appear on conductor RC, relay 1620 releases after a few milliseconds and the transmission of ringing voltage to line 11 is terminated.

As used in this circuit, transistors 1701, 1703, 1705, 1707, 1709, 1711 and 1822 may be type GT692, transistors 1702, 1704, 1706, 1708, 1710, 1712 and 1823 may be type 2N44, transistor 1716 may be type 2N43, and transistors 1801–1815 may be type QC142.

LINE SWITCH CIRCUIT LS22

Figure 11:
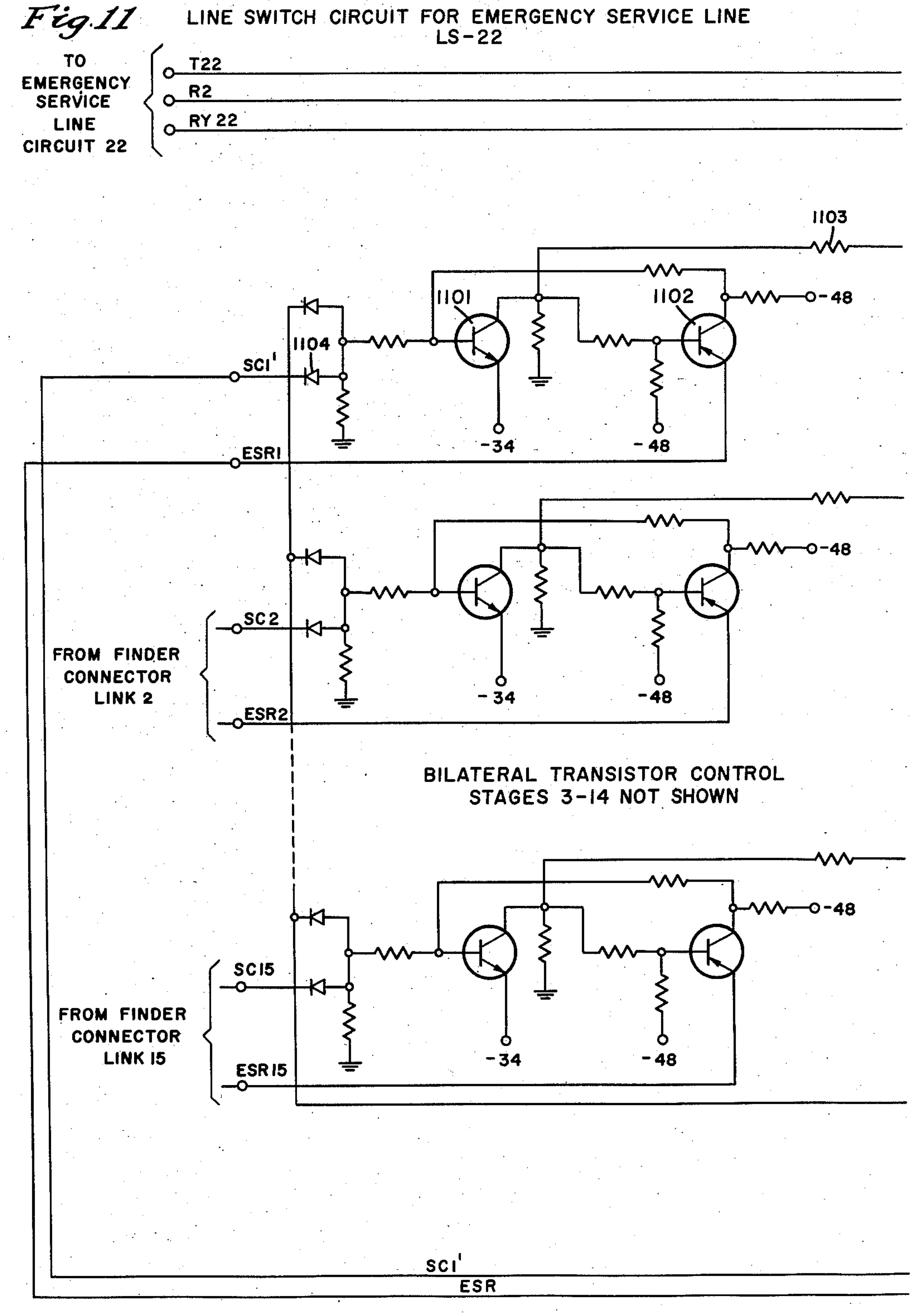
Figure 12:
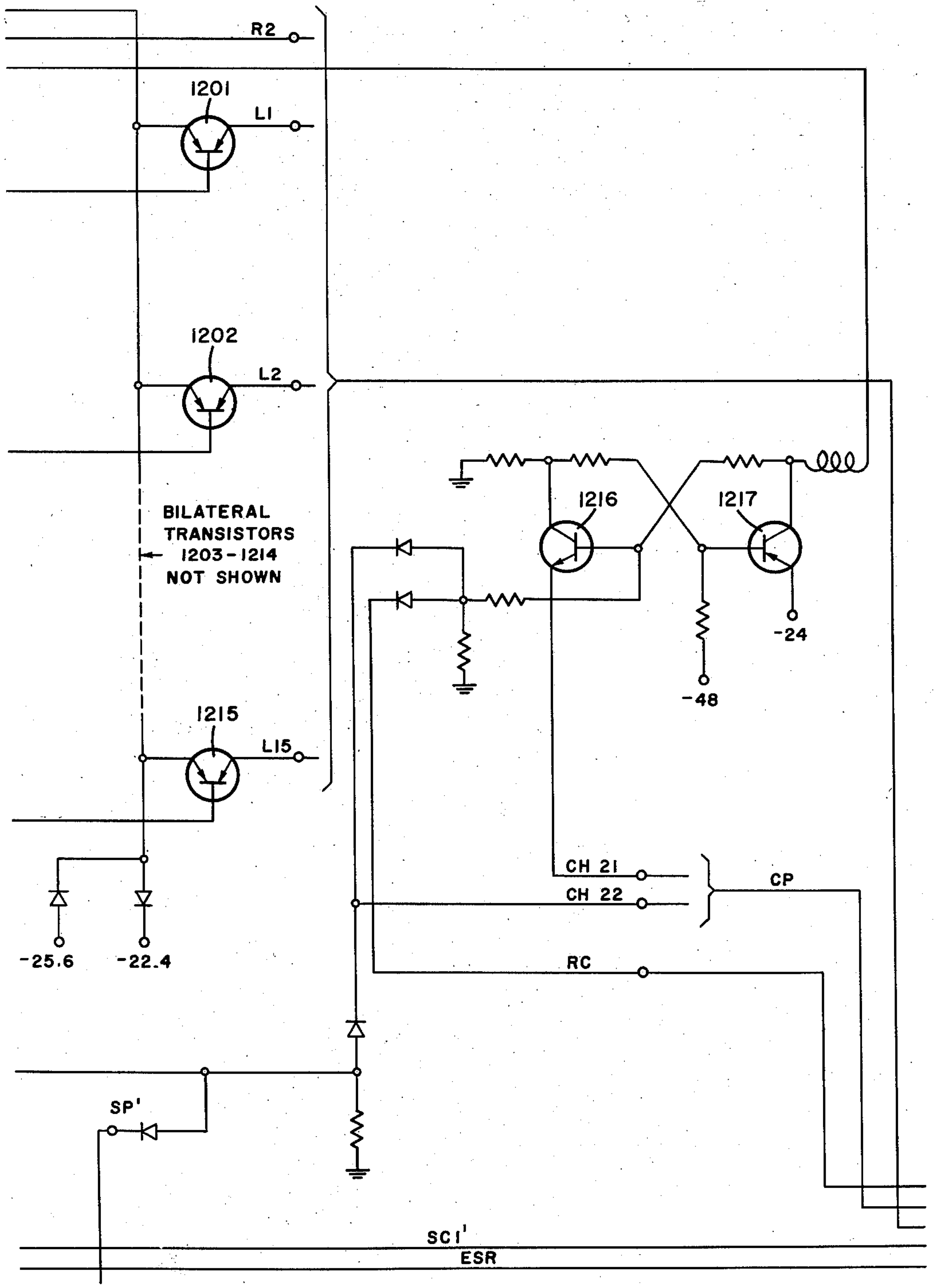

Line switch circuit LS22, which is individually associated with the emergency service line 22, is shown in detail in Figs. 11 and 12 of the drawings. Line switch LS22 is the same as line switch LS11, just described, except that a flip-flip circuit is provided for the purpose of controlling the conductivity of each of the bilateral transistors 1201–1215, inclusive. Individual control of the bilateral transistor is vital to line switch circuit LS22 since line 22 is the emergency service line and as such must be connectable with any number of link multiple points simultaneously.

It is to be noted that the base of each bilateral transistor is connected through a single resistor to its associated control circuit. For example, the base of bilateral transistor 1201 is coupled through resistor 1103 to the collector of transistor 1101. Transistors 1101 and 1102 in the first flip-flip circuit are normally non-conductive and the collector of transistor 1101 stands at minus two volts as explained in the description of the operation of the flip-flip control circuits in line switch 11. A positive pulse appearing on switch control conductor SC1 from link 1 in time position 22 is gated through diode 1104 and renders both transistors 1101 and 1102 conductive. The collector potential of transistor 1101 drops to minus thirty-four volts and bilateral transistor 1201 is rendered conductive to connect tip conductor T22 to the link 1 multiple point 14–1 over conductor L1. Both transistors 1101 and 1102 remain conductive for the duration of the call. At the termination of the call, the potential of the emergency service reset conductor ESR1 from the connector of link 1 drops from minus twenty-four volts to minus thirty-four volts and transistors 1102 and 1101 are rendered non-conductive. It can be seen that any number of the flip-flip circuits and hence their individually associated bilateral transistors, can be operated simultaneously.

The operation of the ringing control circuit comprising transistors 1216 and 1217 is identical to the operation of the ringing control flip-flip in line switch 11. The flip-flip circuit is triggered "on" by ringing control pulses received over conductor RC in time position 22 and is triggered "off" by channel pulses in time position 21 appearing on conductor CH21.

LINK MULTIPLE POINTS

Figure 19:
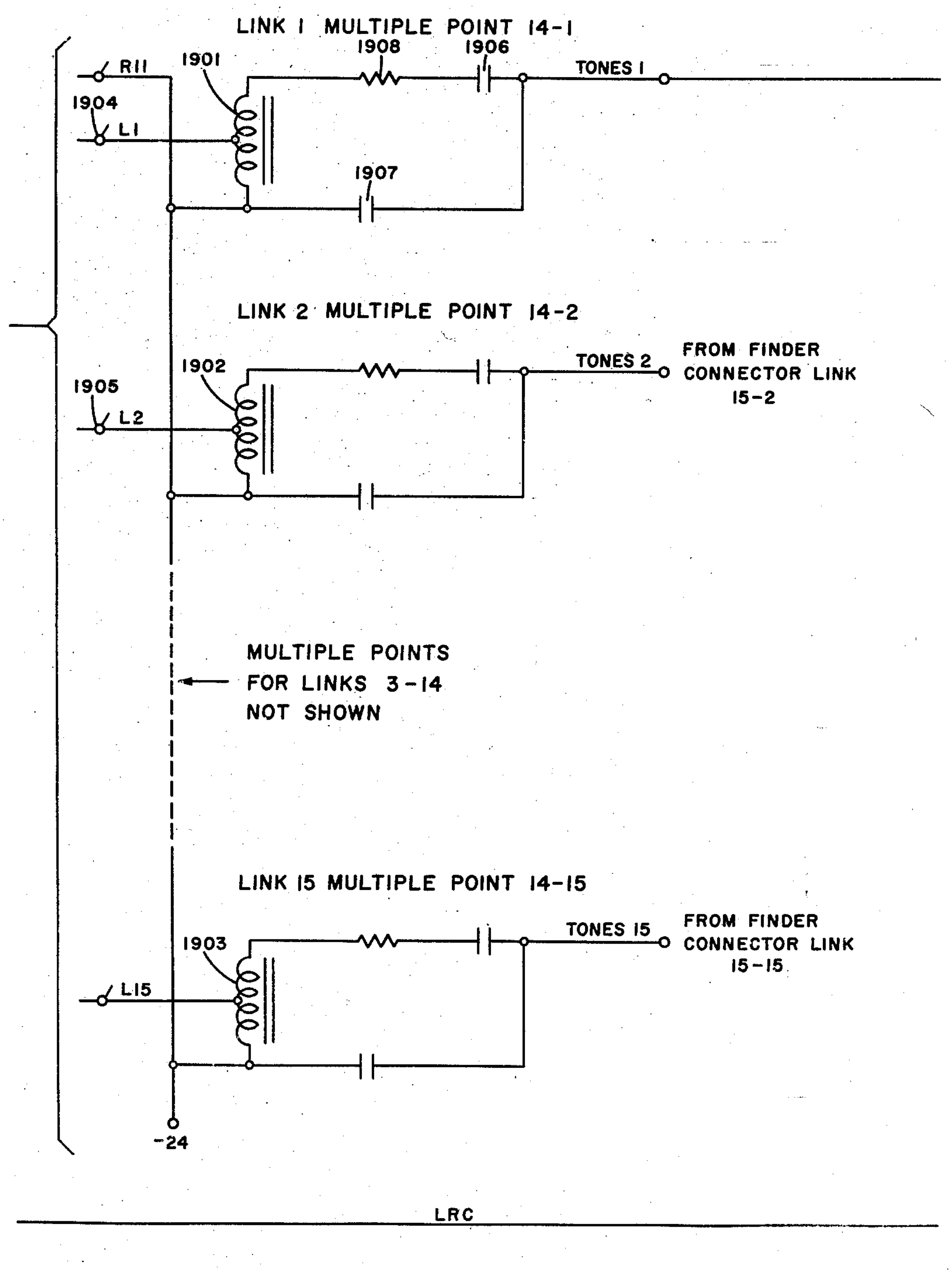

The link 1, link 2 and link 15 multiple points 14–1, 14–2 and 14–15, respectively, are shown in detail in Fig. 19 of the drawings. Each of the multiple points comprises a mixing transformer such as transformer 1901 for link 1 multiple point 14–1. The link 1 conductors L1 from all of the one hundred bilateral transistors associated with link 1 are multiplied at terminal 1904 of transformer 1901. The link 2 conductors L2 from all of the bilateral transistors associated with link 2 are multipled at terminal 1905 of transformer 1902, etc. The ring conductors from the one hundred line circuits, such as conductor R11 from line circuit 11, are multipled to a common bus which connects the lower terminals of all of the mixing transformers to minus twenty-four volts.

Tones from each of the fifteen line finder-connector links are coupled over conductors tones 1–tones 15 to the mixing transformer individual to that link. For example, dial tone and busy tone signals appearing on conductor tones 1 are coupled through a low-pass filter comprising capacitors 1906 and 1907 and resistor 1908 to mixing transformer 1901. The low-pass filter removes some of the higher harmonics present in these tones. The dial tone and busy tone signals are limited in amplitude by proper choice of winding ratio in the link multiple point transformers. As previously mentioned, the line switches are designed to handle a peak to peak voltage swing of 3.2 volts. The dial tone and busy tone signals received are ten volts peak to peak. Therefore, a turns ratio of 10:3.2 is provided in the mixing transformers between the upper windings and the lower windings so that the tone signals cannot exceed the 3.2 volt maximum as applied to the bilateral transistors.

*Control path*

LINE FINDER

Figure 28:
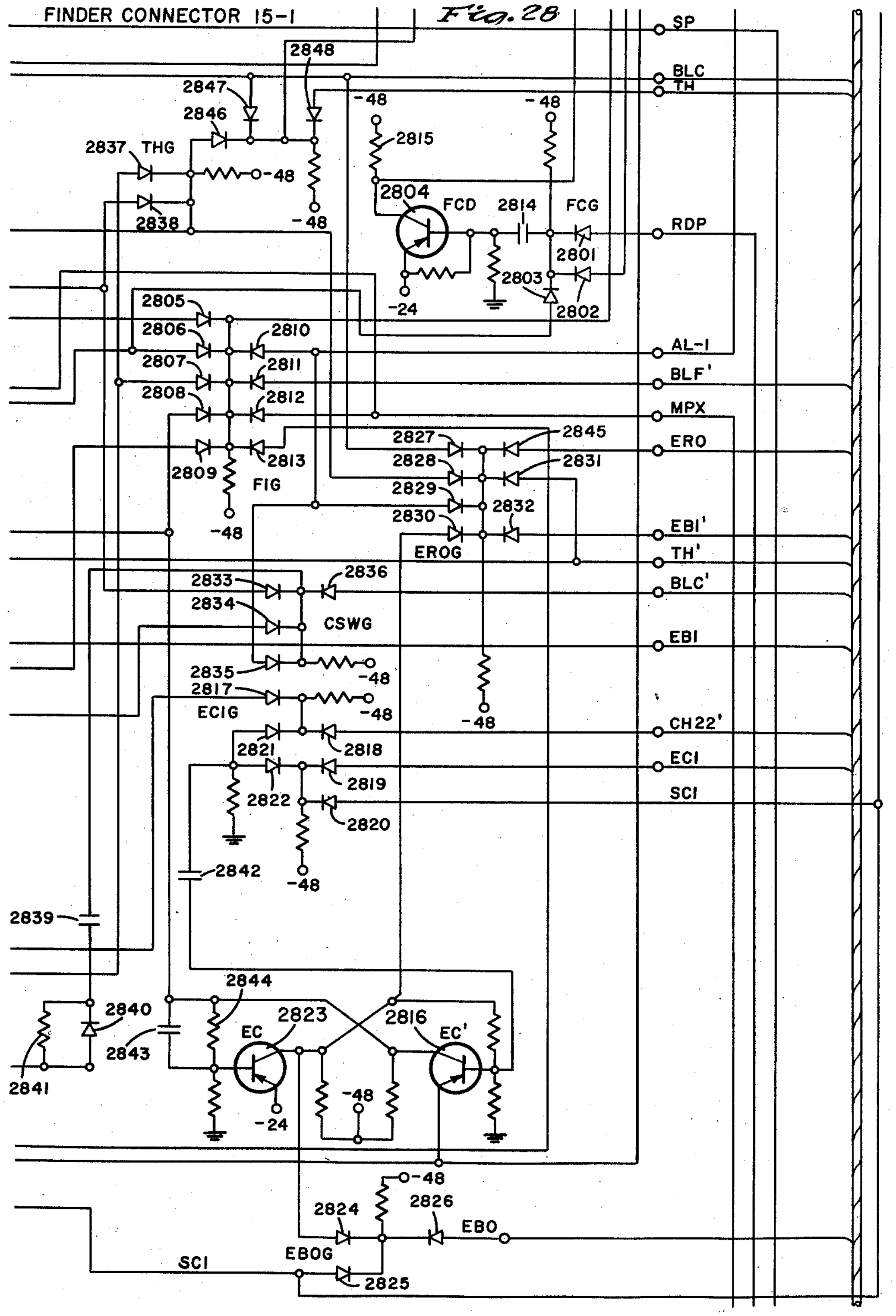

The line finder and connector of link 1 are both shown in detail as a single circuit in Figs. 21–28, inclusive, of the drawings. It will be noted that a functional letter designation as well as a numerical designation has been given to the transistors and the various gates in this relatively complex circuit to aid in the understanding of the invention. In order to separate the line finder from the connector and to illustrate the functions of the various stages in the line finder, a list of the line finder circuits and a brief description of their functions follows:

(1) The finder chain gate FCG is shown in Fig. 28 and comprises diodes 2801, 2802 and 2803. This gate serves to control the stepping of the finder searching chain by gating together the pulses developed by the searching chain, the register drive pulses, and a control potential derived from the finder switch-through flip-flop.

(2) The finder chain driver transistor 2804 is also shown in Fig. 28. Transistor 2804 is a pulse amplifier which is used to amplify and invert the output signal from gate FCG and to apply the resulting signal to the finder searching chain as the advancing signal.

(3) The finder searching chain is shown in Figs. 21–24, inclusive. The searching chain has seven flip-flop scale of two divider stages connected in tandem and comprises transistors 2401, 2402, 2301, 2302, 2303, 2304, 2201, 2202, 2203, 2204, 2101, 2102, 2103 and 2104. This binary chain is stepped by pulses appearing in the output signal from transistor 2804 and the output signals derived from each stage of the chain are utilized to control the finder pulse gate.

(4) The finder pulse gate comprises a diode associated with each of the fourteen transistors of the finder searching chain in such a way that the output signal from each transistor is used to gate through signals from the binary pulse generator 20 appearing on conductors A,A'–G,G', inclusive. The particular signals gated through establish the time position corresponding to the setting of the finder searching chain. The finder pulse gate comprises diodes 2403, 2404, 2305, 2306, 2307, 2308, 2205, 2206, 2207, 2208, 2105, 2106, 2107 and 2108.

Figure 25:
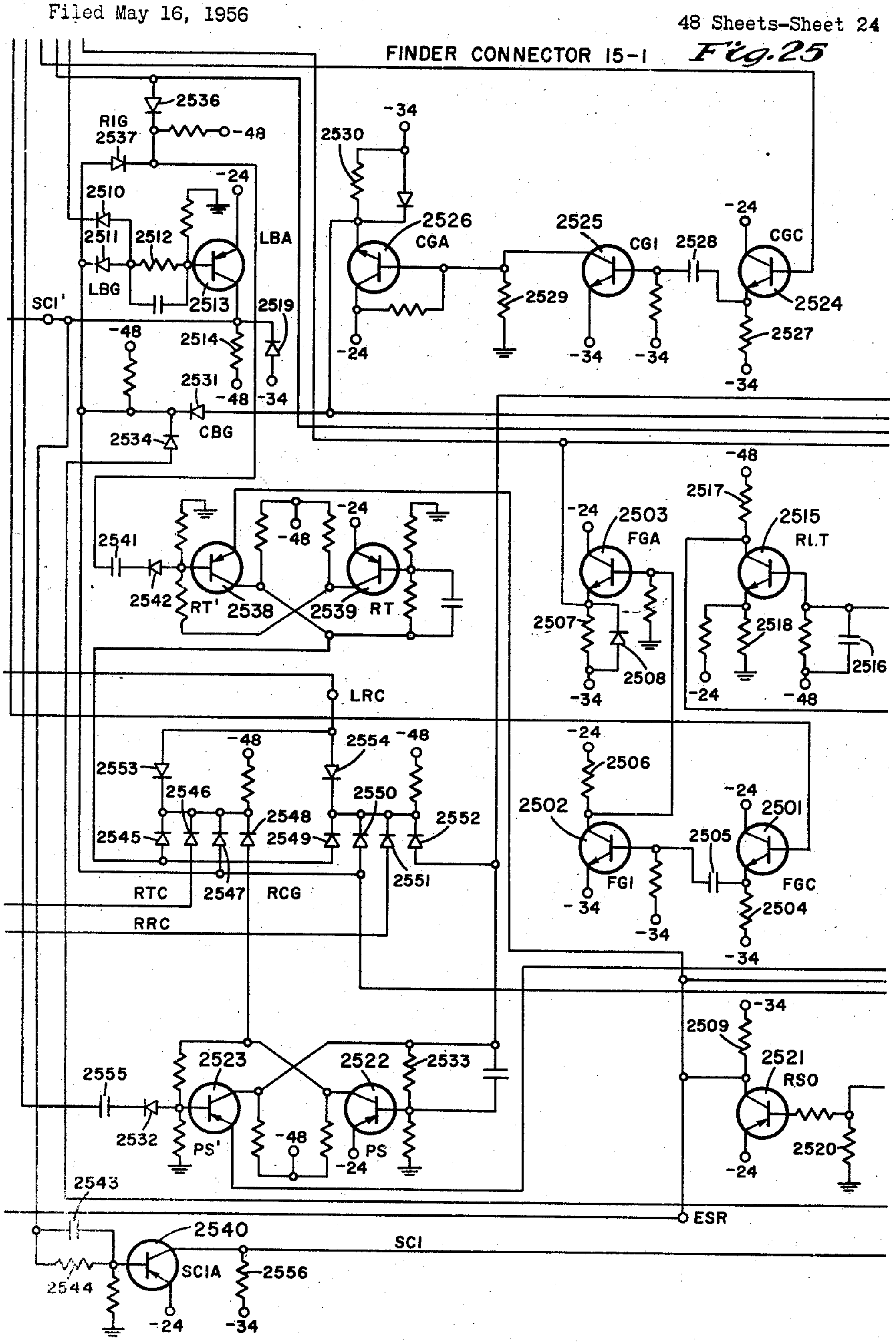

(5) The finder gate clipper transistor 2501, the finder gate inverter transistor 2502, and the finder gate amplifier transistor 2503, which are shown in Fig. 25, are NPN high frequency junction transistors used to clip the output signal from the finder pulse gate, present a high input impedance to the output of the finder pulse gate, and to amplify and deliver a finder pulse to the finder pulse bus.

Figure 21:
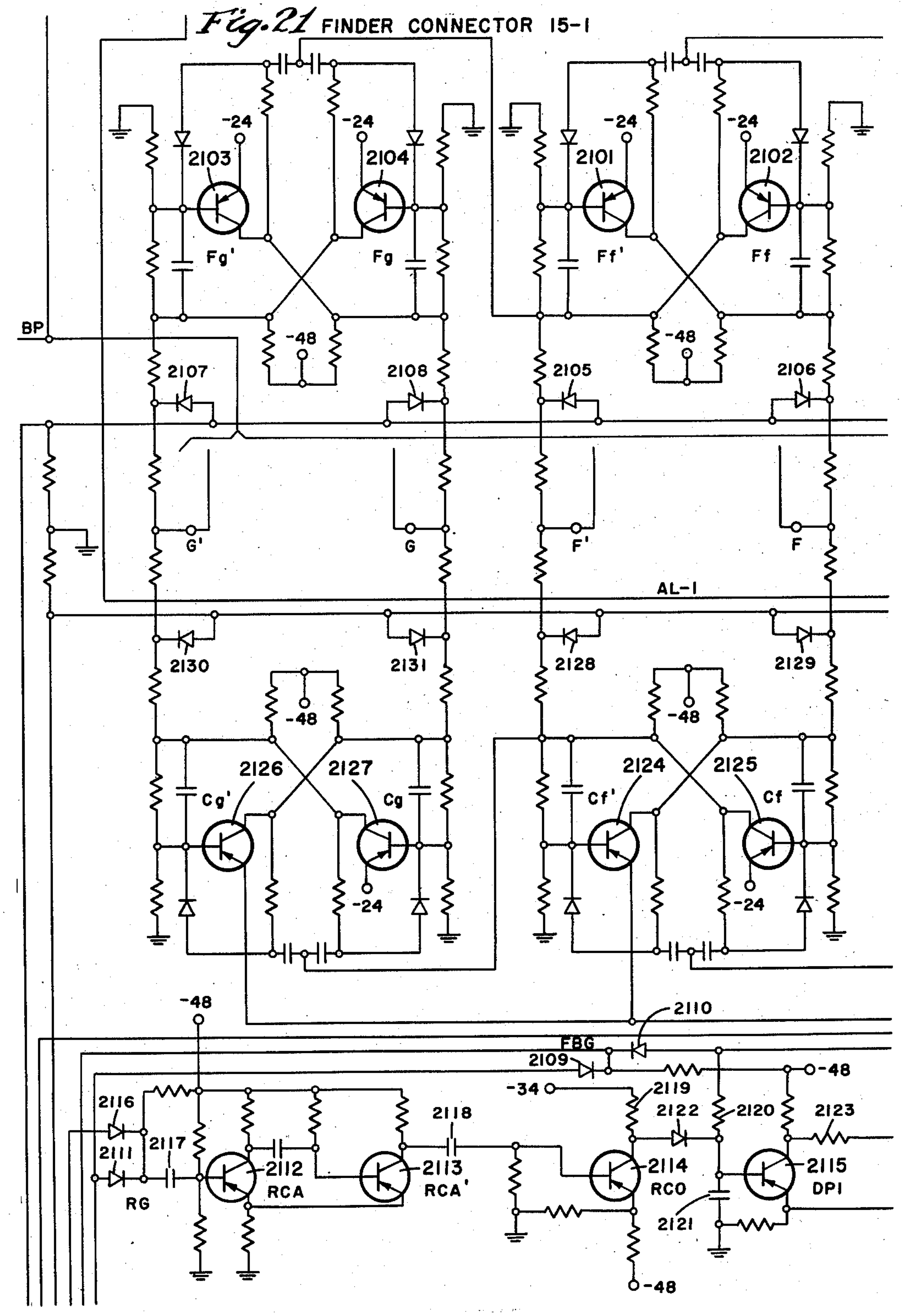

(6) The finder busy gate FBG comprising diodes 2109 and 2110, is shown in Fig. 21. This gate releases finder gate pulses to the link busy amplifier and thence to the switch control conductor SC1' only after the finder has seized a calling line.

(7) The finder in-gate FIG is shown in Fig. 28 and comprises diodes 2805–2813, inclusive. The purpose of this gate is to gate a multiplexer pulse in the time position of an unseized calling line through to the switch-through stage when link 1 is allotted and all of the circuits of the line finder-connector are properly reset.

(8) The finder switch-through transistors 2405 and 2406 are connected as a bi-stable flip-flop circuit. This circuit is triggered to its second operated condition by a multiplexer pulse gated through the finder in-gate. When in its second operated condition, the switch-through stage blocks the finder chain gate so that the finder searching chain remains in its setting, unblocks the finder busy gate so that a switch control pulse in the time position of a calling line may be released over conductor SC1' to mark the line as busy, and informs the connector through the reconstructor gate RG that the finder is engaged.

The finder depends on the connector reconstructor and release stages to differentiate between dial interruptions and an on-hook condition, but since these stages are primarily employed in the connector circuit, they are not considered a part of the line finder.

The line finder is of the normally searching type. That is, the line finder, when idle, generates finder gate pulses which step through the frame, channel after channel, in a continuous fashion. When the finder gate pulse developed by the allotted finder corresponds in time position with a calling line multiplexer pulse not marked as busy, the finder switches through and the finder searching operation is terminated. The finder continues to generate finder gate pulses in the time position of the seized calling line for the duration of the call. When the call is terminated, the line finder resumes its searching operation. As will be explained more fully hereinafter, the finder chain is made to step at fifty kc. and in exact unison with the binary pulse generator 20. Since the finders are allotted in turn for one pulse frame, and since the finders step at the channel rate, the allotted finder is capable of finding any calling line of the group during the time that it is allotted.

Since the finder gate pulse generated by the finder searching chain is used to step the finder searching chain, the circuit is in the form of a closed loop. Therefore, it is necessary to break into the closed loop at a first point and explain the circuit operation around the loop until the first point is again reached. For this purpose, assume that the link is idle as indicated by the fact that transistor 2405 is conductive and transistor 2406 is non-conductive, and that the finder searching chain is stepping in unison with the binary pulse generator 20. The collector of transistor 2405, which stands at minus twenty-four volts when the transistor is conductive, is coupled through resistor 2407 to the base of transistor 2406. The base of transistor 2406 is thus held slightly positive with respect to the minus twenty-four volt potential applied through conducting release transistor 2601 to the emitter of transistor 2406. The collector of transistor 2405 is also coupled to the anode terminal of diode 2110 in the finder busy gate FBG and the minus twenty-four volt potential applied thereto serves to block this gate so that busy pulses are not released at this time. The approximately minus forty volt potential appearing at the collector of non-conducting transistor 2406 is applied to the anode terminal of diode 2802 in the finder chain gate. The collector of transistor 2406 is also cross-coupled to the base of transistor 2405 through resistor 2408 so that transistor 2405 is held conductive once it is triggered to its conductive condition. Finder switch-through transistors 2405 and 2406 may be type 2N44.

The finder chain gate comprising diodes 2801, 2802 and 2803 is an "and" gate for negative signals. As previously mentioned, the approximately minus forty volt potential appearing at the collector of non-conductive transistor 2406 is applied to the anode terminal of diode 2802 when the link is idle. The register drive pulse conductor RDP is connected to the anode terminal of diode 2801. It will be recalled that the waveform appearing on conductor RDP stands at minus twenty-four volts during the first ten microseconds of each twenty microsecond time channel and drops to minus thirty-four volts during the second ten microsecond period of each time channel. The output signal from finder gate amplifier transistor 2503 is coupled to the anode terminal of diode 2803. The output signal from transistor 2503 comprises negative going minus thirty-four volt pulses in each time channel developed by the finder searching chain. The output signal from gate FCG thus comprises a minus thirty-four volt pulse occurring in the second ten microsecond half of each time channel. Each negative pulse coupled through capacitor 2814 to the base of normally non-conducting transistor 2804 from gate FCG renders transistor 2804, which may be type 2N44, conductive. The output signal from transistor 2804, which is taken from across collector load resistor 2815 and which comprises positive pulses, is coupled through either steering diode 2409 to the base of transistor 2402 or through steering diode 2410 to the base of transistor 2401 in the first stage of the finder searching chain. The particular steering diode which conducts the positive pulse is determined by the previous setting of the stage. It will be recalled from the description of the binary pulse generator 20, the operation of which is substantially the same as the operation of the finder chain, that the steering diode associated with the conductive side of each stage has approximately zero bias applied thereto while the steering diode associated with the non-conductive side of each stage is biased in the reverse direction. If it be assumed that transistor 2401 is conductive, a positive pulse in the output signal from transistor 2804 is coupled through capacitor 2411 and diode 2410 to the base of transistor 2401 and renders transistor 2401 non-conductive. The resulting negative swing at the collector of transistor 2401 is coupled through capacitor 2412 to the base of transistor 2402 and renders transistor 2402 conductive. Transistor 2402 is held conductive through cross-coupling resistor 2413 and transistor 2401 is held non-conductive through cross-coupling resistor 2414. The next positive pulse appearing in the outpt signal from transistor 2804 is coupled through steering diode 2409 to the base of transistor 2402 to render transistor 2402 non-conductive and transistor 2401 conductive.

An output signal is taken from the collector of transistor 2402 and coupled to the second stage and through a steering diode to the base of either transistor 2301 or transistor 2302. Each time that transistor 2402 becomes conductive, the positive voltage swing at its collector serves to render one of the second stage transistors non-conductive and the other transistor conductive. Thus, the second stage is operated at half the frequency of the first stage, the third stage is operated at one-half the frequency of the second stage, etc. The output waveform from transistor 2401 is thus a square wave with a twenty microsecond positive alternation and a twenty microsecond negative alternation. The output waveform from transistor 2402 is, of course, in phase opposition to the output waveform of transistor 2401. The output waveform from transistor 2301 is a square wave with a forty microsecond positive alternation and a forty microsecond negative alternation and is in phase opposition to the output wave form from transistor 2302.

Resistance gating circuits are provided for each of the fourteen transistors in the seven binary divider stages. The output signal from each transistor is coupled through a resistor as one input of a two-resistor gate. The appropriate binary pulse from the binary pulse generator 20, A, A', B, B', etc., is coupled through a second resistor as the other input of the resistance gate. The output signals from all of the resistance gates of the binary finder chain are coupled through a fourteen-input diode gate. The two diodes associated with each stage form an "or" gate for negative pulses and the seven groups of two diodes form an "and" gate for positive signals. For example, it can be seen that the collector of transistor 2401 is coupled through resistor 2415 and that conductor A from binary pulse generator 20 is coupled through resistor 2416 to the cathode terminal of diode 2404. Similarly, the collector of transistor 2402 is coupled through resistor 2417 and conductor A' is coupled through resistor 2418 to the cathode terminal of diode 2403. Resistors 2415 and 2416 form a first resistance gate, resistors 2417 and 2418 form a second resistance gate, and diodes 2403 and 2404 form an "or" gate for negative signals and one input of a seven-input "and" gate for positive signals.

The register chain acts to control the transmission of the fourteen binary pulses A–G', inclusive, in such a way that one of the A pulses (either A or A'), one of the B pulses, one of the C pulses, and so on, is selected and allowed to contribute to the formation of a single twenty microsecond channel pulse, termed the finder pulse. The overall gating action is similar to that found in the channel pulse matrix 25, wherein the fourteen binary input pulses are combined in gates to form single twenty microsecond channel pulses.

Thinking of all pulses and gate outputs in the positive sense, it is evident that the output signal from the resistor gate comprising resistors 2417 and 2418 when both conductor A' and the output signal from transistor 2402 are positive (minus twenty-four volts), is positive as well. When conductor A' is positive (minus twenty-four volts) and the output signal from transistor 2402 is negative (minus forty-three volts), the output voltage is an intermediate potential of minus thirty volts. When conductor A' is negative (minus thirty-four volts) and the output signal from transistor 2402 is positive (minus twenty-four volts), the output voltage is also minus thirty volts. When conductor A' and the output signal from transistor 2402 are both negative (minus thirty-four and minus forty-three volts), the output voltage is a negative potential of minus thirty-seven volts. The action of this gate is difficult to describe in conventional Boolean notation since the gate output is three-valued. However, when the second resistor gate, comprising resistors 2415 and 2416, output signal is combined with the output signal of the first resistor gate in the first two diodes 2403 and 2404 of the register chain, the resultant output signal is two-valued and fully expressible in Boolean notation.

It is believed apparent that whenever conductor A is positive (minus twenty-four volts), conductor A' must be negative (minus thirty-four volts), and that whenever the output signal from transistor 2402 is positive (minus twenty-four volts), the output signal from transistor 2401 must be negative (minus forty-three volts). Hence, there are four possible combinations of potentials and, through circuit analysis, the output potential of the diode "or" gate may be determined:

CONDITION No. 1

| | |
|---|---|
| A minus 24 volts | A' minus 34 volts |
| Fa' minus 24 volts | Fa minus 43 volts |
| Resistor gate output minus 24 volts | Resistor gate output minus 37 volts |

Diode gate output minus 37 volts

CONDITION No. 2

| | |
|---|---|
| A minus 34 volts | A' minus 24 volts |
| Fa' minus 24 volts | Fa minus 43 volts |
| Resistor gate output minus 30 volts | Resistor gate output minus 30 volts |

Diode gate output minus 30 volts

CONDITION No. 3

| | |
|---|---|
| A minus 24 volts | A' minus 34 volts |
| Fa' minus 43 volts | Fa minus 24 volts |
| Resistor gate output minus 30 volts | Resistor gate output minus 30 volts |

Diode gate output minus 30 volts

CONDITION No. 4

| | |
|---|---|
| A minus 34 volts | A' minus 24 volts |
| Fa' minus 43 volts | Fa minus 24 volts |
| Resistor gate output minus 37 volts | Resistor gate output minus 24 volts |

Diode gate output minus 37 volts

The interpretation of this is as follows: when register chain transistor 2401(*Fa'*) is conductive, and a positive minus twenty-four volt signal is derived on its collector, the diode gate output waveform is minus thirty volts when A' is minus twenty-four volts, and the diode gate output waveform is minus thirty-seven volts when A' is minus thirty-four volts. In other words, except for a shift in D.-C. level and some attenuation, the A' signal appears on the output of the gate. Conversely, if transistor 2402(*Fa*) is conductive, the A signal appears on the output of the diode gate. The first register chain stage, therefore, acts as a selector to choose either A or A' to be fed to the output circuit.

The expression for the output of the gate comprising diodes 2403 and 2404 is, therefore, $$(Fa)(A)+(Fa')(A')$$

Similarly, the other register chain stages act as selectors to select either the corresponding unprimed or primed signal and to apply it to the common output of the diode "or" gates. As previously stated, when the line finder is searching for unseized lines, the finder chain operates in exact unison with the binary pulse generator 20. For example, during the interval of time when conductors A', B', C, D', E, F and G from binary pulse generator 20 are positive (minus twenty-four volts), transistors 2401, 2301, 2304, 2201, 2204, 2102 and 2104 are conductive so as to gate through a finder pulse in time position 11. The resulting finder pulse is applied to the finder chain gate and during the second half of the twenty microsecond period, a register drive pulse on conductor RDP is gated through gate FCG, amplified by transistor 2804, and conducted through diode 2410 to render transistor 2401 non-conductive, transistor 2402 conductive, transistor 2301 non-conductive, transistor 2302 conductive, transistor 2304 non-conductive and transistor 2303 conductive. Thus, transistors 2402, 2302, 2303, 2201, 2204, 2102 and 2104 are now conductive so that the waveform represented by A, B, C', D', E, F, G will be gated through as a finder pulse. Referring to the binary pulse chart of Figs. 42–45, it can be seen that this waveform corresponds to time position 12.

It should now be apparent how the finder chain is made to synchronize or step in unison with the binary pulse generator 20. To illustrate this operation, assume that the finder chain is set so as to gate a pulse in time position 55 to the finder gate pulse conductor for the duration of a call. Next assume that at the time that the call from line 55 is terminated, the binary pulse generator 20 is set so that a combination of conductors A–G' produces a pulse in time position 51. Since the finder chain is set so as to gate through a combination of conductors A–G' which will produce a pulse in time position 55 only, no finder gate pulse is developed in time positions 51, 52, 53 or 54 as the binary pulse generator advances through these time positions. Thus, the register chain remains set in position 55. During the second half of time channel 55, the finder gate pulse is combined with the register drive pulse and serves to drive the finder chain to position 56. Since the binary pulse generator has not yet advanced to time position 56, the finder chain remains set for time position 56. Ten microseconds after the beginning of time channel 56, the finder is stepped to position 57. The line finder searching chain is now in phase with the binary pulse generator and will remain in phase until the finder seizes another line and thus terminates its searching operation. Each finder is allotted in turn for one pulse frame and is capable of seizing any calling line in the one hundred line group during that one frame. While the line finder is searching, a positive ten microsecond finder gate pulse appears in the output signal from the finder pulse gate during the first half of each time channel. The finder chain transistors may all be type 2N44.

The output signal from the finder pulse gate is coupled directly to the base of transistor 2501. Transistor 2501, which may be type 2N94A, is non-conductive so long as the output signal from the finder pulse gate stands at minus thirty-seven volts and is rendered conductive by each positive going minus thirty volt finder pulse appearing in said output signal. The positive pulses appearing across emitter load resistor 2504 are coupled through capacitor 2505 to the base of normally non-conducting inverter amplifier transistor 2502, which may be type 2N94A, and render transistor 2502 conductive. The output signal from transistor 2502, which is taken from across collector load resistor 2506 and which comprises negative finder pulses, is coupled to the base of emitter follower transistor 2503, which may be type 2N94A. Transistor 2503, which is conductive as long as the output signal from transistor 2502 stands at minus twenty-four volts, is cut off by each negative going finder pulse appearing in said output signal. The output signal from transistor 2503, which is taken from across emitter load resistor 2507, normally stands at minus twenty-four volts and drops to minus thirty-four volts during the time channel of each line selected by the finder pulse gate. As previously explained, a pulse appears in the time channel of each successive line during the finder searching operation. Diode 2508 serves the purpose of clamping the negative swing on the output conductor from transistor 2503 to minus thirty-four volts.

The output signal from transistor 2503 is coupled to the anode terminal of diode 2111 in the reconstructor gate RG for a purpose which will be described in a subsequent paragraph. The output is also coupled to the anode terminal of diode 2109 in finder busy gate FBG. Diodes 2109 and 2110 form an "and" gate for negative signals. As previously described, minus twenty-four volt potential from the collector of transistor 2405 is applied to the anode terminal of diode 2110 at this time so that the negative finder pulses are blocked from the output of gate FBG. As previously described, the output signal from transistor 2503 is also coupled to the anode terminal of diode 2803 in the finder chain gate FCG for the purpose of driving the finder searching chain. The output signal from transistor 2503 is also coupled to the anode terminal of diode 2806 in the finder in-gate FIG.

Finder in-gate FIG, which comprises diodes 2805–2813 is a nine-input "and" gate for negative signals. Conductor AL–1, which stands at minus thirty-four volts during each pulse frame that link 1 is allotted and at minus twenty-four volts at all other times, is connected to the anode terminal of diode 2810. Conductor BLF′ from the busy lead converter circuit 17, which carries positive going minus twenty-four volt pulses in the time positions of all busy lines, is connected to the anode terminal of diode 2811. Conductor MPX from multiplexer 26, which carries negative going minus thirty-four volt pulses in the time positions of all lines of the group which are off-hook, is connected to the anode terminal of diode 2812. The collector potentials of five stages in the connector, namely, reset transistor 2602, digit A transistor 2701, connector switch-through transistor 2702, executive cut-in transistor 2816, and off-normal transistor 2603, are connected to the anode terminals of diodes 2813, 2805, 2807, 2808 and 2809, respectively. These five conductors from the connector carry information back to the finder that the connector is in the normal reset condition and is ready to handle an incoming call. If for any reason the connector does not reset, the finder in-gate is blocked and the finder cannot find a calling line during the time that it is allotted. The next allotted finder will then find the calling line.

Transistors 2602, 2701, 2702, 2816 and 2603 are the normally "off" sides of five flip-flops in the connector circuit. Executive cut-in transistor 2816 and connector switch-through transistor 2702 are held normally non-conductive by their emitter return to the collector of the reset output transistor 2521. Transistor 2521 is under control of finder switch-through in such a way that transistor 2521 is held non-conductive while the finder is idle. Off-normal and digit A transistors 2603 and 2701, respectively, are non-conductive due to the operation of the release transistor 2601 at the termination of the previous call handled by this link. Reset transistor 2602 is held non-conductive by its base return to the collector of the finder switch-through transistor 2405, which is conductive while the link is idle. Transistors 2602, 2701, 2702, 2816 and 2603, when non-conductive, relay a minus forty volt potential to their associated diodes in the finder in-gate.

From the above, it is evident that a negative output pulse is obtained from gate FIG when the finder is allotted by the allotter, when the connector is properly reset, when a multiplexer pulse exists in a time position not covered by a busy marking pulse, and if the finder searching chain is synchronized with the binary pulse generator

20. Expressed in Boolean notation, the output of this gate is:

$$(AL)(MPX)(BLF')(F)(RS)(ON')(EC')(CSW')(DA')$$

In the assumed call from station 211 to station 912, a multiplexer pulse appears on conductor MPX in time position 11 during the first pulse frame succeeding the going off-hook at station 211. A negative finder gate pulse appears in time position 11 from transistor 2503 and since line 11 is not marked busy on conductor BLF′, a negative pulse in time position 11 appears in the output signal from gate FIG. The output signal from gate FIG is coupled through capacitor 2419 and through diode 2420 in parallel with resistor 2421 to the base of transistor 2406, which is the normally "off" side of the finder switch-through flip-flop. The negative pulse in time position 11 appearing in the output signal from gate FIG renders transistor 2406 conductive and the resulting positive swing at the collector of transistor 2406 is coupled through cross-coupling resistor 2408 to the bases of transistor 2405 to render transistor 2405 non-conductive.

As previously described, the collector of transistor 2406 is coupled to the anode terminal of diode 2802 in the finder chain gate FCG. The positive going minus twenty-four volt signal at the collector of transistor 2406 serves to block gate FCG so that the finder searching chain remains in its setting for gating through pulses in time position 11 only. The negative going signal at the collector of transistor 2405 serves to unblock the finder busy gate FBG, which was previously described, so that finder gate pulses in time position 11 are transmitted through diode 2109 to the cathode terminal of diode 2510 in the link busy gate LBG.

Gate LBG comprises diodes 2510 and 2511 and is an "or" gate for negative signals. Diode 2511 is concerned with the application of connector gate pulses in the time position of the called line. This operation will be described in conjunction with the connector circuit. The output signal from gate LBG is coupled through resistor 2512 to the base of normally non-conductive link busy inverter amplifier transistor 2513. Transistor 2513, which may be type 2N112, is rendered conductive by each minus thirty-four volt finder pulse gated through diode 2510 and the resulting positive pulses appearing across collector load resistor 2514 are applied to switch control conductor SC1′ which extends to the switch bank translator 13 and to the emergency service line switch LS22. Diode 2519 serves to clamp the negative excursion on conductor SC1′ to minus thirty-four volts so that the waveform appearing on this conductor swings between minus thirty-four volts and minus twenty-four volts. As previously explained, the switch bank translator routes the switch control pulses to the busy lead converter circuit 17 which amplifies the pulses and returns them over conductor BLF′ to the finders of the group.

Even though the multiplexer pulses and the finder pulses in time position 11 persist, no further output is obtained from the finder in-gate since time position 11 is now marked busy by a positive pulse in that time position on conductor BLF′. Since the finder switch-through transistors 2405 and 2406 comprise a bi-stable flip-flop, no further pulses are required to maintain transistor 2406 conductive. However, a pulse must be provided to return the circuit to the idle condition wherein transistor 2405 is conductive when the call is abandoned by line 11. The release stage in the connector is employed to generate this return pulse.

We shall now turn our attention to the reconstructor and release stages of the connector to see how the finder switch-through transistors 2406 and 2405 are returned to the idle condition. The reconstructor part of the connector consists of the reconstructor gate RG of Fig. 21, the reconstructor amplifier transistors 2112 and 2113, the reconstructor output transistor 2114, the dial pulse integrator transistor 2115, the dial pulse make amplifier transistor 2209, and the dial pulse break amplifier transistor 2210. Transistors 2112, 2113, 2114, 2115, 2209 and 2210 may all be type 2N44. There are two inputs provided to the reconstructor gate. Negative multiplexer pulses corresponding to all lines which are off-hook appear on conductor MPX and are coupled to the anode terminal of diode 2116, and negative finder gate pulses are coupled to the anode terminal of diode 2111. Diodes 2116 and 2111 of gate RG form an "and" gate for negative signals so that the output of RG comprises the multiplexer pulses corresponding to the line which has just been seized by the associated line finder. This is expressed by (MPX)(F). In the assumed case, negative pulses in time position 11 appear in the output signal from gate RG and are coupled through capacitor 2117 to the base of transistor 2112. Transistors 2112 and 2113 are connected as an emitter coupled one-shot multivibrator with transistor 2113 normally conductive. The operation of this one-shot multivibrator is identical to the operation of the many one-shot multivibrators previously described. The time constant has been so chosen that a negative pulse having a duration of approximately one thousand and three hundred microseconds is derived at the collector of transistor 2113 in response to each gated multiplexer pulse. Since the frame rate is three hundred and ninety c.p.s., the output pulse persists for about one half of each frame. This pulse is coupled through capacitor 2118 to the base of normally non-conductive grounded emitter amplifier transistor 2114 which inverts the signal. When MPX pulses are present (during dial pulse makes) the square wave signal is generated, and the output signal from transistor 2114, which is taken from across collector load resistor 2119, varies between minus two volts and minus thirty-four volts.

The dial pulse integrator and dial pulse make amplifier transistors 2115 and 2209, respectively, are connected as an emitter-coupled flip-flop circuit with transistor 2209 being normally conductive. The base of transistor 2115 is connected through resistor 2120 to the collector of finder switch-through transistor 2405. As explained above, the collector of transistor 2405 stands at minus twenty-four volts until the line finder has completed its finding action. Thus, transistor 2115 is held non-conductive until the finder has seized a line. When the finder has found a line, the potential at the collector of transistor 2405 decreases to minus forty volts so that timing capacitor 2121, which is connected to the base of transistor 2115, would start to discharge toward this value. However, at this time, the output signal from transistor 2114, which is coupled to the base of transistor 2115 through diode 2122, rises to minus two volts during half of each frame, as previously described. Thus, diode 2122 is poled in its forward direction, and since its forward impedance is low compared to the resistance of resistor 2120, timing capacitor 2121 will charge to minus two volts and thus hold transistor 2115 non-conductive. When the collector of transistor 2114 returns to minus thirty-four volts, diode 2122 is poled in its reverse direction and timing capacitor 2121 starts to discharge toward the minus forty volt collector potential of transistor 2405 through resistor 2120. However, before the base reaches a potential which would cause transistor 2115 to start conducting, the collector of transistor 2114 again rises to minus two volts poling diode 2122 in the forward direction and again charging timing capacitor 2120 to minus two volts. This action continues, until the multiplexer pulses in the time position of the calling line 11 are interrupted, due to dialing and the like, for a period greater than necessary to discharge the timing capacitor 2120 to a voltage where transistor 2115 starts conducting. Timing capacitor 2120 is chosen so that it will fully discharge during each such interruption so that transistor 2115 is rendered conductive and transistor 2209 is rendered non-conductive through cross-coupling resistor 2123. The output of transistor 2209, which appears across collector load resistor 2211, is a D.-C. signal which is a very close approximation to the line current waveform in the calling telephone line. For this reason, we say that this circuit "reconstructs" the original supervisory signal. The output signal from transistor 2209 is coupled through resistor 2212 to the base of normally non-conductive grounded emitter amplifier transistor 2210. Transistor 2210 inverts the signal from transistor 2209 so that a positive pulse appears across collector load resistor 2213 in response to each dial impulse break. The waveforms appearing at various points throughout the reconstructor circuit are shown in Figs. 46 and 47 of the drawings.

The output signal from transistor 2210 is coupled to the anode terminals of diodes 2604 and 2605 in the release gate RLG. Diodes 2605, 2606, 2607 and 2608 form an "and" gate for negative signals which controls the release action only when the party selection flip-flop or the digit counter flip-flop fail to return to their normal setting upon termination of the call. The operation of this portion of the release gate will be described later in conjunction with the connector circuit.

Diodes 2604 and 2609 comprise an inhibitor gate and diodes 2610 and 2611 form an "or" gate for negative signals which gates together the output signals from the "and" gate and the inhibitor gate. The collector of transistor 2405 is connected to the anode terminal of diode 2609. As previously described, the collector of transistor 2405 stands at minus twenty-four volts until the line has been seized. It then drops to minus forty volts. As explained above and as shown in Figs. 46 and 47, the collector of transistor 2210 stands at minus thirty-six volts at all times, except during dial breaks and during the interval between the hang-up time and the release of the link. At those times it rises to minus twenty-four volts. The output signal from the inhibitor gate is coupled to the anode terminal of diode 2611 in the "or" gate portion of the release gate RLG.

The output signal from the release gate RLG is coupled to the base of normally non-conductive grounded emitter release amplifier transistor 2612. Transistor 2612, which may be type GT692, is rendered conductive by each positive pulse appearing in the output signal from RLG. The output signal from transistor 2612 appearing across collector load resistor 2613 is coupled through diode 2614 to the base of release timing transistor 2515, which may be type 2N43. The base of transistor 2515 also has a two-microfarad timing capacitor 2516 connected thereto. While the link is idle and until the first break of the dial after the finder has found a line, transistor 2612 is non-conductive and diode 2614 is poled in the forward direction charging the timing capacitor 2516 to ground through the collector load resistor 2613. This charge on the timing capacitor holds transistor 2515 non-conductive. The minus forty-eight volt potential appearing across collector load resistor 2517 and coupled through resistor 2615 to the base of release transistor 2601, holds transistor 2601, which may be type 2N43, conductive. Since the emitter of finder switch-through transistor 2406 is returned to the collector of transistor 2601, the transistor 2406 emitter has a minus twenty-four volt enabling potential supplied thereto.

During dial impulse breaks, the output signal from gate RLG returns momentarily to minus twenty-four volts. This causes transistor 2612 to become conductive. The resulting minus thirty-four volt potential at the collector of transistor 2612 blocks diode 2614 and the timing capacitor 2516 starts to discharge toward minus forty-eight volts through resistor 2518. The time constant is so chosen that a period of roughly two hundred and fifty milliseconds is required for the base of transistor 2515 to reach a point where transistor 2515 will conduct. As long as dial interruptions are shorter than this critical value, transistor 2515 will not conduct, and transistor 2601 will stay in saturation. When the calling line hangs up for periods greater than two hundred and fifty milliseconds, transistor 2515 becomes conductive, thereby causing transistor 2601 to become non-conductive and the collector potential of transistor 2601 to drop to minus forty-eight volts. Since the emitter of transistor 2406 is connected to the collector of transistor 2601, transistor 2406 is rendered non-conductive and transistor 2405 is rendered conductive. When transistor 2405 becomes conductive, the RLG output signal returns to minus thirty-six volts, provided that the party selecting and digit counting flip-flops have returned to their "off" condition. Timing capacitor 2516 in the base circuit of transistor 2515 charges to ground which causes transistor 2515 to become non-conductive and transistor 2601 to again become conductive. However, the finder is now released and will remain so until a new call is initiated. In this manner, the finder is made to lock to a calling line even during dial interruptions, and releases only after a suitable release delay timing interval. When the finder releases, the minus twenty-four volt collector potential of transistor 2405 prevents transistor 2115 from conducting again and also blocks the finder busy gate FB. The minus forty volt potential of transistor 2406 enables the finder chain gate FCG so that the finder can resume its searching operation after synchronizing with the binary pulse generator 20, all as previously described.

*Connector circuit*

The connector circuit is also shown in Figs. 21–28 of the drawings. For purposes of explanation, the connector may be split up into a register section and a control section. The register section of the connector is primarily concerned with the counting and storage of dialed digits transmitted thereto from the calling line. The control section of the connector is concerned principally with the handling of the many pieces of information involved with the setting up of a call, and determining how the connector will respond during the call.

The purpose of the register section is to count and store the digits dialed into the link by the calling line, to generate a connector gate pulse in the time position of the called line, to control the transmission of dial tone, to generate a signal indicative of the desired party to be rung, to generate a ringing control pulse in the time position of the called line, released under the joint control of the register section and control section of the connector, to generate a start signal which initiates operation of the control section of the connector, and to generate a release signal for the finder and the connector at the end of a call.

The register section comprises in part, a seven-stage binary counting chain, a connector busy pulse gating circuit, a dial tone gate, a ringing control storage circuit, a ringing control gating circuit, an interdigit timing circuit, a digit counter and digit steering gates. In operation, the first dialed digit acts to drive the connector counting chain to the magnitude of the digit. The first digit is the party selection digit which, in the one hundred line system, will select the ring party if the digit was "1," "2," "3," "4," "5," "6," "7," "8" or "0," and will select the tip party if the digit was "9." The register section of the connector is so arranged that if a "9" is dialed as a first digit, the party selection storage circuit is operated, thus sending a signal to the ringing control gating circuit which will cause it to initiate ringing on the tip side of the line incident to switch-through. If a digit other than "9" is dialed, the party selection storage circuit is not operated and the ringing control gating circuit will ring the ring side of the line incident to switch-through.

At the end of the first digit, the connector counting chain is reset, leaving the party selection information in the storage circuit, and the counting chain is re-used to register the second or tens digit. The binary counting chain responds to this second digit by counting by tens. The third digit drives the binary counting chain to a setting corresponding to the tens digit plus the units digit, and at the end of the digit, the register remains in its driven setting.

Gating circuits associated with the connector counting chain, together with the connector gate circuit, serve to generate a pulse in the time position of the called line, termed a connector gate pulse. This pulse is routed to the control section, and after connector switch-through, is released to the switch control lead which extends to the switch bank translator 13 and to the emergency service line switch.

A dial tone circuit is incorporated in the register section to gate dial tone when the link is seized, and to terminate the tone at the end of the first dialed digit. This tone is routed through the control section to the tones 1 conductor and thence to the link 1 multiple point where it is transmitted to the calling line.

An interdigit timing circuit is incorporated in the register section of the connector which serves to determine the end of each successive digit, and to advance the digit counter at each such time until three digits have been counted. After the third digit, the circuit will not respond to further digits.

A digit counter is incorporated which sets up certain gate circuits in the register section in order that the register chain is properly controlled according to the sequence of the incoming digits. When the last digit has operated the digit counter, a sart signal is sent to the control section which causes it to initiate trunk hunting, busy testing, switch-through, and the like.

The purpose of the control section of the connector is to extract calling multiplexer or input pulses from the multiplexer lead which agree with those of the calling line which has seized the associated line finder, to detect, reconstruct, integrate and clip these pulses to form suitable dial impulses for operation of the register section, and to respond to the initiating signal and connector gate pulse received from the register section and the various control pulses received from the common equipment in the following manner.

If the connector gate pulse does not coincide in time position with a busy marking pulse on the busy lead connector conductor BLC′, switch-through occurs, which in turn, releases the connector gate pulse to the switch control conductor SC1′ whereby it is transmitted to the switch bank translator 13 and to the emergency service line switch. At the same time, ringing control signals are released from the register section of the connector and are routed to the called line circuit to initiate ringing of either the tip party or the ring party, depending upon information received from the ringing storage circuit. At the same time, the ringing trip gate is primed so that the connector will respond to answering supervision originating on the called line.

After switch-through, if the called line answers, a multiplexer pulse is received in the time position of the called line which serves to operate the ringing trip circuit. This serves to terminate transmission of the ringing control signals to the called line circuit.

If the connector gate pulse does coincide with a busy marking pulse on conductor BLC and the finder gate pulse does not coincide with an executive cut-in marking pulse, switch-through does not occur, but instead, the busy circuit operates. The connector is locked in this busy condition until the call is abandoned by the calling line. Busy tone is released by the connector to conductor tones 1 and is routed to the link 1 multiple point and thence to the calling line to inform it of the busy condition of the connector.

If the connector gate pulse does coincide with a busy marking pulse and the finder gate pulse does coincide with an executive cut-in marking pulse, the connector releases an executive release pulse in the time position of the called line to conductor ERO to forcibly release the link engaging the desired line provided that the desired line is not marked with an executive busy pulse on conductor EBI indicating that the desired line is already engaged in an executive call. When the other link is released, the connector switches through to the desired line after a brief false connector busy period, as described in conjunction with the busy lead converter circuit 17.

If the connector gate pulse coincides with a busy marking pulse as well as a trunk marking pulse on conductor TH, a trunk hunting gate releases a pulse to the connector chain, regardless of whether or not the finder gate pulse coincides with an executive cut-in marking pulse. This circuit acts to advance the connector counting chain in the register section of the connector one step, so that a new connector pulse is generated.

The above operations are accomplished in a group of "logic" gates, which respond to the variety of information fed to them by operating associated circuits.

At the termination of the call, the reset circuit operates to return the ring trip stage, the connector switch-through stage, the executive cut-in stage, the busy stage and the connector binary counting stages to their normal state so that the link may handle a new incoming call. Coincidentally, signals are fed to the finder in-gate of the finder which informs the finder of the reset condition of the connector, which in turn, permits the line finder to engage itself with a new calling line.

The connector register section comprises twelve stages which are all interconnected to perform the function of registering the three dialed digits and to initiate operation of further circuits in the connector. A list of the connector register circuits and a brief description of their functions follows.

Figure 26:
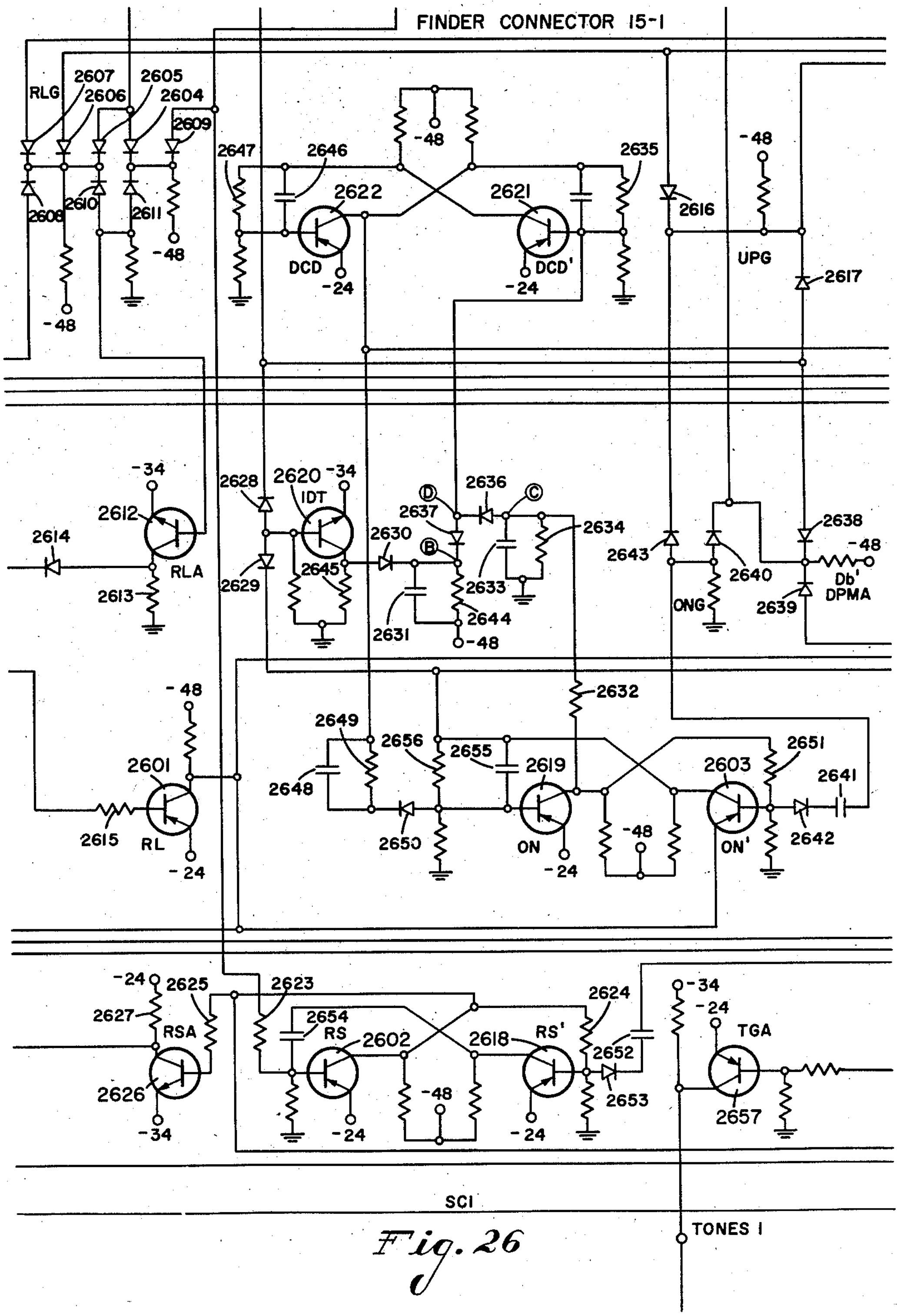

(1) The units and party gate UPG, which is shown in Fig. 26 and which comprises diodes 2616 and 2617, serves to gate through the first and third digits to connector drive A transistor 2422. The second and any digits following the third digit are blocked by gate UPG.

(2) Transistor 2422, which may be type 2N44, is the connector driver for the first, or "A" stage, of the connector chain and serves to step the connector binary chain (counting by ones) in response to the individual dial impulses of the first and third digits received from the calling line. The transistor is also used to step the chain by ones during the trunk hunting operation.

Figure 22:
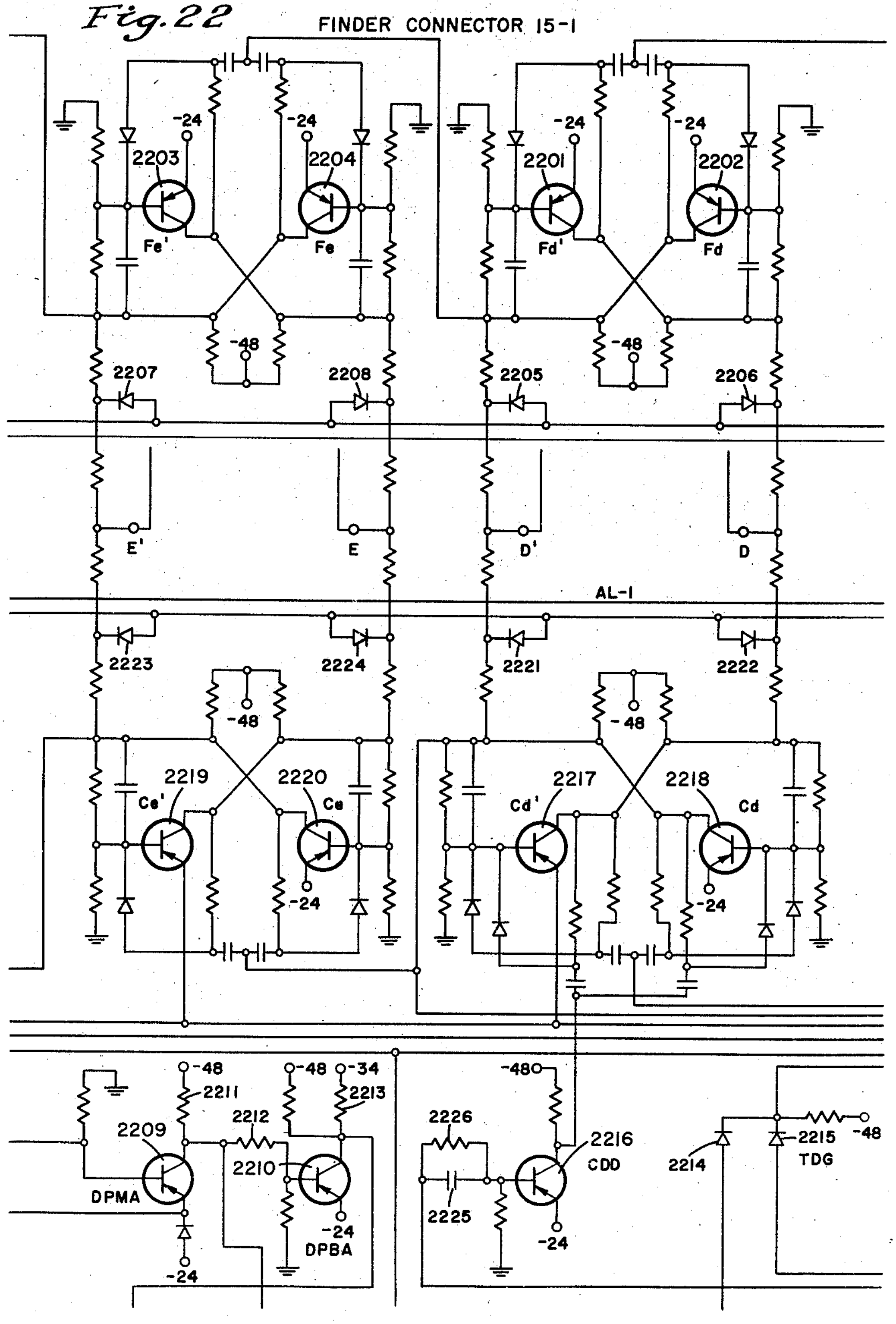

(3) The tens digit gate TDG, which is shown in Fig. 22 and comprises diodes 2214 and 2215, serves to gate through the second digit to connector drive B transistor 2309. The first, third and any succeeding digits are blocked by gate TDG.

(4) Transistors 2309 and 2216, the connector drivers for the "B" and "D" stages, respectively, of the connector chain, serve to step the connector binary chain (counting by tens) in response to the second dialed digit from the calling line. Transistor 2216 is driven by transistor 2309. Both of these transistors may be type 2N44.

(5) The connector counting or register chain is a seven-stage binary divider comprising transistors 2423, 2424, 2310, 2311, 2312, 2313, 2217, 2218, 2219, 2220, 2124, 2125, 2126 and 2127. The connector binary register chain responds to the first three digits dialed from the calling line, and serves as a source of signals to operate the connector pulse gate. All of the transistors of the connector chain may also be type 2N44.

(6) The connector pulse gate comprises a diode associated with each of the fourteen transistors of the connector register chain in such a way that the output signal from each transistor is used to gate through signals from the binary pulse generator 20 appearing on conductors A,A'–G,G', inclusive. The particular signals gated through establish the time position corresponding to the setting of the connector register chain. This gating action is identical to the gating action of the finder searching chain, which was previously described. Only the method of setting the chain is different. The connector pulse gate comprises diodes 2425, 2426, 2314, 2315, 2316, 2317, 2221, 2222, 2223, 2224, 2128, 2129, 2130 and 2131.

(7) Gate $DaDb'$, which comprises diodes 2703 and 2704, serves to operate the reset stage in the connector after the first digit has been dialed.

(8) The reset bi-stable flip-flop comprising transistors 2602 and 2618, which may both be type 2N44, serves to reset the connector register chain at the end of the first digit in response to a signal from gate $DaDb'$ and also operates under control of the finder switch-through stage to hold various stages in the connector in their normal condition during idle periods.

(9) The off-normal flip-flop comprising transistors 2603 and 2619, which may both be type 2N44, serves to start the interdigit timing stages three times, once at the first break of each dialed digit. Further dialed digits cause no response from the off-normal stage.

(10) The interdigit timing transistor 2620, which may be type GT692, serves to differentiate between the make periods between individual dial impulse breaks and the make periods occurring between successive digits. Transistor 2620 responds to an interdigit period by transmitting an operate signal to the digit counter driver flip-flop.

(11) The digit counter driver flip-flop comprising transistors 2621 and 2622, which may both be type 2N44, responds to an operate signal transmitted thereto by transistor 2620 by generating a single short pulse suitable to drive the digit counter and reset the off-normal stage after each of the first three dialed digits. The digit counter driver flip-flop also generates a signal which controls the start of the party digit readout circuit in such a way that the party digit readout occurs before the digit counter operates.

(12) The digit counter, which comprises transistors 2701, 2705, 2706 and 2707, is a binary counting chain which serves to count and store information relative to the numerical identity of the digit which has just been completed. In other words, the digit counter counts the three successive digits dialed into the connector from the calling line and advances one step at the conclusion of each of the digits. These transistors may all be type 2N44.

When the link is idle, the unprimed stages of the connector register chain, such as transistors 2424, 2311, etc., are conductive and the primed stages, such as transistors 2423, 2310, etc., are non-conductive. The emitter terminals of the primed stages are returned to the collector of reset output transistor 2509 which stands at minus thirty-four volts when the link is idle. Any of the primed stages of the register chain which are conductive at the termination of a call are rendered non-conductive by the minus thirty-four volt potential. The other transistor of the flip-flop is, of course, rendered conductive. For example, if the first stage transistor 2423 is rendered non-conductive, the negative swing at its collector renders transistor 2424 conductive through cross-coupling resistor 2427 and capacitor 2428.

The collector of finder switch-through transistor 2405 is coupled to the base of reset transistor 2602 through resistor 2623 for the purpose of resetting the connector. As previously explained, the collector of transistor 2405 stands at minus twenty-four volts when the link is idle. Transistor 2602 is, of course, non-conductive with minus twenty-four volts applied to its base and its collector stands at approximately minus forty-four volts. Transistor 2618 is held conductive through cross-coupling resistor 2624. The collector of transistor 2602 is also coupled to the base of reset amplifier transistor 2626 through resistor 2625. Transistor 2626, which may be type GT692, is held non-conductive by the minus forty-four volt potential applied to its base. The output signal from transistor 2626, which is taken from across collector load resistor 2627, is coupled through resistor 2520 to the base of reset output transistor 2521. Transistor 2521, which may be type 2N68, is non-conductive as long as the output signal from transistor 2626 stands at minus twenty-four volts and its collector potential thus stands at minus thirty-four volts.

It will be recalled that the collector potential of transistor 2405 drops to minus forty volts when the line finder seizes a calling line. When the minus forty volt potential is applied to the base of reset transistor 2602, transistor 2602 becomes conductive. The resulting positive swing at the collector of transistor 2602 renders transistor 2618 non-conductive and reset amplifier transistor 2626 conductive. When the output signal from transistor 2626 drops to minus thirty-four volts, reset output transistor 2521 is rendered conductive. The emitters of the primed stages of the connector register chain now have a solid minus twenty-four volt supply so that the chain remains in reset but is now able to respond to dial information coming from the calling line.

Before considering the operation of the connector register chain the operation of the digit counter must be explained, for the steering of the digits from the calling line to the register chain is controlled by the digit counter. The circuits concerned with digit counting are the off-normal transistors 2603 and 2619, the interdigit timing transistor 2620, the digit counter driving transistors 2621 and 2622, the digit counter transistors 2701, 2705, 2706 and 2707, the off-normal gate ONG of Fig. 26, and the reset transistors 2602, 2618, 2626 and 2521.

During reset, transistor 2603 is held non-conductive since its emitter is returned to the collector of reset output transistor 2521. Transistors 2621, 2705 and 2707 are non-conductive by virtue of the release of the finder-connector link after the previous calling line has hung up, as will be explained more fully hereinafter. Examining the interdigit timing transistor 2620, it can be seen that an "and" gate for positive signals comprising diodes 2628 and 2629 is connected in the base circuit of transistor 2620. The collector of off-normal transistor 2603 is coupled to the cathode terminal of diode 2629. Transistor 2603 is non-conductive at this time and its collector potential stands at minus forty volts. The collector of dial pulse make amplifier 2209 is coupled to the cathode terminal of diode 2628. As explained in the line finder description, the collector of transistor 2209 normally stands at minus twenty-four volts. Because of the action of this "and" gate, the base of transistor 2620 stands at minus forty volts and transistor 2620 is held non-conductive. With transistor 2620 non-conductive, diode 2630, which is connected between the collector of transistor 2620 and point B, is poled in the forward direction charging the timing capacitor 2631 to ground potential. Point C is connected through resistor 2632 to the collector of off-normal transistor 2619 which stands at minus twenty-four volts, since transistor 2619 is conductive at this time. Thus, capacitor 2633, which is connected to point C, is charged to approximately minus twenty volts as determined by the voltage division across resistors 2632 and 2634. Since the base of digit counter driver transistor 2621 is returned through cross-coupling resistor 2635 to the collector of transistor 2622, which stands at minus twenty-four volts, diode 2636 between C and D is poled in the forward direction holding the base of transistor 2621 at minus twenty volts. This voltage holds transistor 2621 non-conductive and also poles diode 2637, which is connected between point B and the base of transistor 2621, in the reverse direction, thereby disconnecting point B from the base of transistor 2621.

Assume that the calling party dials the first or ringing digit. It will be recalled from the description of the digit reconstructor that the output signal from dial pulse make amplifier transistor 2209 goes negative in response to the first break interval of the digit. The output signal from transistor 2209 is coupled to the anode terminal of diode 2638 in gate Db'DPMA. The collector Db' transistor 2707 is coupled to the anode terminal of diode 2639 which forms the other input of this "and" gate for negative signals. Since transistor 2707 is now non-conductive and its collector potential stands at approximately minus forty volts, the negative pulses appearing in the output signal from transistor 2209 are coupled through gate Db'DPMA.

The first negative pulse appearing in the output signal from gate Db'DPMA is coupled through diode 2640 in the off-normal gate ONG, through capacitor 2641 and diode 2642 to the base of normally non-conductive transistor 2603 in the off-normal flip-flop circuit. Diode 2643 forms the other input of gate ONG, which is an "or" gate for negative signals. The output signal from the units pulse gate UPG is coupled to the cathode terminal of diode 2643. As will become apparent as the description proceeds, gate Db'DPMA is blocked at the completion of the second digit and the triggering pulse for the off-normal flip-flop circuit is coupled through diode 2643 during the third digit. When transistor 2603 becomes conductive, the positive swing at its collector renders transistor 2619 non-conductive because of the cross-coupling through capacitor 2655 and resistor 2656. Further negative pulses received from transistor 2209 during the first digit have no effect on the off-normal flip-flop circuit.

When transistor 2619 becomes non-conductive, its collector potential drops to minus forty volts so that timing capacitor 2633 at point C starts to discharge towards approximately minus thirty-six volts as determined by the voltage division across resistors 2632 and 2634. When point C reaches minus twenty-two volts, diode 2636 is poled in the reverse direction so that point C is disconnected from the base of transistor 2621. However, transistor 2621 will remain non-conductive because of the cross-coupling to the collector of transistor 2622 through resistor 2635. When transistor 2603 becomes conductive, its collector potential rises to minus twenty-four volts. The output signal of the "and" gate for positive signals comprising diodes 2628 and 2629 remains at approximately minus forty-one volts, however, since the collector of transistor 2209 stands at minus forty-one volts during the first break interval of the first digit. During the make period following the first break interval of the first digit dialed, the collector of transistor 2209 returns to minus twenty-four volts so that the output signal from the gate rises to minus twenty-four volts. This causes interdigit timing transistor 2620 to conduct and thus its collector potential drops to minus thirty-four volts. Since timing capacitor 2631 is charged to ground and the base of transistor 2621 is held at minus 22 volts, diode 2637 as well as diode 2630 are poled in the reverse direction. Timing capacitor 2631 now starts to discharge toward minus forty-eight volts through resistor 2644. If another break follows the first make of the first digit, the collector of transistor 2209 will again drop to minus forty-one volts causing transistor 2620 to become non-conductive. Thus, the timing capacitor 2631 will again charge to ground potential through the collector load resistor 2645 and diode 2630. The time constant of this circuit is chosen so that the potential at point B will not affect the base of transistor 2621 until a make period of greater than one hundred and seventy-five milliseconds follows a break period of the first dialed digit.

After one hundred and seventy-five milliseconds, point B falls to minus twenty-two volts so that diode 2637 is poled in the forward direction. The time constant of this circuit is altered when diode 2637 becomes conductive because of the additional resistors now in parallel with resistor 2644. Capacitor 2631 continues charging toward minus forty-eight volts with this new time constant until it reaches minus twenty-four volts. At this point, transistor 2621 starts to conduct and its collector potential rises toward minus twenty-four volts. Transistor 2622 starts toward non-conduction because of the cross-coupling to the collector of transistor 2621 through capacitor 2646 and resistor 2647. When transistor 2622 starts toward non-conduction, its collector potential becomes more negative forcing the base of transistor 2621 more negative than minus twenty-four volts. During this changeover period, diode 2637 is again poled in the reverse direction to disconnect point B from the base of transistor 2621. This is done so that the digit counter driver flip-flop circuit can complete its changeover rapidly without the by-passing effect of capacitor 2631 connected to the base of transistor 2621. When capacitor 2631 discharges to the base voltage of transistor 2621 in its conductive condition, diode 2637 is again poled in the forward direction to connect point B to the base of transistor 2621. However, this occurs after the complete changeover of the digit counter driver flip-flop circuit.

When transistor 2622 becomes non-conductive, its collector potential drops to minus forty volts which is the trigger signal for the party selection readout and storage circuit, as will be described in a subsequent paragraph. This negative voltage is also coupled to the base of off-normal transistor 2619 through capacitor 2648 in parallel with resistor 2649 and through diode 2650. Transistor 2619 becomes conductive and its collector potential rises to minus twenty-four volts which, due to the cross-coupling from the collector of transistor 2619 to the base of transistor 2603 through resistor 2651, causes transistor 2603 to become non-conductive.

When transistor 2603 becomes non-conductive, its collector drops to minus forty volts so that transistor 2620 is once again rendered non-conductive and capacitor 2631 charges to ground potential. Once again diode 2637 is poled in the reverse direction and point B and the base of transistor 2621 are disconnected. Transistor 2621 remains conductive, however, due to its connection with transistor 2622 as a flip-flop circuit.

When transistor 2619 becomes conductive and its collector potential rises to minus twenty-four volts, capacitor 2633 starts to charge toward minus twenty volts through resistors 2632 and 2634. When point C reaches minus twenty-four volts, diode 2636 is again poled in the forward direction. This connects the base of transistor 2621 to point C and raises the base of transistor 2621 more positive than the minus twenty-four volt potential of its emitter. Transistor 2621 thus starts toward non-conduction and transistor 2622 starts to conduct. When transistor 2622 starts to conduct, its collector potential becomes more positive, the base of transistor 2621 is forced more positive and diode 2636 is poled in the reverse direction. This disconnects point C and the base of transistor 2621 so that the changeover time of the digit counter driver flip-flop is not slowed down by having capacitor 2633 connected to the base of transistor 2621. When point C reaches minus twenty-two volts, diode 2636 again conducts and eventually pulls the base of transistor 2621 to minus twenty volts.

When transistor 2622 becomes conductive, its collector rises to minus twenty-four volts. This positive going signal is coupled to the base of digit counter transistor 2701 through capacitor 2708 and steering diode 2709. This positive signal renders transistor 2701 non-conductive and since the base of transistor 2705 is cross-coupled to the collector of transistor 2701 by capacitor 2710 and resistor 2711, transistor 2705 is rendered conductive. Thus, the first digit is counted in the digit counter comprising transistors 2701, 2705, 2706 and 2707.

It will be recalled that it is necessary to reset the digit register chain after the first digit has been stored. This resetting operation will now be explained. Gate D*a*D*b'* comprising diodes 2703 and 2704 is an "and" gate for negative signals. The collector of transistor 2701 is coupled to the anode terminal of diode 2703 and the collector of transistor 2707 is coupled to the anode terminal of diode 2704. The collector of transistor 2707 is at minus forty volts so that when transistor 2701 becomes non-conductive and its collector potential drops to minus forty volts, the output of this gate falls to minus forty volts. The output signal from gate D*a*D*b'* is coupled through capacitor 2652 and diode 2653 to the base of reset transistor 2618. Transistors 2602 and 2618 for this operation constitute a one-shot multivibrator with transistor 2618 normally non-conductive. Therefore, the negative signal applied to the base of transistor 2618 renders transistor 2618 conductive. The positive swing at the collector of transistor 2618 is coupled through capacitor 2654 to the base of transistor 2602 and renders transistor 2602 non-conductive. As shown before, when transistor 2602 becomes non-conductive, the reset output amplifier transistor 2521 is cut off and its collector drops to minus thirty-four volts. Since the emitters of all the primed stages of the connector register chain are returned to the collector of transistor 2521, all the primed stages are rendered non-conductive, thereby restoring the connector register chain to the reset condition. Transistor 2602 remains non-conductive for 2.5 microseconds, the time constant of the one-shot multivibrator, and then becomes conductive again. This is more than enough time to allow the connector register chain to reset. When transistor 2602 becomes conductive again, transistor 2521 becomes conductive so that the emitters of the primed stages of the connector register stages are again returned to a solid minus twenty-four volts and the chain is ready to register the second digit.

It should be noted here that capacitor 2633 together with resistor 2632 determine the length of time that digit counter driver transistor 2621 is conductive and transistor 2622 is non-conductive. Since the collector potential of transistor 2622 in going negative is the start signal for party selection readout, and the collector potential of transistor 2622 in going positive starts the reset circuit in operation, it can be seen that there is a delay between readout and reset of the connector chain. This delay is approximately one millisecond.

The first interruption of line current after the first digit has been counted will cause the output signal from transistor 2209 to drop to minus forty volts again which causes the output signal from the off-normal gate ONG to go negative. This negative signal triggers off-normal transistor 2603 as it did before and a new cycle is started in the digit counting stages. However, whereas the reset stage operated to reset the connector register stage after the digit counter operated to count the first digit, the digit counter operating to count the second digit will not operate the reset stage. This is because the output signal from gate D*a*D*b'*, which drives the base of transistor 2618, is going positive at this time because transistors 2701 and 2707 are both conductive at the termination of the second digit. Since a negative pulse is required to trigger the reset multivibrator, transistor 2618 remains non-conductive and the connector register chain will not reset after the second digit.

The first interruption of line current after the second digit has been counted will start another new cycle in the digit counting stages. Once again, however, the reset stage will not operate because the output signal from gate D*a*D*b'* is not negative since transistor 2707 is conductive.

After the third digit has been counted, the off-normal flip-flop circuit cannot be operated again until the main release has operated which is in response to a hang up signal. This is true even though another digit may be mistakenly dialed from the calling line. The off-normal flip-flop circuit is prevented from being triggered by the first negative pulse appearing in the output signal from transistor 2209. Since, after the third digit, the collector of transistor 2707 stands at minus twenty-four volts, gate D*b'*DPMA is blocked. Thus, the base of transistor 2603 is isolated from the negative pulse.

The operation of the connector digit register chain will now be described. As previously mentioned, the register comprises seven flip-flop scale of two dividers connected in tandem. Since the information derived from the calling line concerning the number of the desired called line is in decimal form, a conversion is necessary to register the called line number in the binary connector digit register chain.

Reset or zero in decimal notation is equivalent to 0000000 in the binary notation. It will be remembered from the description of the binary pulse generator 20, and it can be seen in the binary pulse chart of Figs. 42–45, that the combination of waveforms ABCDEFG from the binary pulse generator form a pulse in time position zero. Since the unprimed letters correspond to 0 and the primed letters correspond to 1, it can be seen that in the reset condition of the register the unprimed stages, such as transistors 2424, 2311, 2313, etc., are conductive, and the primed stages, such as transistors 2423, 2310, 2312, etc., are non-conductive.

To register a decimal number 001 in the binary register, it is seen that the new setting of this register must be 0000001. All stages of the register remain in the same setting as for reset except for the "A" stage which must have the primed side or transistor 2423 conductive. It is obvious, from the previous discussion of the binary pulse generator 20, that one positive pulse fed to the input gate of the "A" stages of the register will set the "A" stages so that the primed stage is conductive. If two pulses are fed to the input gate of the "A" stages of the register, the primed stage becomes conductive in response to the first pulse and becomes non-conductive again in response to the second pulse. When the second pulse renders transistor 2423 non-conductive and transistor 2424 conductive, a positive pulse is fed from the collector of transistor 2424 to the input gate of the "B" stage to render *Cb′* transistor 2310 conductive. Thus, the setting of the binary register, in response to two positive pulses applied to the input gate of stage "A," is a change from reset (0000000) to the binary equivalent (0000010) of the decimal number 002.

It should now be obvious that if, starting with the binary connector registor chain in reset, we apply a number of positive pulses to the input gate of the "A" stages, the register will respond to these pulses by counting them in such a manner that the register will assume a setting which in binary notation will agree with the decimal number of the pulses received. This is true for up to one hundred and twenty-seven pulses. The one hundred and twenty-eighth pulse would return the register to reset and any more pulses following one hundred and twenty-eight would be counted as one, two, three, etc., from this point.

Referring to the binary pulse chart of Figs. 42–45, it can be seen that the binary equivalent to the decimal number 010 is AB′CD′EFG or 0001010. Therefore, merely by changing the settings of the "B" and "D" stages so that the B′ and D′ transistors 2310 and 2217, respectively, are conductive, the register is set in the binary equivalent of the decimal number 010. This setting is obtained by feeding a positive pulse to the "B" stage input gate, and another positive pulse to the input gate of the "D" stages. Thus, it can be seen that there are two methods of registering the decimal number 010 in the binary chain. The first method is to apply ten positive pulses to the input gate of the "A" stages, and the second method is to apply one positive pulse to the input gate of the "B" stages and one positive pulse to the input gate of the "D" stages.

To more fully illustrate the second method, assume that the decimal number "20" is to be registered. This is accomplished by applying two positive pulses to the input gate of the "B" stages and two positive pulses to the input gate of the "D" stages. The first positive pulse applied to the input gate of the "B" stages renders *Cb* transistor 2311 non-conductive and *Cb′* transistor 2310 conductive. The second positive pulse renders transistor 2310 non-conductive and transistor 2311 conductive. The resulting pulse at the collector of transistor 2311 renders *Cc* transistor 2313 non-conductive and *Cc′* transistor 2312 conductive. The first positive pulse applied to the input gate of the "D" stages renders *Cd* transistor 2218 non-conductive and *Cd′* transistor 2217 conductive. The second positive pulse renders transistor 2217 non-conductive and transistor 2218 conductive. The resulting positive pulse at the collector of transistor 2218 renders *Ce* transistor 2220 non-conductive and *Ce′* transistor 2219 conductive. The register is now standing with stages A, B, C′, D, E′, F, and G conductive. If the unprimed letters are replaced with 0 and the primed letters with 1, the binary number 0010100 is obtained. This is the binary numeration for the decimal number 020.

This method is used to register the second digit, which corresponds to the tens designation of the called line coming from the calling line. Each pulse received from the calling line during this digit carries a weight of ten and must be applied to the binary register so that it carries a weight of ten in binary notation.

Figure 23:
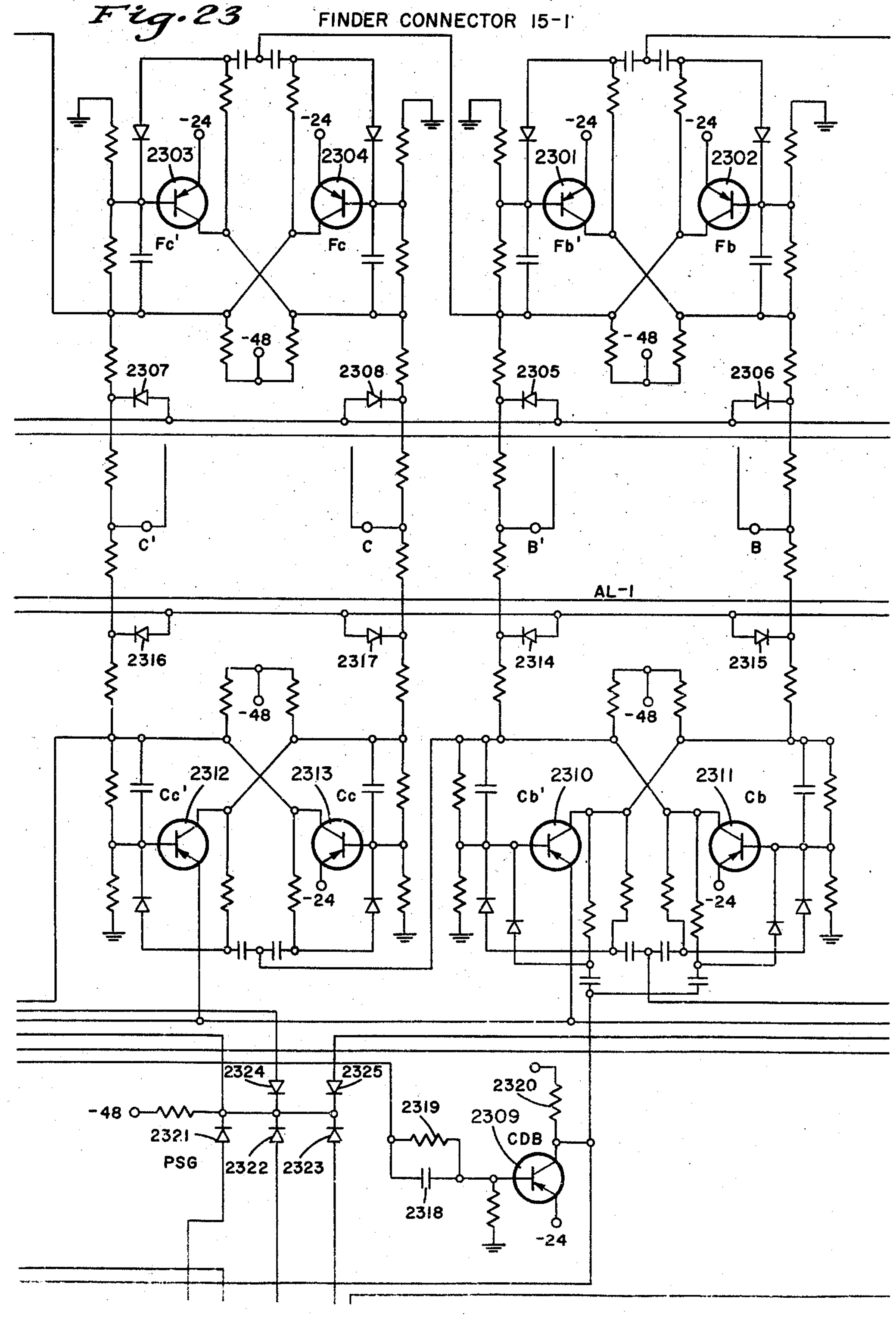

It should be recalled that the circuits concerned with registering the dialed information coming from the calling line and with generating a connector gate pulse in the time position of the called line are the units and party gate UPG, the A stage connector driver transistor 2422, the tens digit gate TDG, the B stage connector driver transistor 2309, the D stage connector driver transistor 2216, the stages of the binary connector register chain, the party selection gate PSG of Fig. 23, the party selection storage flip-flop circuit comprising transistors 2522 and 2523, the connector gate clipper, integrator and amplifier transistors 2524, 2525 and 2526, respectively, and the connector busy gate CBG of Fig. 25.

As previously described, the reset output transistor 2521 is non-conductive and its collector stands at a potential of minus thirty-four volts when the connector is in the reset condition. Since the emitters of all the primed stages of the binary connector register chain are returned to the collector of transistor 2521, all the primed stages of the register are non-conductive during reset. Also, as explained in a previous paragraph, the collector of dial pulse make amplifier transistor 2209 stands at minus twenty-four volts and the collector of dial pulse break amplifier transistor 2210 stands at minus thirty-six volts during reset. After the finder has seized the calling line, transistor 2521 is rendered conductive and its collector voltage rises to minus twenty-four volts. This returns the emitters of the primed stages of the collector register chain to a solid minus twenty-four volts so that they can now respond to positive pulses fed to their input gates. The dial pulse make and dial pulse break transistors 2209 and 2210, respectively, do not change from their reset condition after the finder has seized a calling line. The primed stages of the digit counter are non-conductive due to the release of the subject link after the calling line which previously had engaged the subject link hung up. The output waveforms of the various connector stages are shown in Figs. 46–49.

The units and party gate UPG is a two-input "and" gate for negative signals and comprises diodes 2616 and 2617. The output signal appearing at the collector terminal of digit counter transistor 2705 is coupled to the anode terminal of diode 2616 and the output signal appearing at the collector terminal of dial pulse make amplifier transistor 2209 is coupled to the anode terminal of diode 2617. It will be recalled that the output signal from transistor 2705 stands at minus forty volts until the digit counter operates at the completion of the first digit and after the digit counter operates at the completion of the second digit, as previously explained. Thus, the output signal from gate UPG follows the voltage appearing at the collector of transistor 2209 during the first and third digits. The output signal from gate UPG is coupled to the anode terminal of diode 2640 in off-normal gate ONG and to the cathode terminal of diode 2428 in the base circuit of connector driver transistor 2422.

Diodes 2428 and 2429 form an "or" gate for negative signals. Diode 2429 is concerned with the trunk hunting operation which will be described in a subsequent paragraph. The output signal from this gate is coupled through capacitor 2430 and resistor 2431 to the base of normally non-conductive transistor 2422. Each negative pulse appearing in the output signal from gate UPG renders transistor 2422 conductive and the resulting positive pulses appearing across collector load resistor 2432 are coupled through capacitors and steering diodes to the A stage transistors 2423 and 2424 in the connector register chain.

The tens digit gate TDG is also a two-input "and" gate for negative signals and comprises diodes 2214 and 2215. The output signal from gate Db'DPMA is coupled to the anode terminal of diode 2214 and the output signal appearing at the collector terminal of digit counter transistor 2701 is coupled to the anode terminal of diode 2215. It will be recalled that the output signal from gate Db'DPMA comprises negative dial pulses during the first and second digits and that the output signal from transistor 2701 stands at minus forty volts during the second digit and after the third digit. Thus, the output signal from gate TDG comprises the negative dial pulses of the second digit. The gate is blocked during the first, third, and any other subsequent digits. The output signal from gate TDG is coupled through capacitor 2318 and resistor 2319 to the base of normally non-conductive B stage connector driver transistor 2309.

Each negative pulse appearing in the output signal from gate TDG renders transistor 2309 conductive. The resulting positive pulses appearing across collector load resistor 2320 are coupled through capacitors and steering diodes to the B stage transistors 2310 and 2311 in the connector register chain.

The output signal from transistor 2309 is also coupled through capacitor 2225 and resistor 2226 to the base of normally conductive D stage driver transistor 2216. Each positive pulse appearing in the output signal from transistor 2309 renders transistor 2216 non-conductive. The positive swing at the collector of transistor 2216, when it again becomes conductive after being rendered non-conductive by each input pulse, is coupled through capacitors and steering diodes to the D stage transistors 2217 and 2218 in the connector register chain.

Assume that the calling line 11 now dials the number "342," which is the number assigned to the ring party on line 42. As outlined above, the output signal from gate UPG will be a waveform identical to that appearing at the collector of dial pulse make amplifier transistor 2209 during the first digit. This waveform is amplified and inverted by transistor 2422 and applied to the A stage transistors of the connector register chain. The output signal from transistor 2422 is graphically illustrated as waveform CDA in Figs. 48 and 49 of the drawings. Each time that this signal goes positive in response to the interruption of line current by the dial springs at the calling station, the connector register changes its setting so as to produce the binary equivalent of the decimal number dialed.

The first impulse of the digit "3" renders transistor 2424 non-conductive and transistor 2423 conductive. The second impulse renders transistor 2423 non-conductive, transistor 2424 conductive, transistor 2311 non-conductive, and transistor 2310 conductive. The third impulse renders transistor 2424 non-conductive and transistor 2423 conductive. Thus at the end of the first digit, the connector register is set so as to gate through the waveforms appearing on conductors A', B', C, D, E, F and G. This corresponds to 0000011 which is the binary equivalent of the decimal number 003.

At the end of the first digit, the interdigit timing circuit operates to set in motion the digit counting operation. When the digit counter operates at the end of the first digit dialed from the calling line, the collector potential of digit counter transistor 2701 drops to minus forty volts and this negative drop sets the reset circuit in motion. The reset output transistor 2521 becomes non-conductive and, because of the connection between its collector and the emitters of all the primed stages of the connector register, register chain transistors 2423 and 2310 are rendered non-conductive. With the primed stages non-conductive and the unprimed stages conductive, the connector register is in reset. Just before the register is reset, the party selection readout operation is performed.

Pulses corresponding to the second dialed digit now appear on the collector of dial pulse make amplifier transistor 2209, as shown in Figs. 46 and 47. These pulses are blocked by gate UPG so that there are no pulses fed through the A stage connector driver transistor 2422 to the transistors of the A stage of the connector register. However, since the collector of digit counter transistor 2701 dropped to minus forty volts after the first digit, the tens digit gate TDG now allows the pulses on the collector of transistor 2209 to be gated through to the base of the B stage connector driver transistor 2309. Transistor 2309 amplifies and inverts these pulses and feeds them to the transistors of the B stage of the connector register. These pulses are also fed to the base of the *d* stage connector driver transistor 2216, as previously described. Transistor 2216 inverts the pulses on the collector of transistor 2309 and feeds them to the transistors of the D stages of the connector register. Since the steering diodes associated with the transistors of each stage of the connector register are arranged so as to allow only positive pulses through, it can be seen that for each interruption of line current by the calling party dial, a positive pulse is fed to the transistors of the B stage of the register. For each make following a break of line current by the calling party dial, a positive-going signal is fed to the transistors of the D stage of the register. Thus, for each digit dialed by the calling line, the transistors of the B stage of the connector register receive a positive-going signal at a time corresponding to a break of line current of the calling line. Also, at some time later (fifty milliseconds for a ten-pulse dial) the transistors of the D stage of the connector register will receive a positive-going signal due to the make of the dial of the calling line.

If the second digit dialed is "4," as shown in Figs. 46 and 47, the connector register will act as follows: the first break of the dial will cause transistor 2311 to become non-conductive and transistor 2310 to become conductive. The first make of the dial following this break will cause transistor 2218 to become non-conductive and transistor 2217 to become conductive. The second break of the dial will cause transistor 2310 to become non-conductive and transistor 2311 to become conductive. The positive-going voltage at the collector of transistor 2311 renders transistor 2313 non-conductive and transistor 2312 conductive. The second make of the dial causes transistor 2217 to become non-conductive and transistor 2218 to become conductive. The positive-going voltage at the collector of transistor 2218 renders transistor 2220 non-conductive and transistor 2219 conductive. The third break of the dial renders transistor 2311 non-conductive and transistor 2310 conductive. The third make of the dial renders transistor 2218 non-conductive and transistor 2217 conductive. The fourth break of the dial renders transistors 2311, 2313, 2218, 2220 and 2124 conductive and transistors 2310, 2312, 2217, 2219 and 2125 non-conductive. The fourth make of the dial renders transistor 2218 non-conductive and transistor 2217 conductive.

The connector register has now responded to a decimal number of "4" as a second digit by having the following transistors conductive: *Ca*, *Cb*, *Cc*, *Cd'*, *Ce*, *Cf'* and *Cg*. This in binary notation is 0101000 which is equivalent to the decimal number 40. Thus, the connector register has responded to the second dialed digit from the calling line by assigning a weight of ten to each pulse received and storing this number in binary form.

At the completion of the second digit, the digit counter will again respond as explained above and digit counter transistors 2701 and 2707 become conductive. Since the collectors of transistors 2701 and 2707 are positive-going at this time, gate D*a*D*b'* is blocked and no signal is derived to operate the connector reset circuit. Thus, the connector register is not reset after the second digit.

Pulses corresponding to the third dialed digit now appear on the collector of dial pulse make amplifier transistor 2209, as shown in Figs. 46 and 47. These pulses are blocked by gate TDG since the collector of transistor 2701 now stands at minus twenty-four volts. Thus, no pulses are fed to the transistors of the B or D stages of the connector register. However, since digit counter transistor 2705 becomes non-conductive at the end of the second digit, its collector is at minus forty volts and the pulses on the collector of transistor 2209 are gated through gate UPG to the base of A stage connector driver transistor 2422. Transistor 2422 amplifies and inverts these pulses and feeds them to the transistors of the A stage of the connector register.

The third digit dialed from the calling line is a decimal number "2," as shown in Figs. 46 and 47. The first pulse appearing in the output signal from transistor 2422 renders transistor 2424 non-conductive and transistor 2423 conductive. The second pulse renders transistor 2423 non-conductive and transistor 2424 conductive. The positive-going signal on the collector of its transistor 2424 is fed to the transistors of the B stages of the connector register and renders transistor 2311 non-conductive and transistor 2310 conductive. The following stages of the connector register are now conductive: C*a*, C*b'*, C*c*, C*d'*, C*e*, C*f'*, C*g*. This in binary notation is 0101010 which is the equivalent of the decimal number 42.

After the third digit, the digit counter will again operate so that transistors 2705 and 2707 are conductive. Since the collector of transistor 2707 is positive at this time, no signal is derived to operate the reset circuit of the connector and the connector register is not reset. As previously described, gates UPG and TDG are now blocked so that if any more digits are dialed from the calling line, the register will not respond to them.

Resistance gating circuits are provided for each of the fourteen stages of the binary connector register in order to form a connector pulse. This gating action is identical to that of the finder, which was previously described. With the connector in its present driven setting, a positive connector pulse in time position 42 is obtained at the output of the connector pulse gate.

Since the stages of the connector register are stepped along under control of the calling line dial impulses, it can be seen that the pulse appearing on the connector pulse output bus will change during the dialing time of the calling line; the pulse depending upon the setting of the register at that instant. When the register is driven to its final setting, the pulse appearing on the connector output bus will correspond to the magnitude of the second and third dialed digits; i.e., if the calling line has dialed "342," the output pulse will be in time position 42.

The selected time position pulse appearing on the connector output bus is coupled to the base of the connector gate clipper transistor 2524, which is a normally non-conductive NPN high-frequency junction transistor connected as an emitter follower. The positive pulses appearing across emitter load resistor 2527 are coupled through capacitor 2528 to the base of connector gate inverter transistor 2525, which is a normally non-conductive NPN high-frequency junction transistor connected as a grounded emitter amplifier. The output signal from transistor 2525, which is taken from across collector load resistor 2529, is coupled to the base of connector gate amplifier transistor 2526, which is a high-frequency NPN junction transistor connected as an emitter follower. The purpose of these three stages is to provide an amplifier having a high input impedance, low output impedance, and at the same time to provide means for carrying out wave shaping operations on the connector gate pulse, to clip the base line and to invert and standardize the pulse amplitude. The output signal from the connector gate amplifier transistor 2526 is a negative selected connector gate pulse having a duration of one time channel and having a repetition rate of one pulse frame. This connecttor gate pulse is in the time position of the called line, as selected by the calling line. Transistors 2524, 2525 and 2526 may be type 2N94A.

The negative connector gate pulse, appearing across resistor 2530 in the emitter circuit of transistor 2526, is coupled to the anode terminal of diode 2712 in gate D*a*D*b*SC. The output signal of this gate serves as a start signal and control for the trunk hunting circuit, the busy circuit and the connector switch-through circuit, all contained in the control section of the connector. The negative connector gate pulse is also coupled to the anode terminal of diode 2531 in the connector busy gate CBG. This gate is blocked and the connector gate pulse is prevented from being released over the conductor SC1' to the switch bank translator until the connector switches through to the called line.

A dial tone gate DTG is provided in the register section of the connector to control the transmission of dial tone to the link 1 multiple point. Gate DTG is an "and" gate for negative signals and comprises diodes 2713, 2714 and 2715. Dial tone from tone and pulse generator 19 in the common equipment is coupled to the anode terminal of diode 2713. The potential on the collector of digit counter transistor 2707 is coupled to the anode terminal of diode 2715, and the potential on the collector of digit counter transistor 2705 is coupled to the anode terminal of diode 2714. With the connector in a reset condition, transistors 2705 and 2707 are non-conductive and serve to unblock the gate so that dial tone is transmitted to the tone gate TG. Gate TG is a two-input "or" gate for negative signals comprising diodes 2716 and 2717. Dial tone is gated through this gate to the base of the tone gate amplifier transistor 2657. Transistor 2657, which may be type 2N44, is a grounded emitter amplifier which amplifies the dial tone and transmits it over conductor tones 1 to the link 1 multiple point. When either one or both of transistors 2705 and 2707 are conductive, a positive signal is derived which serves to block gate DTG against further transmission of dial tone. At the termination of the first digit, transistor 2705 becomes conductive to block the gate. From this point until the connector is released at the end of the call, either transistor 2705 or transistor 2707 is conductive to prevent the transmission of dial tone.

A party selection storage circuit is incorpoarted in the register section of the connector. This circuit is controlled by the particular value of the first digit dialed into the connector and serves to store information as to which party on the called line is to be rung. It supplies information as to the chosen party to the ringing control circuits of the connector which act to control the ringing of the proper party on the called line. The ringing storage circuit comprises transistors 2522 and 2523, which are connected as a flip-flop circuit. The operation of the flip-flop circuit is controlled by the party selection gate of Fig. 23. During periods when the link is idle, transistor 2523 is non-conductive due to the operation of the release stage in response to the hang up signal from the previous calling line which had engaged the subject finder. Transistor 2523 can be rendered conductive only by the application of a negative signal to its base.

The party selection gate PSG is a five-input "and" gate for positive signals comprising diodes 2321–2325, inclusive. The collectors of transistors 2622, 2705, 2707, 2218 and 2424 are connected to the anode terminals of diodes 2321, 2322, 2323, 2324 and 2325, respectively. Digit counter transistors 2705 and 2707 are both non-conductive during reset and until transistor 2622 becomes non-conductive at the end of the first digit. Thus, the collector potentials of transistors 2705 and 2707 are minus forty volts until this time. It will be recalled from the description of the operation of the digit counter that the collector of digit counter drive transistor 2622 stands at a potential of minus twenty-four volts during reset and until the end of the first digit. When the interdigit timing circuit operates at the end of the first digit, transistor 2622 is rendered non-conductive for one millisecond and its collector potential drops to minus forty volts during the one millisecond period.

Referring to the binary pulse chart of Figs. 42–45, it can be seen that the binary equivalent of the digit "9" is the waveform A'BCD'EFG. Therefore, only when a "9" is dialed as the first digit is the connector register set so that the primed transistors in the A and D stages, namely, transistors 2423 and 2217, are conductive. Any other number dialed as a first digit will set the chain so that either transistor 2423 or transistor 2217, or both, will be non-conductive. Thus, it is only necessary to check the setting of the A and D stages to obtain the desired information relative to the magnitude of the first digit.

If a "9" has been dialed as the first digit, transistors 2424 and 2218 will be non-conductive and their collector potentials will be at mnius forty volts. Since the digit counter has not yet operated, digit counter transistors 2705 and 2707 will be non-conductive and their collector potentials will be at minus forty volts. When digit counter drive transistor 2622 is rendered non-conductive at the end of the first digit, its collector will go minus forty volts so that all the inputs to gate PSG will be at minus forty volts. Thus, the output of gate PSG drops to minus forty volts and this negative-going signal is coupled through capacitor 2555 and diode 2532 to the base of party selection transistor 2523. Transistor 2523 is rendered conductive and because of the cross-coupling through resistor 2533, transistor 2522 is rendered non-conductive. If any number other than a "9" had been dialed as a first digit, either transistor 2424 or transistor 2218 would be conductive, and the collector voltage of the conducting transistor would be minus twenty-four volts so that no negative signal would appear at the output of gate PSG. Therefore, party selection transistor 2523 would remain non-conductive and transistor 2522 would remain conductive.

One millisecond after digit counter drive transistor 2622 becomes non-conductive, which is the signal which establishes the time to read out the party selection information in the connector register, transistor 2622 again becomes conductive and its collector potential will return to minus twenty-four volts. This positive-going potential is the signal that starts the reset action at the end of the first digit. Therefore, the party selection information in the connector register is read out and the register is reset one millisecond later so as to prevent any race beteen the two operations which would lead to possible error.

The collector potentials of party selection transistors 2522 and 2523 are coupled to the ringing control gates of the connector. When the connector switches through to the called line at the end of the third digit, these gates operate to transmit ringing control signals to the called line in such a way that the ring side of the line is rung if transistor 2522 is conductive and the tip side of the line is rung if transistor 2523 is conductive. Details of this portion of the connector will be described fully in a later paragraph. Both transistors 2522 and 2523 may be type 2N44.

At the end of the third digit, the digit counter operates so that digit counter transistors 2701 and 2706 are both non-conductive and their collector potentials stand at minus forty volts. Up until this time, either transistor 2701 or 2706, or both, are conductive so that one or both of their collectors stand at a potential of minus twenty-four volts. The collectors of transistors 2701 and 2706, the sampling pulse conductor SP, and the connector gate pulse conductor are connected to the anode terminals of diodes 2718, 2719, 2720 and 2712, respectively in gate D*a*D*b*SC, which is a four-input "and" gate for negative signals. The output signal from this gate is that which blocks the control section of the connector from operating until after the third digit has been dialed. During reset and up until the third digit has been dialed, the output of gate D*a*D*b*SC is minus twenty-four volts. This potential is fed to the trunk hunting gate, the busy gate and the switch-through gate in the control section of the connector in such a way as to prevent their operation. After the third digit, transistors 2701 and 2706 are both non-conductive, and their collector potentials stand at minus forty volts. This allows the connector gate pulse in the time channel of the called line and the negative sampling pulse to be gated together to form a ten microsecond pulse in the time position of the called line to initiate action in the control section of the connector.

The control section of the connector will now be described. The connector control section comprises seventeen stages which are all interconnected to perform the function of determining the particular manner in which the connector will respond during a given call. The connector reconstructor circuit, which comprises reconstructor gate RG, reconstructor amplifier one-shot multivibrator comprising transistors 2112 and 2113, reconstructor output amplifier transistor 2114, dial pulse integrator transistor 2115, dial pulse make amplifier transistor 2209, and dial pulse break amplifier transistor 2210, may properly be considered as a part of the connector control section. The operation of these circuits, however, has already been described in conjunction with the line finder. A list of the remaining circuits of the connector control section and a brief description of their functions follows.

(1) The executive cut-in gate ECIG, which is shown in Fig. 28, comprises diodes 2817–2822, inclusive. The purpose of this gate is to gate through an operating signal to the executive cut-in flip-flop circuit when either the calling or called line associated with the link is an executive line, or when the calling line selects the emergency service line 22 as the called line.

(2) The executive cut-in flip-flop circuit comprising transistors 2816 and 2823, which may both be type 2N44, is used to store the information as to whether or not executive service is to be given. This circuit controls the operation of the executive busy out-gate EBOG, the executive release out-gate EROG, and the busy gate BYG. An output signal from the flip-flop circuit is also coupled to the finder in-gate for the purpose of informing the line finder when the connector is properly reset.

(3) The executive busy out-gate EBOG, which is shown in Fig. 28, comprises diodes 2824, 2825 and 2826. The purpose of this gate is to release executive busy pulses to conductor EBO in the time positions of the calling and called lines whenever the executive cut-in flip-flop circuit is operated. The pulses appearing on conductor EBO mark those lines as busy in an executive call so that a second executive call cannot release a connection already engaged in an executive call or a call to the emergency service line 22.

(4) The executive release out-gate EROG, which is also shown in Fig. 28, comprises diodes 2827–2832, inclusive. The purpose of this gate is to release an executive release pulse in the time position of the called line to conductor ERO if the calling line is an executive line and the called line is busy, provided that the called line is not marked as a trunk hunting line, and further provided that the called line is not marked as already busy in an executive call. The pulse on conductor ERO is utilized to forcibly release the link which is handling a call involving the line desired by the calling executive.

Figure 24:
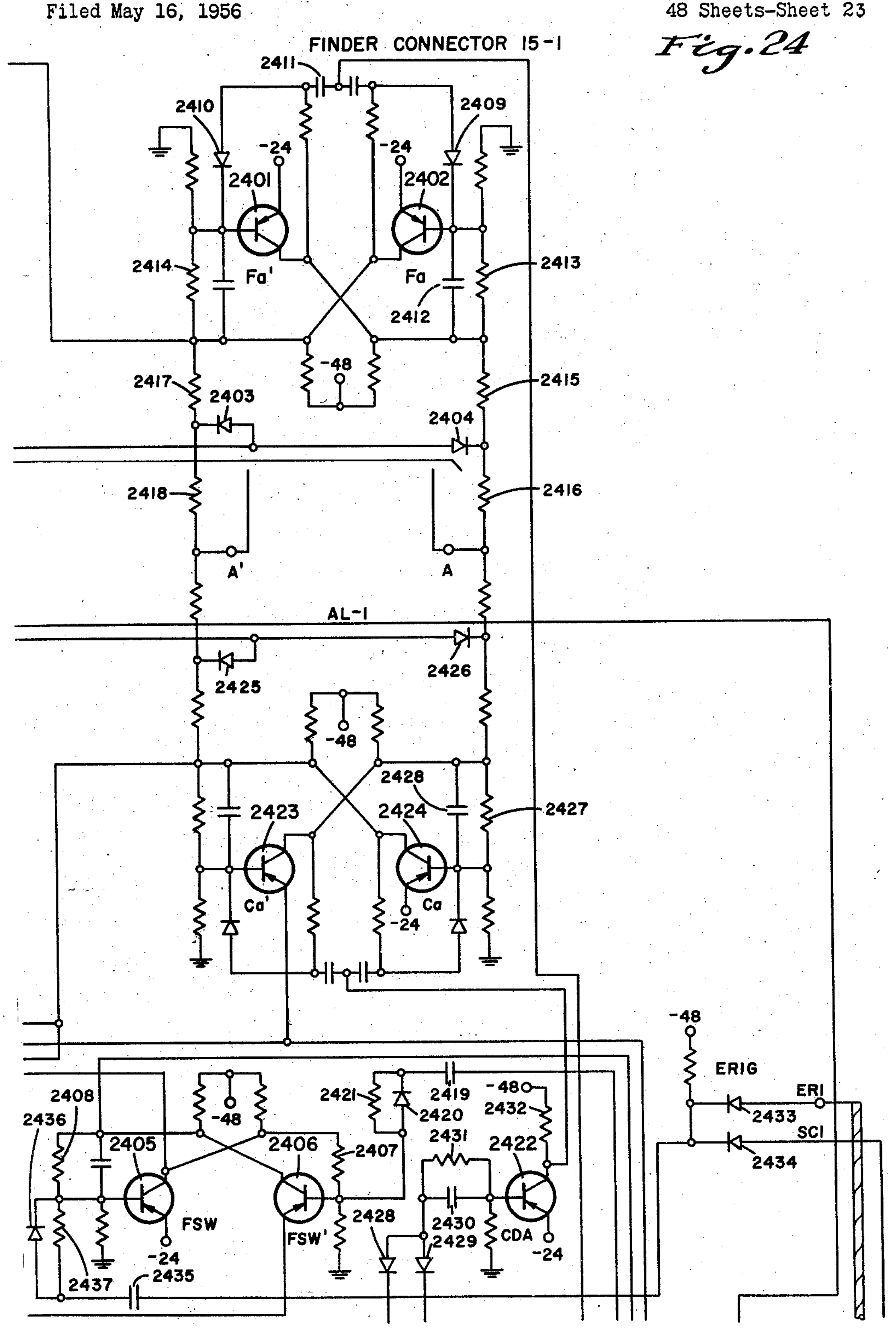

(5) The executive release in-gate ERIG, which is shown in Fig. 24, comprises diodes 2433 and 2434. It will be recalled that the busy lead converter circuit 17 amplifies the executive release pulses appearing on conductor ERO and returns them to the connectors over conductor ERI. The purpose of this gate is to release a triggering pulse to the reset side of the finder switch-through flip-flop whenever a pulse appearing on conductor ERI from another connector agrees in time position with the calling or called line seized by the subject link. Operation of the finder switch-through transistor 2405 by this means releases the link just as if the calling station had hung up.

Figure 27:
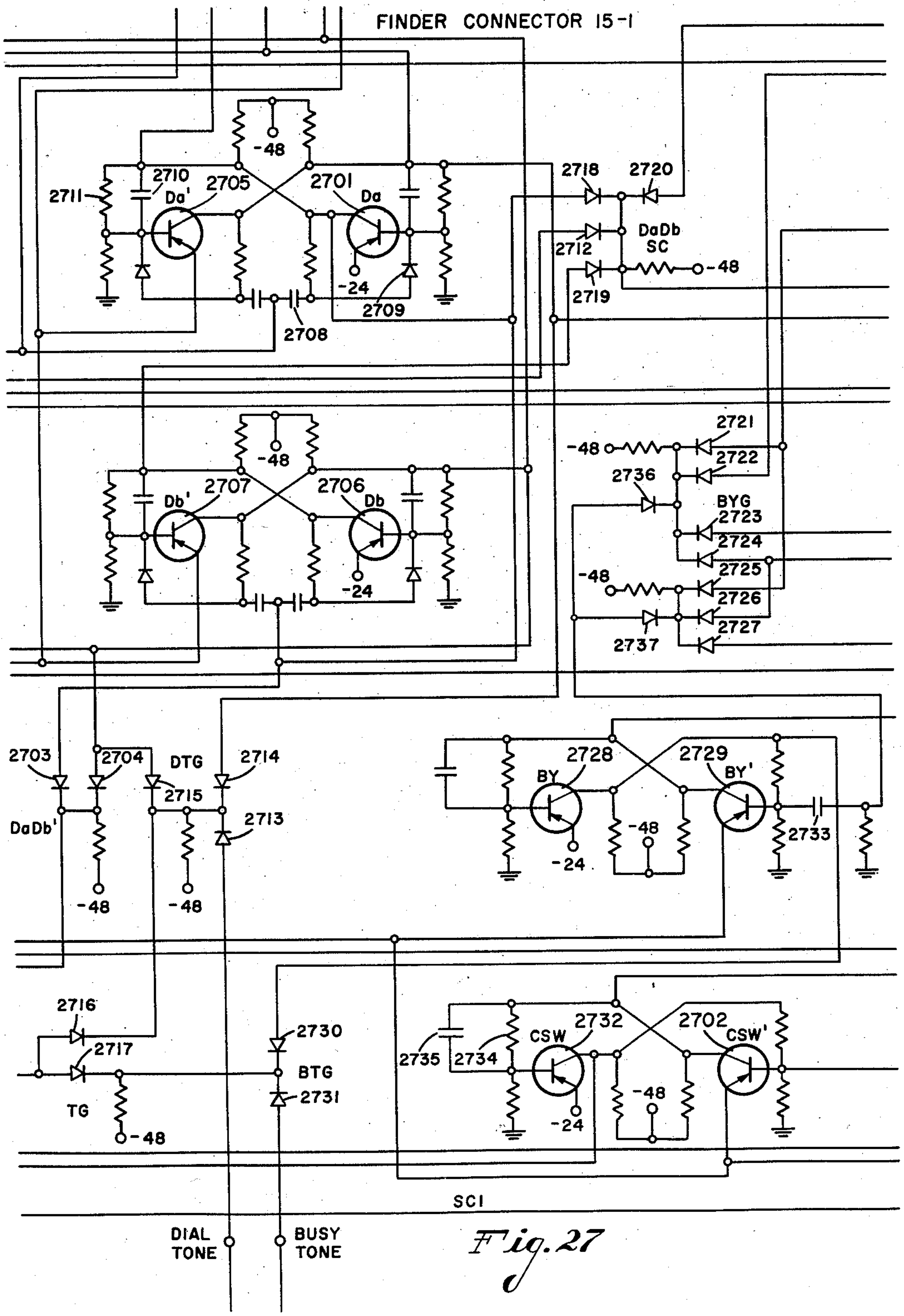

(6) The busy gate BYG, which is shown in Fig. 27, comprises two "and" gates and an "or" gate. The first "and" gate comprises diodes 2721–2724, the second "and" gate comprises diodes 2725–2727, and the "or" gate comprises diodes 2736 and 2737. The purpose of the first "and" gate is to release a triggering pulse to the busy flip-flop circuit through the "or" gate whenever the called line selected by the connector is marked as busy on conductor BLC, provided that the called line is not marked as a trunk line on conductor TH' and further provided that the calling line is not an executive line. The purpose of the second "and" gate is to release a triggering pulse to the busy flip-flop circuit through the "or" gate whenever the called line selected by the connector is marked as already busy in an executive call on conductor EBI, provided that the called line is not marked as a trunk hunting line on conductor TH'.

(7) The busy flip-flop circuit comprising transistors 2728 and 2729, which may be type 2N44, is used to lock the connector in the busy condition in response to a pulse in the time position of the called line released by the busy gate BYG. This circuit controls the busy tone gate BTG and the connector switch-through gate CSWG. The gate CSWG is blocked when the busy flip-flop circuit operates so that the connector cannot switch-through to the called line even though it may become idle sometime after the busy test is made.

(8) The busy tone gate BTG, which is shown in Fig. 27, comprises diodes 2730 and 2731. This gate is controlled by the busy flip-flop circuit to release busy tone to the tone gate amplifier transistor 2657 and thence to the link 1 multiple point via conductor tones 1.

(9) The connector switch-through gate CSWG comprises diodes 2833, 2834, 2835 and 2836. The purpose of this gate is to release an operating pulse to the connector switch-through flip-flop circuit if the pulse in the time position of the called line released by the D*a*D*b*SC gate does not coincide in time position with a busy marking pulse on conductor BLC' provided that the busy flip-flop has not already operated. This gate is enabled only while the link is allotted by link allotter 16. This prevents the simultaneous seizure of a called line by two or more links.

(10) The connector switch-through flip-flop circuit comprises transistors 2702 and 2732, which may be type 2N44. This circuit, when operated, enables the connector busy gate CBG, and prevents further transmission of pulses in the time position of the called line from gate D*a*D*b*SC to the trunk hunting gate THG, the busy gate BYG, and to the executive release out-gate EROG. Thus, gates THG, BYG, and EROG are blocked when the connector switches through.

(11) The connector busy gate CBG, which comprises diodes 2531 and 2534 serves to release pulses in the time position of the called line, when the connector switch-through flip-flop circuit has operated, to the link busy gate LBG, the ringing control gate RCG, and to the executive cut-in gate ECIG. As previously described, these pulses are gated through gate LBG, amplified by transistor 2513, and applied to the switch control conductor SC1' which extends to the switch bank translator 13 and the emergency service line switch LS22. Also as previously described, the pulses applied to gate ECIG are compared as to time position with the pulses on conductor CH22' so that the executive cut-in flip-flop is operated if the emergency service line is the called line.

(12) The ringing control gate RCG, which is shown in Fig. 25, comprises two "and" gates and an "or" gate. The first "and" gate comprises diodes 2545–2548, the second "and" gate comprises diodes 2549–2552, and the "or" gate comprises diodes 2553 and 2554. The first "and" gate serves to release line ringing control pulses in the time position of the called line through the "or" gate to conductor LRC during the ring tip interval if the party selection flip-flop is set for tip ringing. The second "and" gate releases pulses during the ring-ring interval if the party selection flip-flop is set for ring ringing. Both "and" gates are blocked when the ringing trip flip-flop circuit operates when the call is answered.

(13) The return in-gate RIG, which comprises diodes 2536 and 2537, is utilized to control the ringing trip flip-flop circuit. An operating pulse is released from this gate when a multiplexer pulse appears on conductor MPX in the time position of the called line. This occurs when the call is answered.

(14) The ringing control flip-flop circuit comprises transistors 2538 and 2539, which may be type 2N44. This circuit, when operated, blocks the ringing control gate so that no further ringing control pulses are transmitted to the called line.

(15) The switch control inverter amplifier transistor 2540, which may be type 2N112, inverts the pulses in the time positions of the calling and called lines appearing on conductor SC1' and applies them to gates EBOG, ECIG, and ERIG.

(16) As shown in Fig. 28, the trunk hunting gate THG comprises two "and" gates. The first "and" gate comprises diodes 2837 and 2838, and the second "and" gate comprises diodes 2846, 2847, and 2848. The first "and" gate serves to release pulses in the time position of the called line received from gate D*a*D*b*SC until the connector switch-through flip-flop circuit has operated. These pulses are applied to the second "and" gate of gate THG as well as to gates BYG and EROG. The second "and" gate in gate THG serves to gate a pulse to A stage connector driver transistor 2422 and thus to the A stage of the connector register chain whenever the called line agrees in time position with a busy marking pulse on conductor BLC and with a trunk marking pulse on conductor TH.

As can be readily appreciated, the action of the control section of the connector depends upon a number of factors, and the operation of the various circuits in response to one call may differ considerably from the operation in response to another. It seems best, therefore, to assume various possible call conditions where they may best explain the operation of individual circuits. Assume first of all that a non-executive cut-in line has initiated a call to station 912, which is already engaged with another call. The called line is therefore in time position 12, so that a negative connector gate pulse in that time position is transmitted to the control section of the connector through gate D*a*D*b*SC. Assuming also that 912 is not in a trunk group, no trunk marking pulses will appear in time position 12 on either of the trunk hunting conductors TH or TH'. Since 912 is busy, a negative busy marking pulse in time position 12 appears on the busy line connector conductor BLC. It will now be shown that, upon presentation of the start signal from the gate D*a*D*b*SC, the busy gate BYG releases a triggering pulse to the busy flip-flop circuit which operates and throws the connector into a permanent busy condition until the link is released.

It will be recalled that gate D*a*D*b*SC releases ten microsecond pulses in the time position of the called line to the control section of the connector only after the third digit has been dialed. The output signal from gate DaDbSC is coupled to the anode terminal of diode 2838 in the trunk hunting gate. The collector of connector switch-through transistor 2702 is coupled to the anode terminal of diode 2837. Diodes 2837 and 2838 form an "and" gate for negative signals which is shown as part of gate THG. Since the connector switch-through flip-flop has not operated, transistor 2702 is non-conductive and its collector potential stands at minus forty volts. Therefore, the negative ten microsecond pulses from gate DaBbSC are passed through this gate to the anode terminal of diode 2721 in the first "and" gate of the busy gate BYG. As previously mentioned, the first "and" gate of gate BYG comprises diodes 2721–2724 and is an "and" gate for negative signals.

Conductor BLC is connected to the anode terminal of diode 2722 in gate BYG. Since it was assumed that station 912 is busy, a negative pulse in time position 12 appears on busy lead connector conductor BLC at this time. Conductor TH′ is connected to the anode terminal of diode 2723 and since it was assumed that line 12 is not a line in a trunk line group, the trunk hunting conductor TH′ stands at minus thirty-four volts during time channel 12. The fourth and final input to this "and" gate is the collector of executive cut-in transistor 2816, which is connected to the anode terminal of diode 2724. Since it was assumed that the calling line was not an executive line, transistor 2816 is non-conductive and its collector stands at minus forty volts.

Since all of the inputs to this gate are negative during time position 12, a negative pulse appears at the output of this gate, is passed through diode 2736, which with diode 2737 forms an "or" gate for negative signals, and is coupled through capacitor 2733 to the base of busy transistor 2729. This negative pulse renders transistor 2729 conductive and, because of the flip-flop cross-coupling, transistor 2728 is rendered non-conductive.

The collector of transistor 2729, which now stands at minus twenty-four volts, is coupled to the anode terminal of diode 2834 in the connector switch-through gate CSWG. This positive going potential serves to block gate CSWG so that switch-through to line 12 cannot occur even if line 12 should become idle after the busy flip-flop circuit has operated.

The collector of transistor 2728, which now stands at minus forty volts, is connected to the anode terminal of diode 2730 in the busy tone gate BTG. Busy tone is coupled to the anode terminal of diode 2731, which forms the other input of this "and" gate for negative signals. The output signal from gate BTG is coupled to the anode terminal of diode 2717 which forms one input of the tone gate TG. Dial tone, gated by the dial tone gate DTG in the register section of the connector, as previously described, is impressed upon the second input of gate TG. Gate TG, which is an "or" gate for negative signals, serves to transmit either signal to the input of the tone amplifier transistor 2657. Transistor 2657 operates well below cut-off in the absence of either dial tone or busy tone signals. In this manner, any tone leakage signals from gates BTG or DTG are clipped and are not passed on to the link 1 multiple point. When either dial tone or busy tone is gated through to transistor 2657, this amplifier is driven to saturation and provides a rectangular output waveform of fixed amplitude, which is transmitted over conductor tones 1 to the link 1 multiple point, and thence connected by way of the switch bank back to the calling line. In this manner, the calling line is given an audible indication of the condition of the finder-connector link. When dial tone is received, the calling line is informed that the link is seized and that dialing may commence. When busy tone is received, the calling line is informed that the connector has locked into the busy condition, and that he must hang up.

Assume now that the calling line of the previous example reseizes the link at a later time and dials the number "912" at a time when line 12 is idle. This time the busy circuits of the connector should not operate but instead, the switch-through circuits should function. The connector switch-through gate CSWG is provided to determine when the connector should go into the condition of switch-through. Gate CSWG is a four-input "and" gate for negative signals. It can be seen that the output signal from gate DaDbSC is coupled directly to the anode terminal of diode 2833, the collector of busy transistor 2729 is connected to the anode terminal of diode 2834, the allotter control conductor AL–1 is connected to the anode terminal of diode 2835, and that conductor BLC′ is connected to the anode terminal of diode 2836. The output signal from gate DaDbSC comprises negative pulses in time position 12. Since the called line 12 is idle, busy transistor 2729 is non-conductive and its collector stands at minus forty volts. Since the busy line connector conductor BLC′ carries positive busy marking pulses in the time positions of busy lines, it stands at a negative potential during time position 12. It will be recalled from the description of the link allotter 16 that conductor AL–1 stands at minus twenty-four volts for fifteen pulse frames and stands at minus thirty-four volts for one pulse frame during each complete cycle of the allotter.

It can be seen from the above that, when link 1 is allotted, all inputs to gate CSWG are negative and an output pulse in time position 12 is obtained from the gate. The output signal from gate CSWG is coupled through capacitor 2839, and through diode 2840 in parallel with resistor 2841 to the base of connector switch-through transistor 2702. The first negative pulse appearing in the output signal from gate CSWG renders transistor 2702 conductive. Because of the flip-flop circuit cross-coupling through resistor 2734 and capacitor 2735, transistor 2732 is, of course, rendered non-conductive.

At the instant of switch-through, the called line 12 is made busy to prevent intrusion from other incoming calls, and to prevent the calling in of another line finder when station 912 goes off-hook in answer to the call under discussion. For this purpose, the collector of transistor 2732, which now stands at minus forty volts, is coupled to the anode terminal of diode 2534 in the connector busy gate CBG. Connector gate pulses in time position 12, appearing in the output signal from connector gate amplifier transistor 2526, are coupled to the anode terminal of diode 2531. Since diodes 2534 and 2531 form an "and" gate for negative signals, the connector gate pulses are released by gate CBG after transistor 2732 becomes non-conductive. The pulses are transmitted through the link busy gate LBG diode 2511, amplified by transistor 2513, and applied to the switch control conductor SC1′ in the same manner as are the finder gate pulses, which operation was previously described.

The switch control pulses applied to conductor SC1′ are routed to the switch bank translator 13. From the switch bank translator 13 the pulse in time position 12 is routed to the line switch circuits where it is utilized to activate the appropriate bi-stable control circuits in line switch LS12 to render the bilateral transistor switch between line circuit 12 and the link 1 multiple point conductive. Thus, the release of a finder gate pulse in time position 11 and a connector gate pulse in time position 12 by the subject link, results in connecting both the calling line 11 and the called line 12 to the multiple point for this link.

It will be recalled that the switch control pulses are also routed from the switch bank translator 13 to the busy lead converter circuit 17. Circuit 17 amplifies these busy marking pulses and returns them to the links on the busy line finder conductor BLF' and the busy line connector conductors BLC and BLC'. Since line 12 is now marked as busy, means must be provided in the connector to prevent the busy flip-flop circuit from operating after the switch-through flip-flop is operated. The collector of switch-through transistor 2702 is coupled to the anode terminal of diode 2838 in gate THG for this purpose. Since the collector of transistor 2702 now stands at minus twenty-four volts, the negative pulses appearing in the output signal from gate D*a*D*b*SC are now blocked. The output signal from the gate comprising diodes 2837 and 2838 now stands at minus twenty-four volts and thus blocks gates BYG, THG, and EROG.

It will be recalled from the description of the register section of the connector that the dialing of a first digit "9" results in rendering party selection transistor 2523 conductive and transistor 2522, which is the other transistor of the party selection flip-flop circuit, non-conductive. It can be seen that the collector of transistor 2523, which now stands at minus twenty-four volts, is coupled to the anode terminal of diode 2552 in the ringing control gate RCG, and that the collector of transistor 2522, which now stands at minus forty volts, is coupled to the anode terminal of diode 2548 in gate RCG. As previously mentioned, diodes 2545–2548 form a first "and" gate for negative signals and diodes 2549–2552 form a second "and" gate for negative signals.

The collector of ringing trip transistor 2538, which stands at minus forty volts until the call is answered, is coupled to the anode terminals of diodes 2545 and 2549. The output signal from gate CBG, which comprises negative pulses in time position 12, is coupled to the anode terminals of diodes 2547 and 2550. The ring tip control conductor RTC and the ring-ring control conductor RRC from the tone and pulse generator 29 are connected to the anode terminals of diodes 2546 and 2551, 2541, respectively. It will be recalled that each of these conductors stands at minus twenty-four volts for three seconds and at minus thirty-four volts for one second during each four-second ringing cycle.

From the above it can be seen that with transistor 2522 non-conductive, negative pulses in time position 12 are released by the left-hand "and" gate during the one-second ring tip interval as long as ringing trip transistor 2538 remains non-conductive. These pulses are transmitted through diode 2553, which with diode 2554 forms an "or" gate for negative signals, to line ringing control conductor LRC. Conductor LRC, which carries pulses in the time positions of all lines which are to be rung, extends to the ringing control amplifier 24. The pulses appearing on conductor LRC are amplified by circuit 24 and applied to the ringing control conductor RC which extends to the line switch circuits. Only the ringing control circuit in line switch 12 responds to ringing control pulses in time position 12. Thus, the ring control relay in line circuit 12 is operated during the tip ringing interval to apply the tip generator to line 12 and ring the tip party.

If the calling line had dialed "212" instead of "912," party selection transistor 2522 would have remained conductive. In this case, the left-hand "and" gate would be blocked and the right-hand "and" gate would function to release pulses in time position 12 to conductor LRC during the ring ringing interval. Line switch LS12 and line circuit 12 would respond by applying ring generator to the ring side of line 12.

The return in-gate which comprises diodes 2536 and 2537, is two-input "and" gate for negative signals. The output signal from connector busy gate CBG is coupled to the anode of diode 2537 so that incident to switch-through, this gate is enabled in time position 12. The multiplexer conductor MPX, which carries negative multiplexer pulses in the time positions of all lines which are off-hook, is connected to the anode of diode 2536. When a station on the called line 12 answers, therefore, a multiplexer pulse is generated in time position 12, gated through gate RIG and coupled through capacitor 2541 and diode 2542 to the base of transistor 2538 of the ring trip flip-flop circuit.

When transistor 2538 responds to the multiplexer pulse by becoming conductive, its collector potential immediately rises to minus twenty-four volts. This blocks the ringing control gate, preventing further transmission of ringing control pulses to the line circuit 12. The line circuit responds by terminating the application of ringing control power to the tip or ring conductors for the remainder of the call.

A completed connection is now set up from the calling line 11 to the called line 12. Voice signals are transmitted by way of the transistor switch circuits and the link 1 multiple point. The line finder generates a continuous series of finder gate pulses in the time position of the calling line 11 and the connector generates a continuous series of connector gate pulses in the time position of the called line 12. These two sets of pulses are mixed in the link busy gate LBG and amplified by the link busy amplifier transistor 2513. They are then fed to the switch bank translator 13 and mixed with the pulses in the time positions of lines engaged in calls through the other links of the system. From the switch bank translator 13, the pulses are fed to the busy lead converter circuit 17 which operates on these pulses in accordance with the requirements of emergency service number operation, then routes them back to all of the finders and connectors of the system over the connector line busy conductors BLC and BLC' and the finder line busy conductor LBF'. These two sets of busy marking pulses persist for the entire call, and terminate when the finder-connector link is released in response to a hang up on the calling line.

Assume now that a non-executive cut-in line initiates a call to a trunk group. Assume that lines 31, 32 and 33 are members of a three-line trunk group and that the calling line dials the digits "231" to reach this group. Assume also that the lines 31 and 33 of the group are busy and that the second line 32 is idle. Observed on the connector line busy conductors and the finder line busy conductor will be, among others, busy marking pulses in the time positions 31 and 33. On the trunk marking leads TH and TH' will be, among others, marking pulses in time positions 31 and 32 generated by the trunk hunting marker 22.

After the calling line has dialed the digits "231," the register section of the connector responds by generating a connector gate pulse in time position 31 and by releasing the start signal in time position 31 at the output of gate D*a*D*b*SC in a manner similar to that of the first example. Examining first the busy gate BYG, it can be seen that all of the inputs are negative during time position 31, except for the TH' input. A minus twenty-four volt potential exists on conductor TH' due to the positive trunk marking pulse in time position 31, so that gate BYG is prevented from transmitting a signal to the base of busy transistor 2729.

Examining next the switch-through gate CSWG, it can be seen that the gate is prevented from going negative since conductor BLC' stands at minus twenty-four volts during time channel 31.

Next examine the trunk hunting gate THG which comprises two "and" gates for negative signals. It will be recalled that the first "and" gate comprising diodes 2837 and 2838 gates through the negative pulses in time position 31 from gate D*a*D*b*SC until the connector switch-through flip-flop operates. These pulses are coupled to the anode of diode 2846 which forms one input of the second gate. Conductor BLC, which carries a negative busy marking pulse in time position 31, is connetced to the anode of diode 2847. Conductor TH, which also carries a negative trunk marking pulse in time position 31, is connected to the anode of diode 2848. Hence, since all inputs are negative, a ten microsecond pulse centered in time channel 31 is obtained from gate THG.

The negative pulse appearing in the output signal from gate THG is coupled through diode 2429, which with diode 2428 forms an "or" gate for negative signals, to the base of A stage connector drive amplifier transistor 2422. Transistor 2422 inverts and amplifies the pulse and applies it to the connector register A stage transistors 2423 and 2424 to step the register one step in the same manner as described for the party and units digits. The connector register chain now develops a connector gate pulse in time position 32.

In the particular example chosen, the line 32 of the trunk group is idle so that the connector stops trunk hunting after the connector register has changed to a setting corresponding to line 32. This is accomplished by disabling the trunk hunting gate THG after it has gated through a single pulse.

Examination of the trunk hunting gate THG shows that all inputs are negative during time position 32, except for the connector line busy conductor BLC. This conductor stands at minus twenty-four volts during time channel 32 since line 32 is idle. No negative pulse is derived from gate THG so that the connector register chain remains in the setting corresponding to line 32 for the remainder of the call.

Examination of the busy gate BYG shows that all inputs are negative during time position 32 with the exception of the connector line busy conductor BLC which stands at minus twenty-four volts during time position 32, and the trunk hunting marking lead TH' which carries a positive marking pulse in time position 32. No output is obtained, therefore, to operate the busy flip-flop circuit.

Examination of the switch-through gate CSWG shows that all inputs of the gate are negative during time position 32. Therefore, an output pulse occurs at the output of gate CSWG in time position 32. This pulse operates the connector switch-through flip-flop which, in turn, disables gates THG and BYG, enables gate RIG and releases the connector busy pulse as described in a previous paragraph. Ringing of line 32 is initiated, and incident to the answering of the call by a station on line 32, the ring trip flip-flop operates as before, and ringing of the called line is terminated.

If, in the above example, a plurality of successive busy lines were encountered within the trunk group, neither the busy gate BYG nor the switch-through gate CSWG would produce an output after the connector register had stepped in response to the output pulse from gate THG to the setting corresponding to line 32. However, all the inputs to gate THG would again be negative and another pulse would be sent to the input gate of the A stages of the register chain changing it to the setting corresponding to line 33 and causing a connector pulse to be gated through in time position 33. This action would continue until terminated by switch-through, or, as will be shown, by the action of the busy circuit.

Assume now that in the trunk group of the previous example all the lines of the group are busy and that a non-executive cut-in calling line initiates a call to the first line 331 of the group. The trunk hunting marking conductor TH still carries trunk marking pulses in time positions 31 and 32 as before, but the connector line busy conductors BLC and BLC' carry busy marking pulses in time positions 31, 32 and 33. Since a busy marking pulse appears on conductor BLC' in time position 31, gate CSWG is blocked. The busy gate BYG is also blocked since a trunk marking pulse is present in time position 31 on conductor TH'. The trunk hunting gate THG, however, produces a pulse in time position 31 and the connector register chain advances to a setting which gates through a pulse in time position 32. Since line 32 is also busy, the cut-through and busy stages remain blocked and trunk hunting continues to line 33. Since line 33 is the last line of the trunk line group, it is not marked as a trunk line on conductors TH and TH'. Therefore, the connector must stop on the last line whether it is idle or busy. Since line 33 was assumed to be busy, all inputs to busy gate BYG are negative and the busy flip-flop circuit operates to lock the connector in the busy condition. Of course, if line 33 is idle, the connector switches through and one of the stations on line 33 is rung, as previously described.

Assume that the executive line 01 initiates a call through link 1 to station 912 which is already engaged in a call. When the finder switch-through flip-flop operates, a switch control pulse is released in time position 01 to conductor SC1'. As previously explained, this pulse is coupled to the switch bank translator. The pulse is also coupled through capacitor 2543 and resistor 2544 to the base of switch control inverter amplifier transistor 2540. Transistor 2540, which is normally conductive, is rendered non-conductive by each positive pulse appearing on conductor SC1'. The output signal from transistor 2540, which is taken from across collector load resistor 2556 and applied to conductor SC1, thus comprises negative pulses in time position 01.

Conductor SC1 is connected to the anode terminal of diode 2820 in executive cut-in gate ECIG. Executive cut-in conductor ECI, which carries executive marking pulses in the time positions of executive lines 01 and 00, is connected to the anode of diode 2819. Diodes 2819 and 2820 form a two-input "and" gate for negative signals. Since both inputs are negative during time position 01, a negative pulse is coupled through the gate, through diode 2822, which with diode 2821 forms an "or" gate for negative signals, and through capacitor 2842 to the base of executive cut-in transistor 2816. Transistor 2816 is rendered conductive by the negative pulse and because of the cross-coupling through capacitor 2843 and resistor 2844, transistor 2823 is rendered non-conductive.

An output signal from the executive cut-in flip-flop is taken from the collector of transistor 2823 and coupled to the anole terminal of diode 2824 in the executive busy out-gate EBOG. The collector of transistor 2824 is also connected to the anode terminal of diode 2830 in the executive release out-gate EROG which will be described in a subsequent paragraph. The collector of transistor 2816 is connected to the anode of diode 2808 in the finder in-gate for the purpose of blocking this gate in the event that the flip-flop does not properly reset at the termination of the call, as previously described. The collector of transistor 2816 is also connected to the anode of diode 2723 in the upper "and" gate of the busy gate BYG for the purpose of preventing the operation of the busy flip-flop when an executive dials a busy line.

The executive busy out-gate EBOG comprises diodes 2824 and 2825, and is an "and" gate for negative signals. Since the collector potential of transistor 2823 now stands at minus forty volts, the negative pulses in time position 01 appearing on conductor SC1, which is connected to the anode terminal of diode 2825, are released by gate EBOG to executive busy out-conductor EBO. As previously described in conjunction with the busy lead converter circuit 17, the executive busy pulses appearing on conductor EBO are amplified in circuit 17 and returned over executive busy in-conductors EBI and EBI' to the connectors. The executive busy pulses on conductors EBI and EBI' serve to mark the line corresponding to that time position as busy in an executive call.

Since the called line 12 was assumed to be busy, the link handling a call to or from that line must now be forcibly released provided that line 12 is not already engaged in an executive call. The executive release out-gate EROG is provided for this purpose. Gate EROG is an "and" gate for negative signals comprising diodes 2827–2832, inclusive. Conductor BLC, which carries negative busy marking pulses in the time positions of all busy lines, is connected to the anode terminal of diode 2827. The output signal from the "and" gate comprising diodes 2737 and 2738 in gate THG is coupled to the anode terminal of diode 2828. Since the switch-through flip-flop has not yet operated, negative ten microsecond pulses in time position 12 appear in this output signal.

Conductor AL–1 from link allotter 16 is connected to the anode terminal of diode 2829. As previously explained, this conductor stands at minus thirty-four volts only during the pulse frames when link 1 is allotted. As previously mentioned, the collector of transistor 2823, which now stands at minus forty volts, is connected to the anode of diode 2830. Conductor TH′, which carries positive trunk marking pulses in the time positions of trunk lines 31, 32, 62 and 63, is connected to the anode of diode 2831 and finally, conductor EBI′, which carries positive executive busy pulses in the time positions of all lines engaged in executive calls, is connected to the anode terminal of diode 2832.

If it be assumed that link 1 is allotted (AL–1) and that line 12 is not engaged in an executive call (EBI′), and since line 12 is not marked as a trunk line (TH′), it should be apparent that all inputs to gate EROG are negative during the ten microsecond center portion of time position 12 and a negative executive release pulse appears at the output of gate EROG. The executive release pulse is coupled through isolating diode 2845 to executive release out-conductor ERO. It will be recalled from the description of the busy lead converter circuit 17 that the pulses appearing on conductor ERO are amplified by circuit 17 and returned over executive release in conductor ERI to the connectors of the system.

The executive release in-gate ERIG, which is shown in Fig. 24, comprises diodes 2433 and 2434 and is an "and" gate for negative signals. Conductor ERI, which now carries a negative executive release pulse in time position 12, is connected to the anode terminal of diode 2433. The switch control conductor SC1, which now carries a negative switch control pulse in the time position of the calling line 01, is connected to the anode terminal of diode 2434. It is to be noted that conductor SC1 does not carry a switch control pulse in the time position of the called line 12 since a pulse in the time position of the called line is released to conductor SC1′ and thus to conductor SC1 only after the connector switch-through flip-flop has operated. Thus, the executive release pulse in time position 12 on conductor ERI has no effect on the subject connector.

In the connector which is handling line 12 either as a calling line or a called line, however, a negative pulse in time position 12 appears on its SC conductor as well as on conductor ERI. The negative pulse in time position 12 is coupled through the capacitor in that connector corresponding to capacitor 2435, and through diode 2436 and resistor 2437 in parallel to the base of the finder switch-through transistor 2405. When transistor 2405 of the finder switch-through flip-flop circuit in that connector becomes conductive and transistor 2406 is rendered non-conductive, that link is released just as if the calling party had hung up. Thus, busy marking pulses in time position 12 now disappear from the busy conductors BLF′, BLC, and BLC′.

It will be recalled that the busy lead converter circuit 17 applies a one hundred millisecond false finder busy pulse to conductor BLF′ and a six millisecond false connector busy pulse to conductors BLC and BLC′ responsive to the appearance of a pulse on conductor ERI. The false busy pulses prevent other finders or connectors from seizing line 12 and the other line of the previous conversation when that link is released.

When the subject link is allotted after the disappearance of the false connector busy pulse from conductor BLC′, a negative signal is released by gate CSWG to operate the connector switch-through flip-flop circuit. When the connector switch-through flip-flop circuit operates, switch control pulses in time position 12 appear on conductor SC1′ and SC1, and are coupled through gate EBOG to conductor EBO. Thus, line 12 is now marked as busy in an executive call so that another link handling an executive call cannot override the executive call handled by this link. It can be seen that the gate EROG in the other link is now blocked in time position 12 and that link is unable to release an executive release pulse in time position 12 to conductor ERO.

It should be mentioned at this time that if another link which has a call for line 12 is allotted before the subject link is allotted after the six millisecond false connector busy period, the subject link will release another pulse to conductor ERO. The other link will thus be forcibly released.

Now consider the case where the executive line 01 calls line 12 when line 12 is already engaged in an executive call. As previously explained, gate EROG is blocked because of the positive executive busy pulse in time position 12 appearing on conductor EBI′. The upper "and" gate of the busy gate BYG is blocked during an executive call since the collector of executive cut-in transistor 2816 stands at minus twenty-four volts. The lower "and" gate of the busy gate BYG is now utilized to pass a negative triggering pulse to the busy flip-flop circuit. This gate, which comprises diodes 2725, 2726 and 2727 is also an "and" gate for negative signals. Ten microsecond negative pulses in time position 12 are coupled to the anode terminal of diode 2725. Conductor TH′, which carries positive pulses in the time positions of trunk lines 31, 32, 62 and 63, is connected to the anode terminal of diode 2726. Conductor EBI, which carries negative pulses in the time positions of all lines busy in executive calls, is connected to the anode terminal of diode 2727. Thus, during time position 12, all inputs to this gate are negative. The negative pulse passed through this gate and then through diode 2729, triggers the busy flip-flop circuit and the connector is locked in the busy condition.

It will be remembered that the emergency service line 22 is never marked busy to the connectors so that any number of lines may connect to the emergency service line simultaneously. Thus, the connector switch-through flip-flop in each connector operates when line 22 is called by that connector whether line 22 is idle or busy. It is necessary to provide means in each connector to prevent other links from being forcibly released when an executive line calls the emergency service number. The upper "and" gate comprising diodes 2817 and 2818 in executive cut-in gate ECIG is provided for this purpose. This gate is an "and" gate for negative signals. The output signal from the connector busy gate CBG, which comprises negative pulses in the time position of the called line, is coupled to the anode terminal of diode 2817. Conductor CH22′, which carries negative pulses in time position 22, is connected to the anode terminal of diode 2818.

It can be seen that when any calling line, whether it be an executive line or not, calls line 22, both inputs to this gate are negative during time position 22. The negative output signal is coupled through diode 2821 to trigger the executive cut-in flip-flop circuit. The negative pulse appearing on conductor SC1 is then coupled through gate EBOG to conductor EBO. Thus, it can be seen that emergency service line 22 is marked as busy on conductor EBI so that gate EROG in each connector of the group is blocked.

Next consider the case when executive line 01 calls trunk line 31. Assume that trunk lines 31 and 32 of the group are busy. It can be seen that gate EROG is blocked in time positions 31 and 32 since positive trunk marking pulses appear in those time positions on conductor TH'. Thus, the trunk hunting gate THG functions to advance the connector register chain to position 32 and then to position 33. If trunk line 33, which is the last line of the trunk group and as such is not marked on conductor TH', is idle, the connector switch-through flip-flop circuit operates and line 33 is seized. If line 33 is busy, all inputs to gate EROG are negative and an executive release pulse is released to conductor ERO. The link handling a call to or from line 33 is forcibly released and, after the six millisecond pulse connector busy period, the connector flip-flop circuit in the subject link operates and line 33 is seized.

The release operation in the connector circuits will now be described in more detail. It will be recalled from the description of the line finder that when the calling line hangs up for a period of time greater than two hundred and fifty milliseconds, release transistor 2601 is rendered non-conductive. The emitter electrodes of finder switch-through transistor 2406, party selection transistor 2523, digit counter transistors 2705 and 2707, and off-normal transistor 2603 are connected to the collector of release transistor 2601. When transistor 2601 becomes non-conductive, the last mentioned transistors should all become non-conductive. Transistor 2601 remains non-conductive until all of these transistors are rendered non-conductive and then becomes conductive again so as to put the link in a primed condition ready to respond to another call.

If for some reason, one or more of the transistors 2406, 2523, 2705, 2707 and 2603 fail to become non-conductive, release transistor 2601 is held non-conductive by the action of the release gate RLG. The finder switch-through transistor 2406, which would then have minus forty-eight volts applied to its emitter, could not respond to any output signal from the finder in-gate FIG. Thus, the subject link could not find the calling line and the line will be seized by the next allotted link.

It will be recalled from the description of the line finder that the release gate RLG comprises a four-input "and" gate for negative signals. This gate, which comprises diodes 2605–2608, has no effect on the action of release transistor 2601 until the party selection or digit counter flip-flop circuits fail to return to their normal setting at the end of a call. It can be seen that the collectors of transistors 2210, 2705, 2707 and 2523 are connected to the anode terminals of diodes 2605, 2606, 2607 and 2608, respectively. It will be recalled from the description of the line finder that the collectors of transistors 2210 and 2405 are connected to the anode terminals of diodes 2604 and 2609, respectively, in the right-hand inhibitor gate of gate RLG.

Thus, a release signal is derived from gate RLG when the output signal from dial pulse break amplifier transistor 2210 is positive at the same time that the output signal from finder switch-through transistor 2405 is negative or when the output signal from finder switch-through transistor 2405 is positive at the same time that one or more of the output signals from transistors 2705, 2707 and 2523 are positive. The output signal from transistor 2210 is positive whenever the line current of the calling line is interrupted, during periods when the link is in use (transistor 2405 collector negative). If the line current is interrupted for a period of time greater than two hundred and fifty milliseconds, timing capacitor 2516 discharges sufficiently to permit transistor 2515 to conduct, which, in turn, cuts off release transistor 2601, all as previously described.

When transistor 2601 becomes non-conductive, finder switch-through transistors 2406 and 2405 are rendered non-conductive and conductive, respectively. At this time the output signal from transistor 2210 goes negative, and if the party selection and digit counter flip-flop circuits have properly reset, the release signal will terminate. If, however, the party selection or the digit counter flip-flop circuits do not reset, the output signal from gate RLG remains positive and transistor 2601 remains non-conductive.

To summarize, the release signal is maintained until the party selection and digit counter flip-flop circuits have reset after finder switch-through transistor 2406 has become non-conductive. When finder switch-through transistors 2406 and 2405 become non-conductive and conductive, respectively, the reset transistors 2602, 2626 and 2521 become non-conductive as previously described. Since the emitters of ring trip transistor 2538, connector switch-through transistor 2702, executive cut-in transistor 2816, busy transistor 2729, and all of the primed stages of the connector register chain, are returned to the collector of reset output transistor 2521, all of these transistors become non-conductive when transistor 2521 is cut off. If the finder switch-through flip-flop circuit does not reset, one or more of these transistors will remain conductive, and due to the checking feature of the finder in-gate FIG, the link is unable to find a calling line. In response to the release signal from transistor 2601, transistors 2523, 2603, 2705, 2707 and 2406 are rendered non-conductive. Thus, all of the flip-flop circuits in the link must release before the link may handle another call.

While there has been shown and described what is at present considered to be the preferred embodiment of the invention, modifications thereto will readily occur to those skilled in the art. It is, therefore, desired that the invention not be limited to the system shown and described and it is intended to cover in the appended claims all such modifications as fall within the true spirit and scope of the invention.

What is claimed is:

1. In a telephone system, a continuously operating pulse generator having a plurality of settings which occur in turn and repeat during each cycle of operation, each of said settings representing a different individual time position which recurs in repetitive time position frames, a plurality of lines, means for assigning an individual one of said time positions to each of said lines, a searching type line finder comprising a register having a plurality of settings equal in number to the settings of the pulse generator and corresponding to the aforementioned respective time positions which recur in repetitive time position frames, means in said line finder for developing a finder gate pulse only when the setting of the line finder register is identical to the setting of the pulse generator, and means for utilizing a portion of each developed finder gate pulse to advance the setting of the line finder register, whereby the register is made to advance in synchronism with the generator and the developed finder gate pulses appear in the individual time position of each of said lines in turn.

2. The system of claim 1 including means responsive to the initiation of a call on any one of said lines for developing input pulses in the time position of the calling line, means for comparing the time position of said input pulses and said finder gate pulses, and means responsive to the coincidence in time position of an input pulse and a finder gate pulse for preventing further advancement of the line finder register.

3. In a telephone system, a continuously operating pulse generator having a plurality of settings which occur in turn and repeat during each cycle of operation, each of said settings representing an individual time position which recurs in repetitive time positive frames, a plurality of lines, means for assigning an individual one of said time positions to each of said lines, a plurality of searching type line finders common to said lines, each of said line finders comprising a register having a plurality of settings equal in number to the settings of the pulse generator and corresponding to the aforementioned respective time positions which recur in repetitive time position frames, means in each line finder for developing a finder gate pulse only when the setting of its register is identical to the setting of the pulse generator, means for utilizing a portion of each finder gate pulse developed by each line finder to advance the setting of the register in that line finder, means responsive to the initiation of a call on any one of said lines for producing input pulses in the time position of the calling line, means in each line finder for comparing the time position of said input pulses with the time position of said finder gate pulses, an allotter for enabling said line finders in turn, and means in each line finder operative only when that line finder is enabled and responsive to the coincidence in time position of an input pulse and a finder gate pulse for preventing further advancement of the register in that line finder, whereby that line finder thereafter functions to develop a finder gate pulse only in the time position of the calling line in each time position frame.

4. The system of claim 1 in which the allotter comprises means for enabling said line finders at the repetition frequency of said time position frames.

5. In a telephone system, a plurality of lines, a line identification generator operable to a plurality of successive settings, each of said generator settings corresponding to a different one of said lines, means controlled in accordance with the particular setting of said generator for marking the respective one of said lines for identification, means for developing an input signal whenever a calling line is marked for identification, a line identification register operable to a plurality of successive settings corresponding to the settings of said generator, means for producing a gating signal only when the setting of said register is identical to the setting of said generator, means for utilizing said gating signal to advance the regiser to the next successive setting, and means responsive to the simultaneous occurrence of an input signal and a gating signal for preventing further advancement of said register, whereby whenever an input signal is developed simultaneously with a gating signal the register remains in the setting which identifies the calling line.

6. A generator comprising a chain of frequency divider circuits, the operation of each generator divider circuit except the first being controlled by the preceding divider circuit at the output frequency of the preceding divider circuit, a continuously running oscillator for controlling the operation of the first of said generator divider circuits, a register comprising a chain of frequency divider circuits equal in number to the divider circuits of the generator chain, the operation of each register divider circuit except the first being controlled by the preceding divider circuit at the output frequency of the preceding divider circuit, means for producing a signal only when the setting of the register chain is identical to the setting of the generator chain, and means for utilizing the signal so produced to control the operation of the first register divider circuit.

7. In a telephone system, a plurality of lines, a generator comprising a chain of frequency divider circuits, the operation of each generator divider circuit except the first being controlled by the preceding divider circuit at the output frequency of the preceding divider circuit, a continuously running oscillator for controlling the operation of the first of said generator divider circuits to cause said generator chain to assume a number of settings in turn, each of said settings representing an individual time position which recurs in repetitive time position frames, means for assigning an individual one of said time positions to each of said lines, a line finder register comprising a chain of frequency divider circuits equal in number to the divider circuits of the generator chain, the operation of each register divider circuit except the first being controlled by the preceding divider circuit at the output frequency of the preceding divider circuit, means for producing a gating pulse only when the setting of the register chain is identical to the setting of the generator chain, and means for utilizing the gating pulses so produced to control the operation of the first register divider circuit, whereby the register is made to step in synchronism with the generator and the gating pulses produced appear in the individual time position of each of said lines in turn.

8. The system of claim 7 including means responsive to the initiation of a call on any one of said lines for developing input pulses in the time position of the calling line, means for comparing the time position of said input pulses and said gating pulses, and means responsive to the coincidence in time position of an input pulse and a gating pulse for preventing further stepping of the line finder register.

9. In a telephone system, a plurality of lines, a pulse generator comprising a chain of frequency divider circuits, the operation of each generator divider circuit except the first being controlled by the preceding divider circuit at the output frequency of the preceding divider circuit, a continuously operating oscillator for controlling the operation of the first of said generator divider circuits to cause said generator chain to assume a number of settings in turn, each of said settings representing an individual time position which recurs in repetitive time position frames, means for assigning an individual one of said time positions to each of said lines, a plurality of normally searching line finders common to said lines, each of said line finders comprising a register having a chain of frequency divider circuits equal in number to the divider circuits of the generator chain, the operation of each register divider circuit except the first being controlled by the preceding divider circuit at the output frequency of the preceding divider circuit, means in each line finder for producing a finder gate pulse only when the setting of its register chain is identical to the setting of the generator chain, means for utilizing the finder gate pulse produced by each line finder to control the operation of the first register divider circuit in that line finder, means responsive to the initiation of a call on any one of said lines for producing an input pulse in the time position of the calling line, means in each line finder for comparing the time position of said input pulses with the time position of said finder gate pulses, an allotter for enabling said line finders in turn, and means in each line finder operative only when that line finder is enabled and responsive to the coincidence in time position of an input pulse and a finder gate pulse for preventing further operation of its register chain, whereby that line finder thereafter functions to produce a finder gate pulse only in the time position of the calling line in each time position frame.

10. The system of claim 9 in which the allotter comprises means for enabling said line finders in turn at the repetition frequency of said time position frames.

11. A chain of frequency divider circuits in which the operation of each circuit except the first is controlled by the preceding circuit at the output frequency of the preceding circuit, a master oscillator for controlling the operation of the first of said circuits, each circuit having a number of output conductors equal to its factor of division, a second chain of frequency divider circuits equal in number to the circuits of the first chain, each succeeding circuit of the second chain having the same factor of division and the same number of output conductors as the respective succeeding circuit of the first chain, a common output conductor for said second chain, means for comparing the signals appearing on the output conductors of said first and second chains to produce a signal on the common output conductor only when a signal on an output conductor from each circuit of said first chain occurs simultaneously with a signal on the same respective output conductor of the second chain, and means for utilizing the signals appearing on said common output conductor to control the operation of the first circuit in said second chain.

12. In a telephone system, a plurality of lines, a generator comprising a chain of frequency divider circuits, the operation of each circuit except the first being controlled by the preceding circuit at the output frequency of the preceding circuit, each generator divider circuit having a number of output conductors equal to its factor of division, a continuously running master oscillator for controlling the operation of the first of said generator divider circuits to cause said generator chain to assume a number of settings in turn which settings individually represent individual time positions which recur in repetitive time position frames, means for assigning an individual one of said time positions to each of said lines, a line finder register comprising a chain of frequency divider circuits equal in number to the circuits of the generator chain, each succeeding circuit of the line finder chain having the same factor of division and the same number of output conductors as the respective succeeding circuit of the generator chain, a common output conductor for said line finder chain, means for comparing the signals appearing on the output conductors of said generator and line finder chains to produce a signal on the common output conductor only when a signal on an output conductor from each circuit of the generator chain occurs simultaneously with a signal on the same respective output conductor of the line finder chain, and means for utilizing the signals appearing on said common output conductor to control the operation of the first circuit in said line finder chain, whereby the line finder chain is made to step in synchronism with the generator chain and the signals produced on said common output conductor appear in the individual time position of each of said lines in turn.

13. The system of claim 12 including means responsive to the initiation of a call on any one of said lines for developing input signals in the time position of the calling line, means for comparing the time position of said input signals with the time positions of the signals appearing on said common output conductor, and means responsive to the coincidence in time position of an input signal and a signal appearing on said common output conductor for preventing further stepping of said line finder register chain.

14. A generator comprising $n$ frequency divider bistable circuits connected in tandem so that the operation of each circuit except the first is controlled by the preceding circuit at the output frequency of the preceding circuit, a continuously running master oscillator for controlling the operation of the first of said generator divider circuits, two output conductors for each of said generator divider circuits, a register comprising $n$ frequency divider bi-stable circuits connected in tandem so that the operation of each circuit except the first is controlled by the preceding circuit at the output frequency of the preceding circuit, means for intermittently operating the first of said register divider circuits, two output conductors for each of said register divider circuits, a common output conductor for said register divider circuits, and means for comparing the signals appearing on the output conductors from said generator and said register to produce a signal on the common output conductor only when a signal on an output conductor from each generator divider circuit occurs simultaneously with a signal on the same respective output conductor from the register, whereby a signal is produced on the common output conductor only when the setting of the register divider circuits is identical to the setting of the generator divider circuits.

15. The combination of claim 14 including means for utilizing the signals appearing on the common output conductor to operate the first register divider circuit.

16. In a telephone system, a plurality of lines, a generator comprising $n$ frequency divider bi-stable circuits connected in tandem so that the operation of each circuit except the first is controlled by the preceding circuit at the output frequency of the preceding circuit, two output conductors for each of said generator divider circuits, a continuously operating oscillator for controlling the operation of the first of said generator divider circuits to cause said generator divider circuits to assume $2^n$ unique settings in turn, each of said settings representing an individual time position which recurs in repetitive time position frames, means for assigning an individual one of said time positions to each of said lines, a line finder register comprising $n$ frequency divider bi-stable circuits connected in tandem so that the operation of each circuit except the first is controlled by the preceding circuit at the output frequency of the preceding circuit, two output conductors for each of said register divider circuits, a common output conductor for said register divider circuits, means for comparing the signals appearing on the output conductors from said generator and said register to produce a signal on the common output conductor only when a signal on an output conductor from each generator divider circuit occurs simultaneously with a signal on the same respective output conductor from the register, and means for utilizing the signals appearing on said common output conductor to control the operation of the first divider circuit in said register, whereby the register is made to step in synchronism with the generator and the signals produced on said common output conductor appear in the individual time position of each of said lines in turn.

17. The system of claim 16 including means responsive to the initiation of a call on any one of said lines for developing input signals in the time position of the calling line, means for comparing the time position of said input signals with the time positions of the signals appearing on said common output conductor, and means responsive to the coincidence in time position of an input signal and a signal appearing on said common output conductor for preventing further stepping of the line finder register.

References Cited in the file of this patent

UNITED STATES PATENTS

| | | |
|---|---|---|
| 2,490,833 | Ransom | Dec. 13, 1949 |
| 2,747,021 | Chubb et al. | May 22, 1956 |
| 2,773,937 | Morris | Dec. 11, 1956 |

UNITED STATES PATENT OFFICE

CERTIFICATE OF CORRECTION

June 23, 1959

Patent No. 2,892,035

Robert B. Trousdale

It is hereby certified that error appears in the printed specification of the above numbered patent requiring correction and that the said Letters Patent should read as corrected below.

Column 52, line 72, for "flip-flop" read -- flip-flip --; column 55, line 35, for "linke" read -- link --; column 94, line 67, for "positive" read -- position --; column 95, line 18, for the claim reference numeral "1" read -- 3 --.

Signed and sealed this 22nd day of March 1960.

(SEAL)

Attest:

KARL H. AXLINE

Attesting Officer

ROBERT C. WATSON

Commissioner of Patents